United States Patent
Aiura

(10) Patent No.: US 9,385,553 B2
(45) Date of Patent: Jul. 5, 2016

(54) BALANCE CHARGING CIRCUIT FOR SERIES-CONNECTED STORAGE CELLS AND BALANCE CHARGING METHOD FOR SERIES-CONNECTED STORAGE CELLS

(75) Inventor: Masami Aiura, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 608 days.

(21) Appl. No.: 13/822,511

(22) PCT Filed: Mar. 16, 2012

(86) PCT No.: PCT/JP2012/001842
§ 371 (c)(1),
(2), (4) Date: Mar. 12, 2013

(87) PCT Pub. No.: WO2012/127830
PCT Pub. Date: Sep. 27, 2012

(65) Prior Publication Data
US 2013/0187612 A1      Jul. 25, 2013

(30) Foreign Application Priority Data

Mar. 18, 2011   (JP) .................. 2011-061299

(51) Int. Cl.
*H02J 7/00* (2006.01)
*H01M 10/42* (2006.01)
*H01M 10/44* (2006.01)

(52) U.S. Cl.
CPC ........... *H02J 7/0068* (2013.01); *H01M 10/425* (2013.01); *H01M 10/44* (2013.01); *H02J 7/0019* (2013.01); *H01M 2010/4271* (2013.01)

(58) Field of Classification Search
CPC ................................... H02J 7/0068
USPC ........................................... 320/118
See application file for complete search history.

(56) References Cited

U.S. PATENT DOCUMENTS 5,650,710 A * 7/1997 Hotta ............... B60L 3/0046
                                                            320/128
6,081,095 A * 6/2000 Tamura ............ B60L 11/1861
                                                            320/118

(Continued)

FOREIGN PATENT DOCUMENTS

JP   2001-185229       7/2001
JP   2003-153460 A     5/2003

(Continued)

OTHER PUBLICATIONS

Supplementary European Search Report dated Jun. 29, 2015, for corresponding European Patent Application No. 12761230.7.

(Continued)

*Primary Examiner* — Richard Isla Rodas
*Assistant Examiner* — Dung V Bui
(74) *Attorney, Agent, or Firm* — Morgan, Lewis & Bockius LLP

(57) ABSTRACT

A coil is electrically connected to one of storage cells to charge it, and after that, the coil is electrically connected to the other one thereof to charge it. In a first charging period, a path of a charging current flowing into a reference voltage through the coil is formed, in a second charging period, a path of a charging current flowing into a second cell from the coil is formed, in a third charging period, a path of a charging current flowing into the reference voltage through the coil is formed, and in a forth charging period, one end of the coil is electrically conducted with one end of the first cell and another end of the coil is electrically conducted with another end of the first cell to form a path of a charging current flowing into the first cell from the coil.

27 Claims, 89 Drawing Sheets

(56) References Cited

U.S. PATENT DOCUMENTS

| | | | |
|---|---|---|---|
| 7,193,392 B2 | 3/2007 | King et al. | |
| 7,245,108 B2 | 7/2007 | Chertok et al. | |
| 7,378,818 B2 | 5/2008 | Fowler et al. | |
| 7,466,104 B2* | 12/2008 | Wang | H02J 7/0016 320/118 |
| 7,999,417 B2 | 8/2011 | Kato et al. | |
| 8,129,945 B2 | 3/2012 | Hartzog | |
| 2003/0139888 A1* | 7/2003 | Burns | H02J 7/0021 702/63 |
| 2004/0032236 A1* | 2/2004 | Canter | B64G 1/425 320/137 |
| 2008/0023123 A1 | 1/2008 | Downton et al. | |
| 2008/0191663 A1 | 8/2008 | Fowler et al. | |
| 2008/0231231 A1 | 9/2008 | Hartzog | |
| 2009/0278496 A1 | 11/2009 | Nakao et al. | |
| 2010/0244781 A1* | 9/2010 | Kramer | H02J 7/0016 320/162 |
| 2010/0253286 A1* | 10/2010 | Sutardja | H02J 7/0014 320/118 |
| 2010/0261048 A1* | 10/2010 | Kim | H01M 10/44 429/150 |
| 2013/0187612 A1* | 7/2013 | Aiura | H01M 10/425 320/118 |

FOREIGN PATENT DOCUMENTS

| | | |
|---|---|---|
| JP | 2006-067742 | 3/2006 |
| JP | 2008-017605 | 1/2008 |
| JP | 2008-206395 | 9/2008 |
| JP | 2009-232660 | 10/2009 |
| JP | 2009-284591 | 12/2009 |
| JP | 2010-522528 | 7/2010 |
| JP | 2010-522528 A | 7/2010 |
| JP | 2011-172433 | 9/2011 |
| WO | 2008/115538 A1 | 9/2008 |

OTHER PUBLICATIONS

Park et al., "A New Buck-boost Type Battery Equalizer", Applied Power Electronics Conference and Exposition, 2009. APEC 2009. 24th Annual IEEE, Feb. 15, 2009, pp. 1246-1250.

International Preliminary Report on Patentability dated Sep. 24, 2013, for the corresponding international application No. PCT/JP2012/001842.

* cited by examiner

FIG. 7

|    | T1 | T2 | T3 | T4 |
|----|----|----|----|----|
| S1 |    |    |    | ON |
| S2 | ON |    | ON |    |
| S3 |    | ON |    |    |
| S4 |    |    |    | ON |
| S5 |    |    | ON |    |
| S6 | ON | ON |    |    |

FIG. 8

|    | T1 | T2 | T3 | T4 |
|----|----|----|----|----|
| S1 |    |    |    | ON |
| S2 | ON |    | ON |    |
| S3 |    | ON |    |    |
| S4 |    |    |    | ON |
| S5 | ON |    | ON |    |
| S6 |    | ON |    |    |

|  | T1 | T2 | T3 | T4 |
|---|---|---|---|---|
| S1 |  |  |  | ON |
| S2 | ON |  |  |  |
| S3 |  | ON | ON |  |
| S4 |  |  | ON |  |
| S5 | ON | ON |  | ON |

|    | T 1 | T 2 | T 3 | T 4 |
|----|-----|-----|-----|-----|
| S 1 |     |     |     | ON  |
| S 2 | ON  |     |     |     |
| S 3 |     | ON  | ON  |     |

|  | T1 | T2 | T3 | T4 |
|---|---|---|---|---|
| S1 |  |  |  | ON |
| S2 | ON |  |  |  |
| S3 |  | ON | ON |  |

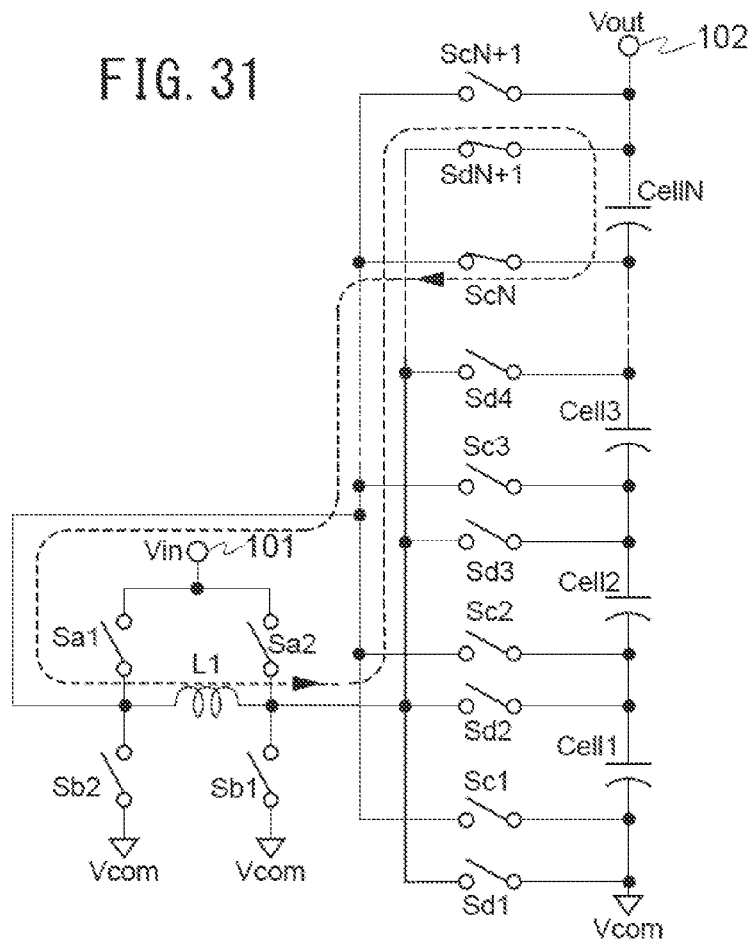

FIG. 38

|  | T1 | | T2 | | T3 | | ..... | TN | |
| --- | --- | --- | --- | --- | --- | --- | --- | --- | --- |
|  | T1a | T1b | T2a | T2b | T3a | T3b | ..... | TNa | TNb |
| Sa1 | ON |  | ON |  | ON |  | ..... | ON |  |
| Sb1 | ON |  | ON |  | ON |  | ..... | ON |  |
| Sc1 |  | ON |  |  |  |  | ..... |  |  |
| Sd2 |  | ON |  |  |  |  | ..... |  |  |
| Sc2 |  |  |  | ON |  |  | ..... |  |  |
| Sd3 |  |  |  | ON |  |  | ..... |  |  |
| Sc3 |  |  |  |  |  | ON | ..... |  |  |
| Sd4 |  |  |  |  |  | ON | ..... |  |  |
| ⋮ | ⋮ | ⋮ | ⋮ | ⋮ | ⋮ | ⋮ |  | ⋮ | ⋮ |
| ScN |  |  |  |  |  |  | ..... |  | ON |
| SdN+1 |  |  |  |  |  |  | ..... |  | ON |

FIG. 45

|  | T1 | | T2 | | T3 | | ····· | TN | |
|---|---|---|---|---|---|---|---|---|---|
|  | T1a | T1b | T2a | T2b | T3a | T3b | ····· | TNa | TNb |
| Sa1 | ON | | ON | | ON | | ····· | ON | |
| Sb1 | | | ON | | ON | | ····· | ON | |
| Sc1 | | ON | | | | | ····· | | |
| Sd2 | ON | ON | | | | | ····· | | |
| Sc2 | | | | ON | | | ····· | | |
| Sd3 | | | | ON | | | ····· | | |
| Sc3 | | | | | | ON | ····· | | |
| Sd4 | | | | | | ON | ····· | | |
| ⋮ | ⋮ | ⋮ | ⋮ | ⋮ | ⋮ | ⋮ | ⋱ | ⋮ | ⋮ |
| ScN | | | | | | | ····· | | ON |
| SdN+1 | | | | | | | ····· | | ON |

FIG. 51

| | T1 | | T2 | | T3 | | ..... | TN | |
|---|---|---|---|---|---|---|---|---|---|
| | T1a | T1b | T2a | T2b | T3a | T3b | ..... | TNa | TNb |
| Sa1 | ON | ON | ON | | ON | | ..... | ON | |
| Sb1 | ON | | ON | | ON | | ..... | ON | |
| Sc1 | | | | | | | ..... | | |
| Sd2 | | ON | | | | | ..... | | |
| Sc2 | | | | ON | | | ..... | | |
| Sd3 | | | | ON | | | ..... | | |
| Sc3 | | | | | | ON | ..... | | |
| Sd4 | | | | | | ON | ..... | | |
| ⋮ | ⋮ | ⋮ | ⋮ | ⋮ | ⋮ | ⋮ | ⋱ | ⋮ | ⋮ |
| ScN | | | | | | | ..... | | ON |
| SdN+1 | | | | | | | ..... | | ON |

FIG. 59

| | T1 | | T2 | | T3 | | ..... | TN-1 (odd) | | TN (even) | |
|---|---|---|---|---|---|---|---|---|---|---|---|
| | T1a | T1b | T2a | T2b | T3a | T3b | ..... | TN-1a | TN-1b | TNa | TNb |
| Sa1 | ON | | | | ON | | ..... | ON | | | |
| Sa2 | | | ON | | | | ..... | | | ON | |
| Sb1 | ON | | | | ON | | ..... | ON | | | |
| Sf0 | | ON | ON | | | | ..... | | | ON | |
| Sf1 | | ON | | ON | | | ..... | | | | |
| Sf2 | | | | ON | ON | | ..... | | | | |
| Sf3 | | | | | | ON | ..... | | | | |
| Sf4 | | | | | | | ..... | | | | |
| Sf5 | | | | | | | ..... | | | | |
| Sf6 | | | | | | | ..... | | | | |
| ⋮ | ⋮ | ⋮ | ⋮ | ⋮ | ⋮ | ⋮ | | ⋮ | ⋮ | ⋮ | ⋮ |
| SfN-2 | | | | | | | ..... | | ON | | |
| SfN-1 | | | | | | | ..... | | ON | | ON |
| SfN | | | | | | | ..... | | | | ON |

FIG. 60

| | T1 | | T2 | |
|---|---|---|---|---|
| | T1a | T1b | T2a | T2b |
| Sa1 | ON | | | |
| Sa2 | | | ON | |
| Sb1 | ON | | | |
| Sf0 | | ON | ON | |
| Sf1 | | ON | | ON |
| Sf2 | | | | ON |

FIG. 61

|     | T1  |     | T2  |     |
|-----|-----|-----|-----|-----|
|     | T1a | T1b | T2a | T2b |
| Sa1 | ON  |     |     |     |
| Sa2 |     |     | ON  |     |
| Sb1 |     |     |     |     |
| Sf0 |     | ON  | ON  |     |
| Sf1 | ON  | ON  |     | ON  |
| Sf2 |     |     |     | ON  |

FIG. 62

|     | T1  |     | T2  |     |
|-----|-----|-----|-----|-----|
|     | T1a | T1b | T2a | T2b |
| Sa1 | ON  | ON  |     |     |
| Sa2 |     |     | ON  |     |
| Sb1 | ON  |     |     |     |
| Sf0 |     |     | ON  |     |
| Sf1 |     | ON  |     | ON  |
| Sf2 |     |     |     | ON  |

FIG. 69

| | T1 | | T2 | | T3 | | ..... | TN | |
|---|---|---|---|---|---|---|---|---|---|
| | T1a | T1b | T2a | T2b | T3a | T3b | ..... | TNa | TNb |
| Sa1 | ON | | | | | | ..... | | |
| Sa2 | | | ON | | ON | | ..... | ON | |
| Sb1 | | ON | ON | | ON | | ..... | ON | |
| Sd2 | ON | ON | | ON | | | ..... | | |
| Sc3 | | | | ON | | | ..... | | |
| Sd3 | | | | | | ON | ..... | | |
| Sc4 | | | | | | ON | ..... | | |
| ⋮ | ⋮ | ⋮ | ⋮ | ⋮ | ⋮ | ⋮ | ⋮ | ⋮ | ⋮ |
| ScN | | | | | | | ..... | | ON |
| ScN+1 | | | | | | | ..... | | ON |

FIG. 76

|  | T1 | | T2 | | T3 | | ..... | TN | |
| --- | --- | --- | --- | --- | --- | --- | --- | --- | --- |
|  | T1a | T1b | T2a | T2b | T3a | T3b | ..... | TNa | TNb |
| Sa1 | ON |  |  |  |  |  | ..... |  |  |
| Sb2 |  | ON | ON |  | ON |  | ..... | ON |  |
| Sd2 | ON | ON | ON | ON | ON |  | ..... | ON |  |
| Sc3 |  |  |  | ON |  |  | ..... |  |  |
| Sd3 |  |  |  |  |  | ON | ..... |  |  |
| Sc4 |  |  |  |  |  | ON | ..... |  |  |
| ⋮ | ⋮ | ⋮ | ⋮ | ⋮ | ⋮ | ⋮ | ⋱ | ⋮ | ⋮ |
| SdN |  |  |  |  |  |  | ..... |  | ON |
| ScN+1 |  |  |  |  |  |  | ..... |  | ON |

FIG. 84

|  | T1 | | T2 | | T3 | | ..... | TN | |
|---|---|---|---|---|---|---|---|---|---|
|  | T1a | T1b | T2a | T2b | T3a | T3b | ..... | TNa | TNb |
| Sa1 | ON | | | | | | ..... | | |
| Sb2 | | ON | ON | | ON | | ..... | ON | |
| Sd2 | ON | ON | ON | ON | | | ..... | | |
| Sc3 | | | | ON | | | ..... | | |
| Sd3 | | | | | ON | ON | ..... | | |
| Sc4 | | | | | | ON | ..... | | |
| ⋮ | ⋮ | ⋮ | ⋮ | ⋮ | ⋮ | ⋮ | ⋮ | ⋮ | ⋮ |
| SdN | | | | | | | ..... | ON | ON |
| ScN+1 | | | | | | | ..... | | ON |

FIG. 91

|  | T1 | | T2 | | T3 | | ..... | TN | |
| --- | --- | --- | --- | --- | --- | --- | --- | --- | --- |
|  | T1a | T1b | T2a | T2b | T3a | T3b | ..... | TNa | TNb |
| Sa1 | ON | | | | | | ..... | | |
| Sb2 | | ON | ON | | ON | | ..... | ON | |
| Sd2 | ON | ON | ON | ON | ON | | ..... | ON | |
| Sc3 | | | | ON | | | ..... | | |
| Sd3 | | | | | | ON | ..... | | |
| Sc4 | | | | | | ON | ..... | | |
| ⋮ | ⋮ | ⋮ | ⋮ | ⋮ | ⋮ | ⋮ | ⋱ | ⋮ | ⋮ |
| SdN | | | | | | | ..... | | ON |
| ScN+1 | | | | | | | ..... | | ON |

FIG. 99

| | T1 | | T2 | | T3 | | ..... | TN | |
|---|---|---|---|---|---|---|---|---|---|
| | T1a | T1b | T2a | T2b | T3a | T3b | ..... | TNa | TNb |
| Sa1 | ON | | | | | | ..... | | |
| Sb2 | | ON | ON | | ON | | ..... | ON | |
| Sd2 | ON | ON | ON | ON | | | ..... | | |
| Sc3 | | | | ON | | | ..... | | |
| Sd3 | | | | | ON | ON | ..... | | |
| Sc4 | | | | | | ON | ..... | | |
| ⋮ | ⋮ | ⋮ | ⋮ | ⋮ | ⋮ | ⋮ | ⋱ | ⋮ | ⋮ |
| SdN | | | | | | | ..... | ON | ON |
| ScN+1 | | | | | | | ..... | | ON |

FIG. 100

| | Tx | |
|---|---|---|
| | Txa | Txb |
| SdP | ON | |
| ScP | | |
| SdP+1 | | |
| ScP+1 | ON | |
| SdQ+1 | | ON |
| ScQ | | ON |

FIG. 101

| Q>1 | Tx | |
|---|---|---|
| | Txa | Txb |
| ScP | ON | |
| SdP+1 | ON | |
| ScQ | | |
| SdQ | | ON |
| ScQ+1 | | ON |
| SdQ+1 | | |

FIG. 102

| Q=1 | Tx | |
|---|---|---|
| | Txa | Txb |
| ScP | ON | |
| SdP+1 | ON | |
| Sc1 | | |
| Sb1 | | ON |
| Sc2 | | ON |
| Sd2 | | |

FIG. 103

| | Tx | |
|---|---|---|
| | Txa | Txb |
| SfP | ON | |
| SfP-1 | ON | |
| SfQ | | ON |
| SfQ-1 | | ON |

FIG. 104

| P>1 | Tx | |
|---|---|---|
| | Txa | Txb |
| ScP-1 | | |
| SdP-1 | | |
| ScP | | |
| SdP | ON | |
| ScP+1 | ON | |
| SdP+1 | | |
| ScQ | | ON |
| SdQ+1 | | ON |

FIG. 105

| P=1 | Tx | |
|---|---|---|
| | Txa | Txb |
| Sa1 | | |
| Sb2 | ON | |
| Sd2 | ON | |
| Sd3 | | |
| Sc3 | | |
| Sd4 | | |
| ScQ | | ON |
| SdQ+1 | | ON |

FIG. 106

| Q=1 | Tx | |
|---|---|---|
| | Txa | Txb |
| ScP-1 | | |
| SdP-1 | | |
| ScP | | |
| SdP | ON | |
| ScP+1 | ON | |
| SdP+1 | | |
| Sd2 | | ON |
| Sb2 | | ON |

FIG. 107

| P>1 | Tx | |
|---|---|---|
| | Txa | Txb |
| ScP-1 | | |
| SdP-1 | | |
| ScP | | |
| SdP | ON | |
| ScP+1 | ON | |
| SdP+1 | | |
| ScQ | | ON |
| SdQ+1 | | ON |

| Q=1 | Tx | |
|---|---|---|
| | Txa | Txb |
| ScP-1 | | |
| SdP-1 | | |
| ScP | | |
| SdP | ON | |
| ScP+1 | ON | |
| SdP+1 | | |
| Sd2 | | ON |
| Sb2 | | ON |

BALANCE CHARGING CIRCUIT FOR SERIES-CONNECTED STORAGE CELLS AND BALANCE CHARGING METHOD FOR SERIES-CONNECTED STORAGE CELLS

TECHNICAL FIELD

The present invention relates to a balance charging circuit for series-connected storage cells and a balance charging method for series-connected storage cells.

BACKGROUND ART

Storage cells (hereinafter referred to as cells) such as secondary batteries and capacitors are often used to be connected in series. When the cells are connected in series, voltages at both ends of the series-connected cells increase. In view of this, when the series-connected cells are assumed as a single module, that is, a single package, a voltage booster type of charging circuit using an inductor or the like is necessary to charge the series-connected cells by a low-voltage power supply. A charging circuit 503 in FIG. 109 is a conventionally known charging circuit for series-connected cells.

The charging circuit 503 includes a coil (an inductor) L1, a switch S1, a switch S2, and a charging control circuit Control 5, and one end of the coil L1 is connected to an input terminal 501, one end of the switch S1 is connected to an output terminal 502, and one end of the switch S2 is connected to a reference voltage terminal. Another end of the coil L1 is connected to the other end of the switch S1 and the other end of the switch S2. Further, the charging control circuit Control 5 controls on and off of the switch S1 and the switch S2. Further, series-connected cells are connected to the one end of the switch S1.

The switch S2 is turned on by the charging control circuit Control 5. Next, an input voltage Vin is input from the input terminal 501, and a charging current to charge the series-connected cells with electric charge is stored in the coil L1.

Then, the switch S2 is turned off and the switch S1 is turned on by the charging control circuit Control 5. After that, the series-connected cells are charged with electric charge by the charging current charged in the coil L1.

The series-connected cells can be charged in this manner.

In the meantime, capacitance values of storage cells differ from each other due to their production processes.

In such a case, if there is a variation in capacitance value between series-connected cells, a variation in voltage occurs between the series-connected cells after charging is performed. When the variation in voltage occurs, a voltage concentrates on one of the series-connected cells, which causes such a problem that its life is shortened. In order to solve this problem, there has been known a voltage balance correction circuit (a cell balancing circuit) for series-connected cells for equalizing voltages of respective cells in the series-connected cells to maintain voltage balance (see, for example, Patent Document 1).

A cell balancing circuit 504 in FIG. 109 is a conventional cell balancing circuit described in Patent Document 1.

The cell balancing circuit 504 includes a coil L2, a switch S3, a switch S4, a cell Cell1, a cell Cell2, and a cell-balancing control circuit Control 6. The cell Cell1 and the cell Cell2 are connected in series and have one series-connected end connected to the output terminal 502 and another series-connected end connected to a reference voltage terminal. Further, one end of the coil L2 is connected to a contact point between the cell Cell1 and the cell Cell2, one end of the switch S3 is connected to the output terminal 502, one end of the switch S4 is connected to the reference voltage terminal, and the other end of the coil L2 is connected to the other end of the switch S3 and the other end of the switch S4. Further, the cell-balancing charging circuit Control 6 controls on and off of the switch S3 and the switch S4.

The switch S4 is turned on by the cell-balancing control circuit Control 6. Among electric charge charged in the cell Cell2, a current to maintain voltage balance between the series-connected cells is flowed into the coil L2 so as to store a charging current.

Then, the switch S4 is turned off and the switch S3 is turned on by the cell-balancing control circuit Control 6. After that, the cell Cell1 is charged with electric charge by the charging current charged in the coil L2 so as to maintain the voltage balance between the series-connected cells.

As mentioned earlier, each of the charging circuit and the cell balancing circuit needs one coil.

If the charging circuit is combined with the cell balancing circuit, a balance charging circuit for series-connected cells which charges the series-connected cells and maintains voltage balance between the respective cells is attained.

FIG. 109 is entirely a view illustrating a conventional balance charging circuit for series-connected cells. The conventional balance charging circuit for series-connected cells is constituted by the charging circuit 503 for charging the series-connected cells and the cell balancing circuit 504 for maintaining voltage balance between the respective cells.

The charging circuit 503 includes a coil (an inductor) L1, a switch S1, a switch S2, and a charging control circuit Control 5, and one end of the coil L1 is connected to an input terminal 501, one end of the switch S1 is connected to an output terminal 502, and one end of the switch S2 is connected to a reference voltage terminal. Another end of the coil L1 is connected to the other end of the switch S1 and the other end of the switch S2. Further, the charging control circuit Control 5 controls on and off of the switch S1 and the switch S2.

The cell balancing circuit 504 includes a coil L2, a switch S3, a switch S4, a cell Cell1, a cell Cell2, and a cell-balancing control circuit Control 6, and the cell Cell1 and the cell Cell2 are connected in series and have one series-connected end connected to the output terminal 502 and another series-connected end connected to the reference voltage terminal. Further, one end of the coil L2 is connected to a contact point between the cell Cell1 and the cell Cell2, one end of the switch S3 is connected to the output terminal 502, one end of the switch S4 is connected to the reference voltage terminal, and the other end of the coil L2 is connected to the other end of the switch S3 and the other end of the switch S4. Further, the cell-balancing charging circuit Control 6 controls on and off of the switch S3 and the switch S4.

FIGS. 110 to 113 are views to explain operations of the conventional balance charging circuit for series-connected cells.

Firstly, the switch S2 is turned on by the charging control circuit Control 5. Next, an input voltage Vin is input from the input terminal 501, and a charging current to charge the series-connected cells with electric charge is stored in the coil L1. A path of the charging current is indicated by a dotted arrow in FIG. 110.

Then, the switch S2 is turned off and the switch S1 is turned on by the charging-amount control circuit Control 5. After that, the series-connected cells are charged with the charging current charged in the coil L1. A path of the charging current is indicated by a dotted arrow of FIG. 111.

In parallel with the afore-mentioned operation of the charging control circuit Control 5, the switch S4 is turned on by the cell-balancing control circuit Control 6. Among the electric charge charged in the cell Cell2, a current to maintain voltage balance between the series-connected cells is flowed into the coil L2 so as to store a charging current. A path of the charging current is indicated by a dotted arrow of FIG. 112.

Then, the switch S4 is turned off and the switch S3 is turned on by the cell-balancing control circuit Control 6. After that, the cell Cell1 is charged with the charging current charged in the coil L2 so as to maintain the voltage balance between the series-connected cells. A path of the charging current is indicated by a dotted arrow of FIG. 113.

In the conventional balance charging circuit for series-connected cells, the series-connected cells are charged with electric charge and the voltage balance between the series-connected cells is maintained as such, so as to obtain an output voltage Vout from the output terminal 502.

PRIOR ART DOCUMENT

Patent Document

Patent Document 1: JP 2008-17605 A

SUMMARY OF THE INVENTION

Problem to be Solved

However, the conventional balance charging circuit for series-connected cells described in Patent Document 1 has the following problem. In the conventional balance charging circuit for series-connected cells, two coils in total, i.e., a coil for charging the series-connected cells with electric charge and a coil for maintaining voltage balance between the series-connected cells are necessary. That is, a coil is larger in size than components such as a switch, and therefore, using many coils causes such a problem that a circuit is upsized as a whole.

Further, in order to maintain voltage balance between the series-connected cells by use of the conventional balance charging circuit for series-connected cells, another charging circuit is necessary separately, as has been explained with reference to FIG. 109. That is, by performing two operational stages, i.e., by performing charging by this charging circuit (see FIG. 110 and FIG. 111), and then, maintaining voltage balance between the series-connected cells by the operation of the balancing circuit (see FIG. 112 and FIG. 113), charging voltage balance between the series-connected cells is maintained. As described, it is necessary to provide a charging circuit in addition to the balance charging circuit, which causes such a problem that a circuit is upsized as a whole.

The present invention has been made in view of the above-mentioned circumstances, and an object of the present invention is to provide a balance charging circuit for series-connected storage cells and a balance charging method for series-connected storage cells each of which can combine a coil for charging series-connected cells with electric charge and a coil for maintaining voltage balance between the series-connected cells, that is, can realize these coils by a single coil and which attains a smaller circuit configuration as a whole.

Solution to the Problem

A balance charging circuit for series-connected cells according to one embodiment of the present invention is a balance charging circuit for charging, in a balanced manner, a first storage cell and a second storage cell connected in series and having one series-connected end connected to an output terminal and another series-connected end connected to a reference voltage, and the balancing charging circuit includes: a coil provided in common for the first storage cell and the second storage cell and temporarily storing a power supplied from a power supply to charge the first storage cell and the second storage cell; and a switch section for electrically connecting the coil to one of the first storage cell and the second storage cell to charge the one of the first storage cell and the second storage cell and then for electrically connecting the coil to the other one of the first storage cell and the second storage cell to charge the other one of the first storage cell and the second storage cell. By employing this configuration, it is not necessary to provide a plurality of coils and it is possible to downsize a whole configuration of the balance charging circuit more.

In the balance charging circuit for series-connected storage cells, it is preferable that: the switch section includes a plurality of switches for switching a path of a charging current flowing in the coil; the balance charging circuit further includes a control circuit for controlling the plurality of switches to be turned on and off and for setting repeatedly in turn a first charging period in which the coil is charged with a charging current to charge the second cell, a second charging period in which the second cell is charged with the charging current thus charged in the coil, a third charging period in which the coil is charged with a charging current to charge the first cell, and a fourth charging period in which the first cell is charged with the charging current thus charged in the coil; and in the first charging period, the control circuit controls the plurality of switches to be turned on and off to form a path of a charging current flowing into the reference voltage terminal through the coil, in the second charging period, the control circuit controls the plurality of switches to be turned on and off to form a path of a charging current flowing into the second storage cell from the coil, in the third charging period, the control circuit controls the plurality of switches to be turned on and off to form a path of a charging current flowing into the reference voltage through the coil, and in the fourth charging period, the control circuit controls the plurality of switches to be turned on and off to electrically conduct one end of the coil to one end of the first cell, electrically conduct another end of the coil to another end of the first cell, and form a path of a charging current flowing into the first cell from the coil. By employing this configuration, it is not necessary to provide a plurality of coils and it is possible to downsize a whole configuration of the balance charging circuit more.

The plurality of switches may include a first switch having one end connected to a contact point where the first cell and the second cell are connected to each other, a second switch having one end connected to an input terminal, a third switch having one end connected to the reference voltage, a fourth switch having one end connected to the output terminal, a fifth switch having one end connected to the reference voltage, and a sixth switch having one end connected to the contact point where the first cell and the second cell are connected to each other; one end of the coil may be connected to another end of the first switch, another end of the second switch, and another end of the third switch, and another end of the coil may be connected to another end of the fourth switch, another end of the fifth switch, and another end of the sixth switch; and in the first charging period, the control circuit may turn on the second and sixth switches and turn off the first, third, fourth, and fifth switches, in the second charging period, the control circuit may turn on the third and sixth switches and turn off the first, second, fourth, and fifth switches, in the third charging period, the control circuit may turn on the second and fifth switches and turn off the first, third, fourth, and sixth switches, and in the fourth charging period, the control circuit may turn on the first and fourth switches and turn off the second, third, fifth, and sixth switches. By employing this configuration, it is not necessary to provide a plurality of coils and it is possible to downsize a whole configuration of the balance charging circuit more.

Further, the plurality of switches may include a first switch having one end connected to a contact point where the first cell and the second cell are connected to each other, a second switch having one end connected to an input terminal, a third switch having one end connected to the reference voltage, a fourth switch having one end connected to the output terminal, a fifth switch having one end connected to the reference voltage, and a sixth switch having one end connected to the contact point where the first cell and the second cell are connected to each other; one end of the coil may be connected to another end of the first switch, another end of the second switch, and another end of the third switch, and another end of the coil may be connected to another end of the fourth switch, another end of the fifth switch, and another end of the sixth switch; and in the first charging period, the control circuit may turn on the second and fifth switches and turn off the first, third, fourth, and sixth switches, in the second charging period, the control circuit may turn on the third and sixth switches and turn off the first, second, fourth, and fifth switches, in the third charging period, the control circuit may turn on the second and fifth switches and turn off the first, third, fourth, and sixth switches, and in the fourth charging period, the control circuit may turn on the first and fourth switches and turn off the second, third, fifth, and sixth switches. By employing this configuration, it is not necessary to provide a plurality of coils and it is possible to downsize a whole configuration of the balance charging circuit more.

The plurality of switches may include a first switch having one end connected to the output terminal, a second switch having one end connected to an input terminal, a third switch having one end connected to the reference voltage, a fourth switch having one end connected to the input terminal, and a fifth switch having one end connected to a contact point where the first cell and the second cell are connected to each other; one end of the coil may be connected to another end of the first switch, another end of the second switch, and another end of the third switch, and another end of the coil mat be connected to another end of the fourth switch and another end of the fifth switch; and in the first charging period, the control circuit may turn on the second and fifth switches and turn off the first, third, and fourth switches, in the second charging period, the control circuit may turn on the third and fifth switches and turn off the first, second, and fourth switches, in the third charging period, the control circuit may turn on the third and fourth switches and turn off the first, second, and fifth switches, and in the fourth charging period, the control circuit may turn on the first and fifth switches and turn off the second, third, and fourth switches. By employing this configuration, it is not necessary to provide a plurality of coils and it is possible to reduce the number of switches, thereby making it possible to downsize a whole configuration of the balance charging circuit more.

The plurality of switches may include a first switch having one end connected to the output terminal, a second switch having one end connected to an input terminal, and a third switch having one end connected to the reference voltage; one end of the coil may be connected to another end of the first switch, another end of the second switch, and another end of the third switch, and another end of the coil may be connected to a contact point where the first cell and the second cell are connected to each other; and in the first charging period, the control circuit may turn on the second switch and turn off the first and third switches, in the second charging period, the control circuit may turn on the third switch and turn off the first and second switches, in the third charging period, the control circuit may turn on the third switch and turn off the first and second switches, and in the fourth charging period, the control circuit may turn on the first switch and turn off the second and third switches. By employing this configuration, it is not necessary to provide a plurality of coils and it is possible to reduce the number of switches, thereby making it possible to downsize a whole configuration of the balance charging circuit more.

The plurality of switches may include a first switch having one end connected to the output terminal, a second switch having one end connected to an input terminal, and a third switch having one end connected to the reference voltage; the balance charging circuit may further include a capacitor having one end connected to the reference voltage, and a diode having a cathode connected to a contact point where the first cell and the second cell are connected to each other; one end of the coil may be connected to another end of the first switch, another end of the second switch, and another end of the third switch, and another end of the coil may be connected to another end of the capacitor and an anode of the diode; and in the first charging period, the control circuit may turn on the second switch and turn off the first and third switches, in the second charging period, the control circuit may turn on the third switch and turn off the first and second switches, in the third charging period, the control circuit may turn on the third switch and turn off the first and second switches, and in the fourth charging period, the control circuit may turn on the first switch and turn off the second and third switches. By employing this configuration, it is not necessary to provide a plurality of coils and it is possible to further reduce the number of switches, thereby making it possible to downsize a whole configuration of the balance charging circuit more.

It is preferable that the control circuit sets times for turning on the switches in the second and fourth charging periods so that the charging current of the coil becomes zero at the end of the second and fourth charging periods. By employing this configuration, a time for removing a residual current of the coil at the end of the second and fourth charging periods can be eliminated at the beginning of the first and third charging periods. It is also possible to prevent power attenuation which occurs when a refresh current to a power supply side flows into a parasitic resistor of each element in a current path in the first and third charging periods.

A balance charging circuit for series-connected storage cells according to another embodiment of the present invention is a balance charging circuit for charging, in a balanced manner, first to Nth (N is an integer of 2 or more, the same applies hereinafter) storage cells connected in series and having one series-connected end connected to an output terminal and another series-connected end connected to a reference voltage terminal, and the balancing charging circuit includes:

a coil provided in common for the first to Nth storage cells and temporarily storing a power supplied from a power supply connected to the input terminal to charge the first to Nth storage cells; and a plurality of first switches for electrically connecting the coil between the input terminal and the reference voltage; and a plurality of second switches for electrically connecting both ends of the coil to both ends of each of the first to Nth storage cells to charge the each of the first to Nth storage cells. By employing this configuration, it is not necessary to provide a plurality of coils and it is possible to downsize a whole configuration of the balance charging circuit more.

It is preferable that: the balance charging circuit for series-connected storage cells further includes a control circuit for repeatedly setting, in a random manner, each of the first to Nth charging periods wherein a kth ($1 \leq k \leq N$) coil charging period in which the plurality of first switches are controlled to be turned on and off to charge the coil with a charging current to charge the kth storage cell, and a kth storage cell charging period in which the plurality of second switches are controlled to be turned on and off to charge the kth storage cell with the charging current charged in the coil in the kth coil charging period are taken as a kth charging period for charging the kth storage cell; and in the kth coil charging period, the control circuit controls the plurality of first switches to be turned on and off to form a path of a charging current flowing into the reference voltage terminal from the input terminal through the coil, and in the kth storage cell charging period, the control circuit controls the plurality of second switches to be turned on and off to form a path of a charging current flowing into the kth storage cell from the coil. By employing this configuration, it is not necessary to provide a plurality of coils and it is possible to downsize a whole configuration of the balance charging circuit more.

It is preferable that: the plurality of first switches include a first coil connection switch having one end connected to the input terminal and another end connected to one end of the coil, and a second coil connection switch having one end connected to another end of the coil and another end connected to the reference voltage terminal; and the plurality of second switches include first to Nth storage cell lower side connection switches each having one end connected to a lower side of each of the first to Nth storage cells and another end connected to the one end of the coil, and first to (N−1)th storage cell upper side connection switches each having one end connected to an upper side of each of the first to (N−1)th storage cells and another end connected to the one end of the coil. By employing this configuration, it is not necessary to provide a plurality of coils and it is possible to downsize a whole configuration of the balance charging circuit more.

In the kth coil charging period, the control circuit may turn on the first and second coil connection switches, and turn off the first to Nth storage cell lower side connection switches and the first to (N−1)th storage cell upper side connection switches; and in the kth storage cell charging period, the control circuit may turn off the first and second coil connection switches, turn on the kth storage cell lower side connection switch and the kth storage cell upper side connection switch, and turn off the switches other than the kth storage cell lower side connection switch among the second to Nth storage cell lower side connection switches, and the switches other than the kth storage cell upper side connection switch among the first to (N−1)th storage cell upper side connection switches. By employing this configuration, it is not necessary to provide a plurality of coils and it is possible to downsize a whole configuration of the balance charging circuit more.

In the first coil charging period, the control circuit may turn on the first and second coil connection switches and the first storage cell upper side connection switch, and turn off the first to Nth storage cell lower side connection switches and the third to (N−1)th storage cell upper side connection switches; in the Mth ($2 \leq M \leq N$) coil charging period, the control circuit may turn on the first and second coil connection switches, and turn off the first to Nth storage cell lower side connection switches and the third to (N−1)th storage cell upper side connection switches; in the Mth storage cell charging period, the control circuit may turn off the first and second coil connection switches, turn on the Mth storage cell lower side connection switch and the Mth storage cell upper side connection switch, and turn off the switches other than the Mth storage cell lower side connection switch among the first to Nth storage cell lower side connection switches, and the switches other than the Mth storage cell upper side connection switch among the first to (N−1)th storage cell upper side connection switches. By employing this configuration, it is not necessary to provide a plurality of coils and it is possible to downsize a whole configuration of the balance charging circuit more.

In the first storage cell charging period, the control circuit may turn on the first coil connection switch and the first storage cell upper side connection switch, and turn off the second coil connection switch, the first to Nth storage cell lower side connection switches, and the second to (N−1)th storage cell upper side connection switches; in the Mth coil charging period, the control circuit may turn on the first and second coil connection switches, and turn off the first to Nth storage cell lower side connection switches and the first to (N−1)th storage cell upper side connection switches; and in the Mth storage cell charging period, the control circuit may turn off the first and second coil connection switches, turn on the Mth storage cell lower side connection switch and the Mth storage cell upper side connection switch, and turn off the switches other than the Mth storage cell lower side connection switch among the first to Nth storage cell lower side connection switches, and the switches other than the Mth storage cell upper side connection switch among the first to (N−1)th storage cell upper side connection switches. By employing this configuration, it is not necessary to provide a plurality of coils and it is possible to downsize a whole configuration of the balance charging circuit more.

In the first coil charging period, the control circuit may turn on the first storage cell upper side connection switch instead of turning on the second coil connection switch. By employing this configuration, it is not necessary to provide a plurality of coils and it is possible to downsize a whole configuration of the balance charging circuit more.

In the kth coil charging period, the control circuit may turn on the first and second coil connection switches, and turn off the first to Nth storage cell lower side connection switches and the first to (N−1)th storage cell upper side connection switches; in the first storage cell charging period, the control circuit may turn on the first coil connection switch and the first storage cell upper side connection switch, and turn off the second coil connection switch, the first to Nth storage cell lower side connection switches, and the switches other than the first storage cell upper side connection switch among the first to (N−1)th storage cell upper side connection switches; and in the kth ($k \geq 2$) storage cell charging period, the control circuit may turn off the first and second coil connection switches, turn on the kth storage cell lower side connection switch and the kth storage cell upper side connection switch, and turn off the switches other than the kth storage cell lower side connection switch among the first to Nth storage cell lower side connection switches, and the switches other than the kth storage cell upper side connection switch among the first to (N−1)th storage cell upper side connection switches. By employing this configuration, it is not necessary to provide a plurality of coils and it is possible to downsize a whole configuration of the balance charging circuit more.

The plurality of first switches may include a first coil connection switch having one end connected to the input terminal and another end connected to one end of the coil, a second coil connection switch having one end connected to another end of the coil and another end connected to the reference voltage terminal, a third coil connection switch having one end connected to the input terminal and another end connected to the another end of the coil, and a fourth coil connection switch having one end connected to the one end of the coil and another end connected to the reference voltage terminal; and the plurality of second switches may include a kth (k is an even number) storage cell lower side connection switch having one end connected to a lower side of each of the first to Nth storage cells, and another end connected to the one end of the coil, and a kth (k is an odd number) storage cell upper side connection switch having one end connected to an upper side of each of the first to (N−1)th storage cells, and another end connected to the one end of the coil. By employing this configuration, it is not necessary to provide a plurality of coils and it is possible to downsize a whole configuration of the balance charging circuit more.

In the kth (k is an odd number) coil charging period, the control circuit may turn on the first and second coil connection switches, and turn off the first to Nth storage cell lower side connection switches and the first to (N−1)th storage cell upper side connection switches; in the kth (k is an even number) coil charging period, the control circuit may turn on the third and fourth coil connection switches, and turn off the first to Nth storage cell lower side connection switches and the first to (N−1)th storage cell upper side connection switches; in the kth (k is an odd number) storage cell charging period, the control circuit may turn on the kth storage cell upper side connection switch and the (k+1)th storage cell lower side connection switch, turn off the first to fourth coil connection switches, and turn off switches other than the kth storage cell upper side connection switch among the first to (N−1)th storage cell upper side connection switches and switches other than the (k+1)th storage cell lower side connection switch among the first to Nth storage cell lower side connection switches; and in the kth (k is an even number) storage cell charging period, the control circuit may turn on the kth storage cell lower side connection switch and the (k−1)th storage cell upper side connection switch, turn off the first to fourth coil connection switches, and turn off switches other than the kth storage cell lower side connection switch among the first to Nth storage cell lower side connection switches and switches other than the (k−1)th storage cell upper side connection switch among the first to (N−1)th storage cell upper side connection switches. By employing this configuration, it is not necessary to provide a plurality of coils and it is possible to downsize a whole configuration of the balance charging circuit more.

In the first coil charging period, the control circuit may turn on the first storage cell upper side connection switch instead of turning on the second coil connection switch. By employing this configuration, it is not necessary to provide a plurality of coils and it is possible to downsize a whole configuration of the balance charging circuit more.

In the first coil charging period, the control circuit may turn on the first coil connection switch instead of turning on the fourth coil connection switch. By employing this configuration, it is not necessary to provide a plurality of coils and it is possible to downsize a whole configuration of the balance charging circuit more.

The plurality of first switches may include a first coil connection switch having one end connected to the input terminal and another end connected to one end of the coil, a third coil connection switch having one end connected to the input terminal and another end connected to another end of the coil, and a fourth coil connection switch having one end connected to the one end of the coil and another end connected to the reference voltage terminal; and the plurality of second switches may include third to Nth storage cell lower side connection switches each having one end connected to a lower side of each of the third to Nth storage cells and another end connected to the one end of the coil, and first to (N−1)th storage cell upper side connection switches each having one end connected to an upper side of each of the first to (N−1)th storage cells and another end connected to the one end of the coil. By employing this configuration, it is not necessary to provide a plurality of coils and it is possible to downsize a whole configuration of the balance charging circuit more.

In the first coil charging period, the control circuit may turn on the first coil connection switch and the first storage cell upper side connection switch; in the second to Nth coil charging periods, the control circuit may turn on the third and fourth coil connection switches, and turn off the third to Nth storage cell lower side connection switches and the first to (N−1)th storage cell upper side connection switches; in the first storage cell charging period, the control circuit may turn on the fourth coil connection switch and the first storage cell upper side connection switch, and turn off the third to Nth storage cell lower side connection switches, and switches other than the first storage cell upper side connection switch among the first to (N−1) th storage cell upper side connection switches; and in the kth (k≥2) storage cell charging period, the control circuit may turn off the first to third coil connection switches, turn on the (k+1)th storage cell lower side connection switch and the kth storage cell upper side connection switch, and turn off switches other than the (k+1)th storage cell lower side connection switch among the first to Nth storage cell lower side connection switches, and switches other than the kth storage cell upper side connection switch among the first to (N−1) th storage cell upper side connection switches. By employing this configuration, it is not necessary to provide a plurality of coils and it is possible to downsize a whole configuration of the balance charging circuit more.

The plurality of first switches may include a first coil connection switch having one end connected to the input terminal and another end connected to one end of the coil, and a fourth coil connection switch having one end connected to the one end of the coil and another end connected to the reference voltage terminal; and the plurality of second switches may include third to Nth storage cell lower side connection switches each having one end connected to a lower side of each of the third to Nth storage cells and another end connected to the one end of the coil, and first to (N−1)th storage cell upper side connection switches each having one end connected to an upper side of each of the first to (N−1)th storage cells and another end connected to the one end of the coil. By employing this configuration, it is not necessary to provide a plurality of coils and it is possible to downsize a whole configuration of the balance charging circuit more.

In the first coil charging period, the control circuit may turn on the first coil connection switch and the first storage cell upper side connection switch; in the second to Nth coil charging periods, the control circuit may turn on the fourth coil connection switch and the first storage cell upper side connection switch, and turn off the third to Nth storage cell lower side connection switches and the first to (N−1)th storage cell upper side connection switches; in the first storage cell charging period, the control circuit may turn on the fourth coil connection switch and the first storage cell upper side connection switch, and turn off the third to Nth storage cell lower side connection switches, and switches other than the first storage cell upper side connection switch among the first to (N−1)th storage cell upper side connection switches; and in the kth (k≥2) storage cell charging period, the control circuit may turn off the first to third coil connection switches, turn on the (k+1)th storage cell lower side connection switch and the kth storage cell upper side connection switch, and turn off switches other than the (k+1)th storage cell lower side connection switch among the first to Nth storage cell lower side connection switches, and switches other than the kth storage cell upper side connection switch among the first to (N−1)th storage cell upper side connection switches. By employing this configuration, it is not necessary to provide a plurality of coils and it is possible to downsize a whole configuration of the balance charging circuit more.

In the kth ($2 \leq k \leq N$) coil charging period, the control circuit may turn on the fourth coil connection switch and the (k−1)th storage cell upper side connection switch, and turn off the third to Nth storage cell lower side connection switches, and switches other than the (k−1)th storage cell upper side connection switch among the second to Nth storage cell upper side connection switches. By employing this configuration, it is not necessary to provide a plurality of coils and it is possible to downsize a whole configuration of the balance charging circuit more.

The plurality of first switches may include a first coil connection switch having one end connected to the input terminal and another end connected to one end of the coil, and a fourth coil connection switch having one end connected to the one end of the coil and another end connected to the reference voltage terminal; the plurality of second switches may include third to Nth storage cell lower side connection switches each having one end connected to a lower side of each of the third to Nth storage cells and another end connected to the one end of the coil, and first to (N−1)th storage cell upper side connection switches each having one end connected to an upper side of each of the first to (N−1)th storage cells and another end connected to the one end of the coil; and the balance charging circuit may further include a diode having a cathode connected to the upper side of the first storage cell and an anode connected to the first storage cell upper side connection switch, and a capacitor connected between the anode of the diode and the reference voltage. By employing this configuration, it is not necessary to provide a plurality of coils and it is possible to downsize a whole configuration of the balance charging circuit more.

The plurality of first switches may include a first coil connection switch having one end connected to the input terminal and another end connected to one end of the coil, and a fourth coil connection switch having one end connected to the one end of the coil and another end connected to the reference voltage terminal; the plurality of second switches may include third to Nth storage cell lower side connection switches each having one end connected to a lower side of each of the third to Nth storage cells and another end connected to the one end of the coil, and first to (N−1)th storage cell upper side connection switches each having one end connected to an upper side of each of the first to (N−1)th storage cells and another end connected to the one end of the coil; and the balance charging circuit may further include first to (N−1)th diodes each provided for each of the first to (N−1)th storage cells and having a cathode connected to an upper side of a corresponding storage cell and an anode connected to each of the first to (N−1)th storage cell upper side connection switches, and first to (N−1)th capacitors each provided for each of the first to (N−1)th diodes and connected between an anode of a corresponding diode and a reference voltage. By employing this configuration, it is not necessary to provide a plurality of coils and it is possible to downsize a whole configuration of the balance charging circuit more.

In the first coil charging period, the control circuit may turn on the first coil connection switch and the first storage cell upper side connection switch; in the second to Nth coil charging periods, the control circuit may turn on the fourth coil connection switch and the first storage cell upper side connection switch, and turn off the third to Nth storage cell lower side connection switches and the first to (N−1)th storage cell upper side connection switches; in the first storage-cell charging period, the control circuit may turn on the fourth coil connection switch and the first storage cell upper side connection switch, and turn off the third to Nth storage cell lower side connection switches, and switches other than the first storage cell upper side connection switch among the first to (N−1)th storage cell upper side connection switches; and in the kth ($k \geq 2$) storage cell charging period, the control circuit may turn off the first to third coil connection switches, turn on the (k+1)th storage cell lower side connection switch and the kth storage cell upper side connection switch, and turn off switches other than the (k+1)th storage cell lower side connection switch among the first to Nth storage cell lower side connection switches, and switches other than the kth storage cell upper side connection switch among the first to (N−1)th storage cell upper side connection switches. By employing this configuration, it is not necessary to provide a plurality of coils and it is possible to downsize a whole configuration of the balance charging circuit more.

The balance charging circuit may further include a (N+1)th storage cell lower side connection switch having one end connected to an upper side of the Nth storage cell and another end connected to the one end of the coil, and in a case where the Nth storage cell is charged, the (N+1)th storage cell lower side connection switch may be turned on together with the Nth upper-side connection switch. By employing this configuration, it is not necessary to provide a plurality of coils and it is possible to downsize a whole configuration of the balance charging circuit more.

The plurality of first switches may include a first coil connection switch having one end connected to the input terminal and another end connected to one end of the coil and a second coil connection switch having one end connected to another end of the coil and another end connected to the reference voltage terminal; and the plurality of second switches may include first to Nth storage cell lower side connection switches each having one end connected to a lower side of each of the first to Nth storage cells and another end connected to the one end of the coil, and first to Nth storage cell upper side connection switches each having one end connected to an upper side of each of the first to Nth storage cells and another end connected to the one end of the coil. By employing this configuration, it is not necessary to provide a plurality of coils and it is possible to downsize a whole configuration of the balance charging circuit more.

In the first to Nth coil charging periods, the control circuit may turn on the first coil connection switch and the second coil connection switch; and in the kth ($1 \leq k \leq N$) storage cell charging period, the control circuit may turn on the kth storage cell lower side connection switch and the kth storage cell upper side connection switch, and turn off switches other than the kth storage cell lower side connection switch among the first to Nth storage cell lower side connection switches, and switches other than the kth storage cell upper side connection switch among the first to Nth storage cell upper side connection switches. By employing this configuration, it is not necessary to provide a plurality of coils and it is possible to downsize a whole configuration of the balance charging circuit more.

After all operations corresponding to the kth (k is an odd number) coil charging period and the kth (k is an odd number) storage cell charging period are completed, the control circuit may control the switches so that operations corresponding to the kth (k is an even number) coil charging period and the kth (k is an even number) storage cell charging period are performed. By employing this configuration, it is not necessary to provide a plurality of coils and it is possible to downsize a whole configuration of the balance charging circuit more. Further, a direction of a current flowing in the coil is changed only once, so that efficient power consumption is attained.

The control circuit may control the switches so that an upper side of the Pth (P is any of 1 to N) storage cell in the first to Nth storage cells is electrically connected to an upper side of the Qth (Q is any of 1 to N except P) storage cell to maintain charging voltage balance between the Pth storage cell and the Qth storage cell. By employing this configuration, it is not necessary to provide a plurality of coils and it is possible to downsize a whole configuration of the balance charging circuit more. By employing this configuration, it is not necessary to provide a plurality of coils and it is possible to downsize a whole configuration of the balance charging circuit more.

Further, a balance charging method for series-connected storage cells according to the present invention is a balance charging method for series-connected storage cells in which a power is supplied from a power supply connected to an input terminal, and first to Nth (N is an integer of 2 or more, the same applies hereinafter) storage cells connected in series sequentially from a reference voltage terminal between an output terminal and the reference voltage terminal are charged in a balanced manner, and the balance charging method includes: a first step of electrically connecting a coil between the input terminal and the reference voltage terminal and charging the coil with a charging current to charge the kth ($1 \leq k \leq N$) storage cell; a second step of electrically connecting the coil to both ends of the kth storage cell and charging the kth storage cell with the charging current charged in the coil in the first step; and a third step of repeatedly performing the first and second steps to charge the first to Nth storage cells one by one. By employing this method, it is not necessary to provide a plurality of coils and it is possible to charge series-connected storage cells in a balanced manner by a single coil.

Advantageous Effects of the Invention

According to the present invention, a coil for charging series-connected cells with electric charge and a coil for maintaining voltage balance between the series-connected cells can be combined, that is, can be realized by a single coil, thereby yielding an effect that a whole circuit can be more downsized.

Further, since the series-connected cells are charged while voltage balance is maintained, it is not necessary to provide another charging circuit separately, thereby yielding an effect that a whole circuit can be more downsized.

BRIEF DESCRIPTION OF THE DRAWINGS

FIG. 7 is a view illustrating controlled contents of a control circuit according to the first embodiment of the present invention;

FIG. 8 is a view illustrating controlled contents of a control circuit according to the first embodiment of the present invention;

FIG. 31 is a view to explain an operation of the fifth embodiment of the present invention;

FIG. 32 is a view illustrating controlled contents of a control circuit according to the fifth embodiment of the present invention;

FIG. 38 is a view illustrating controlled contents of a control circuit according to the sixth embodiment of the present invention;

FIG. 45 is a view illustrating controlled contents of a control circuit according to the seventh embodiment of the present invention;

FIG. 51 is a view illustrating controlled contents of a control circuit according to the eighth embodiment of the present invention;

FIG. 59 is a view illustrating controlled contents of a control circuit according to the ninth embodiment of the present invention;

FIG. 60 is a view illustrating controlled contents of a control circuit according to a modification of the ninth embodiment of the present invention;

FIG. 61 is a view illustrating controlled contents of a control circuit according to the modification of the ninth embodiment of the present invention;

FIG. 62 is a view illustrating controlled contents of a control circuit according to the modification of the ninth embodiment of the present invention;

FIG. 69 is a view illustrating controlled contents of a control circuit according to the tenth embodiment of the present invention;

FIG. 76 is a view illustrating controlled contents of a control circuit according to the eleventh embodiment of the present invention;

FIG. 84 is a view illustrating controlled contents of a control circuit according to the twelfth embodiment of the present invention;

FIG. 91 is a view illustrating controlled contents of a control circuit according to the thirteenth embodiment of the present invention;

FIG. 99 is a view illustrating controlled contents of a control circuit according to the fourteenth embodiment of the present invention;

FIG. 100 is a view illustrating an example of a cell balancing control at the time of discharge;

FIG. 101 is a view illustrating an example of a cell balancing control at the time of discharge;

FIG. 102 is a view illustrating an example of a cell balancing control at the time of discharge;

FIG. 103 is a view illustrating an example of a cell balancing control at the time of discharge;

FIG. 104 is a view illustrating an example of a cell balancing control at the time of discharge;

FIG. 105 is a view illustrating an example of a cell balancing control at the time of discharge;

FIG. 106 is a view illustrating an example of a cell balancing control at the time of discharge;

FIG. 107 is a view illustrating an example of a cell balancing control at the time of discharge;

DESCRIPTION OF EMBODIMENTS

Embodiments of the present invention will be described below with reference to drawings. Note that, in each figure to be referred to in the following description, an equivalent part in other figures is indicated by the same reference sign and an explanation about the equivalent part is omitted appropriately.

(Configuration of Balance Charging Circuit According to First Embodiment)

Figure 1:
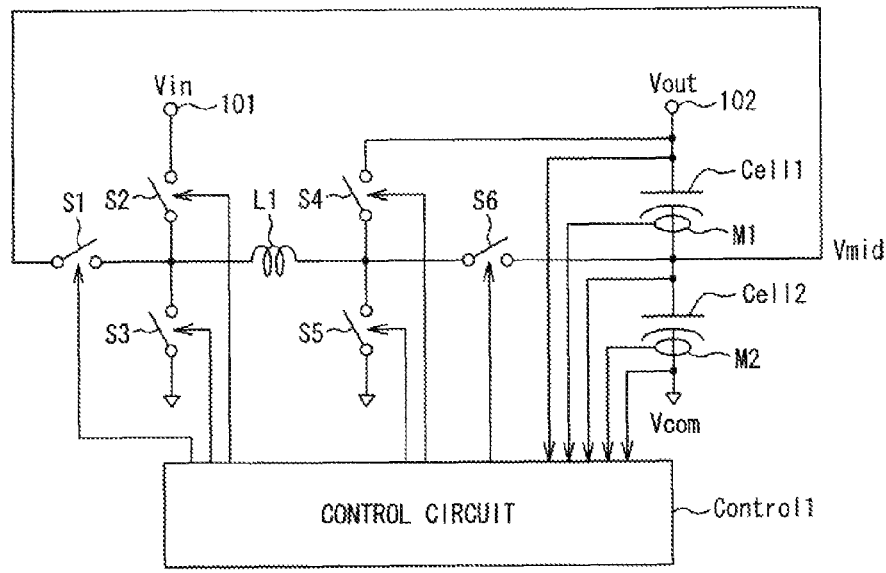
FIG. 1 is a circuit diagram illustrating a first embodiment of the present invention.
Figure 2:
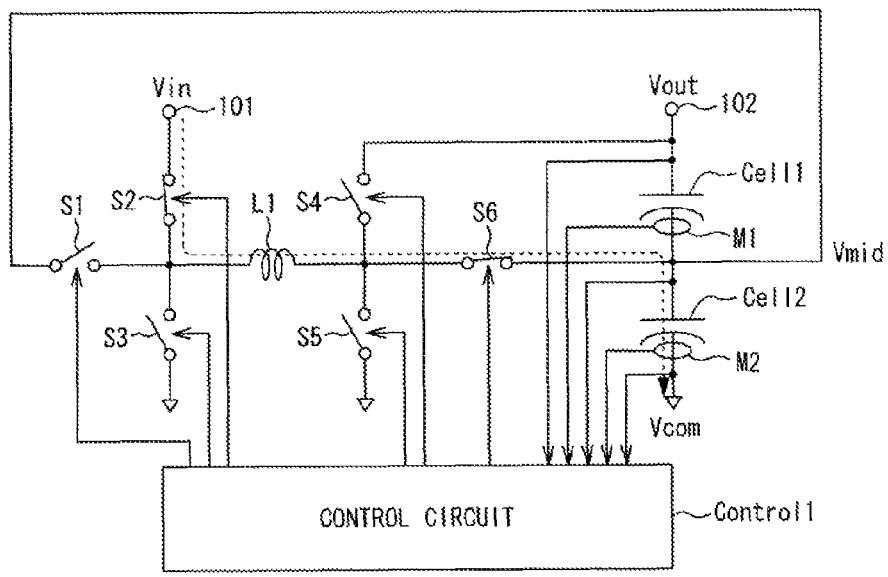
FIG. 2 is a view to explain an operation of the first embodiment of the present invention.

Firstly explained is a configuration of a balance charging circuit for series-connected cells according to a first embodiment of the present invention. FIG. 1 is a circuit diagram illustrating the first embodiment of the present invention.

The balance charging circuit for series-connected cells according to the first embodiment of the present invention includes a coil (an inductor) L1, switches S1 to S6, a control circuit Control 1, a cell Cell1, and a cell Cell2. The cell Cell1 and the cell Cell2 are connected in series and have one series-connected end connected to an output terminal 102 and another series-connected end connected to a reference voltage terminal. One end of the switch S1 is connected to a contact point between the cell Cell1 and the cell Cell2, one end of the switch S2 is connected to an input terminal 101, one end of the switch S3 is connected to a reference voltage terminal, one end of the switch S4 is connected to the output terminal 102, one end of the switch S5 is connected to the reference voltage terminal, and one end of the switch S6 is connected to the contact point between the cell Cell1 and the cell Cell2. Further, one end of the coil L1 is connected to another ends of the switches S1 to S3 and another end thereof is connected to another ends of the switches S4 to S6. Further, the control circuit Control 1 is connected to control terminals of the switches S1 to S6 so as to control on and off. The control circuit Control 1 can be realized by, for example, a sequential circuit using a well-known gate circuit or a PWM signal generation circuit for generating a PWM signal having a pulse width according to a current and a voltage of each cell.

Here, the switches S1 to S6 can be realized by a semiconductor element such as an N-channel MOS transistor, a P-channel MOS transistor, an NPN bipolar transistor, or a PNP bipolar transistor.

In a case where the N-channel MOS transistor or the P-channel MOS transistor is employed as a switch, one end of the switch serves as either of a source and a drain, and another end thereof serves as the other one of the source and the drain. Further, the control terminal serves as a gate.

In a case where the NPN bipolar transistor or the PNP bipolar transistor is employed as a switch, one end of the switch serves as either of an emitter and a collector, and another end thereof serves as the other one of the emitter and the collector. Further, the control terminal serves as a base.

In a case where the N-channel MOS transistor or the NPN bipolar transistor is employed as a switch, when a high voltage is applied to the control terminal, the switch is turned on, and when a low voltage is applied to the control terminal, the switch is turned off.

In a case where the P-channel MOS transistor or the PNP bipolar transistor is employed as a switch, when a low voltage is applied to the control terminal, the switch is turned on, and when a high voltage is applied to the control terminal, the switch is turned off.

The control circuit Control 1 receives an output voltage Vout, a contact-point voltage Vmid between the cell Cell1 and the cell Cell2, and a reference voltage Vcom to find both ends voltages of the cell Cell1 and the cell Cell2. Further, the control circuit Control 1 monitors charging currents respectively flowing in the cell Cell1 and the cell Cell2 by current monitoring circuits M1 and M2, and receives current values thus monitored. Then, the control circuit Control 1 controls on and off times of the switches S1 to S6 based on the both ends voltages thus found and the current values thus monitored so that the cell Cell1 and the cell Cell2 are charged in a balanced manner.

The current monitoring circuits M1 and M2 can be realized by a current sensor using a sense resistor or a current mirror circuit.

(Operation of Balance Charging Circuit According to First Embodiment)

Next, an operation of the balance charging circuit for series-connected cells according to the first embodiment of the present invention will be explained. FIGS. 2 to 6 are views to explain operations of the first embodiment of the present invention.

In the balance charging circuit for series-connected cells according to the first embodiment of the present invention, in order to charge series-connected cells and maintain voltage balance between the series-connected cells, first to fourth charging periods are set by the control circuit Control 1.

Firstly, in the first charging period, the control circuit Control 1 turns on the switch S2 and the switch S6. Next, an input voltage Vin is input from the input terminal 101, so that a charging current to charge the cell Cell2 with electric charge is stored in the coil L1. A path of the charging current is indicated by a dotted arrow of FIG. 2.

Figure 3:
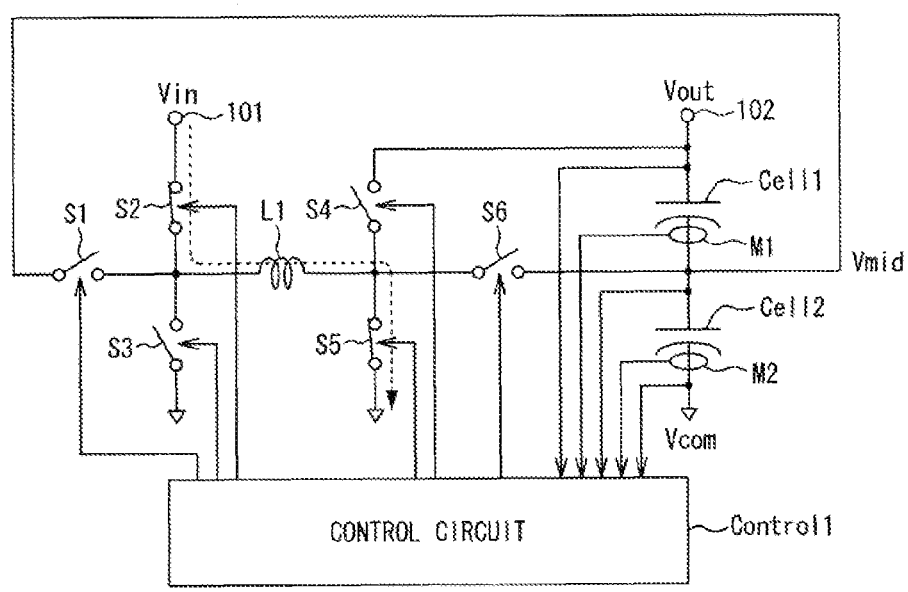
FIG. 3 is a view to explain an operation of the first embodiment of the present invention.
Figure 4:
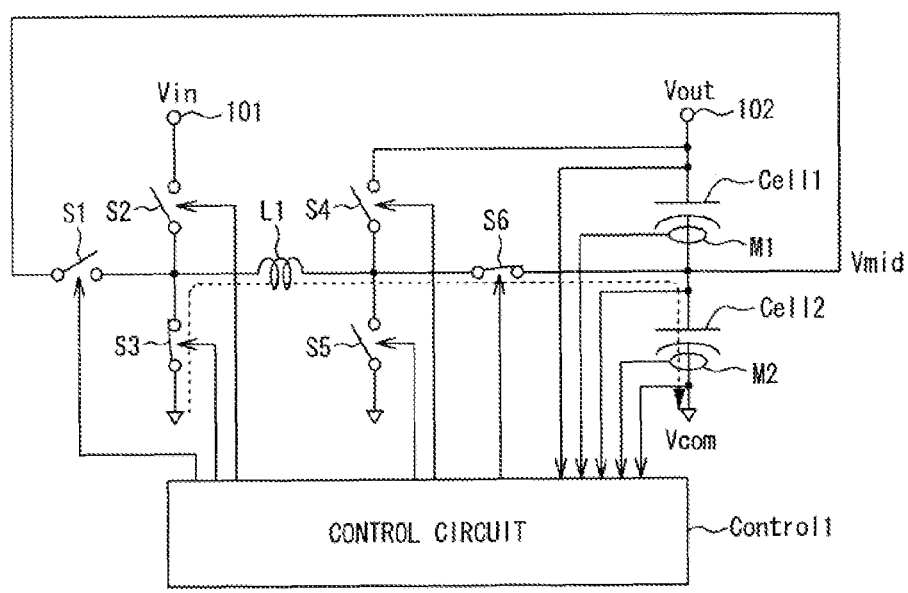
FIG. 4 is a view to explain an operation of the first embodiment of the present invention.
Figure 5:
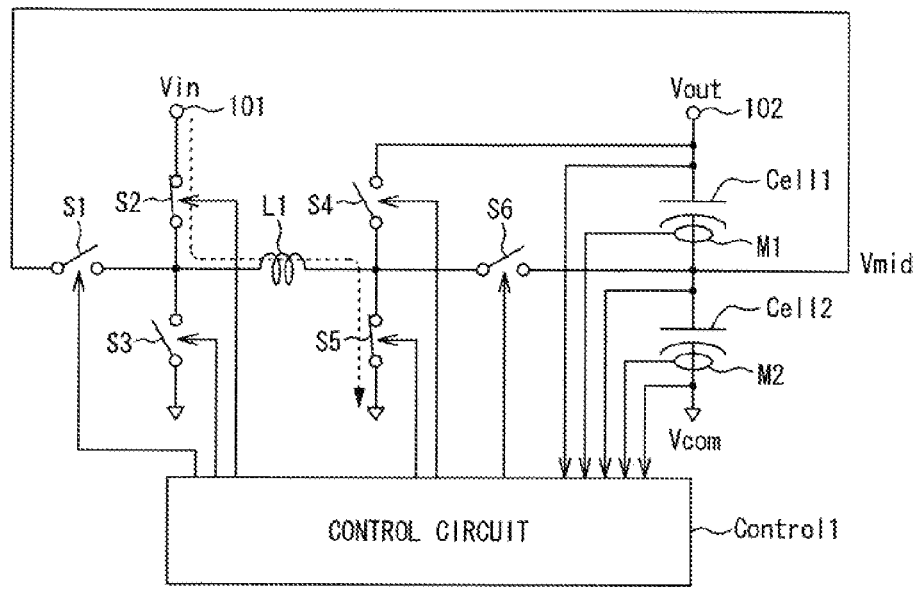
FIG. 5 is a view to explain an operation of the first embodiment of the present invention.

It is to be noted that, in the first charging period, the control circuit Control 1 may be configured to turn on the switch S2 and the switch S5, as illustrated in FIG. 3. Then, an input voltage Vin is input from the input terminal 101, so that a charging current to charge the cell Cell2 with electric charge is stored in the coil L1. A path of the charging current is indicated by a dotted arrow of FIG. 3.

Subsequently, in the second charging period, the control circuit Control 1 turns off the switch S2, and turns on the switch S3 and the switch S6. Then, the cell Cell2 is charged with the charging current charged in the coil L1. A path of the charging current is indicated by a dotted arrow of FIG. 4.

It is to be noted that, in a case where the control circuit Control 1 is configured to turn on the switch S2 and the switch S5 as illustrated in FIG. 3 in the first charging period, the control circuit Control 1 turns off the switch S2 and the switch S5 in the second charging period.

After that, in the third charging period, the control circuit Control 1 turns off the switch S3 and the switch S6, and turns on the switch S2 and the switch S5. Then, a charging current to charge the cell Cell1 with electric charge is stored in the coil L1. A path of the charging current is indicated by a dotted arrow of FIG. 5.

Figure 6:
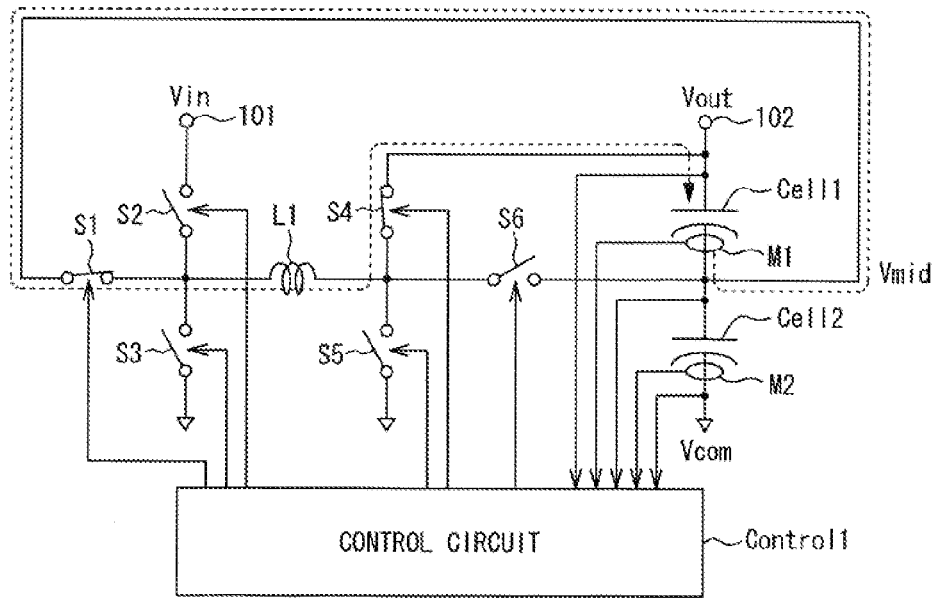
FIG. 6 is a view to explain an operation of the first embodiment of the present invention.

Further, in the fourth charging period, the control circuit Control 1 turns off the switch S2 and the switch S5, and turns on the switch S1 and the switch S4. Then, the cell Cell1 is charged with the charging current charged in the coil L1. A path of the charging current is illustrated in FIG. 6.

Here, controlled contents by the control circuit Control 1 are explained with reference to FIG. 7. FIG. 7 illustrates which switch, among the switches S1 to S6 in FIG. 1, the control circuit Control 1 turns on in each of the first to fourth charging periods T1 to T4. That is, among the switches S1 to S6, a switch corresponding to a column indicative of "ON" in the figure is turned into an ON state by the control circuit Control 1, and the other switches are turned into an off state.

As illustrated in FIG. 7, the switches S1 and S6 are turned on in the first charging period T1 as described above. Then, the switches S3 and S6 are turned on in the second charging period T2. Further, the switches S2 and S5 are turned on in the third charging period T3. Furthermore, the switches S1 and S4 are turned on in the fourth charging period T4.

The control circuit Control 1 repeatedly controls the switches S1 to S6 to turn on as shown in the first to fourth charging periods T1 to T4 described above. Accordingly, it is possible to realize a balance charging circuit using a single coil L1.

In the meantime, as has been explained with reference to FIG. 3, in a case where the switch S2 and the switch S5 are turned on in the first charging period, controlled contents by the control circuit Control 1 are those illustrated in FIG. 8. That is, among the switches S1 to S6, a switch corresponding to a column indicative of "ON" in the figure is turned into an ON state by the control circuit Control 1, and the other switches are turned into an off state.

In FIG. 8, the switches S2 and S5 are turned on in the first charging period T1 as described above. Then, the switches S3 and S6 are turned on in the second charging period T2. Further, the switches S2 and S5 are turned on in the third charging period T3. Furthermore, the switches S1 and S4 are turned on in the fourth charging period T4.

As described above, in the balance charging circuit for series-connected cells according to the first embodiment of the present invention, a single coil for temporarily storing a power supplied from a power source is provided in common for the cell Cell1 and the cell Cell2 so as to charge the cell Cell1 and the cell Cell2. In the first charging period and the second charging period, the cell Cell2 is charged, and in the third and fourth charging period, the cell Cell1 is charged. That is, the cell Cell1 and cell Cell2 can be charged independently, and therefore, by setting times for turning on the switches in the first to fourth charging periods according to a variation between a capacitance value of the cell Cell1 and a capacitance value of the cell Cell2, the series-connected cells can be charged with electric charge and voltage balance between the series-connected cells can be maintained.

For example, in a case where the capacitance value of the cell Cell1 is larger than the capacitance value of the cell Cell2, times for turning on the switches in the first and second charging periods may be set longer than times for turning on the switches in the third and fourth charging periods. On the other hand, in a case where the capacitance value of the cell Cell1 is smaller than the capacitance value of the cell Cell2, times for turning on the switches in the first and second charging periods may be set shorter than times for turning on the switches in the third and fourth charging periods. By repeatedly setting the first to fourth charging periods in turn by the control circuit Control 1, the series-connected cells are charged with electric charge, voltage balance between the series-connected cells is maintained, and an output voltage Vout can be obtained from the output terminal 502.

According to the above configuration and operations, in the balance charging circuit for series-connected cells according to the first embodiment of the present invention, a coil for charging series-connected cells with electric charge and a coil for maintaining voltage balance between the series-connected cells can be combined, that is, can be realized by a single coil, thereby yielding an effect that a whole circuit is small in size.

Further, each cell in the series-connected cells is not discharged in any of the first to fourth charging periods, thereby yielding an effect that the series-connected cells which have a limitation in terms of the number of charging times can be charged with electric charge and voltage balance between the series-connected cells can be maintained.

(Configuration of Balance Charging Circuit According to Second Embodiment)

Figure 9:
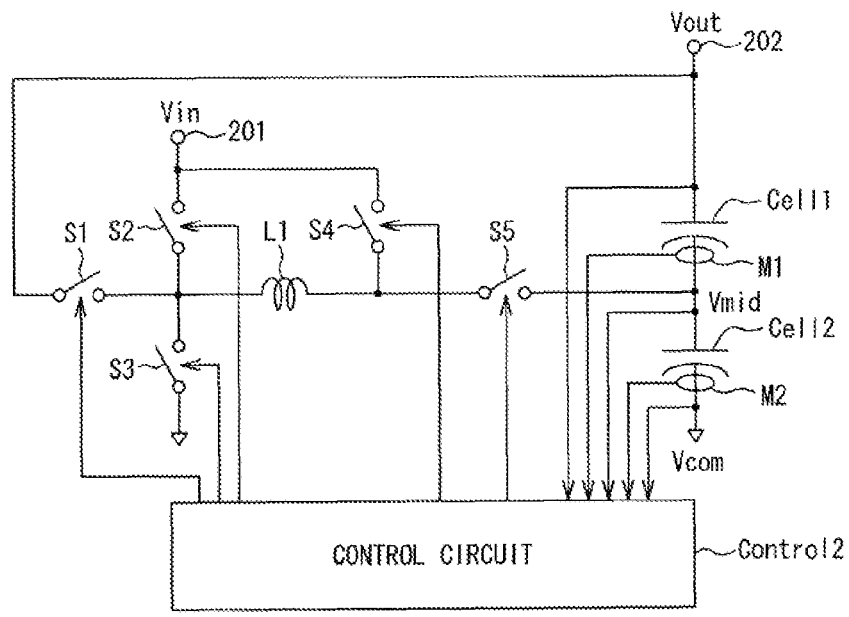
FIG. 9 is a circuit diagram illustrating a second embodiment of the present invention.
Figure 10:
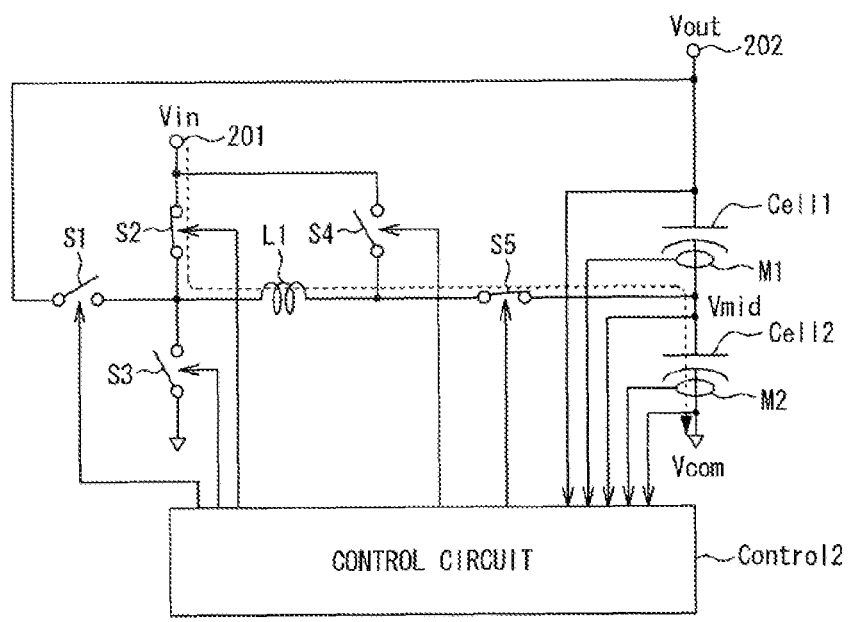
FIG. 10 is a view to explain an operation of the second embodiment of the present invention.
Figure 11:
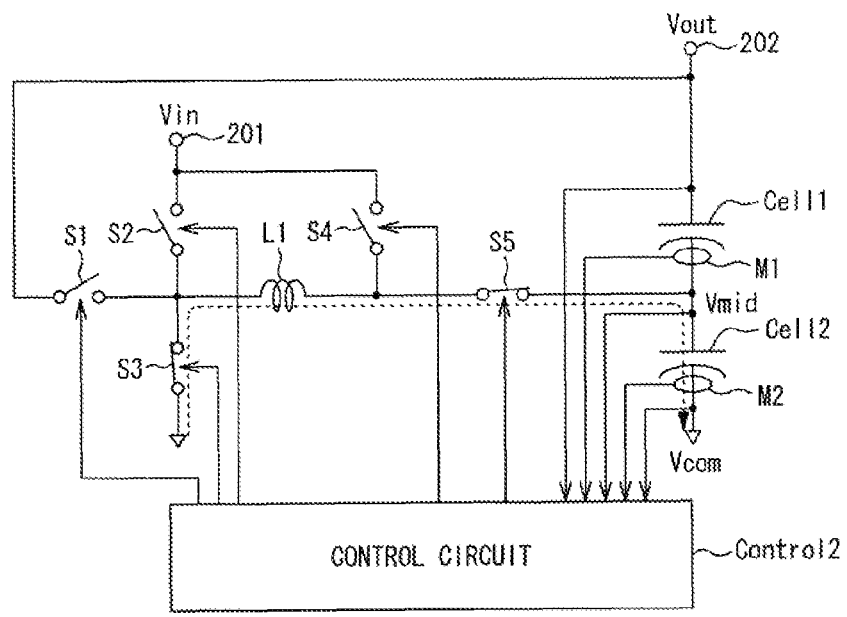
FIG. 11 is a view to explain an operation of the second embodiment of the present invention.
Figure 12:
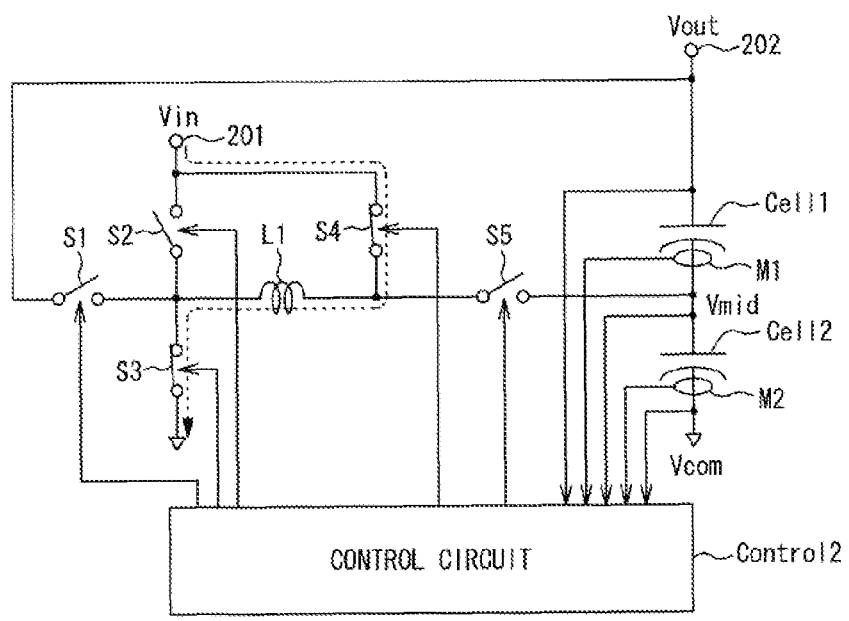
FIG. 12 is a view to explain an operation of the second embodiment of the present invention.

Next, a configuration of a balance charging circuit for series-connected cells according to a second embodiment of the present invention will be explained. FIG. 9 is a circuit diagram illustrating the second embodiment of the present invention.

The balance charging circuit for series-connected cells according to the second embodiment of the present invention includes a coil L1, switches S1 to S5, a control circuit Control 2, a cell Cell1, and a cell Cell2, and the cell Cell1 and the cell Cell2 are connected in series and have one series-connected end connected to an output terminal 202 and another series-connected end connected to a reference voltage terminal. One end of the switch S1 is connected to the output terminal 202, one end of the switch S2 is connected to an input terminal 201, one end of the switch S3 is connected to the reference voltage terminal, one end of the switch S4 is connected to the input terminal 201, and one end of the switch S5 is connected to a contact point between the cell Cell1 and the cell Cell2. Further, one end of the coil L1 is connected to another ends of the switches S1 to S3 and another end thereof is connected to another ends of the switches S4 to S5. Further, the control circuit Control 2 is connected to control terminals of the switches S1 to S5 so as to control on and off. The control circuit Control 2 can be realized by, for example, a sequential circuit using a well-known gate circuit or a PWM signal generation circuit for generating a PWM signal having a pulse width according to a current and a voltage of each cell.

Similarly to the balance charging circuit for series-connected cells according to the first embodiment of the present invention, the switches S1 to S5 can be realized by a semiconductor element such as an N-channel MOS transistor, a P-channel MOS transistor, an NPN bipolar transistor, or a PNP bipolar transistor.

In a case where the N-channel MOS transistor or the P-channel MOS transistor is employed as a switch, one end of the switch serves as either of a source and a drain, and another end thereof serves as the other one of the source and the drain. Further, the control terminal serves as a gate.

In a case where the NPN bipolar transistor or the PNP bipolar transistor is employed as a switch, one end of the switch serves as either of an emitter and a collector, and another end thereof serves as the other one of the emitter and the collector. Further, the control terminal serves as a base.

In a case where the N-channel MOS transistor or the NPN bipolar transistor is employed as a switch, when a high voltage is applied to the control terminal, the switch is turned on, and when a low voltage is applied to the control terminal, the switch is turned off.

In a case where the P-channel MOS transistor or the PNP bipolar transistor is employed as a switch, when a low voltage is applied to the control terminal, the switch is turned on, and when a high voltage is applied to the control terminal, the switch is turned off.

The control circuit Control 2 receives an output voltage Vout, a contact-point voltage Vmid between the cell Cell1 and the cell Cell2, and a reference voltage Vcom to find both ends voltages of the cell Cell1 and the cell Cell2. Further, the control circuit Control 2 monitors charging currents respectively flowing in the cell Cell1 and the cell Cell2 by current monitoring circuits M1 and M2, and receives current values thus monitored. Then, the control circuit Control 2 controls on and off times of the switches S1 to S5 based on the both ends voltages thus found and the current values thus monitored so that the cell Cell1 and the cell Cell2 are charged in a balanced manner.

The current monitoring circuits M1 and M2 can be realized by a current sensor using a sense resistor or a current mirror circuit.

(Operation of Balance Charging Circuit According to Second Embodiment)

Next, an operation of the balance charging circuit for series-connected cells according to the second embodiment of the present invention will be explained. FIGS. 10 to 13 are views to explain operations of the second embodiment of the present invention.

In the balance charging circuit for series-connected cells according to the second embodiment of the present invention, in order to charge series-connected cells and maintain voltage balance between the series-connected cells, first to fourth charging periods are set by the control circuit Control 2.

Firstly, in the first charging period, the control circuit Control 2 turns on the switch S2 and the switch S5. Then, an input voltage Vin is input from the input terminal 201, so that a charging current to charge the cell Cell2 with electric charge is stored in the coil L1. A path of the charging current is indicated by a dotted arrow in FIG. 10.

Subsequently, in the second charging period, the control circuit Control 2 turns off the switch S2, and turns on the switch S3 and the switch S5. Then, the cell Cell2 is charged with the charging current stored in the coil L1. A path of the charging current is indicated by a dotted arrow in FIG. 11.

After that, in the third charging period, the control circuit Control 2 turns off the switch S3 and the switch S5, and turns on the switch S3 and the switch S4. Then, a charging current to charge the cell Cell1 with electric charge is stored in the coil L1. A path of the charging current is indicated by a dotted arrow in FIG. 12.

Further, in the fourth charging period, the control circuit Control 2 turns off the switch S3 and the switch S4, and turns on the switch S1 and the switch S5. Then, the cell Cell1 is charged with the charging current charged in the coil L1. A path of the charging current is illustrated in FIG. 13.

Here, controlled contents by the control circuit Control 2 are explained with reference to FIG. 14. This figure illustrates which switch, among the switches S1 to S5 in FIG. 9, the control circuit Control 2 turns on in each of the first to fourth charging periods T1 to T4. That is, among the switches S1 to S5, a switch corresponding to a column indicative of "ON" in the figure is turned into an ON state by the control circuit Control 2, and the other switches are turned into an off state.

Figures 13, 14:
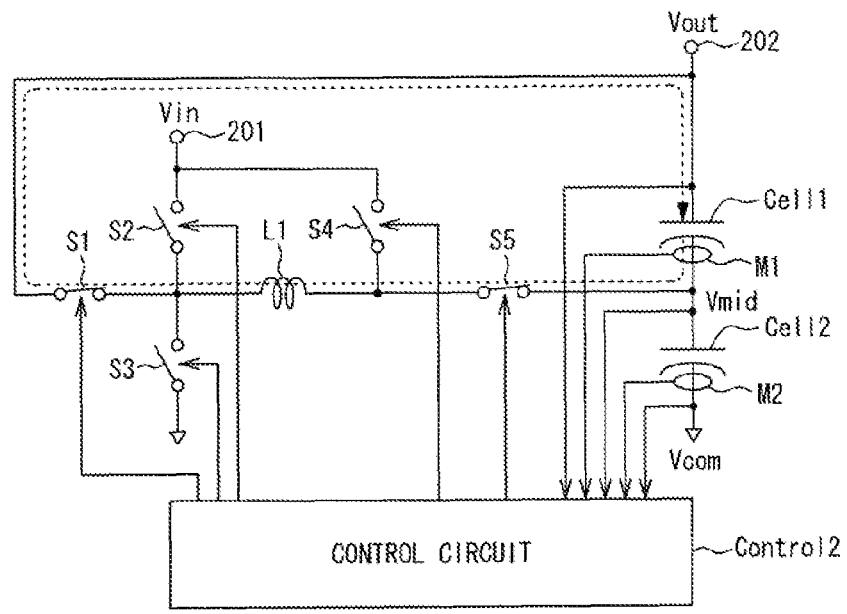
FIG. 13 is a view to explain an operation of the second embodiment of the present invention.
FIG. 14 is a view illustrating controlled contents of a control circuit according to the second embodiment of the present invention.

Now, referring to FIG. 14, the switches S1 and S5 are turned on in the first charging period T1 as described above. Then, the switches S3 and S5 are turned on in the second charging period T2. Further, the switches S3 and S4 are turned on in the third charging period T3. Furthermore, the switches S1 and S5 are turned on in the fourth charging period T4.

The control circuit Control 2 repeatedly controls the switches S1 to S5 to turn on as shown in the first to fourth charging periods T1 to T4 described above. Accordingly, it is possible to realize a balance charging circuit using a single coil L1.

As described above, in the balance charging circuit for series-connected cells according to the second embodiment of the present invention, a single coil for temporarily storing a power supplied from a power source is provided in common for the cell Cell1 and the cell Cell2 so as to charge the cell Cell1 and the cell Cell2. In the first charging period and the second charging period, the cell Cell2 is charged, and in the third and fourth charging period, the cell Cell1 is charged. That is, the cell Cell1 and cell Cell2 can be charged independently, and therefore, by setting times for turning on the switches in the first to fourth charging periods according to a variation between a capacitance value of the cell Cell1 and a capacitance value of the cell Cell2, the series-connected cells can be charged with electric charge and voltage balance between the series-connected cells can be maintained.

For example, in a case where the capacitance value of the cell Cell1 is larger than the capacitance value of the cell Cell2, times for turning on the switches in the first and second charging periods may be set longer than times for turning on the switches in the third and fourth charging periods. On the other hand, in a case where the capacitance value of the cell Cell1 is smaller than the capacitance value of the cell Cell2, times for turning on the switches in the first and second charging periods may be set shorter than times for turning on the switches in the third and fourth charging periods. By setting the first to fourth charging periods repeatedly in turn by the control circuit Control 2, the series-connected cells are charged with electric charge, voltage balance between the series-connected cells is maintained, and an output voltage Vout can be obtained from the output terminal 202. Further, if times for turning on the switches in the second and fourth charging periods are set so that a charging current of the coil L1 becomes zero at the end of the second and fourth charging periods, a time for removing a residual current of the coil L1 at the end of the second and fourth charging periods can be eliminated at the beginning of the first and third charging periods. It is also possible to prevent power attenuation which occurs when a refresh current to a power supply side flows into a parasitic resistor of each element in a current path in the first and third charging periods.

According to the above configuration and operations, in the balance charging circuit for series-connected cells according to the second embodiment of the present invention, a coil for charging series-connected cells with electric charge and a coil for maintaining voltage balance between the series-connected cells can be combined, that is, can be realized by a single coil, thereby yielding an effect that a whole circuit is small in size.

Further, the number of switches is one fewer than that of the balance charging circuit for series-connected cells according to the first embodiment of the present invention, thereby yielding an effect that the whole circuit can be further downsized.

Further, each cell in the series-connected cells is not discharged in any of the first to fourth charging periods, thereby also yielding an effect that the series-connected cells which have a limitation in terms of the number of charging times can be charged with electric charge, and voltage balance between the series-connected cells can be maintained.

(Configuration of Balance Charging Circuit According to Third Embodiment)

Figure 15:
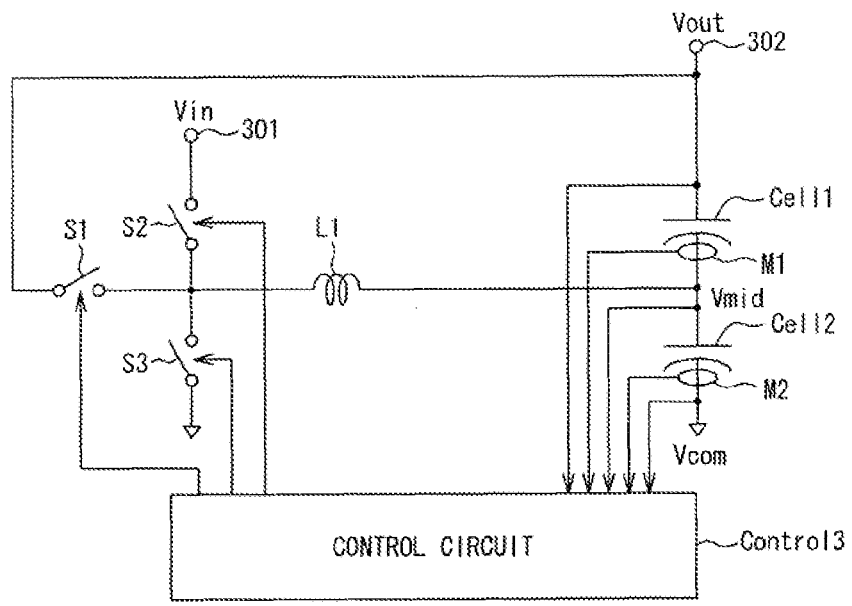
FIG. 15 is a circuit diagram illustrating a third embodiment of the present invention.
Figure 16:
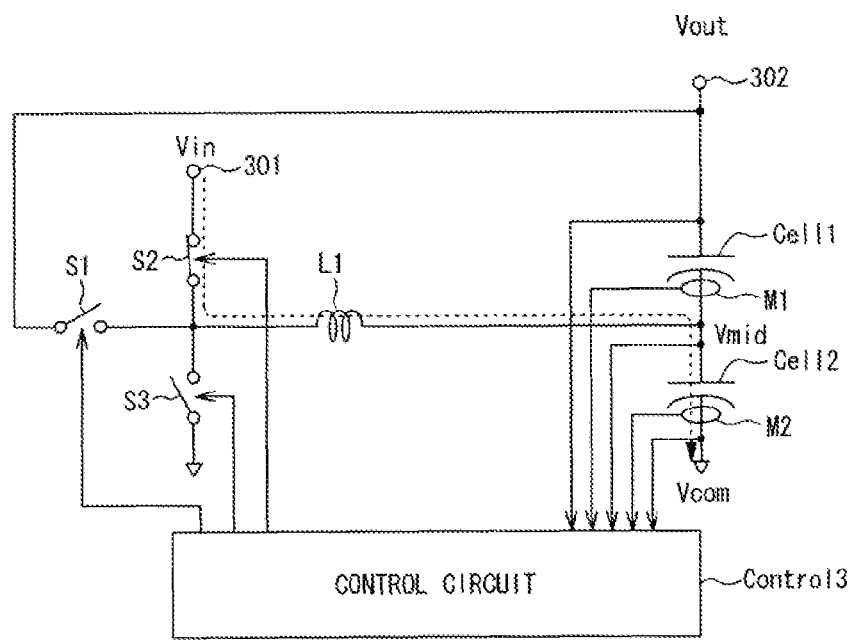
FIG. 16 is a view to explain an operation of the third embodiment of the present invention.
Figure 17:
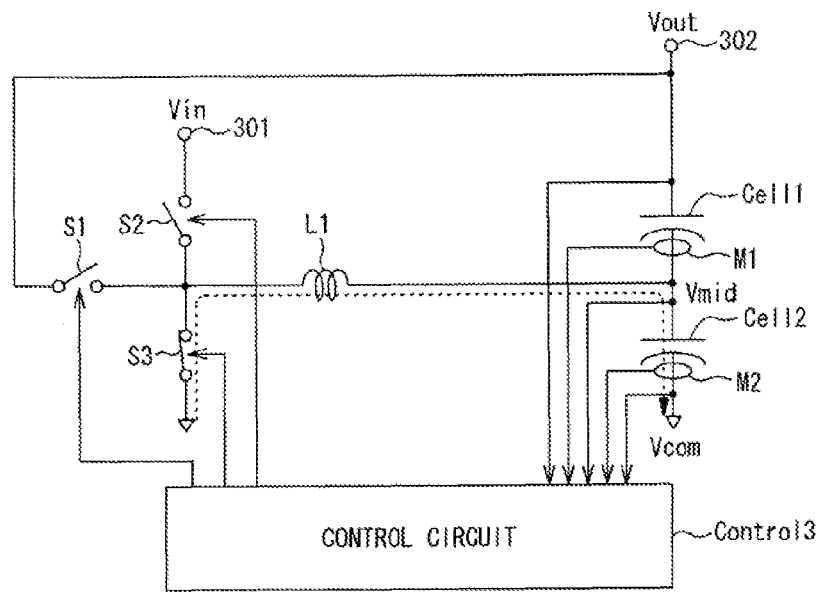
FIG. 17 is a view to explain an operation of the third embodiment of the present invention.
Figure 18:
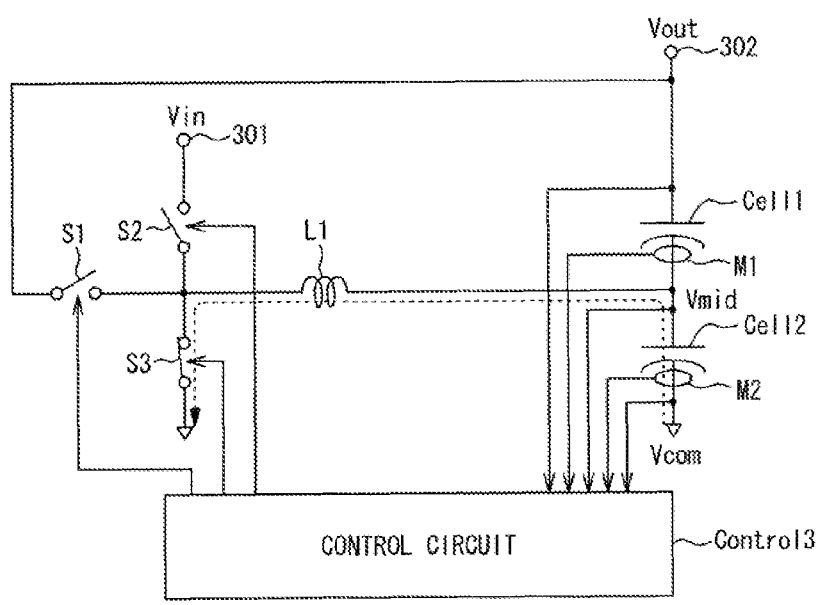
FIG. 18 is a view to explain an operation of the third embodiment of the present invention.

Next, a configuration of a balance charging circuit for series-connected cells according to a third embodiment of the present invention will be explained. FIG. 15 is a circuit diagram illustrating the third embodiment of the present invention.

The balance charging circuit for series-connected cells according to the third embodiment of the present invention includes a coil L1, switches S1 to S3, a control circuit Control 3, a cell Cell1, and a cell Cell2, and the cell Cell1 and the cell Cell2 are connected in series and have one series-connected end connected to an output terminal 302 and another series-connected end connected to a reference voltage terminal. One end of the switch S1 is connected to the output terminal 302, one end of the switch S2 is connected to an input terminal 301, and one end of the switch S3 is connected to the reference voltage terminal. Further, one end of the coil L1 is connected to another ends of the switches S1 to S3 and another end thereof is connected to a contact point between the cell Cell1 and the cell Cell2. Further, the control circuit Control 3 is connected to control terminals of the switches S1 to S3 so as to control on and off. The control circuit Control 3 can be realized by, for example, a sequential circuit using a well-known gate circuit or a PWM signal generation circuit for generating a PWM signal having a pulse width according to a current and a voltage of each cell.

Similarly to the balance charging circuit for series-connected cells according to the first embodiment of the present invention, the switches S1 to S3 can be realized by a semiconductor element such as an N-channel MOS transistor, a P-channel MOS transistor, an NPN bipolar transistor, or a PNP bipolar transistor.

In a case where the N-channel MOS transistor or the P-channel MOS transistor is employed as a switch, one end of the switch serves as either of a source and a drain, and another end thereof serves as the other one of the source and the drain. Further, the control terminal serves as a gate.

In a case where the NPN bipolar transistor or the PNP bipolar transistor is employed as a switch, one end of the switch serves as either of an emitter and a collector, and another end thereof serves as the other one of the emitter and the collector. Further, the control terminal serves as a base.

In a case where the N-channel MOS transistor or the NPN bipolar transistor is employed as a switch, when a high voltage is applied to the control terminal, the switch is turned on, and when a low voltage is applied to the control terminal, the switch is turned off.

In a case where the P-channel MOS transistor or the PNP bipolar transistor is employed as a switch, when a low voltage is applied to the control terminal, the switch is turned on, and when a high voltage is applied to the control terminal, the switch is turned off.

The control circuit Control 3 receives an output voltage Vout, a contact-point voltage Vmid between the cell Cell1 and the cell Cell2, and a reference voltage Vcom to find both ends voltages of the cell Cell1 and the cell Cell2. Further, the control circuit Control 3 monitors charging currents respectively flowing in the cell Cell1 and the cell Cell2 by current monitoring circuits M1 and M2, and receives current values thus monitored. Then, the control circuit Control 3 controls on and off times of the switches S1 to S3 based on the both ends voltages thus found and the current values thus monitored so that the cell Cell1 and the cell Cell2 are charged in a balanced manner.

The current monitoring circuits M1 and M2 can be realized by a current sensor using a sense resistor or a current mirror circuit.

(Operation of Balance Charging Circuit According to Third Embodiment)

Next, an operation of the balance charging circuit for series-connected cells according to the third embodiment of the present invention will be explained. FIGS. 16 to 19 are views to explain operations of the third embodiment of the present invention.

In the balance charging circuit for series-connected cells according to the third embodiment of the present invention, in order to charge series-connected cells and maintain voltage balance between the series-connected cells, first to fourth charging periods are set by the control circuit Control 3.

Firstly, in the first charging period, the control circuit Control 3 turns on the switch S2. Then, an input voltage Vin is input from the input terminal 301, so that a charging current to charge the cell Cell2 with electric charge is stored in the coil L1. A path of the charging current is indicated by a dotted arrow in FIG. 16.

Subsequently, in the second charging period, the control circuit Control 3 turns off the switch S2 and turns on the switch S3. Then, the cell Cell2 is charged with the charging current charged in the coil L1. A path of the charging current is indicated by a dotted arrow in FIG. 17.

After that, in the third charging period, the control circuit Control 3 turns on the switch S3. Then, a charging current to charge the cell Cell1 with electric charge is stored in the coil L1 from the cell Cell2. A path of the charging current is indicated by a dotted arrow in FIG. 18.

Further, in the fourth charging period, the control circuit Control 3 turns off the switch S3 and turns on the switch S1. Then, the cell Cell1 is charged with the charging current stored in the coil L1. A path of the charging current is illustrated in FIG. 19.

Here, controlled contents by the control circuit Control 3 are explained with reference to FIG. 20. This figure illustrates which switch, among the switches S1 to S3 in FIG. 15, the control circuit Control 3 turns on in each of the first to fourth charging periods T1 to T4. That is, among the switches S1 to S3, a switch corresponding to a column indicative of "ON" in the figure is turned into an ON state by the control circuit Control 3, and the other switches are turned into an off state.

Figures 19, 20:
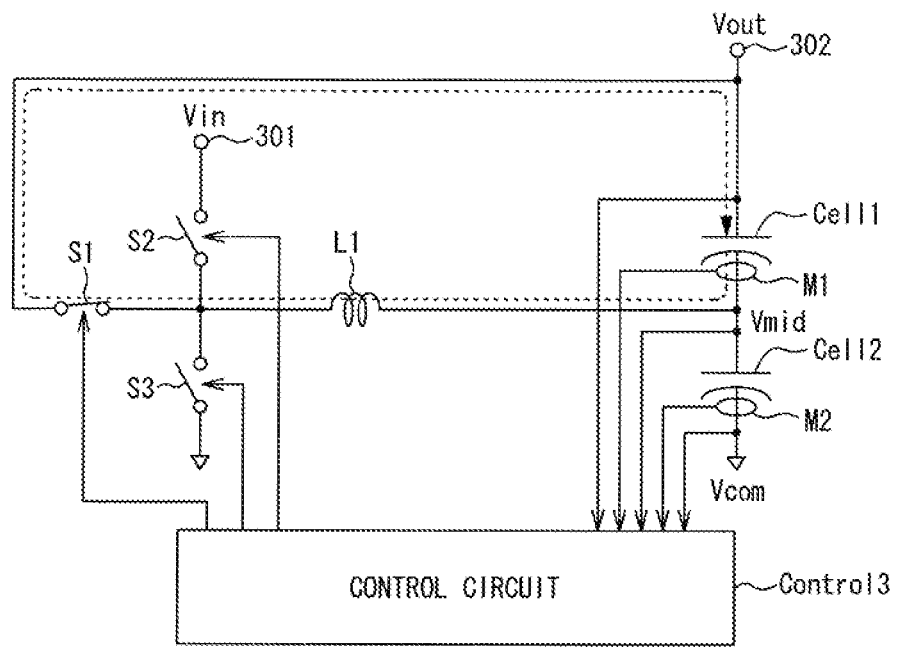
FIG. 19 is a view to explain an operation of the third embodiment of the present invention.
FIG. 20 is a view illustrating controlled contents of a control circuit according to the third embodiment of the present invention.

As illustrated in FIG. 20, the switch S2 is turned on in the first charging period T1 as described above. Then, the switch S3 is turned on in the second charging period T2. Further, the switch S3 is turned on in the third charging period T3. Furthermore, the switch S1 is turned on in the fourth charging period T4.

The control circuit Control 3 repeatedly controls the switches S1 to S3 to turn on as shown in the first to fourth charging periods T1 to T4 described above. Accordingly, it is possible to realize a balance charging circuit using a single coil L1.

As described above, in the balance charging circuit for series-connected cells according to the third embodiment of the present invention, a single coil for temporarily storing a power supplied from a power source is provided in common for the cell Cell1 and the cell Cell2 so as to charge the cell Cell1 and the cell Cell2. In the first charging period and the second charging period, the cell Cell2 is charged, and in the third and fourth charging period, the cell Cell1 is charged. That is, the cell Cell1 and cell Cell2 can be charged independently, and therefore, by setting times for turning on the switches in the first to fourth charging periods according to a variation between a capacitance value of the cell Cell1 and a capacitance value of the cell Cell2, the series-connected cells can be charged with electric charge and voltage balance between the series-connected cells can be maintained.

For example, in a case where the capacitance value of the cell Cell1 is larger than the capacitance value of the cell Cell2, times for turning on the switches in the first and second charging periods may be set longer than times for turning on the switches in the third and fourth charging periods. On the other hand, in a case where the capacitance value of the cell Cell1 is smaller than the capacitance value of the cell Cell2, times for turning on the switches in the first and second charging periods may be set shorter than times for turning on the switches in the third and fourth charging periods. By setting the first to fourth charging periods repeatedly in turn by the control circuit Control 3, the series-connected cells can be charged with electric charge, voltage balance between the series-connected cells can be maintained, and an output voltage Vout can be obtained from the output terminal 302. Further, if times for turning on the switches in the second and fourth charging periods are set so that a charging current of the coil L1 becomes zero at the end of the second and fourth charging periods, a time for removing a residual current of the coil L1 at the end of the second and fourth charging periods can be eliminated at the beginning of the first and third charging periods. It is also possible to prevent power attenuation which occurs when a refresh current to a power supply side flows into a parasitic resistor of each element in a current path of the first and third charging periods.

According to the above configuration and operations, in the balance charging circuit for series-connected cells according to the third embodiment of the present invention, a coil for charging series-connected cells with electric charge and a coil for maintaining voltage balance between the series-connected cells can be combined, that is, can be realized by a single coil, thereby yielding an effect that a whole circuit is small in size.

Further, the number of switches is two fewer than that of the balance charging circuit for series-connected cells according to the second embodiment of the present invention, thereby yielding an effect that the whole circuit can be further downsized.

(Configuration of Balance Charging Circuit According to Fourth Embodiment)

Figure 21:
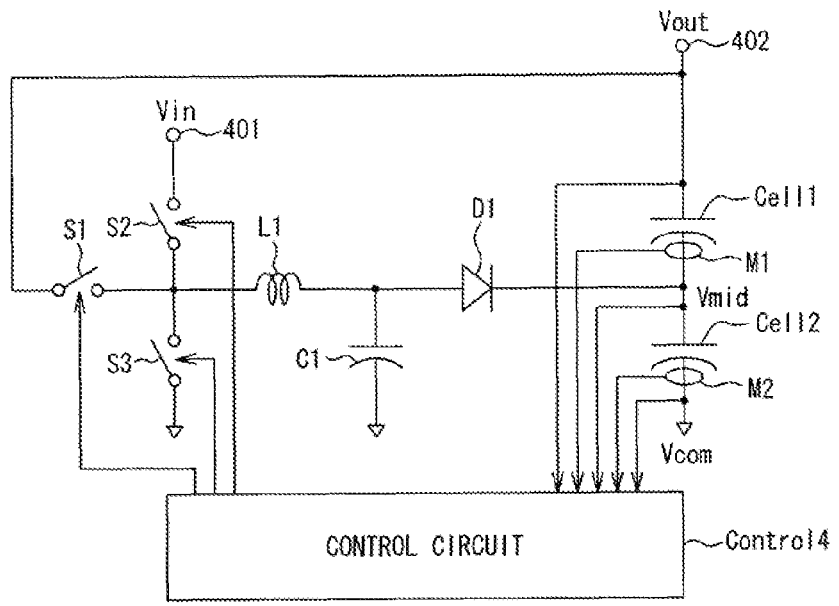
FIG. 21 is a circuit diagram illustrating a fourth embodiment of the present invention.
Figure 22:
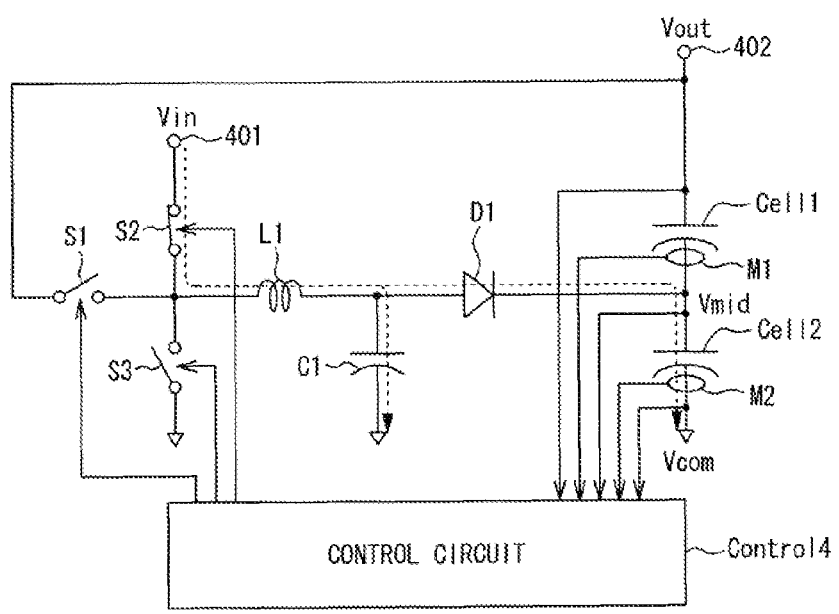
FIG. 22 is a view to explain an operation of the fourth embodiment of the present invention.
Figure 23:
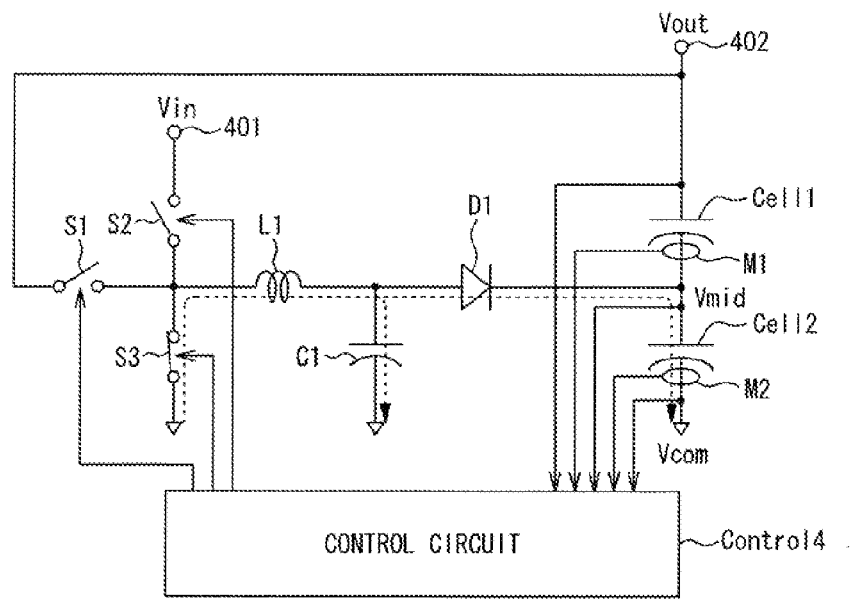
FIG. 23 is a view to explain an operation of the fourth embodiment of the present invention.
Figure 24:
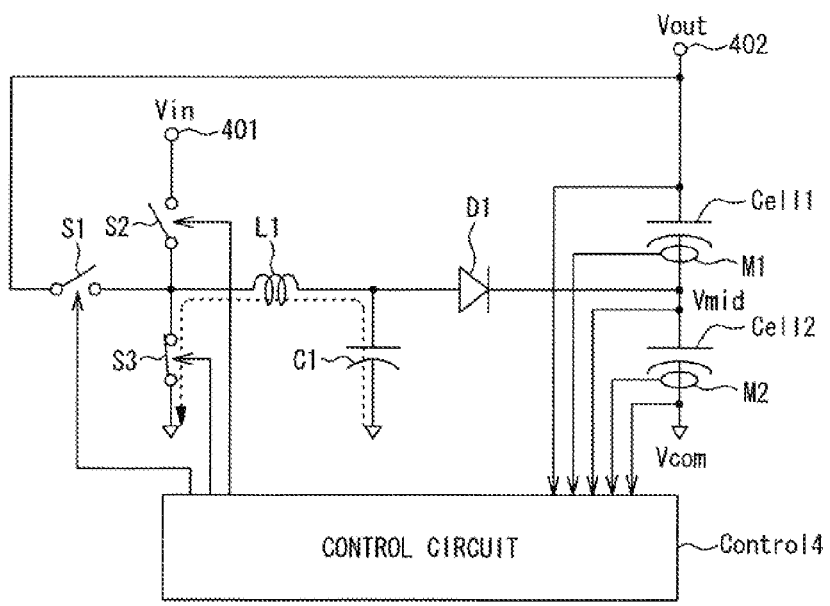
FIG. 24 is a view to explain an operation of the fourth embodiment of the present invention.

Next, a configuration of a balance charging circuit for series-connected cells according to a fourth embodiment of the present invention will be explained. FIG. 21 is a circuit diagram illustrating the fourth embodiment of the present invention.

The balance charging circuit for series-connected cells according to the fourth embodiment of the present invention includes a coil L1, switches S1 to S3, a control circuit Control 4, a capacitor C1, a diode D1, a cell Cell1, and a cell Cell2, and the cell Cell1 and the cell Cell2 are connected in series and have one series-connected end connected to an output terminal 402 and another series-connected end connected to a reference voltage terminal. One end of the switch S1 is connected to the output terminal 402, one end of the switch S2 is connected to an input terminal 401, and one end of the switch S3 is connected to the reference voltage terminal. Further, one end of the capacitor C1 is connected to the reference voltage terminal and a cathode of the diode D1 is connected to a contact point between the cell Cell1 and the cell Cell2. One end of the coil L1 is connected to another ends of the switches S1 to S3 and another end thereof is connected to another end of the capacitor C1 and an anode of the diode D1. Further, the control circuit Control 4 is connected to control terminals of the switches S1 to S3 so as to control on and off. The control circuit Control 4 can be realized by, for example, a sequential circuit using a well-known gate circuit or a PWM signal generation circuit for generating a PWM signal having a pulse width according to a current and a voltage of each cell.

Similarly to the balance charging circuit for series-connected cells according to the first embodiment of the present invention, the switches S1 to S3 can be realized by a semiconductor element such as an N-channel MOS transistor, a P-channel MOS transistor, an NPN bipolar transistor, or a PNP bipolar transistor.

In a case where the N-channel MOS transistor or the P-channel MOS transistor is employed as a switch, one end of the switch serves as either of a source and a drain, and another end thereof serves as the other one of the source and the drain. Further, the control terminal serves as a gate.

In a case where the NPN bipolar transistor or the PNP bipolar transistor is employed as a switch, one end of the switch serves as either of an emitter and a collector, and another end thereof serves as the other one of the emitter and the collector. Further, the control terminal serves as a base.

In a case where the N-channel MOS transistor or the NPN bipolar transistor is employed as a switch, when a high voltage is applied to the control terminal, the switch is turned on, and when a low voltage is applied to the control terminal, the switch is turned off.

In a case where the P-channel MOS transistor or the PNP bipolar transistor is employed as a switch, when a low voltage is applied to the control terminal, the switch is turned on, and when a high voltage is applied to the control terminal, the switch is turned off.

The control circuit Control 4 receives an output voltage Vout, a contact-point voltage Vmid between the cell Cell1 and the cell Cell2, and a reference voltage Vcom to find both ends voltages of the cell Cell1 and the cell Cell2. Further, the control circuit Control 4 monitors charging currents respectively flowing in the cell Cell1 and the cell Cell2 by current monitoring circuits M1 and M2, and receives current values thus monitored. Then, the control circuit Control 4 controls on and off times of the switches S1 to S3 based on the both ends voltages thus found and the current values thus monitored so that the cell Cell1 and the cell Cell2 are charged in a balanced manner.

The current monitoring circuits M1 and M2 can be realized by a current sensor using a sense resistor or a current mirror circuit.

Further, the diode D1 can be realized by a PN junction diode, a Schottky barrier diode, or the like.

(Operation of Balance Charging Circuit According to Fourth Embodiment)

Next, an operation of the balance charging circuit for series-connected cells according to the fourth embodiment of the present invention will be explained. FIGS. 22 to 25 are views to explain operations of the fourth embodiment of the present invention.

In the balance charging circuit for series-connected cells according to the fourth embodiment of the present invention, in order to charge series-connected cells and maintain voltage balance between the series-connected cells, first to fourth charging periods are set by the control circuit Control 4.

Firstly, in the first charging period, the control circuit Control 4 turns on the switch S2. Then, an input voltage Vin is input from the input terminal 401, so that a charging current to charge the capacitor C1 and the cell Cell2 with electric charge is stored in the coil L1. A path of the charging current is indicated by a dotted arrow in FIG. 22. Subsequently, in the second charging period, the control circuit Control 4 turns off the switch S2 and turns on the switch S3. Then, the capacitor C1 and the cell Cell2 are charged with the charging current charged in the coil L1. A path of the charging current is indicated by a dotted arrow of FIG. 23.

After that, in the third charging period, the control circuit Control 4 turns on the switch S3. Then, a charging current to charge the cell Cell1 with electric charge is stored in the coil L1 from the capacitor C1. At this time, the electric charge of the cell Cell2 is maintained without flowing into a side of the coil L1, due to a backflow prevention function of the diode D1. A path of the charging current is indicated by a dotted arrow of FIG. 24.

Further, in the fourth charging period, the control circuit Control 4 turns off the switch S3 and turns on the switch S1. Then, the cell Cell1 is charged with the charging current charged in the coil L1. A path of the charging current is illustrated in FIG. 25.

Here, controlled contents by the control circuit Control 4 are explained with reference to FIG. 26. This figure illustrates which switch, among the switches S1 to S3 in FIG. 21, the control circuit Control 4 turns on in each of the first to fourth charging periods T1 to T4. That is, among the switches S1 to S3, a switch corresponding to a column indicative of "ON" in the figure is turned into an ON state by the control circuit Control 4, and the other switches are turned into an off state.

Figures 25, 26:
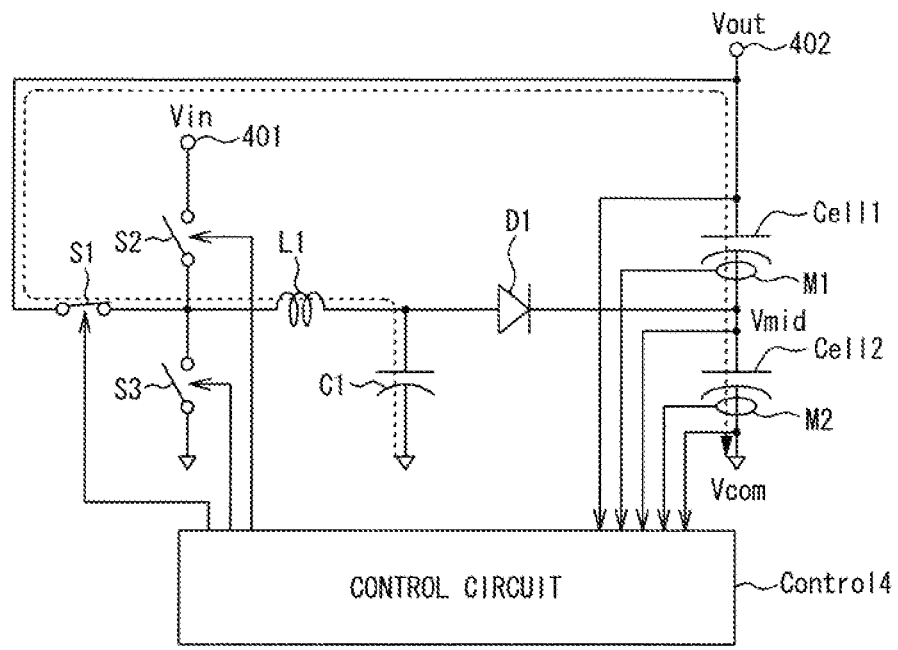
FIG. 25 is a view to explain an operation of the fourth embodiment of the present invention.
FIG. 26 is a view illustrating controlled contents of a control circuit according to the fourth embodiment of the present invention.

As illustrated in FIG. 26, the switch S2 is turned on in the first charging period T1 as described above. Then, the switch S3 is turned on in the second charging period T2. Further, the switch S3 is turned on in the third charging period T3. Furthermore, the switch S1 is turned on in the fourth charging period T4.

The control circuit Control 4 repeatedly controls the switches S1 to S3 to turn on as shown in the first to fourth charging periods T1 to T4 described above. Accordingly, it is possible to realize a balance charging circuit using a single coil L1.

As described above, in the balance charging circuit for series-connected cells according to the fourth embodiment of the present invention, a single coil for temporarily storing a power supplied from a power source is provided in common for the cell Cell1 and the cell Cell2 so as to charge the cell Cell1 and the cell Cell2. In the first charging period and the second charging period, the cell Cell2 is charged, and in the third and fourth charging period, the cell Cell1 is charged. That is, the cell Cell1 and cell Cell2 can be charged independently, and therefore, by setting times for turning on the switches in the first to fourth charging periods according to a variation between a capacitance value of the cell Cell1 and a capacitance value of the cell Cell2, the series-connected cells can be charged with electric charge and voltage balance between the series-connected cells can be maintained.

For example, in a case where the capacitance value of the cell Cell1 is larger than the capacitance value of the cell Cell2, times for turning on the switches in the first and second charging periods may be set longer than times for turning on the switches in the third and fourth charging periods. On the other hand, in a case where the capacitance value of the cell Cell1 is smaller than the capacitance value of the cell Cell2, times for turning on the switches in the first and second charging periods may be set shorter than times for turning on the switches in the third and fourth charging periods. By setting the first to fourth charging periods repeatedly in turn by the control circuit Control 4, the series-connected cells can be charged with electric charge, voltage balance between the series-connected cells can be maintained, and an output voltage Vout can be obtained from the output terminal 402. Further, if times for turning on the switches in the second and fourth charging periods are set so that a charging current of the coil L1 becomes zero at the end of the second and fourth charging periods, a time for removing a residual current of the coil L1 at the end of the second and fourth charging periods can be eliminated at the beginning of the first and third charging periods. It is also possible to prevent power attenuation which occurs when a refresh current to a power supply side flows into a parasitic resistor of each element in a current path of the first and third charging periods.

According to the above configuration and operations, in the balance charging circuit for series-connected cells according to the fourth embodiment of the present invention, a coil for charging series-connected cells with electric charge and a coil for maintaining voltage balance between the series-connected cells can be combined, that is, can be realized by a single coil, thereby yielding an effect that a whole circuit is small in size.

Further, each cell in the series-connected cells is not discharged in any of the first to fourth charging periods, thereby yielding an effect that the series-connected cells which have a limitation in terms of the number of charging times can be charged with electric charge and voltage balance between the series-connected cells can be maintained.

(In Case where Three or more Cells are Arranged)

The above description, however, has been given of cases where the number N of storage cells connected in series is "2", but the number N of storage cells may be an integer of "3" or more.

A case where the number N of storage cells is 3 or more (N≥3) will be described. In the following description given with reference to respective figures, the control circuit and the current monitoring circuits are not illustrated from the convenience of drawing figures. That is, in each figure to be referred to in the following explanation, a control circuit, not illustrated, is provided at a lower side in the figure, similarly to the above cases. Further, in each figure to be referred to in the following explanation, a current monitoring circuit, not illustrated, is provided between respective storage cells, similarly to the above cases.

The control circuit, not illustrated, receives an output voltage Vout, contact-point voltages Vmid1 to VmidN−1 between adjacent cells, and a reference voltage Vcom so as to find both ends voltages between the cells. Further, the control circuit, not illustrated, monitors charging currents flowing in respective cells by current monitoring circuits which are not illustrated herein, and receives current values thus monitored. Then, the control circuit, not illustrated, controls on and off times of respective switches based on the both ends voltages thus found and the current values thus monitored so that the respective cells are charged in a balanced manner. The current monitoring circuits which are not illustrated herein can be realized by a current sensor using a sense resistor or a current mirror circuit.

Similarly to the balance charging circuit for series-connected cells according to the first embodiment of the present invention, the respective switches used in explanation of the following embodiments can be realized by a semiconductor element such as an N-channel MOS transistor, a P-channel MOS transistor, an NPN bipolar transistor, or a PNP bipolar transistor.

In a case where the N-channel MOS transistor or the P-channel MOS transistor is employed as a switch, one end of the switch serves as either of a source and a drain, and another end thereof serves as the other one of the source and the drain. Further, the control terminal serves as a gate.

In a case where the NPN bipolar transistor or the PNP bipolar transistor is employed as a switch, one end of the switch serves as either of an emitter and a collector, and another end thereof serves as the other one of the emitter and the collector. Further, the control terminal serves as a base.

In a case where the N-channel MOS transistor or the NPN bipolar transistor is employed as a switch, when a high voltage is applied to the control terminal, the switch is turned on, and when a low voltage is applied to the control terminal, the switch is turned off.

In a case where the P-channel MOS transistor or the PNP bipolar transistor is employed as a switch, when a low voltage is applied to the control terminal, the switch is turned on, and when a high voltage is applied to the control terminal, the switch is turned off.

The control circuit, not illustrated, turns on a given switch pair connected to both ends of the coil L1 to charge the coil L1 with a current, and then turns on another switch pair connected to both ends of the coil L1 and a storage cell which pair is different from the above switches, so as to charge the storage cell with the current in the coil L1. Further, the control circuit, not illustrated, monitors voltages of the respective storage cells by the current monitoring circuits which are not illustrated herein, so as to control on and off times of the switch pairs so that the voltages of the respective storage cells are equal to each other.

(Configuration of Balance Charging Circuit According to Fifth Embodiment)

Figure 27:
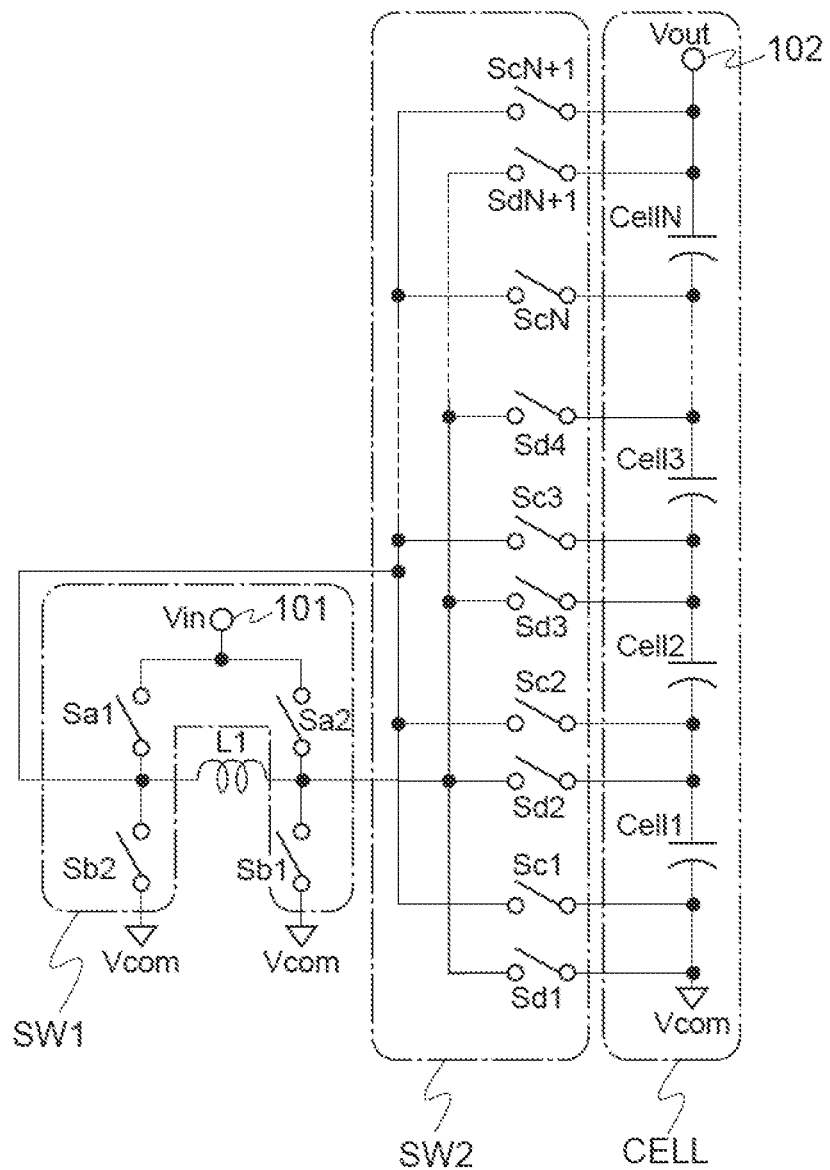
FIG. 27 is a circuit diagram illustrating a fifth embodiment of the present invention.
Figure 28:
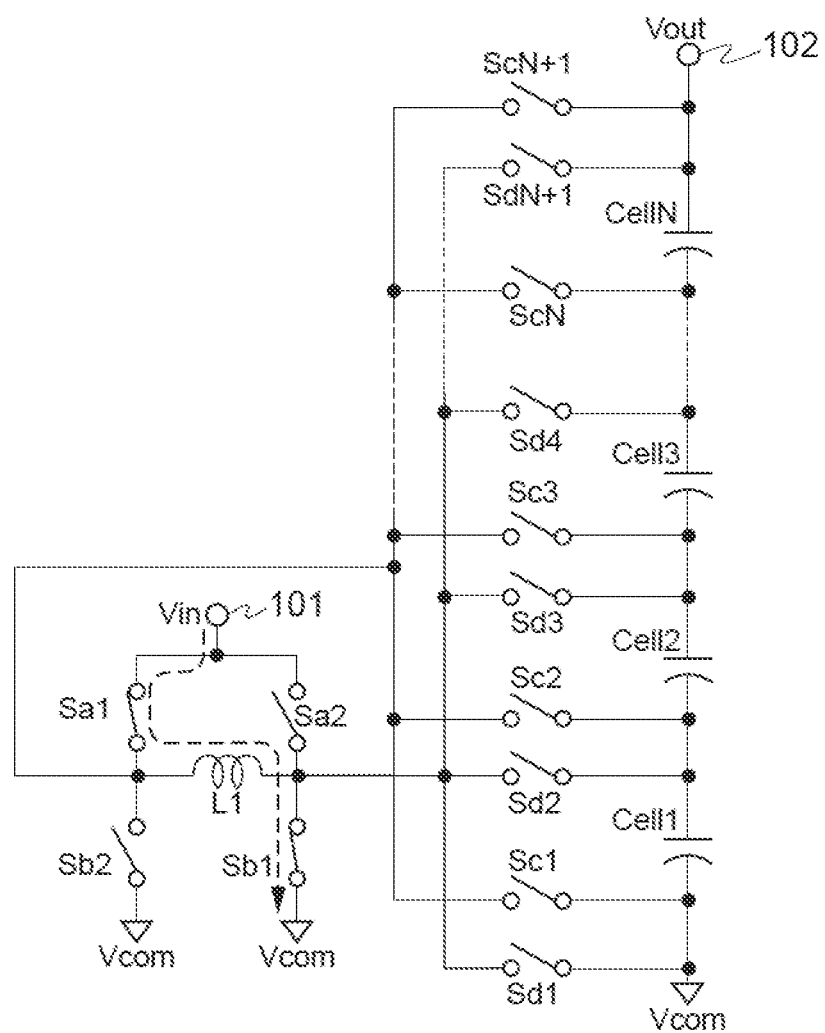
FIG. 28 is a view to explain an operation of the fifth embodiment of the present invention.
Figure 29:
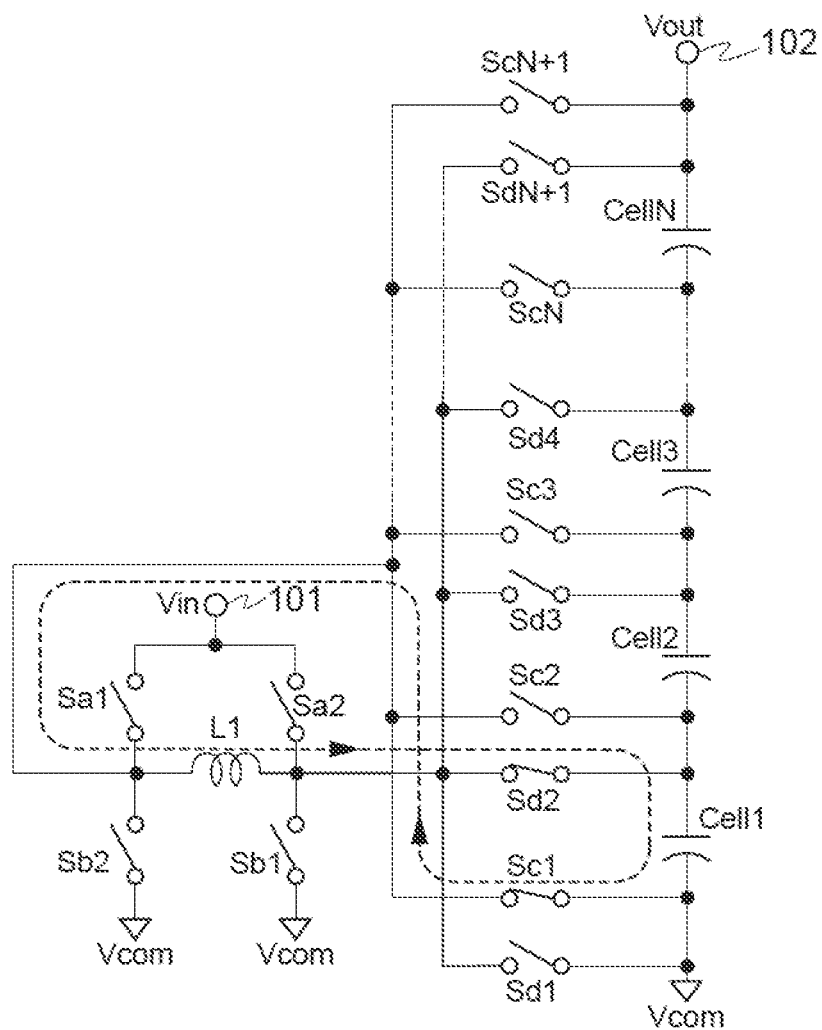
FIG. 29 is a view to explain an operation of the fifth embodiment of the present invention.
Figure 30:
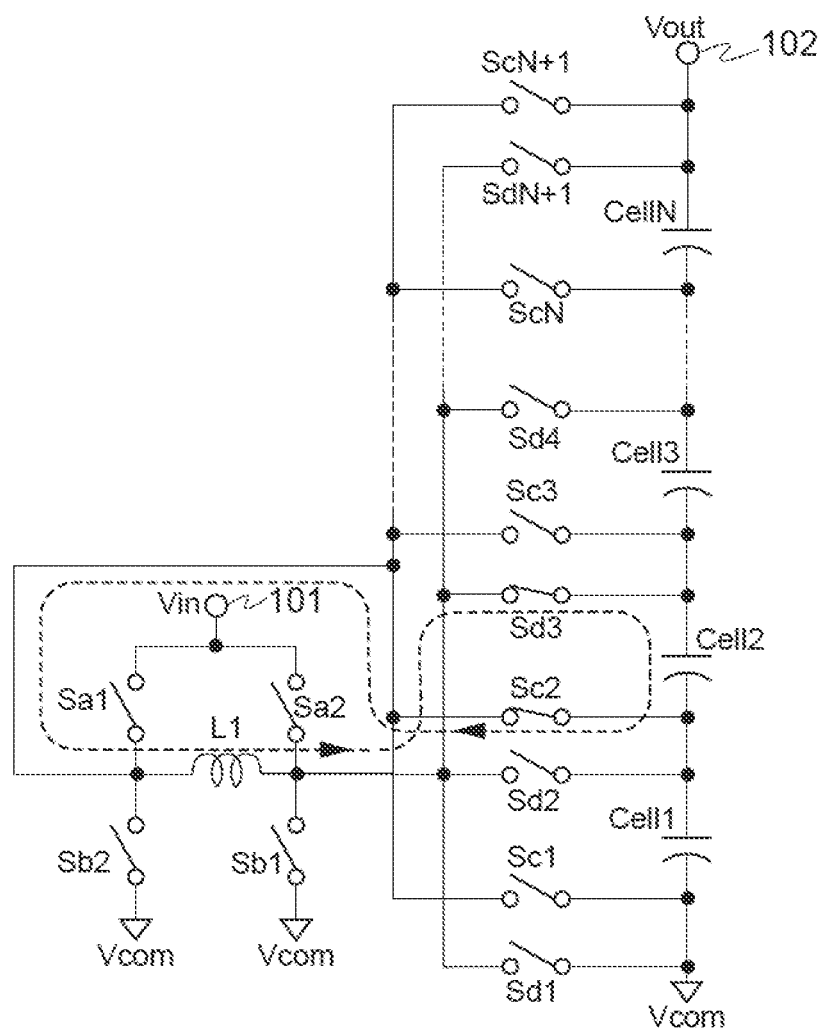
FIG. 30 is a view to explain an operation of the fifth embodiment of the present invention.

FIG. 27 is a circuit diagram illustrating an exemplary configuration of a balance charging circuit for charging, by use of a single coil L1, N pieces of storage cells Cell1 to CellN which are connected in series. In FIG. 27, the balance charging circuit includes a single coil L1, a switch group SW1 for electrically connecting the coil L1 between an input terminal 101 into which a charging voltage is input and a reference voltage terminal, and a switch group SW2 for electrically connecting both ends of each of the storage cells Cell1 to CellN to both ends of the coil L1.

The switch group SW1 includes a switch Sa1 and a switch Sa2, and a switch Sb1 and a switch Sb2. One ends of the switch Sa1 and the switch Sa2 are connected to the input terminal 101, and another ends thereof are respectively connected to one end and another end of the coil L1. One ends of the switch Sb1 and the switch Sb2 are connected to the reference voltage terminal, and another ends thereof are respectively connected to one end and another end of the coil L1.

The switch group SW2 includes switches Sc1 to ScN+1 and switches Sd1 to SdN+1. One ends of the switches Sc1 to ScN+1 are connected to contact points of N pieces of the storage cells Cell1 to CellN, an output terminal 102, and the reference voltage terminal, and another ends thereof are connected to one end of the coil L1. One ends of the switches Sd1 to SdN+1 are connected to contact points of N pieces of the storage cells Cell1 to CellN, the output terminal 102, and the reference voltage terminal, and another ends thereof are connected to another end of the coil L1.

(Operation of Balance Charging Circuit According to Fifth Embodiment)

Next, an operation of the balance charging circuit for series-connected cells according to the fifth embodiment of the present invention will be explained. The balance charging circuit for series-connected cells according to the present embodiment is a charge/discharge circuit which turns on a given switch pair connected to both ends of the coil L1 to charge the coil L1 with a current, and then turns on another switch pair connected to both ends of the coil L1 and a storage cell which pair is different from the above switch pair, so as to charge the storage cell with the current in the coil L1. The balance charging circuit monitors voltages of respective storage cells and controls on and off times of the switch pairs so that the voltages of the respective storage cells are equal to each other.

FIGS. 28 to 32 are views to explain operations of the fifth embodiment of the present invention.

In the balance charging circuit for series-connected cells according to the fifth embodiment of the present invention, in order to charge series-connected storage cells and maintain voltage balance between the series-connected cells, first to Nth charging periods are set by a control circuit which is not illustrated in the figure. A first half of each of the first to Nth charging periods is a coil charging period (which applies in each of the following embodiments). A second half of each of the first to Nth charging periods is a storage cell charging period (which is applies in each of the following embodiments).

Firstly, in a first half of the first charging period, the control circuit, not illustrated, turns on switches Sa1 and Sb1. Then, an input voltage Vin is input from the input terminal 101, and a charging current to charge the cell Cell1 is stored in the coil L1. A path of the charging current is indicated by a dotted arrow of FIG. 28.

Next, in a second half of the first charging period, the control circuit, not illustrated, turns off the switches Sa1 and Sb1 and turns on switches Sc1 and Sd2. Then, the cell Cell1 is charged with the charging current charged in the coil L1. A path of the charging current is indicated by a dotted arrow of FIG. 29.

After that, in a first half of the second charging period, the control circuit, not illustrated, turns off the switches Sc1 and Sd2 and turns on the switches Sa1 and Sb1. Then, an input voltage Vin is input from the input terminal 101, and a charging current to charge the cell Cell2 is stored in the coil L1. This state is the same as the state in FIG. 28, and a path of the charging current is indicated by the dotted arrow of FIG. 28.

Next, in a second half of the second charging period, the switches Sa1 and Sb1 are turned off and switches Sc2 and Sd3 are turned on. Then, the cell Cell2 is charged with the charging current charged in the coil L1. A path of the charging current is indicated by a dotted arrow in FIG. 30.

Thereafter, a similar operation is repeated to turn on the switches Sa1 and Sb1 in a first half of each charging period, so as to store, in the coil L1, a charging current to charge a storage cell with electric charge. Then, corresponding switches for both ends of each cell are turned on in a second half of the each charging period, so as to charge the cell with the charging current stored in the coil L1. Accordingly, in a case where the cell CellN is charged, switches ScN and SdN+1 are turned on. A path of the charging current in this state is indicated by a dotted arrow in FIG. 31.

Here, controlled contents by the control circuit, not illustrated, are explained with reference to FIG. 32. FIG. 32 illustrates which switch, among the switches in FIG. 27, the control circuit, not illustrated, turns on in each of the first to Nth charging periods T1 to TN. That is, among the switches, a switch corresponding to a column indicative of "ON" in the figure is turned into an ON state by the control circuit, not illustrated, and the other switches are turned into an off state.

As illustrated in FIG. 32, the switches Sa1 and Sb1 are turned on in the first half of each of the charging periods T1 to TN, as described above. Then, corresponding switches for both ends of each cell are turned on in the second half of the each of the charging periods T1 to TN, as described above. As described, the control circuit, not illustrated, repeatedly controls each of the switches to turn on as shown in the first to Nth charging periods T1 to TN described above. Accordingly, it is possible to realize a balance charging circuit using a single coil L1.

(Configuration of Balance Charging Circuit According to Sixth Embodiment)

Figure 33:
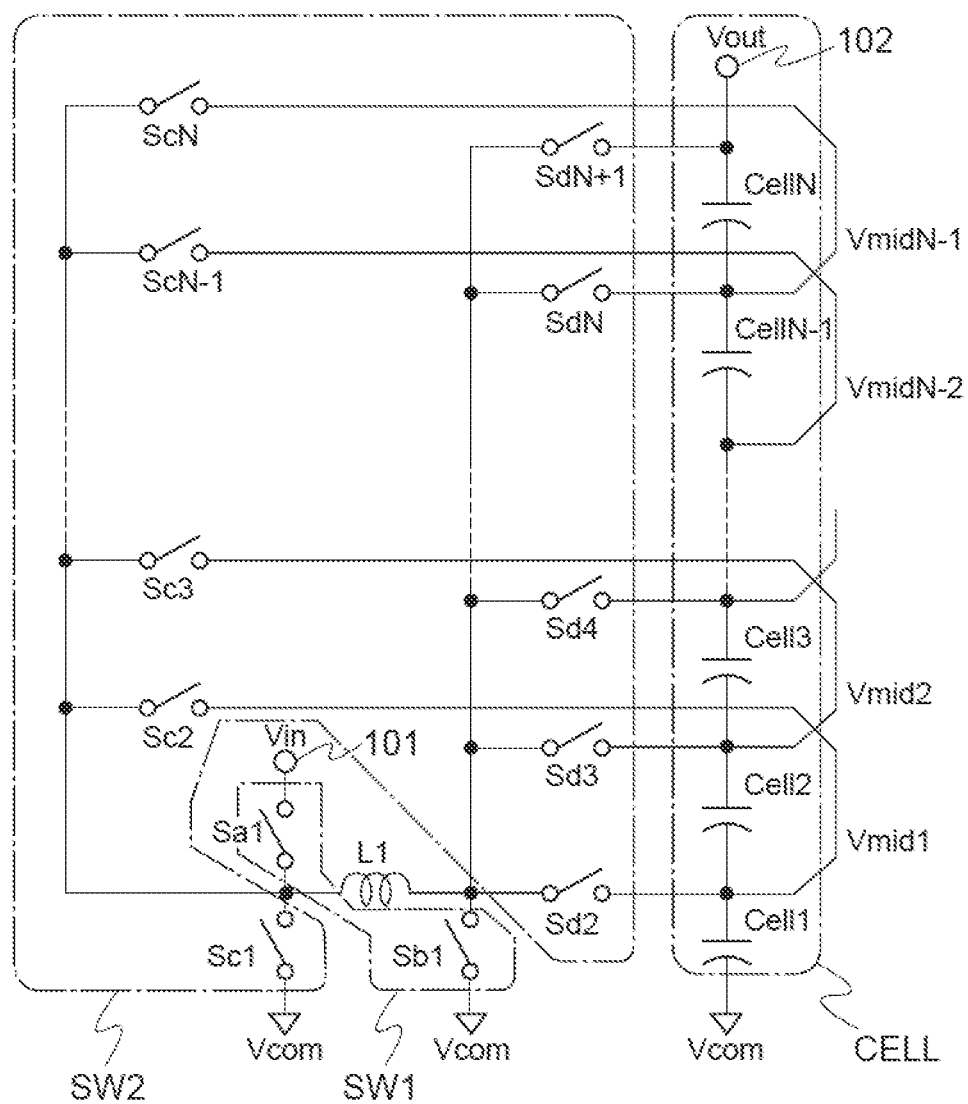
FIG. 33 is a circuit diagram illustrating a sixth embodiment of the present invention.
Figure 34:
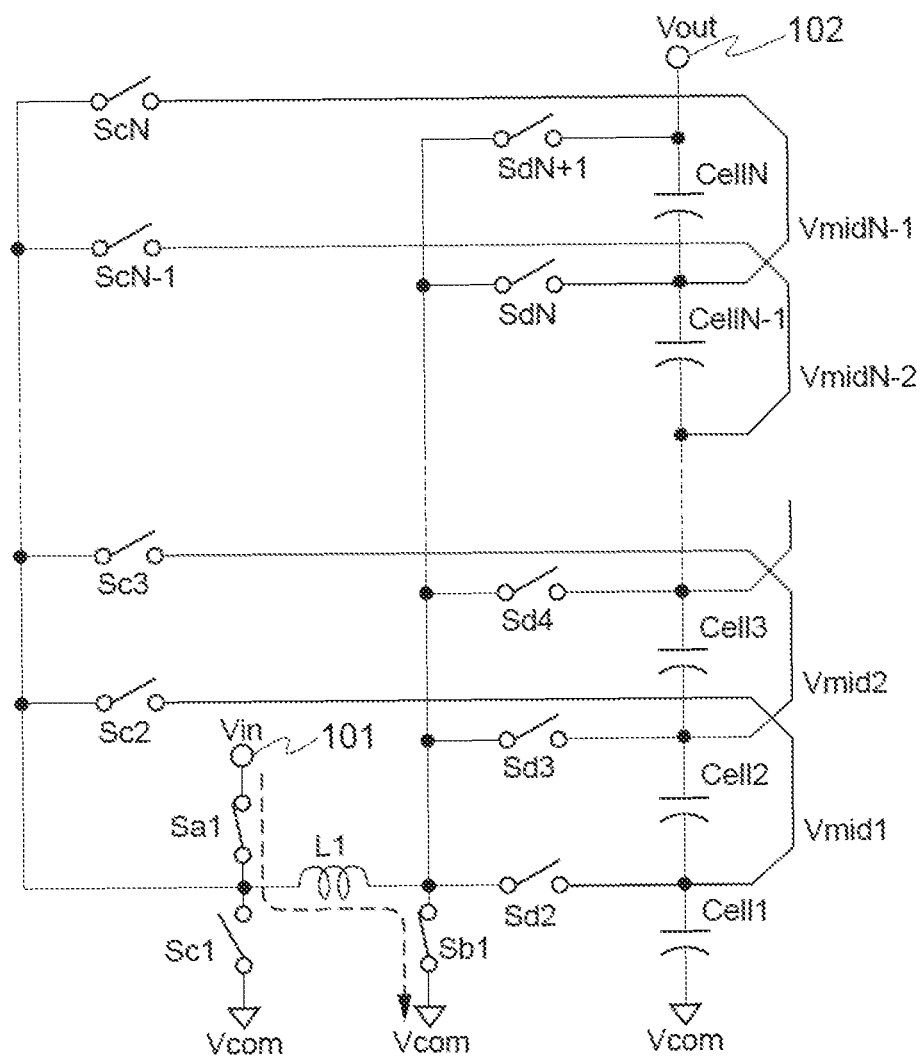
FIG. 34 is a view to explain an operation of the sixth embodiment of the present invention.
Figure 35:
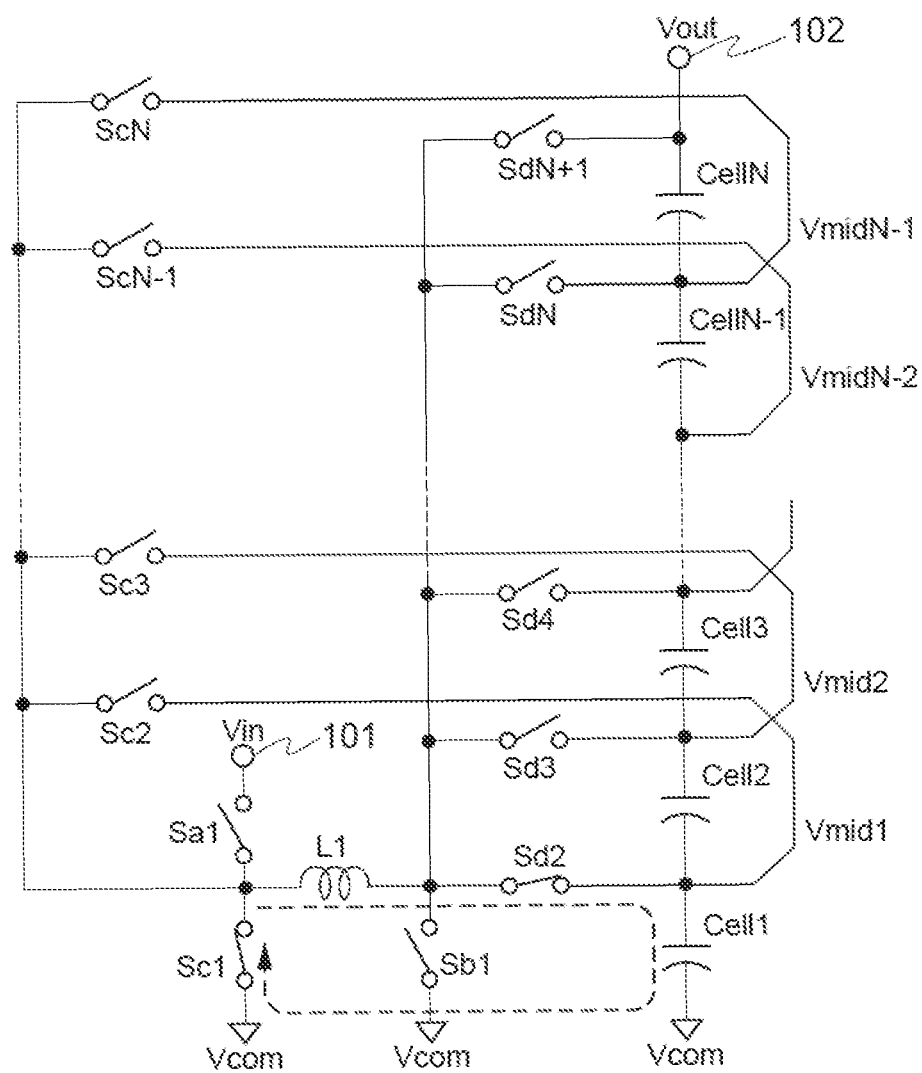
FIG. 35 is a view to explain an operation of the sixth embodiment of the present invention.
Figure 36:
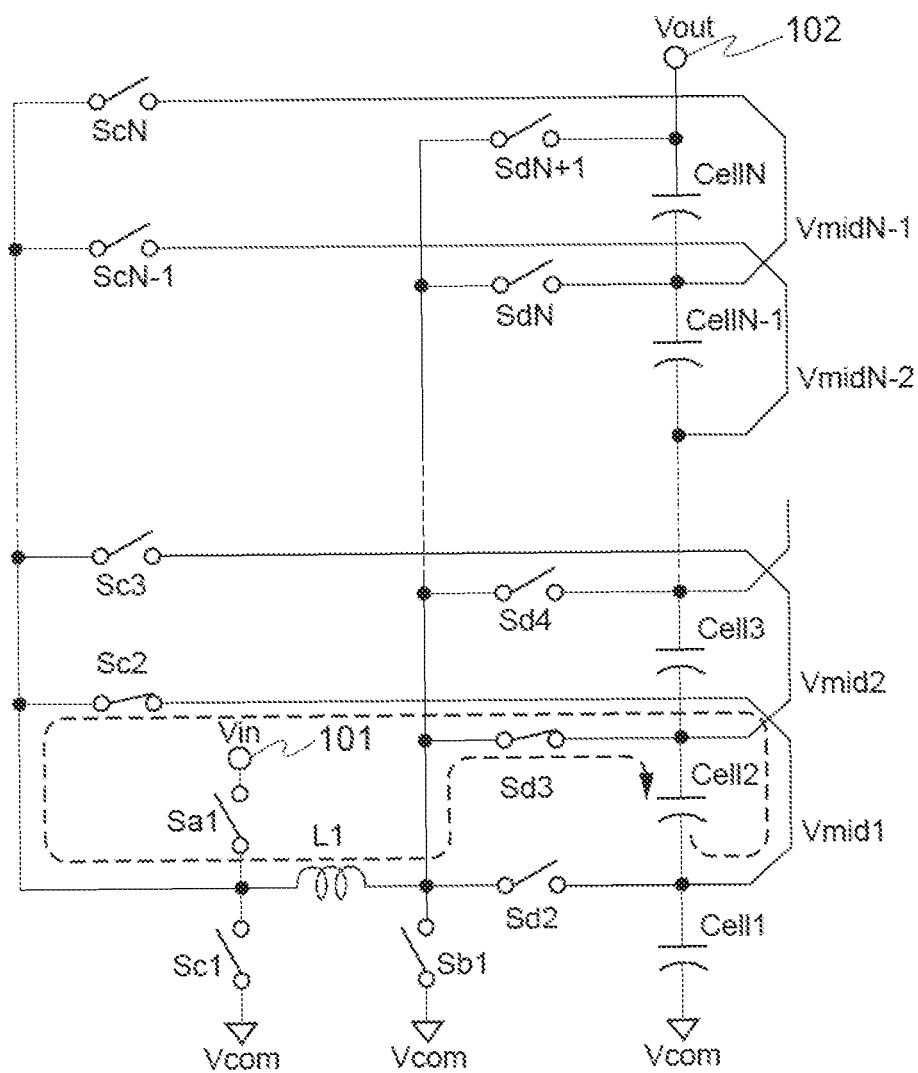
FIG. 36 is a view to explain an operation of the sixth embodiment of the present invention.
Figure 37:
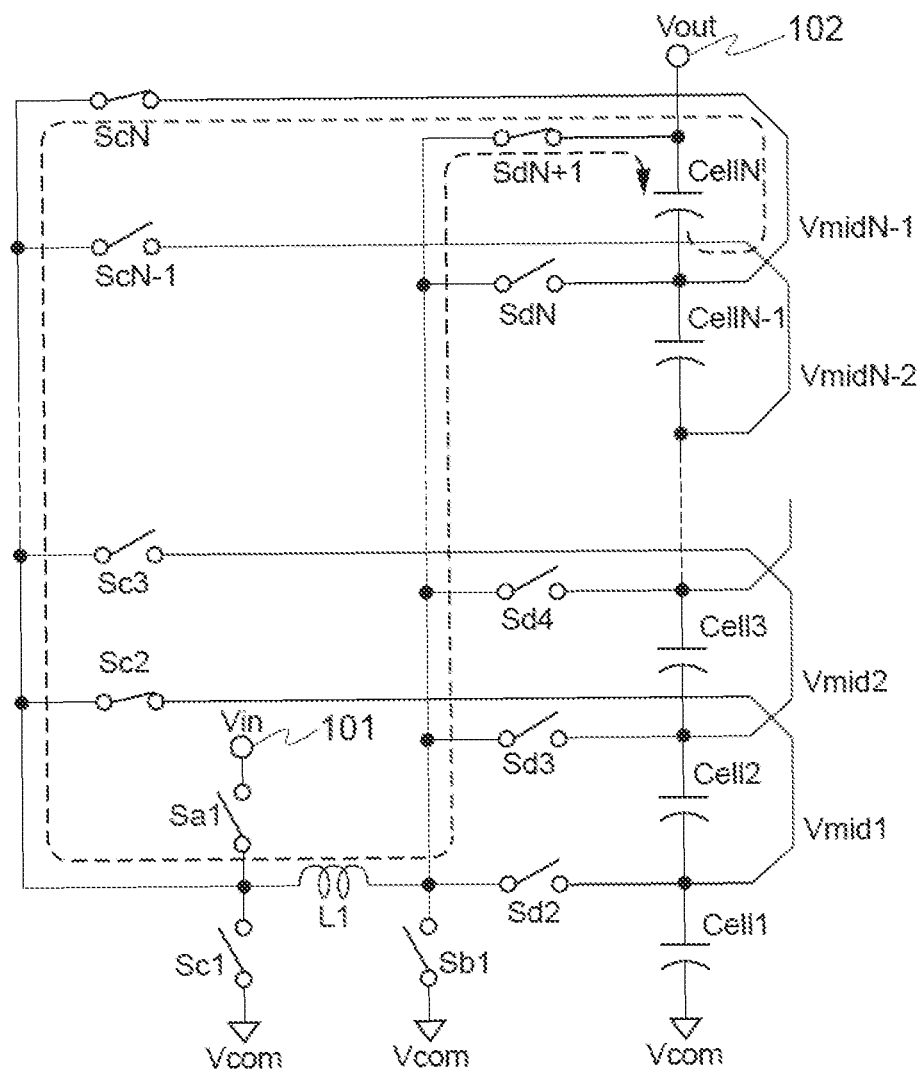
FIG. 37 is a view to explain an operation of the sixth embodiment of the present invention.

FIG. 33 is a circuit diagram illustrating an exemplary configuration of a balance charging circuit for charging, by use of a single coil L1, N pieces of storage cells Cell1 to CellN which are connected in series. In FIG. 33, the balance charging circuit includes a single coil L1, a switch group SW1 for electrically connecting the coil L1 between an input terminal 101 into which a charging voltage is input and a reference voltage terminal, and a switch group SW2 for electrically connecting both ends of each of the storage cells Cell1 to CellN to both ends of the coil L1. The configuration of the balance charging circuit of FIG. 33 is a configuration of a balance charging circuit in a case where the number of cells is N in the configurations of FIGS. 1 and 8.

The switch group SW1 includes a switch Sa1 and a switch Sb1. One end of the switch Sa1 is connected to the input terminal 101, and another end thereof is connected to one end of the coil L1. One end of the switch Sb1 is connected to the reference voltage terminal, and another end thereof is connected to another end of the coil L1.

The switch group SW2 includes switches Sc1 to ScN and switches Sd1 to SdN+1. One ends of the switches Sc1 to ScN are connected to contact points of N pieces of the storage cells Cell1 to CellN and the reference voltage terminal, and another ends thereof are connected to the one end of the coil L1. One ends of the switches Sd2 to SdN+1 are connected to the contact points of N pieces of the storage cells Cell1 to CellN and an output terminal 102, and another ends thereof are connected to the another end of the coil L1.

As described, the balance charging circuit according to the present embodiment includes switches as many as the number equal to twice the number of storage cells plus "2." That is, the switches as many as the number equal to twice the number of storage cells plus "2" include the switch group SW2 including 2N pieces of switches for connecting both ends of each storage cell to the coil L1, and the switch group SW1 including switch pairs for connecting both ends of the coil L1 between the input terminal and the reference voltage terminal.

A charging period of a control circuit which is not illustrated in the figure includes a period TJa (J=1 to N) in which the switch Sa1 for connecting one end of the coil to a charging power input terminal (Vin) and the switch Sb1 for connecting another end of the coil to the reference voltage terminal (Vcom) are turned on, and a period TJb (J=1 to N) in which a switch SdJ+1 for connecting a high voltage terminal of a Jth storage cell to the another end of the coil and a switch ScJ for connecting a low voltage terminal of the Jth storage cell to the one end of the coil are turned on. Voltages of respective storage cells are monitored and lengths of the periods T1a to TNa and lengths of the periods T1b to TNb are controlled so that the voltages of the respective storage cells are equal to each other.

A discharge period of the control circuit, not illustrated, includes a period Tx having: a period Txa in which the voltages of the respective storage cells are monitored, a high-voltage storage cell of a number P which is counted from the first storage cell and a low-voltage storage cell of a number Q which is counted from the first storage cell are selected independently, a switch (ScP+1) for connecting a high-voltage terminal of the high-voltage storage cell to the one end of the coil and a switch (SdP) for connecting a low-voltage terminal of the high-voltage storage cell to the another end of the coil are turned on so as to charge the coil with a current; and a period Txb in which a switch (SdQ+1) for connecting a high-voltage terminal of the low-voltage storage cell to the another end of the coil and a switch (ScQ) for connecting a low-voltage terminal of the low-voltage storage cell to the one end of the coil are turned on so as to charge the low-voltage storage cell with a current stored in the coil. The control circuit, not illustrated, controls lengths of the above periods repeatedly so that the voltages of the respective storage cells are equal to each other.

(Operation of Balance Charging Circuit According to Sixth Embodiment)

Next, an operation of the balance charging circuit for series-connected cells according to the sixth embodiment of the present invention will be explained. The balance charging circuit for series-connected cells according to the present embodiment includes, as a charging time, a period TJa (J=1 to N) in which the switch Sa1 for connecting one end of the coil L1 to the charging power input terminal (Vin) and the switch Sb1 for connecting another end of the coil L1 to the reference voltage terminal (Vcom) are turned on, and a period TJb (J=1 to N) in which a switch SdJ+1 for connecting a high-voltage terminal of a Jth storage cell to the another end of the coil L1 and a switch ScJ for connecting a low-voltage terminal of the Jth storage cell to the one end of the coil L1 are turned on, monitors voltages of respective storage cells, and controls the lengths of the periods T1a to TNa and the lengths of the periods T1b to TNb so that the voltages of the respective storage cells are equal to each other. Further, the balance charging circuit for series-connected cells according to the present embodiment includes, as a discharge time for driving a connected load to the output terminal 102, a period Tx having: a period Txa in which the voltages of the respective storage cells are monitored, a high-voltage storage cell of a number P which is counted from the first storage cell and a low-voltage storage cell of a number Q which is counted from the first storage cell are selected independently, and a switch (ScP+1) for connecting a high-voltage terminal of the high-voltage storage cell to the one end of the coil L1 and a switch (SdP) for connecting a low-voltage terminal of the high-voltage storage cell to the another end of the coil L1 are turned on so as to charge the coil L1 with a current; and a period Txb in which a switch (SdQ+1) for connecting a high-voltage terminal of the low-voltage storage cell to the another end of the coil L1 and a switch (ScQ) for connecting a low-voltage terminal of the low-voltage storage cell to the one end of the coil L1 are turned on so as to charge the low-voltage storage cell with the current flowing in the coil L1. The balance charging circuit controls lengths of the above periods repeatedly so that the voltages of the respective storage cells are equal to each other.

FIGS. 34 to 38 are views to explain operations of the sixth embodiment of the present invention.

In the balance charging circuit for series-connected cells according to the sixth embodiment of the present invention, in order to charge series-connected storage cells and maintain voltage balance between the series-connected cells, first to Nth charging periods are set by a control circuit which is not illustrated in the figure.

Firstly, in a first half of the first charging period, the control circuit, not illustrated, turns on the switches Sa1 and Sb1. Then, an input voltage Vin is input from the input terminal 101, and a charging current to charge the cell Cell1 with electric charge is stored in the coil L1. A path of the charging current is indicated by a dotted arrow in FIG. 34.

Subsequently, in a second half of the first charging period, the control circuit, not illustrated, turns off the switches Sa1 and Sb1 and turns on the switches Sc1 and Sd2. Then, the cell Cell1 is charged with the charging current charged in the coil L1. A path of the charging current is indicated by a dotted arrow in FIG. 35.

After that, in a first half of the second charging period, the control circuit, not illustrated, turns off the switches Sc1 and Sd2 and turns on the switches Sa1 and Sb1. Then, an input voltage Vin is input from the input terminal 101, and a charging current to charge the cell Cell2 with electric charge is stored in the coil L1. This state is the same as the state in FIG. 34, and a path of the charging current is indicated by the dotted arrow of FIG. 34.

Next, in a second half of the second charging period, the switches Sa1 and Sb1 are turned off and the switches Sc2 and Sd3 are turned on. Then, the cell Cell2 is charged with the charging current charged in the coil L1. A path of the charging current is indicated by a dotted arrow in FIG. 36.

Thereafter, a similar operation is repeated to turn on the switches Sa1 and Sb1 in a first half of each charging period, so as to store, in the coil L1, a charging current to charge a storage cell with electric charge. Then, corresponding switches for both ends of each cell are turned on in a second half of the each charging period, so as to charge the cell with the charging current charged in the coil L1. Accordingly, in a case where the cell CellN is charged, the switches ScN and SdN+1 are turned on. A path of the charging current in this state is indicated by a dotted arrow in FIG. 37.

Here, controlled contents by the control circuit, not illustrated, are explained with reference to FIG. 38. FIG. 38 illustrates which switch, among the switches in FIG. 33, the control circuit, not illustrated, turns on in each of the first to Nth charging periods T1 to TN. That is, among the switches, a switch corresponding to a column indicative of "ON" in the figure is turned into an ON state by the control circuit, not illustrated, and the other switches are turned into an off state.

As illustrated in FIG. 38, the switches Sa1 and Sb1 are turned on in the first half of each of the charging periods T1 to TN, as described above. Then, corresponding switches for both ends of each cell are turned on in the second half of the each of the charging periods T1 to TN, as described above. As described, the control circuit, not illustrated, repeatedly controls each of the switches to turn on as shown in the first to Nth charging periods T1 to TN described above. Accordingly, it is possible to realize a balance charging circuit which performs voltage boost and drop operations by use of a single coil L1.

Further, each cell in the series-connected cells is not discharged in any of the charging periods T1 to TN, thereby also yielding an effect that the series-connected cells which have a limitation in terms of the number of charging times can be charged with electric charge and voltage balance between the series-connected cells can be maintained.

(Configuration of Balance Charging Circuit According to Seventh Embodiment)

Figure 39:
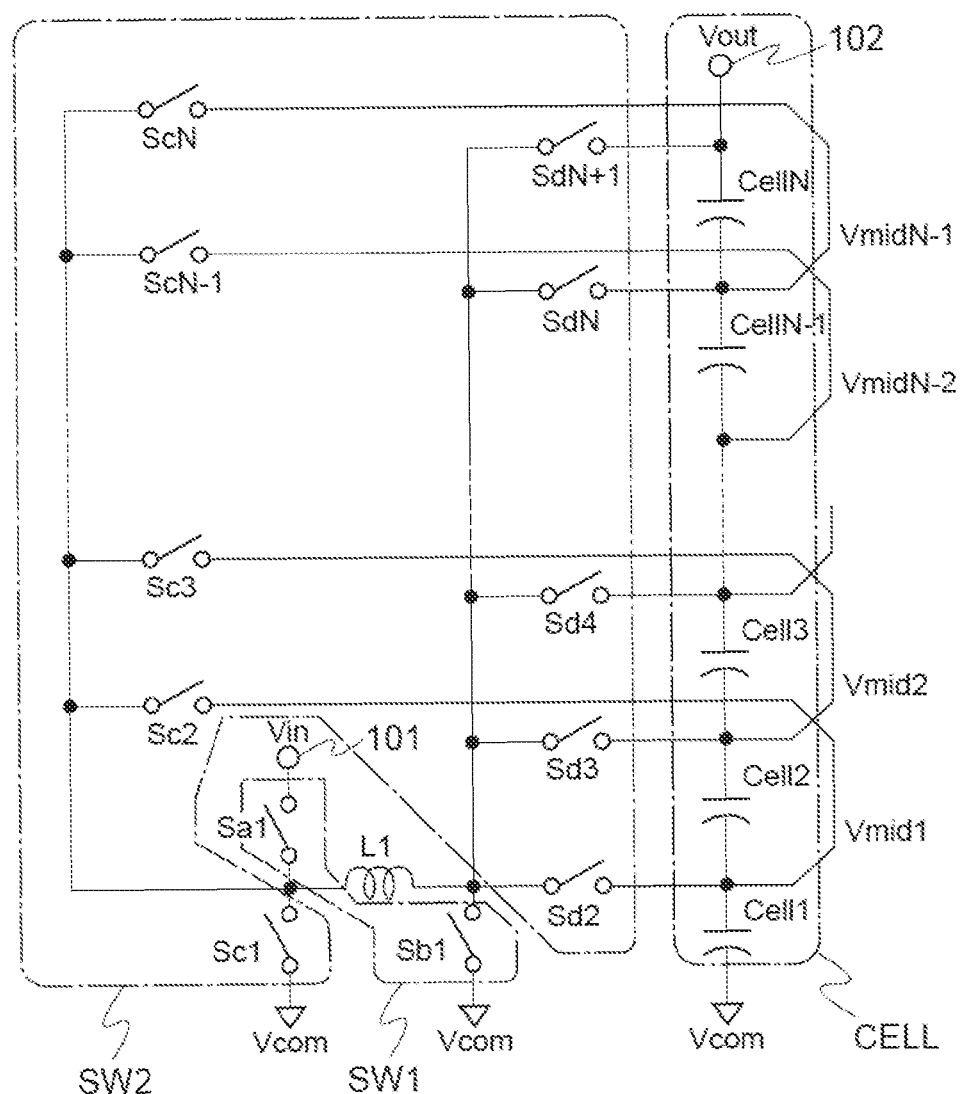
FIG. 39 is a circuit diagram illustrating a seventh embodiment of the present invention.
Figure 40:
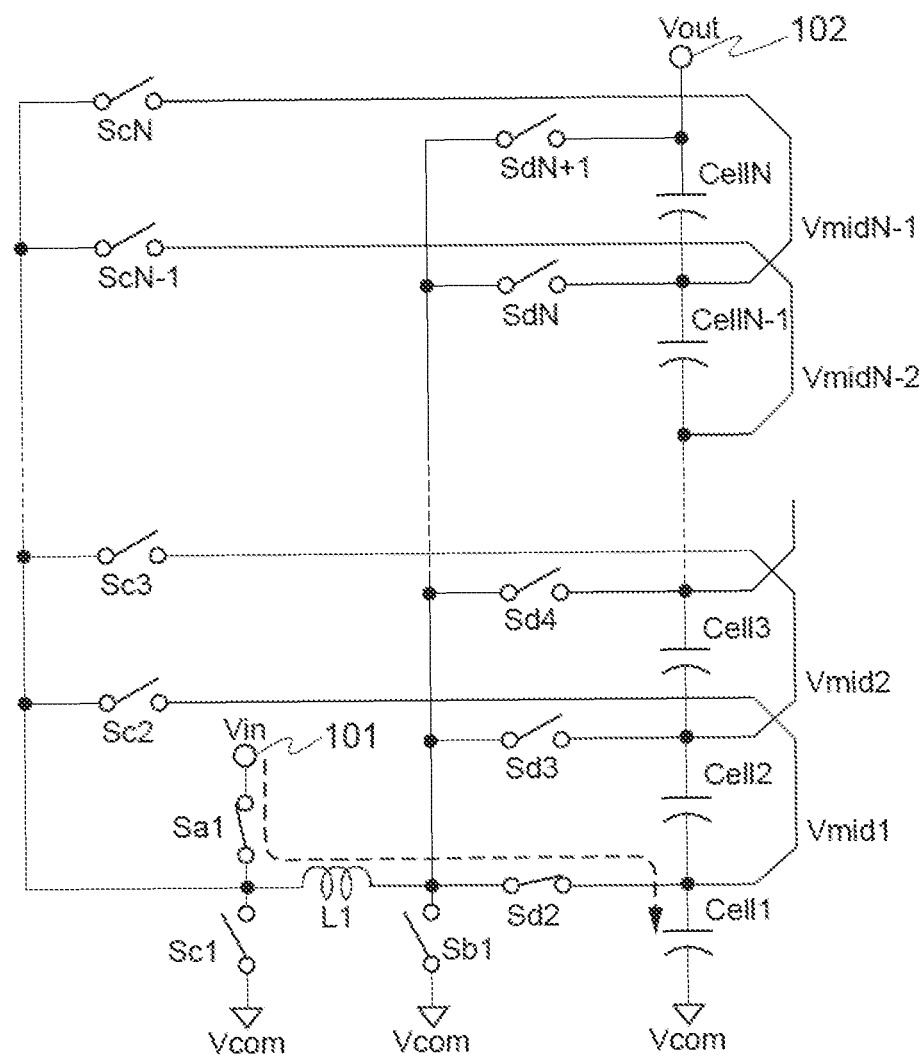
FIG. 40 is a view to explain an operation of the seventh embodiment of the present invention.
Figure 41:
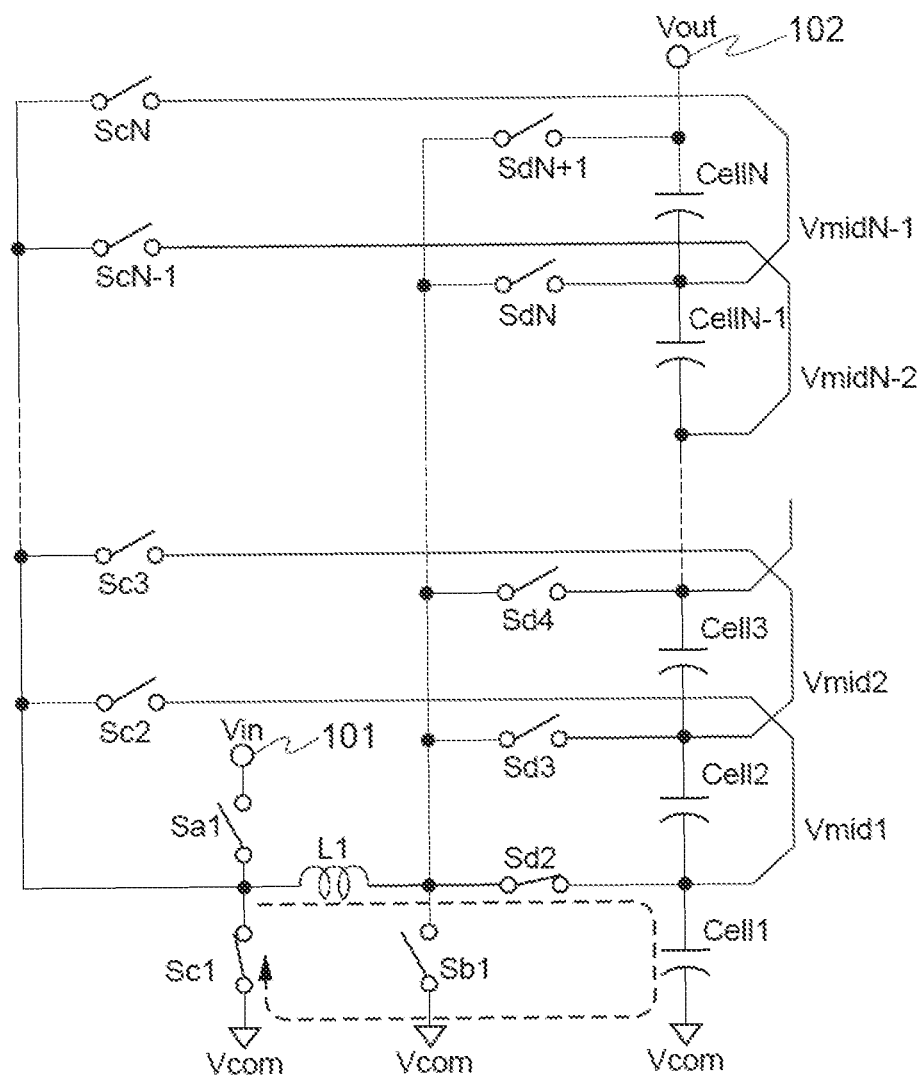
FIG. 41 is a view to explain an operation of the seventh embodiment of the present invention.
Figure 42:
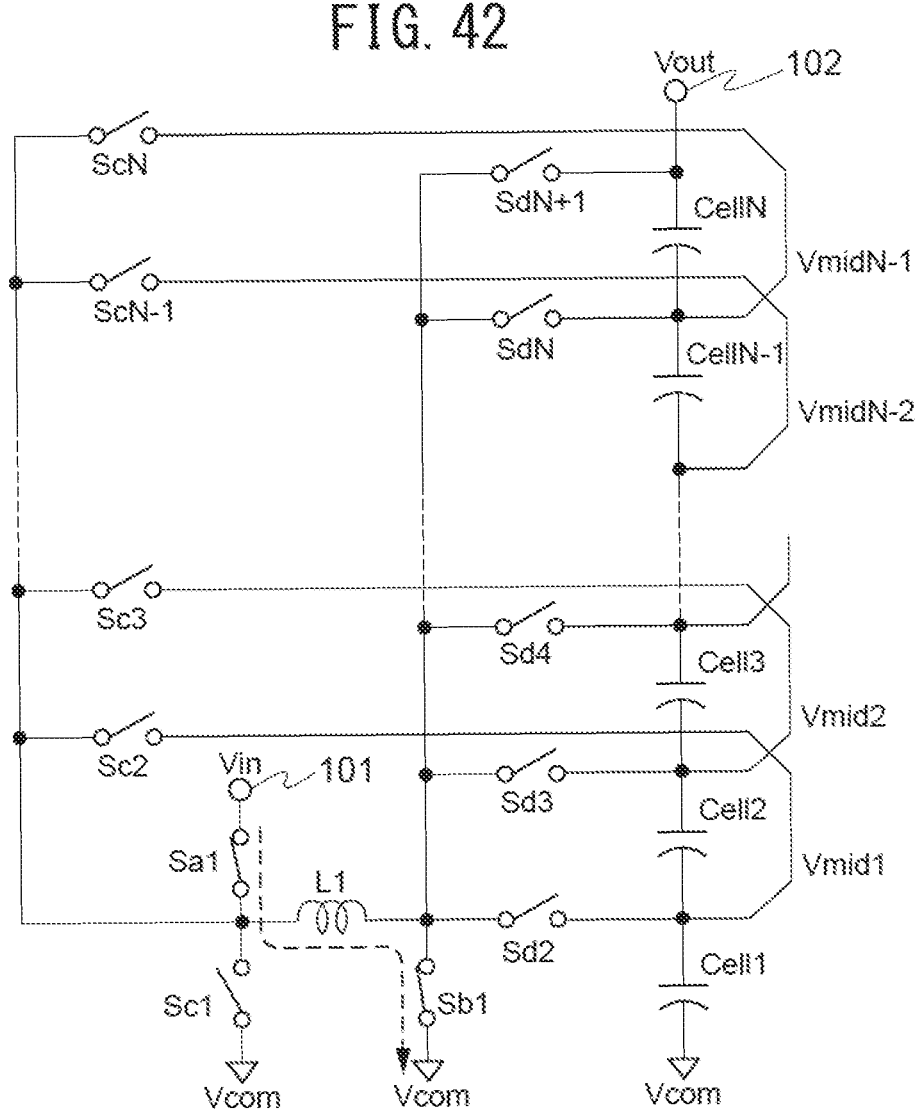
FIG. 42 is a view to explain an operation of the seventh embodiment of the present invention.
Figure 43:
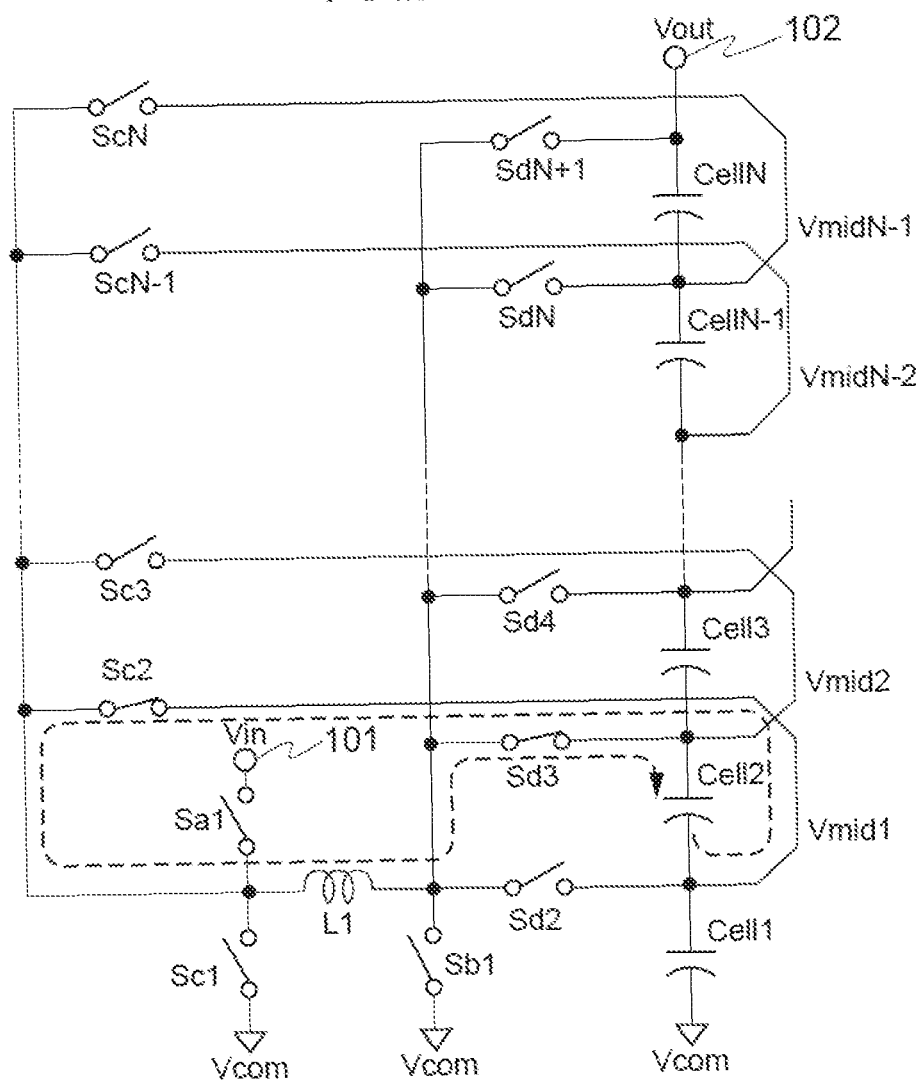
FIG. 43 is a view to explain an operation of the seventh embodiment of the present invention.
Figure 44:
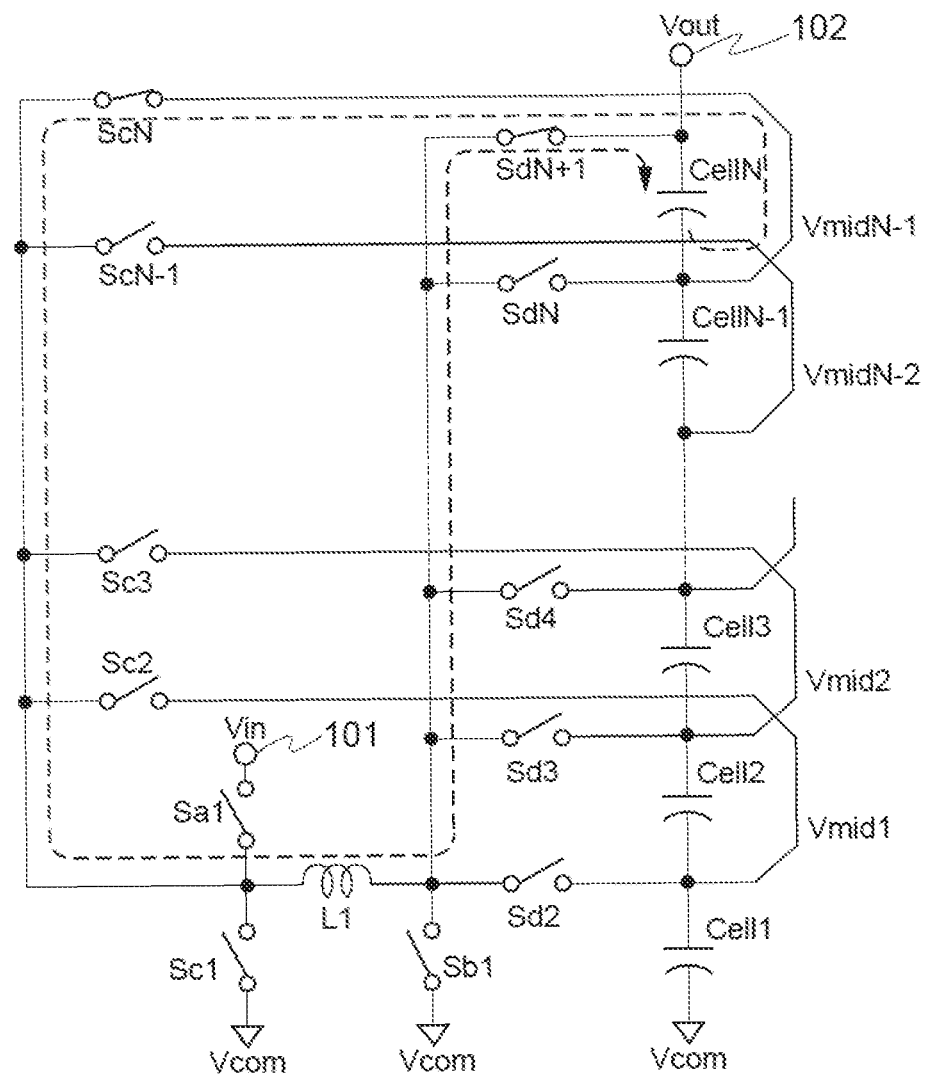
FIG. 44 is a view to explain an operation of the seventh embodiment of the present invention.

FIG. 39 is a circuit diagram illustrating an exemplary configuration of a balance charging circuit for charging, by use of a single coil L1, N pieces of storage cells Cell1 to CellN which are connected in series. In FIG. 39, the balance charging circuit includes a single coil L1, a switch group SW1 for electrically connecting the coil L1 between an input terminal 101 into which a charging voltage is input and a reference voltage terminal, and a switch group SW2 for electrically connecting both ends of each of the storage cells Cell1 to CellN to both ends of the coil L1. The configuration of the balance charging circuit of FIG. 39 is a configuration of a balance charging circuit in a case where the number of cells is N in the configurations of FIGS. 1 and 7.

The configuration of the balance charging circuit in FIG. 39 itself is similar to the configuration of the balance charging circuit explained with reference to FIG. 33, but some controlled contents of switches controlled by a control circuit, not illustrated, are different, and a voltage drop operation is implemented.

(Operation of Balance Charging Circuit According to Seventh Embodiment)

Next, an operation of the balance charging circuit for series-connected cells according to the seventh embodiment of the present invention will be explained. FIGS. 40 to 45 are views to explain operations of the sixth embodiment of the present invention.

In the balance charging circuit for series-connected cells according to the seventh embodiment of the present invention, in order to charge series-connected storage cells and maintain voltage balance between the series-connected cells, first to Nth charging periods are set by a control circuit which is not illustrated in the figure. Note that switches to be turned on in the first charging period are different from those in the sixth embodiment.

That is, in a first half of the first charging period, the control circuit, not illustrated, turns on the switches Sa1 and Sd2. In this regard, the switches to be turned on herein are different from those in the sixth embodiment. Then, an input voltage Vin is input from the input terminal 101, so that the cell Cell1 is charged while a charging current is stored in the coil L1. A path of the charging current is indicated by a dotted arrow in FIG. 40.

Next, in a second half of the first charging period, the control circuit, not illustrated, turns off the switch Sa1 and turns on the switch Sc1 while the switch Sd2 is being turned on. Then, the cell Cell1 is charged with the charging current charged in the coil L1. A path of the charging current is indicated by a dotted arrow in FIG. 41.

After that, in a first half of the second charging period, the control circuit, not illustrated, turns off the switches Sc1 and Sd2 and turns on the switches Sa1 and Sb1. Then, an input voltage Vin is input from the input terminal 101, and a charging current to charge the cell Cell2 is stored in the coil L1. A path of the charging current is indicated by a dotted arrow in FIG. 42.

Next, in a second half of the second charging period, the switches Sa1 and Sb1 are turned off and the switches Sc2 and Sd3 are turned on. Then, the cell Cell2 is charged with the charging current charged in the coil L1. A path of the charging current is indicated by a dotted arrow in FIG. 43.

Thereafter, a similar operation is repeated to turn on the switches Sa1 and Sb1 in a first half of each charging subsequent to the second charging period, so as to store, in the coil L1, a charging current to charge a storage cell with electric charge. Then, corresponding switches for both ends of each cell are turned on in a second half of the each charging period, so as to charge the cell with the charging current charged in the coil L1. Accordingly, in a case where the cell CellN is charged, the switches ScN and SdN+1 are turned on. A path of the charging current in this state is indicated by a dotted arrow in FIG. 44.

Here, controlled contents by the control circuit, not illustrated, are explained with reference to FIG. 45. FIG. 45 illustrates which switch, among the switches in FIG. 39, the control circuit, not illustrated, turns on in each of the first to Nth charging periods T1 to TN. That is, among the switches, a switch corresponding to a column indicative of "ON" in the figure is turned into an ON state by the control circuit, not illustrated, and the other switches are turned into an off state.

As illustrated in FIG. 45, in each of the charging periods T1 to TN, the switches Sa1 and Sd2 are turned on in a first half of the first charging period, and the switches Sa1 and Sb1 are turned on in a first half of each of the second charging period and its subsequent charging periods. Then, corresponding switches for both ends of each cell are turned on in a second half of each of the charging periods T1 to TN, as described above. As described, the control circuit, not illustrated, repeatedly controls each of the switches to turn on as shown in the first to Nth charging periods T1 to TN described above. Accordingly, it is possible to realize a balance charging circuit using a single coil L1.

Further, each cell in the series-connected cells is not discharged in any of the charging periods T1 to TN, thereby also yielding an effect that the series-connected cells which have a limitation in terms of the number of charging times can be charged with electric charge and voltage balance between the series-connected cells can be maintained.

(Configuration of Balance Charging Circuit According to Eighth Embodiment)

Figure 46:
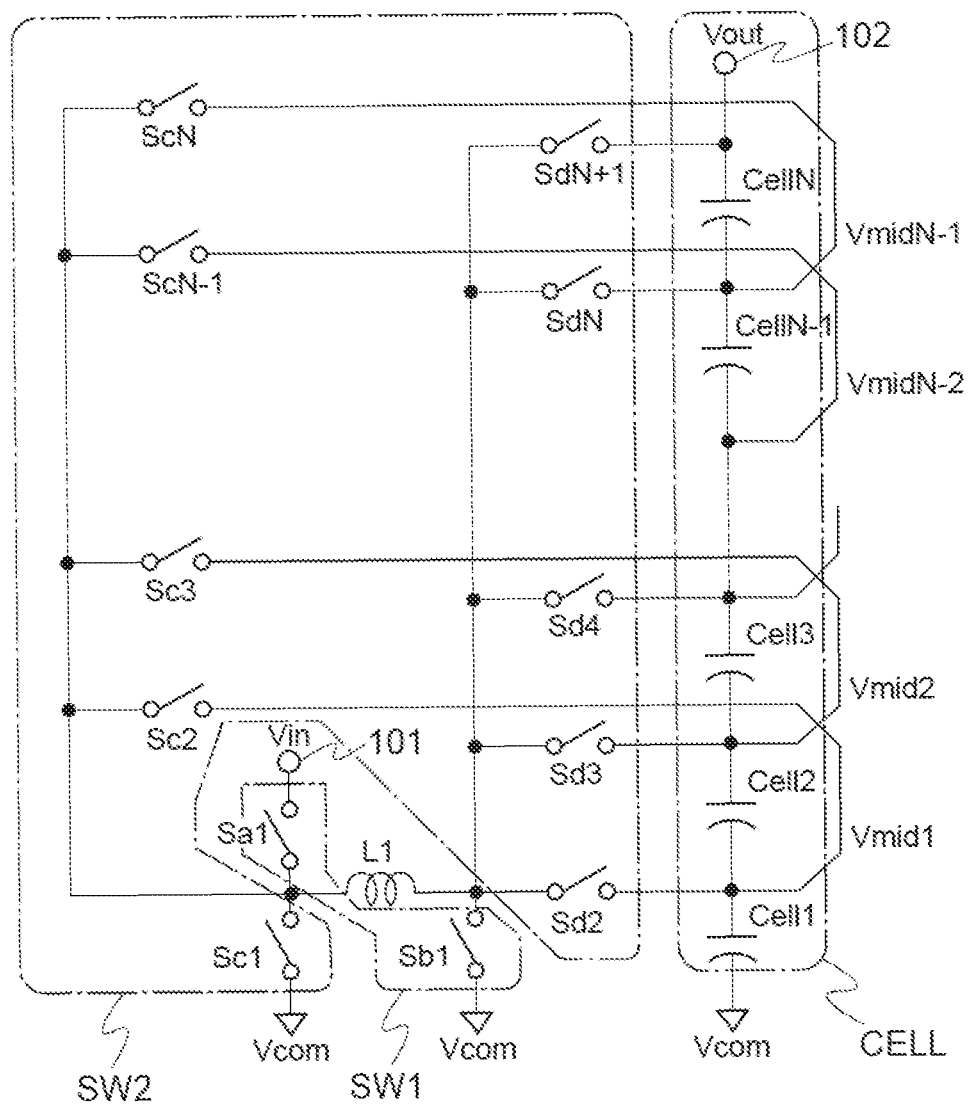
FIG. 46 is a circuit diagram illustrating an eighth embodiment of the present invention.
Figure 47:
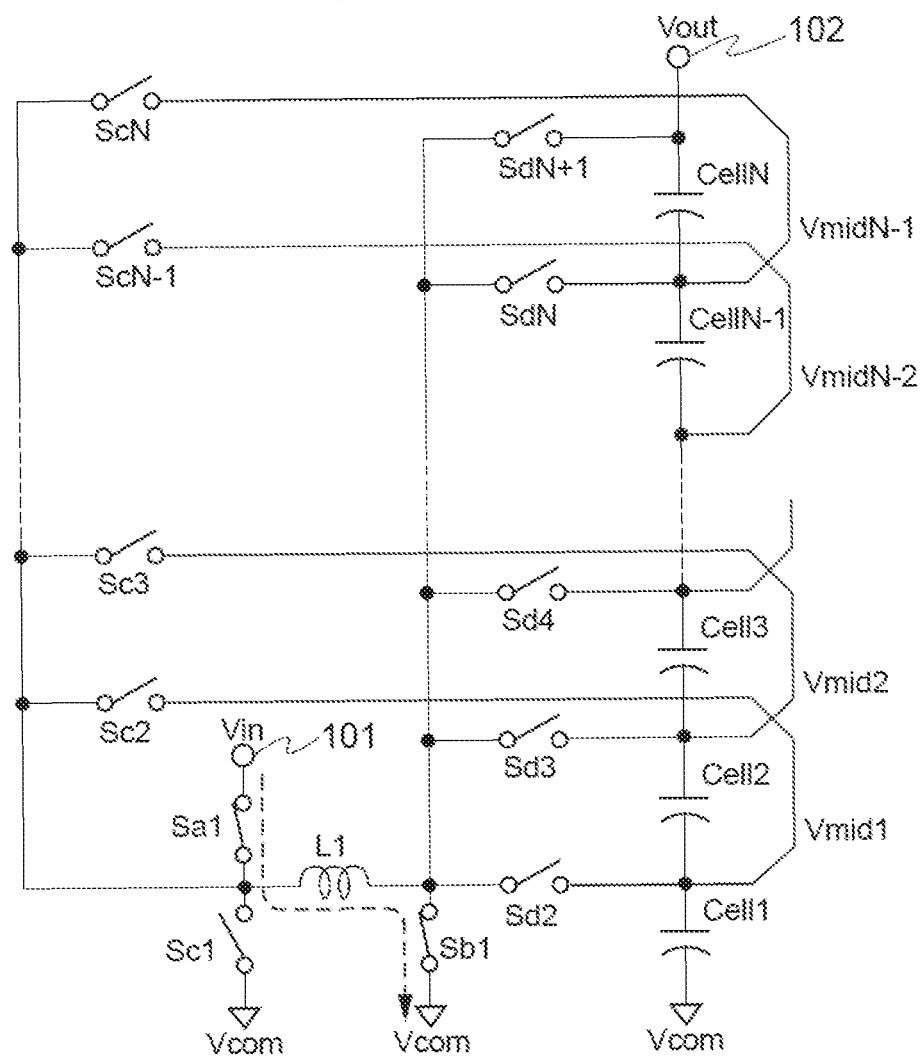
FIG. 47 is a view to explain an operation of the eighth embodiment of the present invention.
Figure 48:
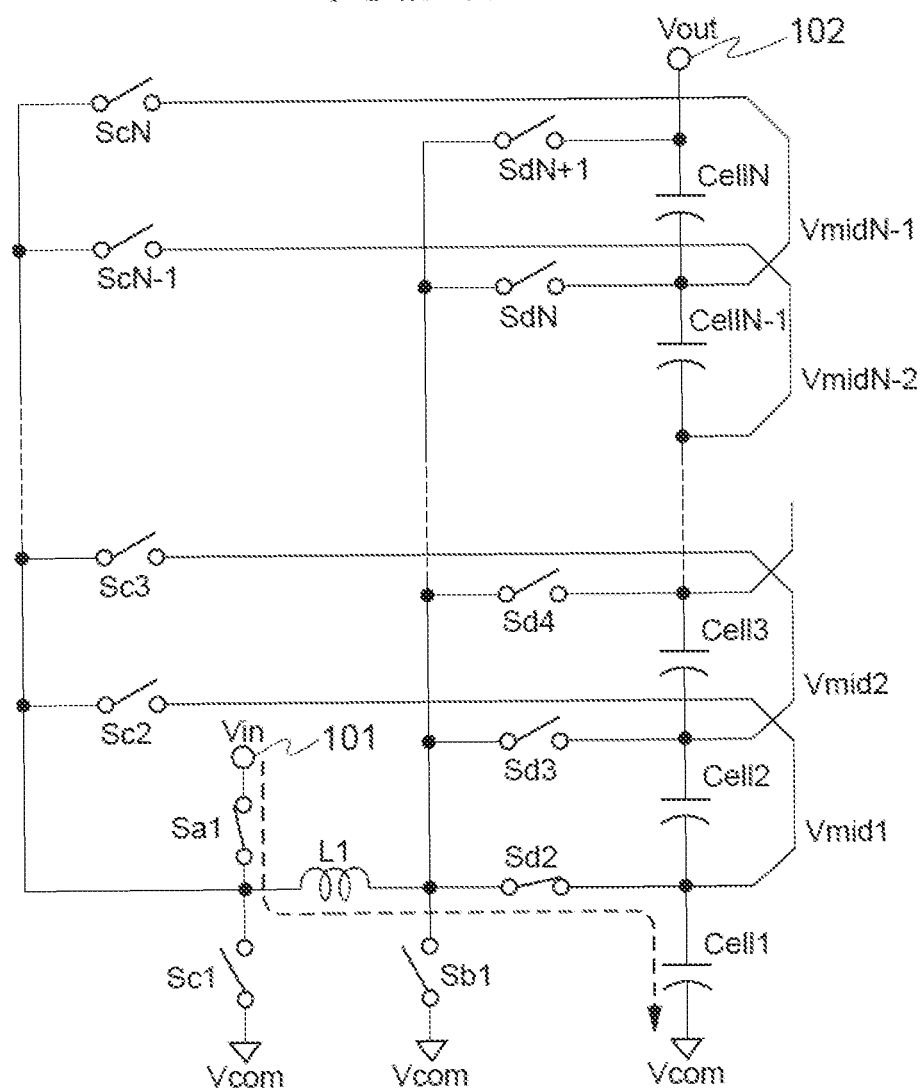
FIG. 48 is a view to explain an operation of the eighth embodiment of the present invention.
Figure 49:
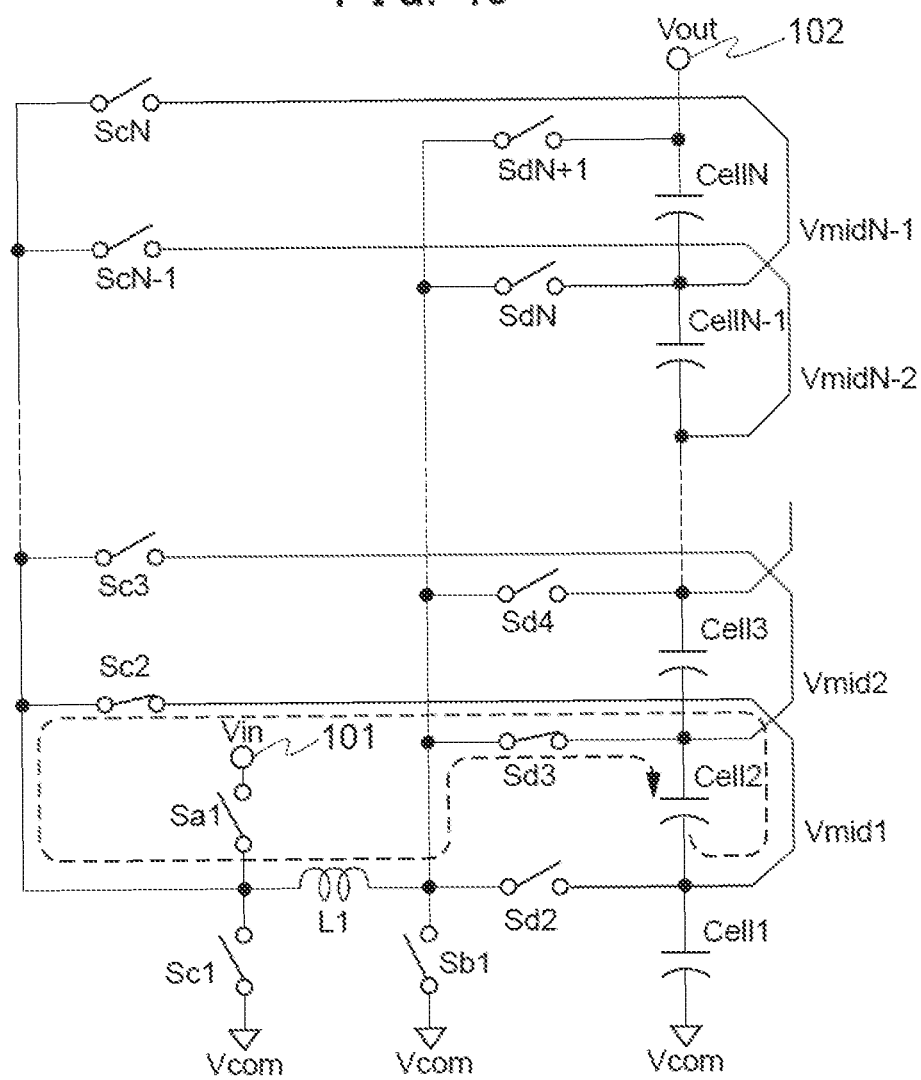
FIG. 49 is a view to explain an operation of the eighth embodiment of the present invention.
Figure 50:
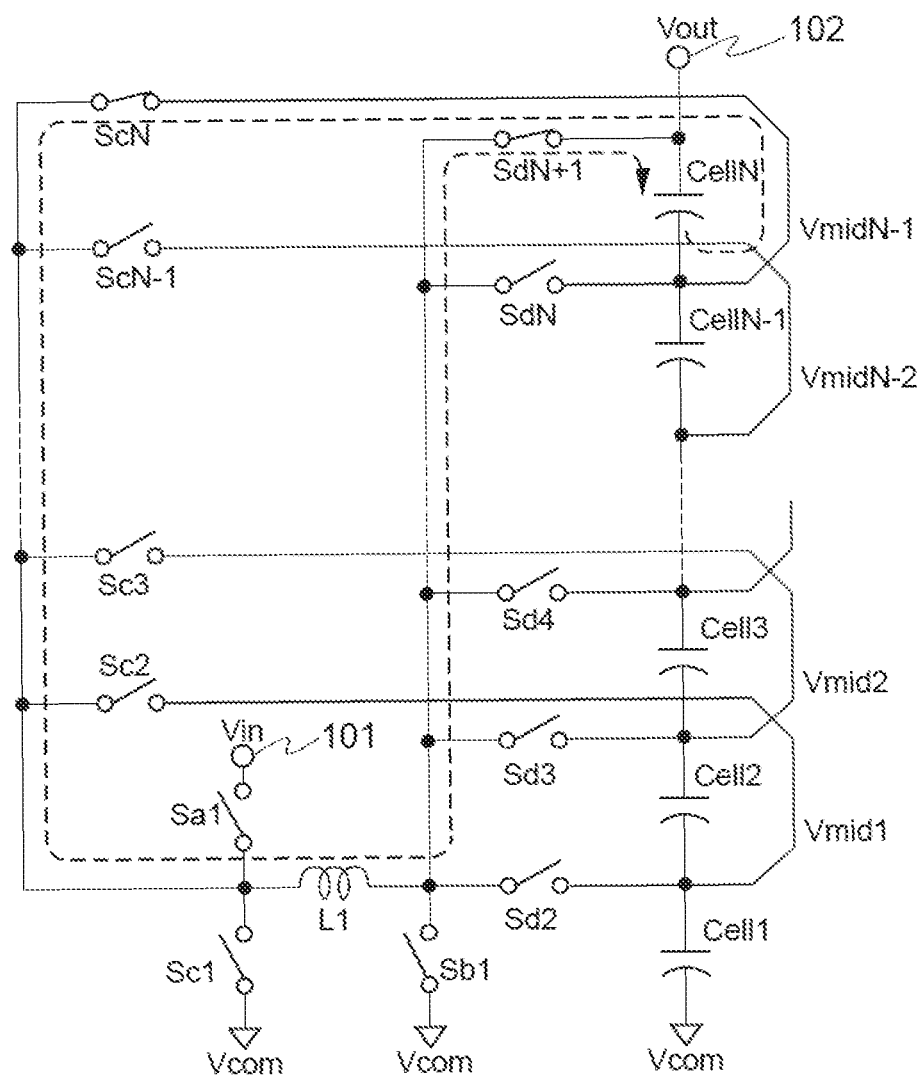
FIG. 50 is a view to explain an operation of the eighth embodiment of the present invention.

FIG. 46 is a circuit diagram illustrating an exemplary configuration of a balance charging circuit for charging, by use of a single coil L1, N pieces of storage cells Cell1 to CellN which are connected in series. In FIG. 46, the balance charging circuit includes a single coil L1, a switch group SW1 for electrically connecting the coil L1 between an input terminal 101 into which a charging voltage is input and a reference voltage terminal, and a switch group SW2 for electrically connecting both ends of each of the storage cells Cell1 to CellN to both ends of the coil L1.

The configuration of the balance charging circuit in FIG. 46 itself is similar to the configuration of the balance charging circuit explained with reference to FIG. 33, but some controlled contents of switches controlled by a control circuit, not illustrated, are different, and a voltage boost operation is implemented.

(Operation of Balance Charging Circuit According to Eighth Embodiment)

Next, an operation of the balance charging circuit for series-connected cells according to the eighth embodiment of the present invention will be explained. FIGS. 47 to 51 are views to explain operations of the eighth embodiment of the present invention.

In the balance charging circuit for series-connected cells according to the eighth embodiment of the present invention, in order to charge series-connected storage cells and maintain voltage balance between the series-connected cells, first to Nth charging periods are set by a control circuit which is not illustrated in the figure. Note that switches to be turned on in the first charging period are different from those in the sixth embodiment.

That is, in a first half of the first charging period, the control circuit, not illustrated, turns on switches the Sa1 and Sb1. Then, an input voltage Vin is input from the input terminal 101, and a charging current to charge the cell Cell1 with electric charge is stored in the coil L1. A path of the charging current is indicated by a dotted arrow in FIG. 47.

Next, in a second half of the first charging period, the control circuit, not illustrated, turns off the switch Sb1 and turns on the switch Sd2 while the switch Sa1 is being turned on. Then, the cell Cell1 is charged with the charging current charged in the coil L1. A path of the charging current is indicated by a dotted arrow in FIG. 48.

After that, in a first half of the second charging period, the control circuit, not illustrated, turns off the switch Sd2, and turns on the switch Sb1 while the switch Sa1 is being turned on. Then, an input voltage Vin is input from the input terminal 101, and a charging current to charge the cell Cell2 with electric charge is stored in the coil L1. This state is the same as the state in FIG. 47, and a path of the charging current is indicated by the dotted arrow of FIG. 47.

Next, in a second half of the second charging period, the switches Sa1 and Sb1 are turned off and the switches Sc2 and Sd3 are turned on. Then, the cell Cell2 is charged with the charging current charged in the coil L1. A path of the charging current is indicated by a dotted arrow in FIG. 49.

Thereafter, a similar operation is repeated to turn on the switches Sa1 and Sb1 in a first half of each charging period, so as to store, in the coil L1, a charging current to charge a storage cell with electric charge. Then, corresponding switches for both ends of each cell are turned on in a second half of the each charging period, so as to charge the cell with the charging current charged in the coil L1. Accordingly, in a case where the cell CellN is charged, the switches ScN and SdN+1 are turned on. A path of the charging current in this state is indicated by a dotted arrow in FIG. 50.

Here, controlled contents by the control circuit, not illustrated, are explained with reference to FIG. 51. FIG. 51 illustrates which switch, among the switches in FIG. 46, the control circuit, not illustrated, turns on in each of the first to Nth charging periods T1 to TN. That is, among the switches, a switch corresponding to a column indicative of "ON" in the figure is turned into an ON state by the control circuit, not illustrated, and the other switches are turned into an off state.

As illustrated in FIG. 51, the switches Sa1 and Sb1 are turned on in a first half of each of the charging periods T1 to TN, as described above. Then, in each of the charging periods T1 to TN, the switches Sa1 and Sd2 are turned on in a second half of the first charging period, and corresponding switches for both end of each cell are turned on in a second half of each of the second charging period and its subsequent charging periods. As described, the control circuit, not illustrated, repeatedly controls each of the switches to turn on as shown in the first to Nth charging periods T1 to TN described above. Accordingly, it is possible to realize a balance charging circuit using a single coil L1.

Further, each cell in the series-connected cells is not discharged in any of the charging periods T1 to TN, thereby also yielding an effect that the series-connected cells which have a limitation in terms of the number of charging times can be charged with electric charge and voltage balance between the series-connected cells can be maintained.

(Configuration of Balance Charging Circuit According to Ninth Embodiment)

Figure 52:
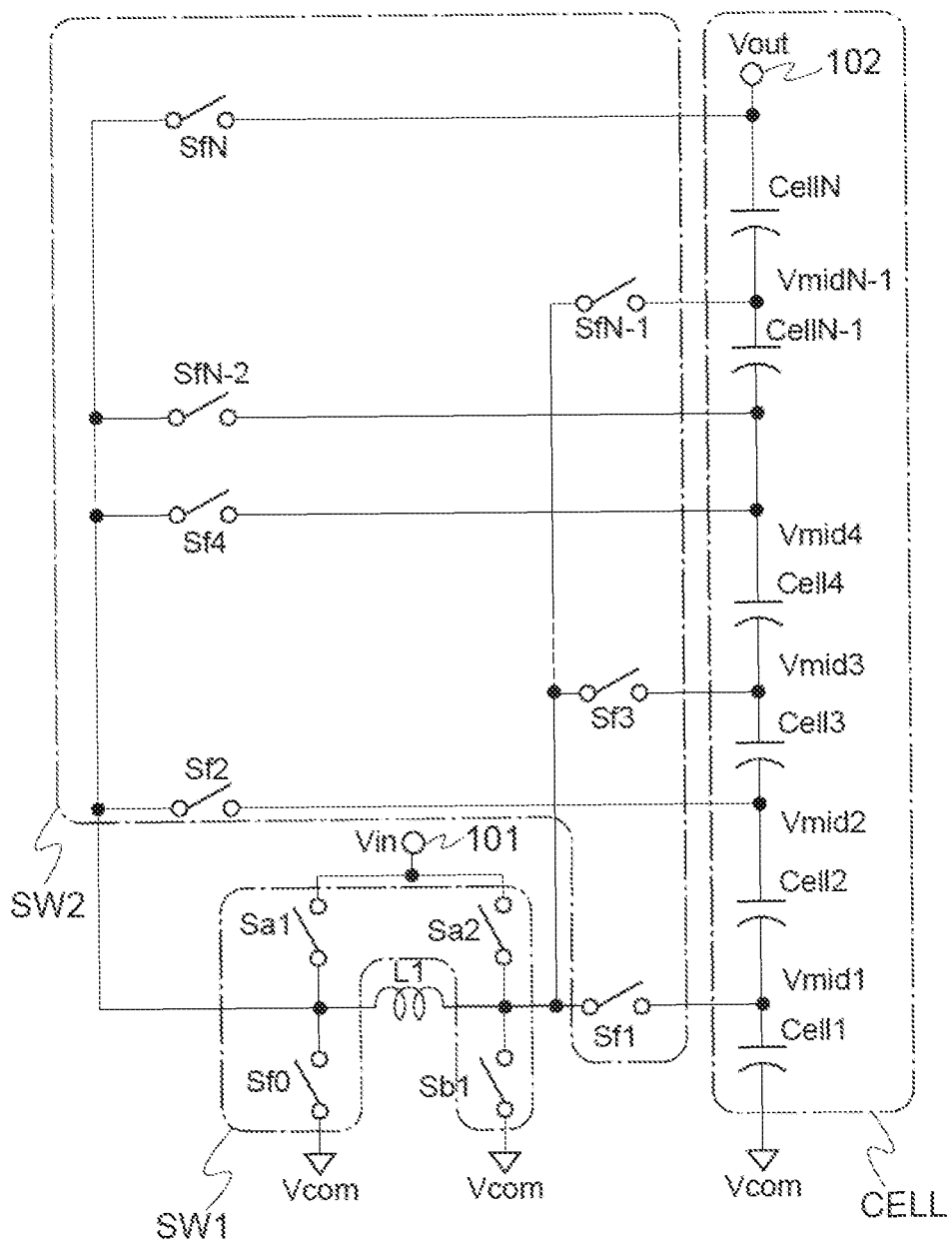
FIG. 52 is a circuit diagram illustrating a ninth embodiment of the present invention.
Figure 53:
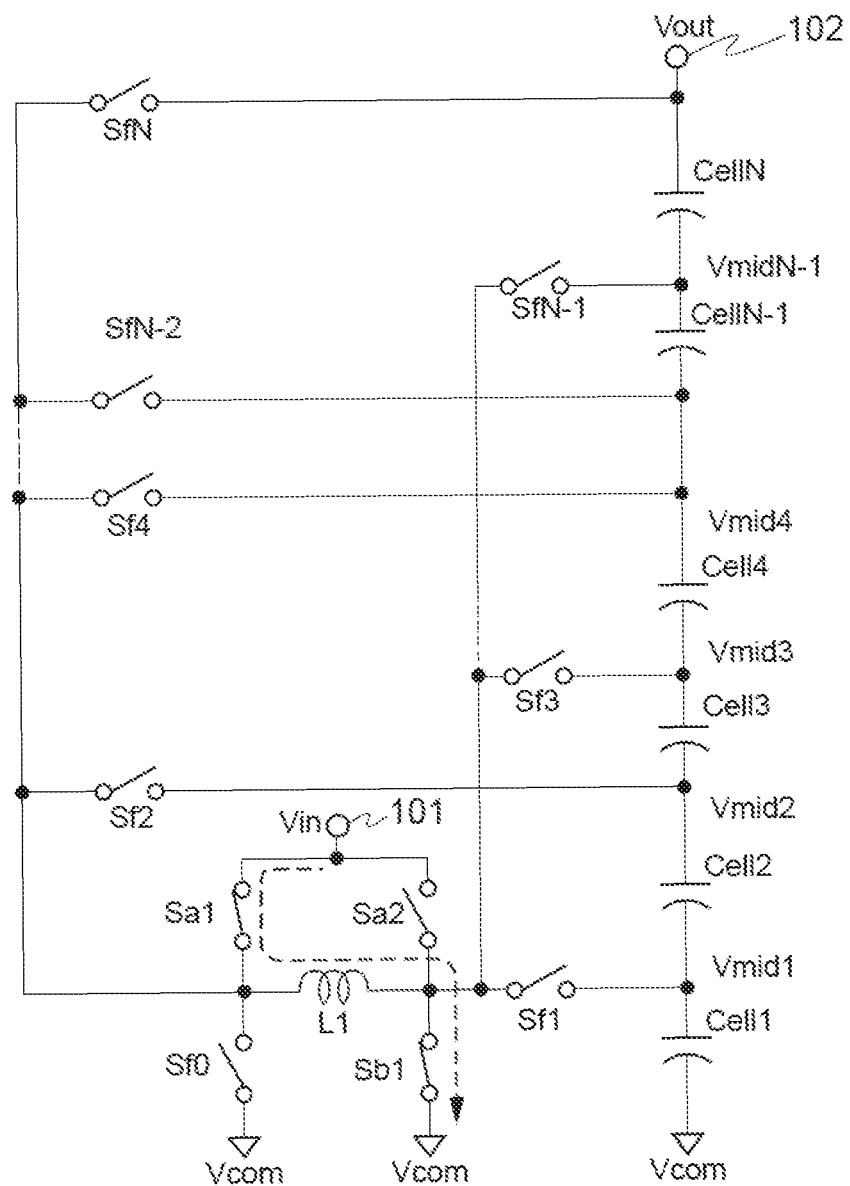
FIG. 53 is a view to explain an operation of the ninth embodiment of the present invention.
Figure 54:
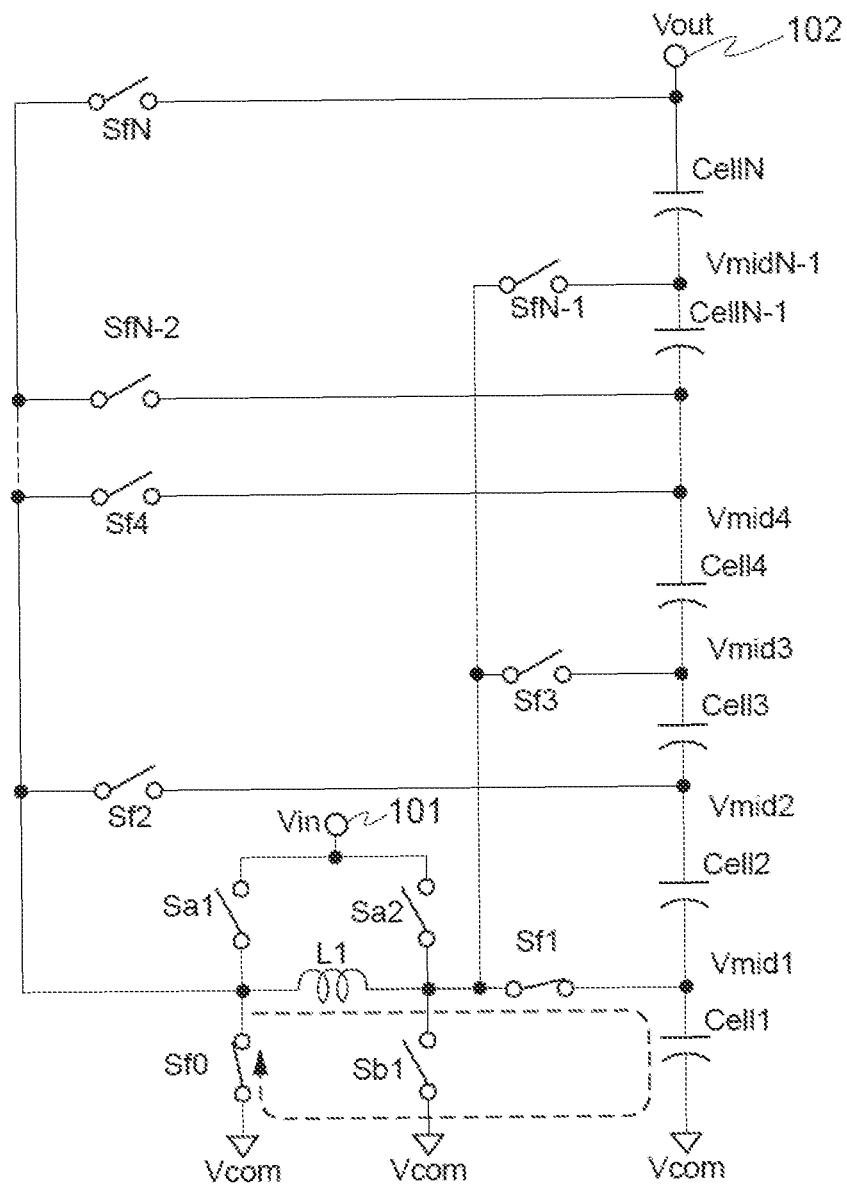
FIG. 54 is a view to explain an operation of the ninth embodiment of the present invention.

FIG. 52 is a circuit diagram illustrating an exemplary configuration of a balance charging circuit for charging, by use of a single coil L1, N pieces of storage cells Cell1 to CellN which are connected in series. In FIG. 52, the balance charging circuit includes a single coil L1, a switch group SW1 for electrically connecting the coil L1 between an input terminal 101 into which a charging voltage is input and a reference voltage terminal, and a switch group SW2 for electrically connecting both ends of each of the storage cells Cell1 to CellN to both ends of the coil L1.

The switch group SW1 includes a switch Sa1 and a switch Sa2, and a switch Sf0 and a switch Sb1. One ends of the switch Sa1 and the switch Sa2 are connected to the input terminal 101, and another ends thereof are respectively connected to one end and another end of the coil L1. One ends of the switch Sf0 and the switch Sb1 are connected to the reference voltage terminal, and another ends thereof are respectively connected to the one end and the other end of the coil L1.

The switch group SW2 includes switches Sf1 to SfN. One ends of odd-numbered switches Sf1, Sf3, . . . , SfN−1 among the switches Sf1 to SfN are connected to contact points of N pieces of the storage cells Cell1 to CellN, and another ends thereof are connected to the another end of the coil L1. One ends of even-numbered switches Sf2, Sf4, . . . , SfN among the switches Sf1 to SfN are connected to the contact points of N pieces of the storage cells Cell1 to CellN and the output terminal 102, and another ends thereof are connected to the one end of the coil L1.

As described, the balance charging circuit according to the present embodiment includes switches as many as the number equal to the number of storage cells plus "4." That is, the switches as many as the number equal to the number of storage cells plus "4" include: the switch group SW2 including N pieces of switches for connecting both ends of each storage cell to the coil L1; and the switch group SW1 including four switches for connecting the input terminal 101 and the coil L1. The switch group SW2 includes switches Sf2 to SfM (switches Sf2, Sf4, . . . , SfM (M is the largest even number which is not more than N) connected to even-numbered storage cells) for connecting even-numbered high-voltage terminals counted from a first storage cell to the one end of the coil, and switches Sf1 to Sf1 (switches Sf1, Sf3, . . . , Sf1 (L is the largest odd number which is not more than N) connected to odd-numbered storage cells) for connecting odd-numbered high-voltage terminals counted from the first storage cell to the another end of the coil.

(Operation of Balance Charging Circuit According to Ninth Embodiment)

Next, an operation of the balance charging circuit for series-connected cells according to the ninth embodiment of the present invention will be explained. FIGS. 53 to 58 are views to explain operations of the ninth embodiment of the present invention.

In the balance charging circuit for series-connected cells according to the ninth embodiment of the present invention, in order to storage charge cells connected in series and maintain voltage balance between the series-connected cells, first to Nth charging periods are set by a control circuit which is not illustrated in the figure.

Firstly, in a first half of the first charging period, the control circuit, not illustrated, turns on the switches Sa1 and Sb1. Then, an input voltage Vin is input from the input terminal 101, and a charging current to charge the cell Cell1 with electric charge is stored in the coil L1. A path of the charging current is indicated by a dotted arrow of FIG. 53.

Next, in a second half of the first charging period, the control circuit, not illustrated, turns off the switches Sa1 and Sb1 and turns on the switches Sf0 and Sf1. Then, the cell Cell1 is charged with the charging current charged in the coil L1. A path of the charging current is indicated by a dotted arrow of FIG. 54.

Figure 55:
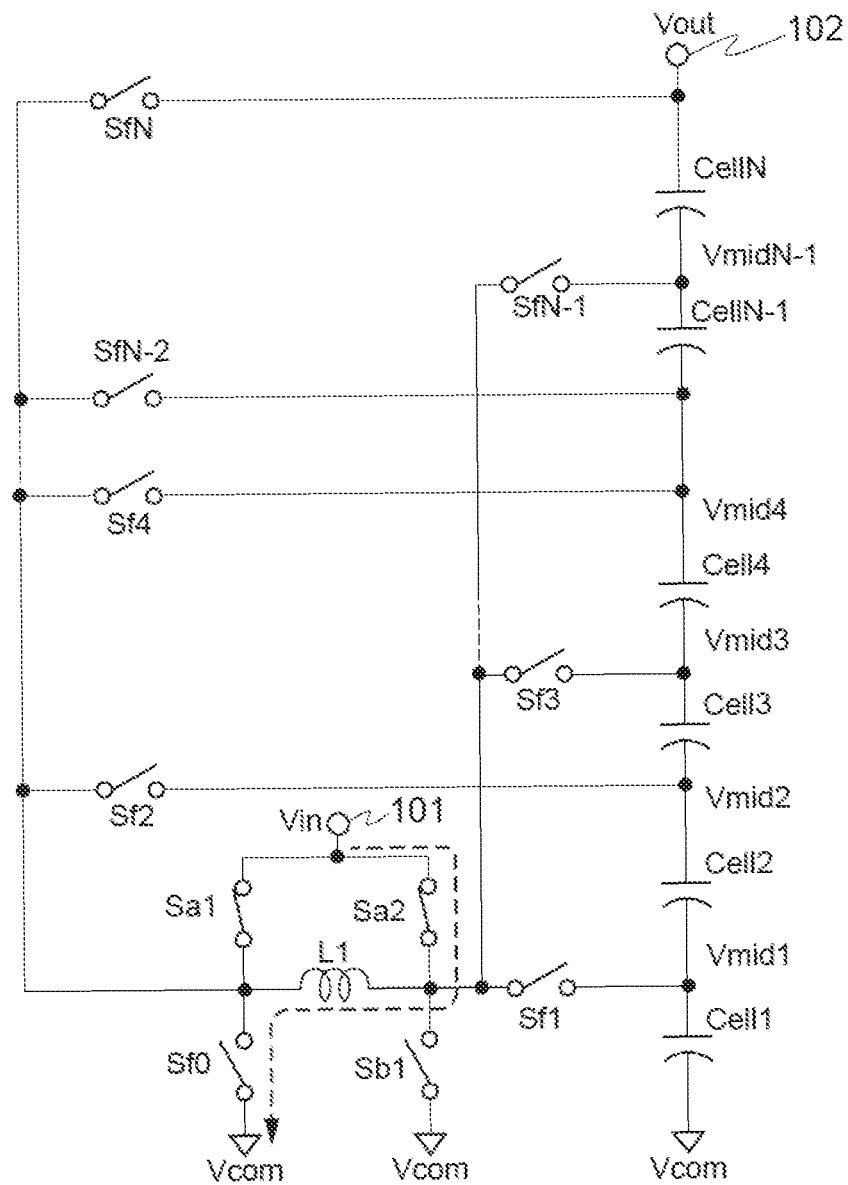
FIG. 55 is a view to explain an operation of the ninth embodiment of the present invention.
Figure 56:
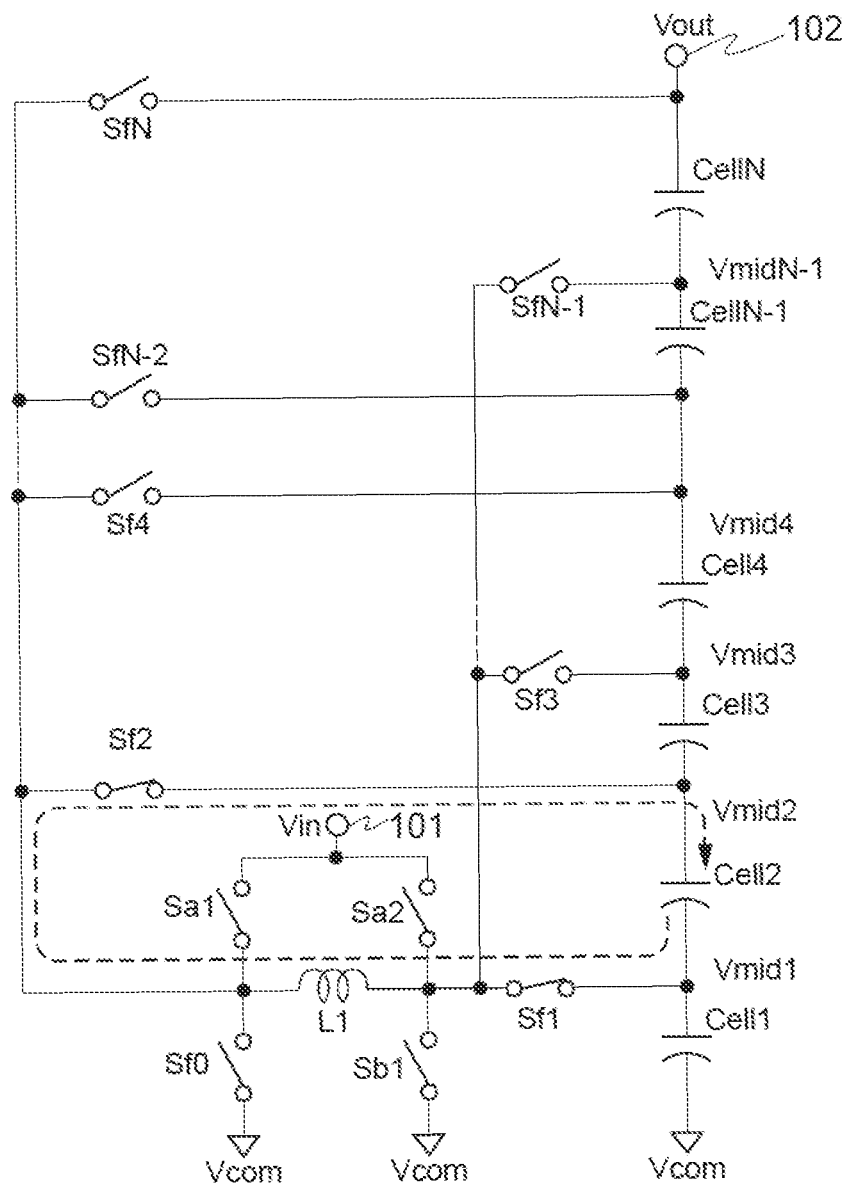
FIG. 56 is a view to explain an operation of the ninth embodiment of the present invention.
Figure 57:
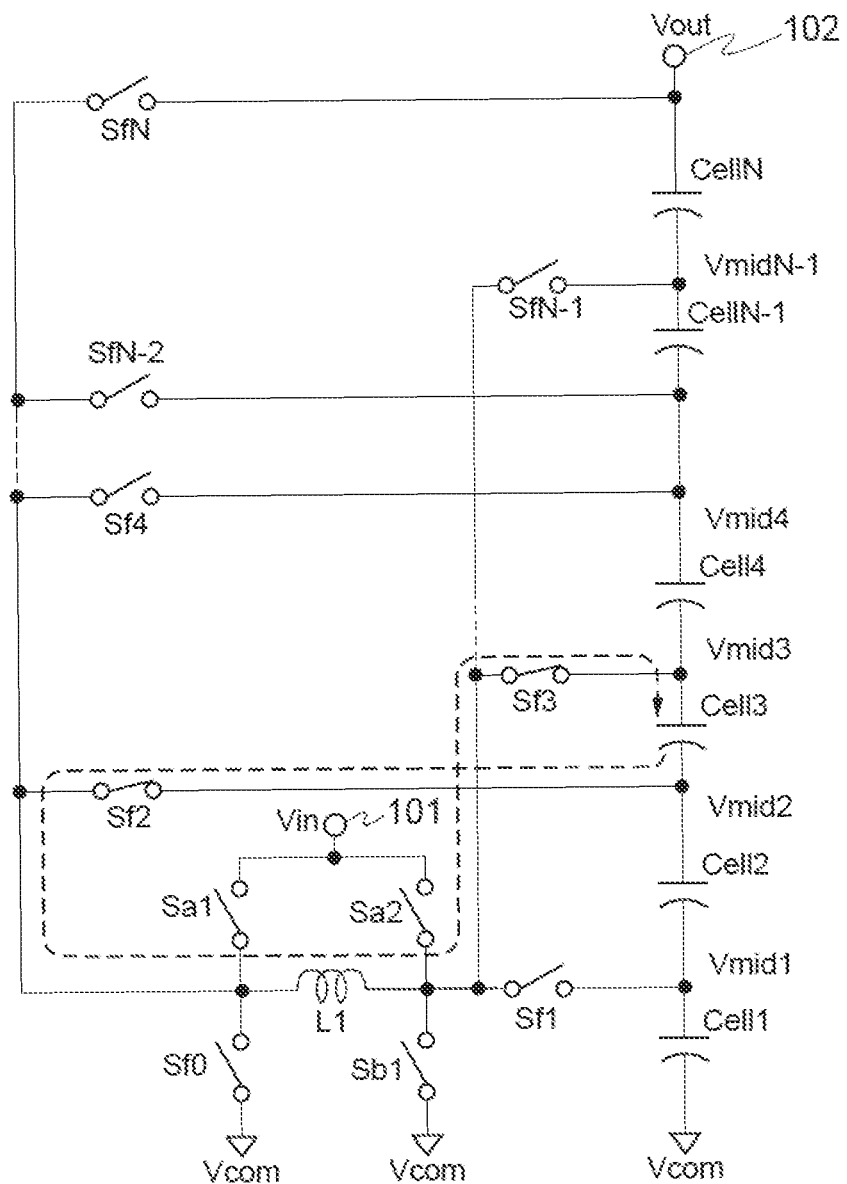
FIG. 57 is a view to explain an operation of the ninth embodiment of the present invention.
Figure 58:
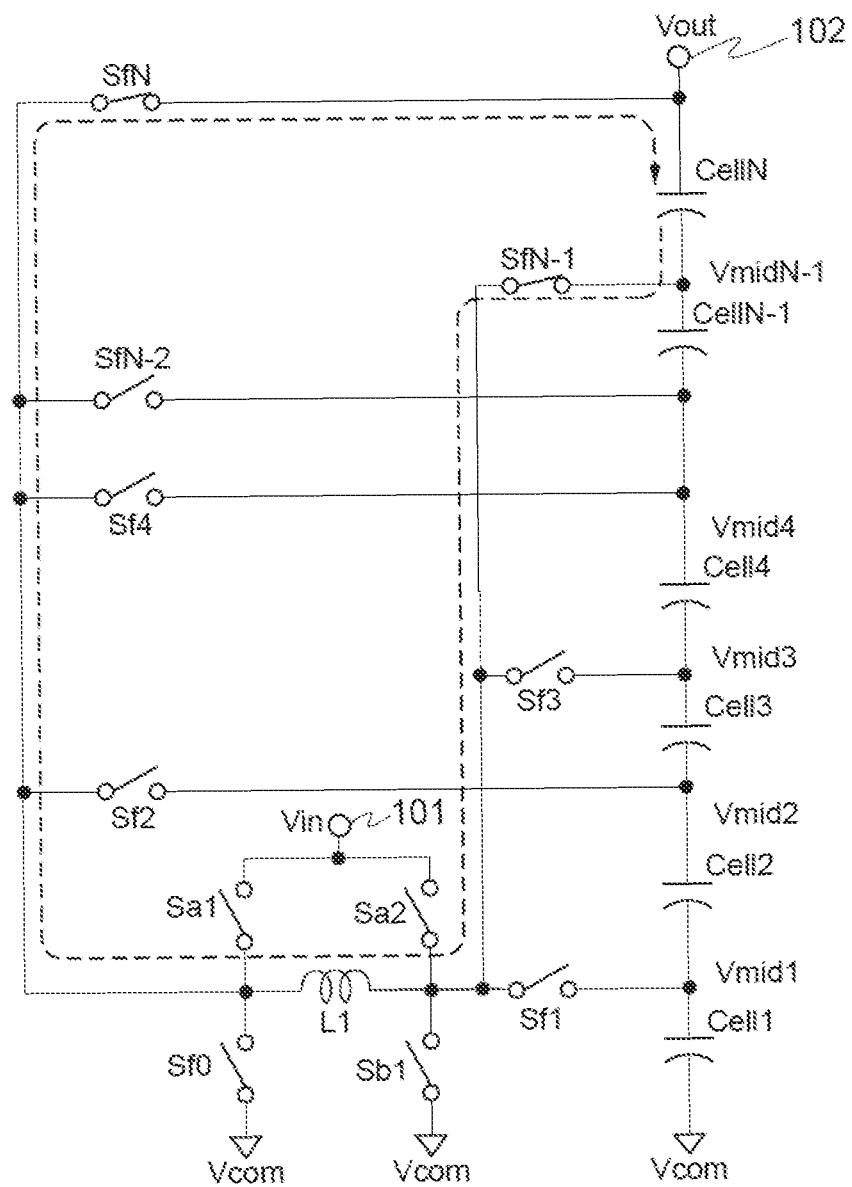
FIG. 58 is a view to explain an operation of the ninth embodiment of the present invention.

Next, in a first half of the second charging period, the control circuit, not illustrated, turns off the switches Sf0 and Sf1 and turns on the switches Sa2 and Sf0. Then, an input voltage Vin is input from the input terminal 101, and a charging current to charge the cell Cell2 with electric charge is stored in the coil L1. A path of the charging current is indicated by a dotted arrow of FIG. 55. The path of the charging current in FIG. 55 is in an opposite direction to the path of the charging current in FIG. 53.

Next, in a second half of the second charging period, the switches Sa2 and Sf0 are turned off and the switches Sf1 and Sf2 are turned on. Then, the cell Cell2 is charged with the charging current charged in the coil L1. A path of the charging current is indicated by a dotted arrow of FIG. 56.

After that, in a first half of the third charging period, the control circuit, not illustrated, turns off the switches Sf1 and Sf2 and turns on the switches Sf0 and Sf1. Then, an input voltage Vin is input from the input terminal 101, and a charging current to charge the cell Cell3 with electric charge is stored in the coil L1. This state is the same as the state in FIG. 53, and a path of the charging current is indicated by the dotted arrow of FIG. 53.

Next, in a second half of the third charging period, the switches Sa1 and Sb1 are turned off and the switches Sf2 and Sf3 are turned on. Then, the cell Cell3 is charged with the charging current stored in the coil L1. A path of the charging current is indicated by a dotted arrow of FIG. 57.

Thereafter, a similar operation is repeated so as to alternately change a flowing direction of the charging current to be stored in the coil L1 in a first half of each charging period, between an odd-numbered charging period and an even-numbered charging period. Then, corresponding switches for both ends of each cell are turned on in a second half of the each charging period, so as to charge the cell with the charging current charged in the coil L1. Accordingly, in an even-numbered charging period in which the cell CellN is charged, the switches SfN−1 and SfN are turned on. A path of the charging current in this state is indicated by a dotted arrow in FIG. 58.

Here, controlled contents by the control circuit, not illustrated, are explained with reference to FIG. 59. FIG. 59 illustrates which switch, among the switches in FIG. 52, the control circuit, not illustrated, turns on in each of the first to Nth charging periods T1 to TN. That is, among the switches, a switch corresponding to a column indicative of "ON" in the figure is turned into an ON state by the control circuit, not illustrated, and the other switches are turned into an off state.

As illustrated in FIG. 59, the switches Sa1 and Sb1 are turned on in a first half of an odd-numbered charging period, and the switches S21 and Sf0 are turned on in a first half of an even-numbered charging period, so that the flowing direction of the charging current to be stored in the coil L1 is changed alternately. Then, corresponding switches for both ends of each cell are turned on in a second half of each of the charging periods T1 to TN, as described above.

That is, a charging period of the control circuit, not illustrated, include: a charging period T1 including a period T1a in which only the switches Sa1 and Sb1 are turned on to charge the coil L1 with a charging current, and a period T1b in which only the switches Sf0 and Sf1 are turned on to charge a first storage cell with the current of the coil thus charged; a charging period T2 similarly including a period T2a in which only the switches Sa2 and Sf0 are turned on to charge the coil L1 with a charging current, and a period T2b in which only the switches Sf1 and Sf2 are turned on to charge a second storage cell with the current of the coil L1 thus charged; and charging periods T3 to TN in which the switches Sa1, Sb1, Sa2, Sf0 and Sf2 to SfN are turned on and off to charge third to Nth storage cells with the current of the coil L1, similarly to the charging periods T1 and T2. Voltages of the respective storage cells are monitored so as to control lengths of the periods T1a to TNa and lengths of the periods T1b to TNb so that the voltages of the respective storage cells are equal to each other.

Further, a discharge period of the control circuit, not illustrated, includes a period Tx having: a period Txa in which the voltages of the respective storage cells are monitored, a high-voltage storage cell of a number P which is counted from a first storage cell and a low-voltage storage cell of a number Q which is counted from the first storage cell are selected independently so that a sum of P and Q becomes an odd number, a switch SfP for connecting a high-voltage terminal of the high-voltage Pth storage cell to another end of the coil L and a switch Sf(P−1) for connecting a low-voltage terminal of the high-voltage Pth storage cell to one end of the coil L are turned on so as to charge the coil L1 with a current; and a period Txb in which a switch SfQ for connecting a high-voltage terminal of the low-voltage Qth storage cell to the another end of the coil L and a switch Sf(Q−1) for connecting a low-voltage terminal of the low-voltage Qth storage cell to the one end of the coil are turned on so as to charge the low-voltage storage cell with the current of the coil. When driving a connected load to the output terminal 102, the control circuit, not illustrated, controls lengths of the above periods repeatedly so that the voltages of the respective storage cells are equal to each other.

As described, the control circuit, not illustrated, repeatedly controls each of the switches to turn on as shown in the first to Nth charging periods T1 to TN described above. Accordingly, it is possible to realize a balance charging circuit for performing voltage boost and drop operations by use of a single coil L1.

Further, each cell in the series-connected cells is not discharged in any of the charging periods T1 to TN, thereby also yielding an effect that the series-connected cells which have a limitation in terms of the number of charging times can be charged with electric charge and voltage balance between the series-connected cells can be maintained.

Moreover, the number of switches is equal to the number N of storage cells plus "4", and therefore, it is possible to realize a balance charging circuit for series-connected storage cells with an extremely few elements.

(Modification to Ninth Embodiment)

In the ninth embodiment, the control circuit, not illustrated, may be modified to control the switches in the charging period T1 as follows. That is, FIGS. 60 to 62 are views illustrating on and off control states of the switches Sa1, Sa2, Sb1, Sf0, Sf1, and Sf2 by the control circuit which is not illustrated in the ninth embodiment.

With reference to FIG. 60, the switches Sa1 and Sb1 are turned on in a first half of the charging period T1 so as to store a current in the coil L1. Then, in a second half of the charging period T1, the cell Cell1 is charged with the current stored in the coil L1 by turning on the switches Sf0 and Sf1.

Next, the switches Sa2 and Sf0 are turned on in a first half of the charging period T2 so as to store a current in the coil L1. Then, in a second half of the charging period T2, the cell Cell2 is charged with the current stored in the coil L1 by turning on the switches Sf1 and Sf2.

By turning on and off the switches as such, voltage boost and drop operations of the balance charging circuit can be realized.

Further, with reference to FIG. 61, the switches Sa1 and Sf1 are turned on in the first half of the charging period T1 so as to store a current in the coil L1. Then, in the second half of the charging period T1, the cell Cell1 is charged with the current stored in the coil L1 by turning on the switches Sf0 and Sf1.

Next, the switches Sa2 and Sf0 are turned on in the first half of the charging period T2 so as to store a current in the coil L1. Then, in the second half of the charging period T2, the cell Cell2 is charged with the current stored in the coil L1 by turning on the switches Sf1 and Sf2.

By turning on and off the switches as such, a voltage drop operation of the balance charging circuit can be realized.

Furthermore, with reference to FIG. 62, the switches Sa1 and Sb1 are turned on in the first half of the charging period T1 so as to store a current in the coil L1. Then, in the second half of the charging period T1, the cell Cell1 is charged with the current stored in the coil L1 by turning on the switches Sa1 and Sf1.

Next, the switches Sa2 and Sf0 are turned on in the first half of the charging period T2 so as to store a current in the coil L1. Then, in the second half of the charging period T2, the cell Cell2 is charged with the current stored in the coil L1 by turning on the switches Sf1 and Sf2.

By turning on and off the switches as such, a voltage boost operation of the balance charging circuit can be realized.

Note that such a control may be performed that an odd-numbered storage cell and an even-numbered storage cell are taken as a charging target alternately, or such a control may be performed such that either ones of odd-numbered storage cells and even-numbered storage cells are all charged as a charging target completely at first in a random order, i.e., in any given order, and the other ones are then charged completely as a charging target in a random order, i.e., in any given order. In a case where the former control is employed, a flowing direction of the current is changed every time a storage cell to be a charging target is changed, but in a case where the latter control is employed, the flowing direction of the current is changed only once when the charging is changed from the odd-numbered storage cells to the even-numbered storage cells and vice versa. Accordingly, in the case where the latter control is employed, power consumption is more efficient than the case where the former control is employed.

(Configuration of Balance Charging Circuit According to Tenth Embodiment)

Figure 63:
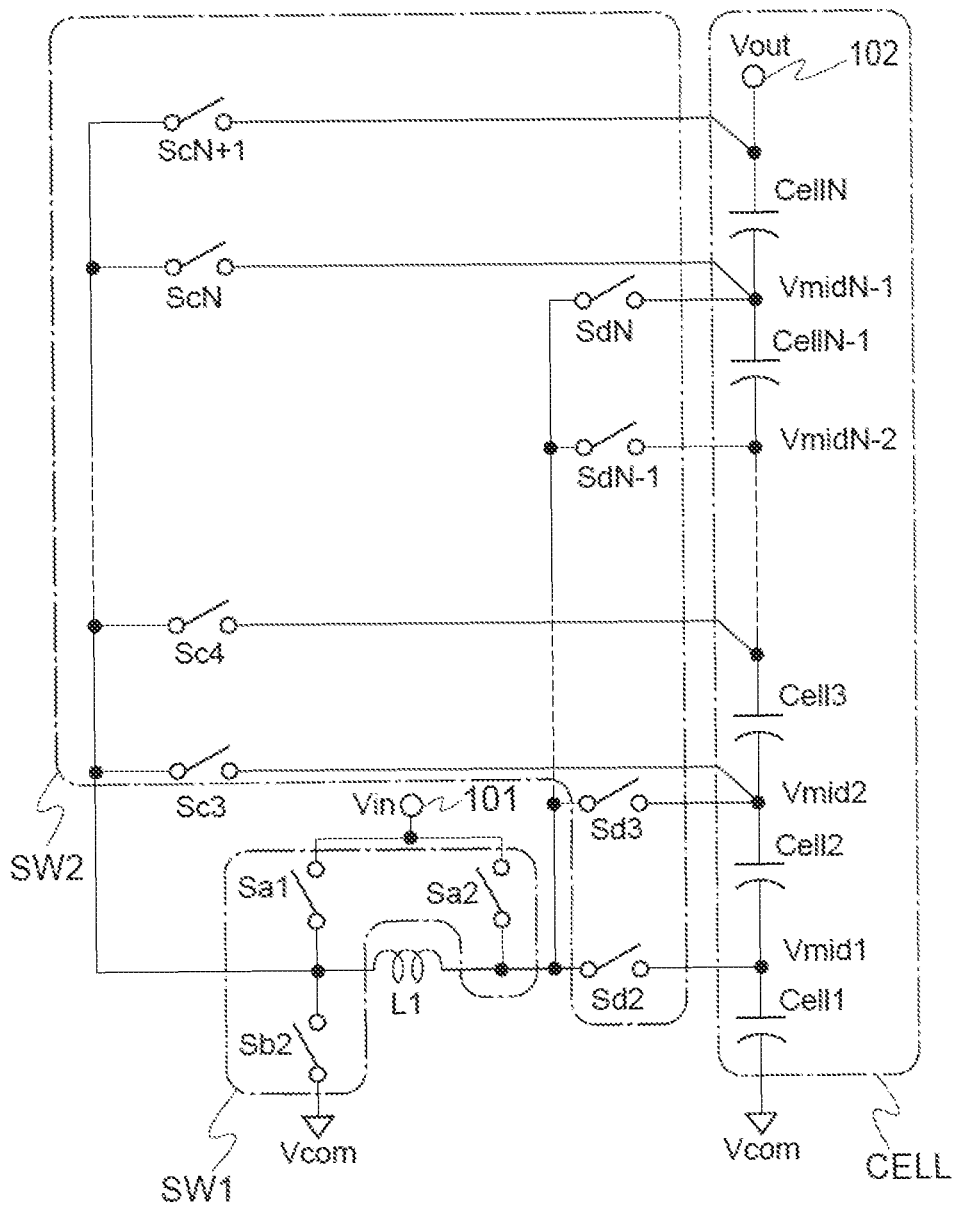
FIG. 63 is a circuit diagram illustrating a tenth embodiment of the present invention.
Figure 64:
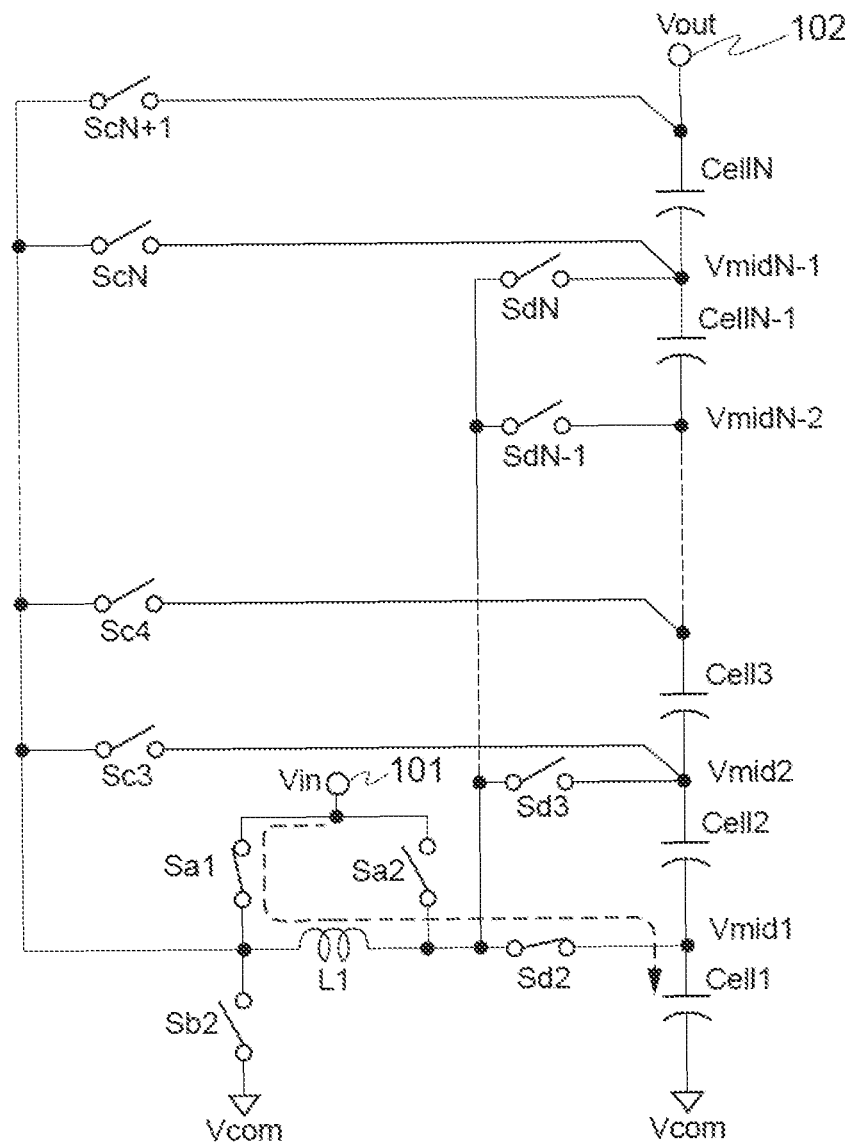
FIG. 64 is a view to explain an operation of the tenth embodiment of the present invention.
Figure 65:
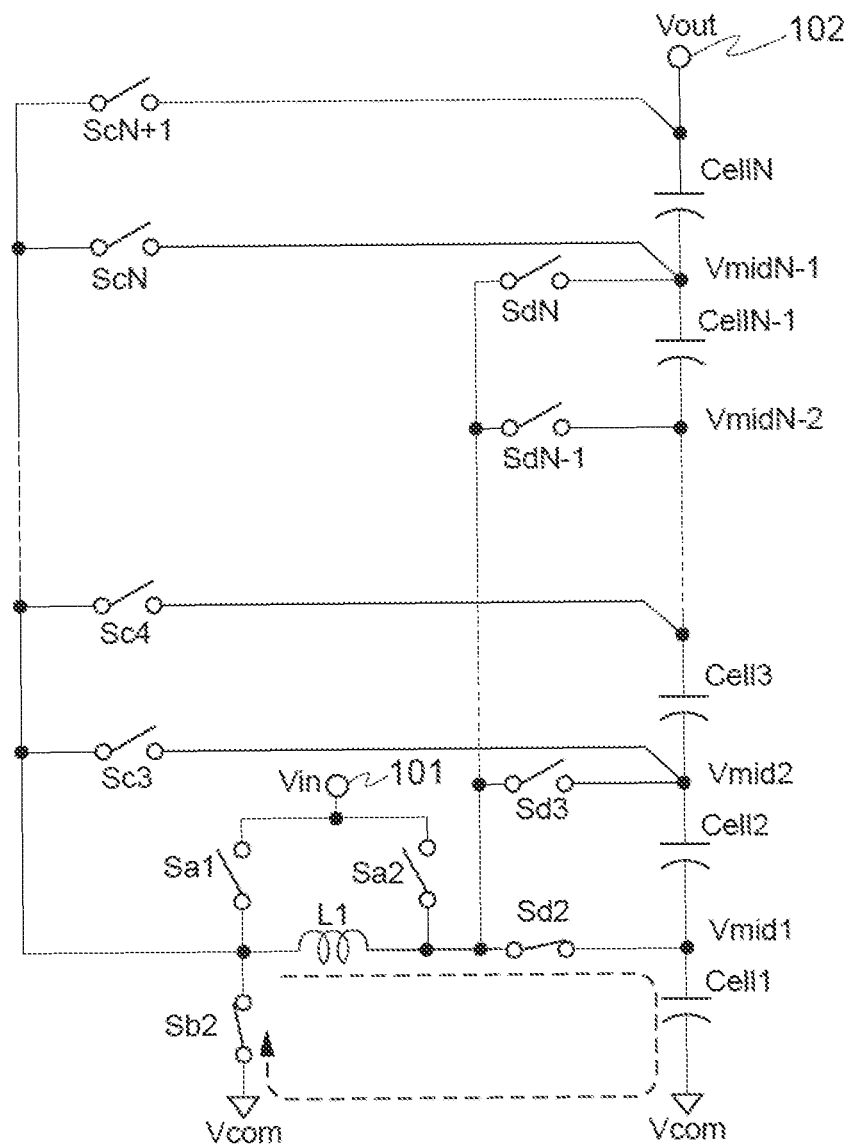
FIG. 65 is a view to explain an operation of the tenth embodiment of the present invention.
Figure 66:
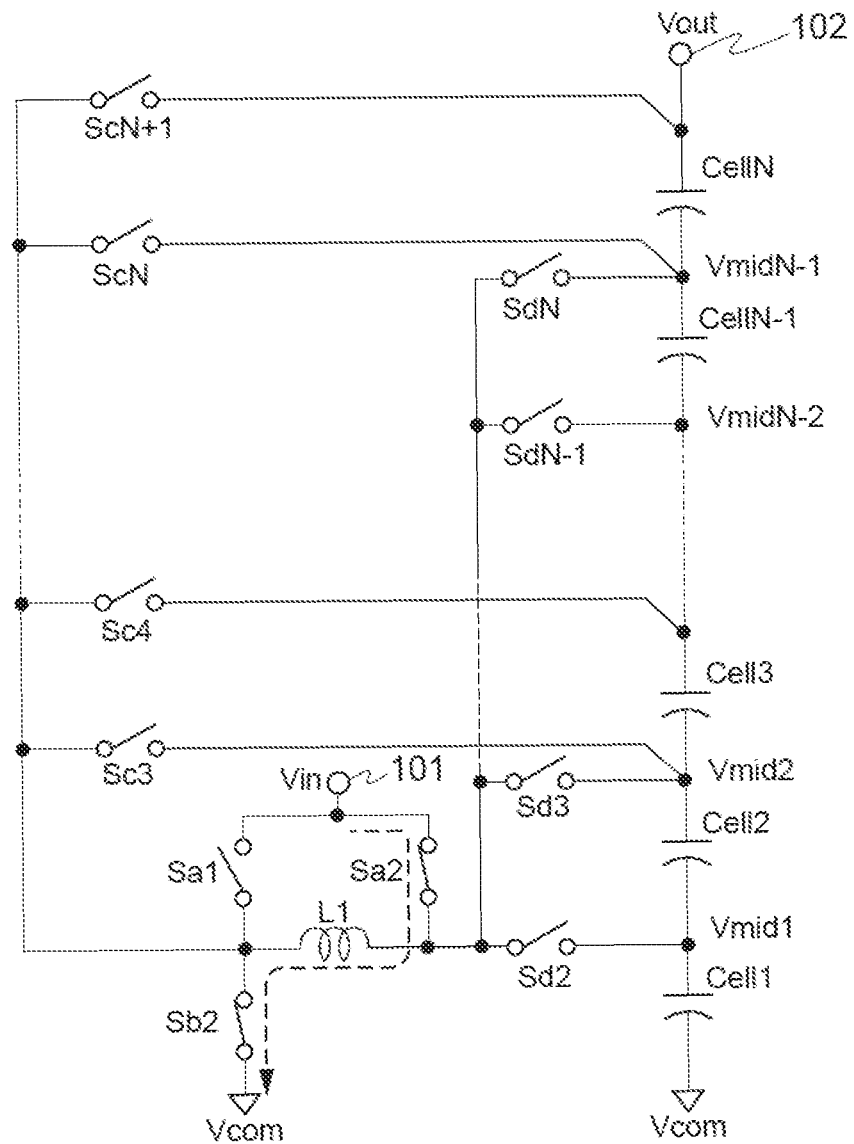
FIG. 66 is a view to explain an operation of the tenth embodiment of the present invention.
Figure 67:
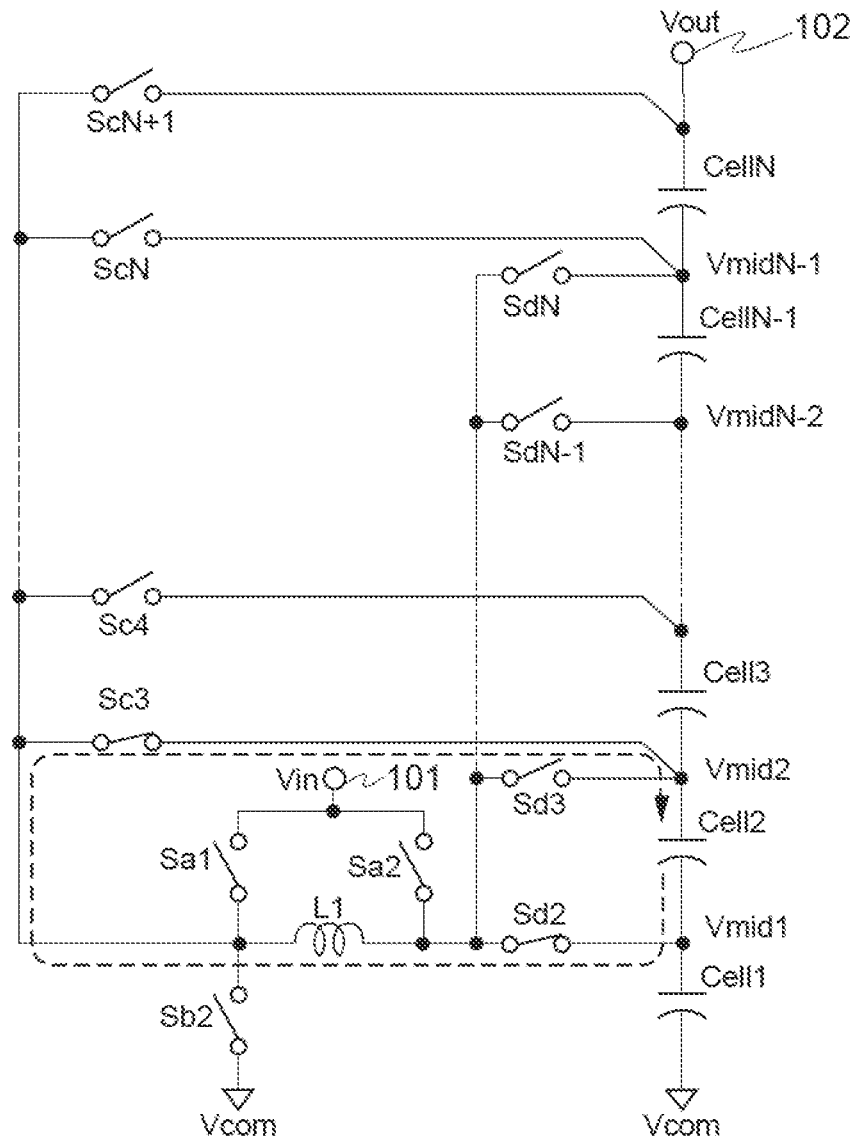
FIG. 67 is a view to explain an operation of the tenth embodiment of the present invention.
Figure 68:
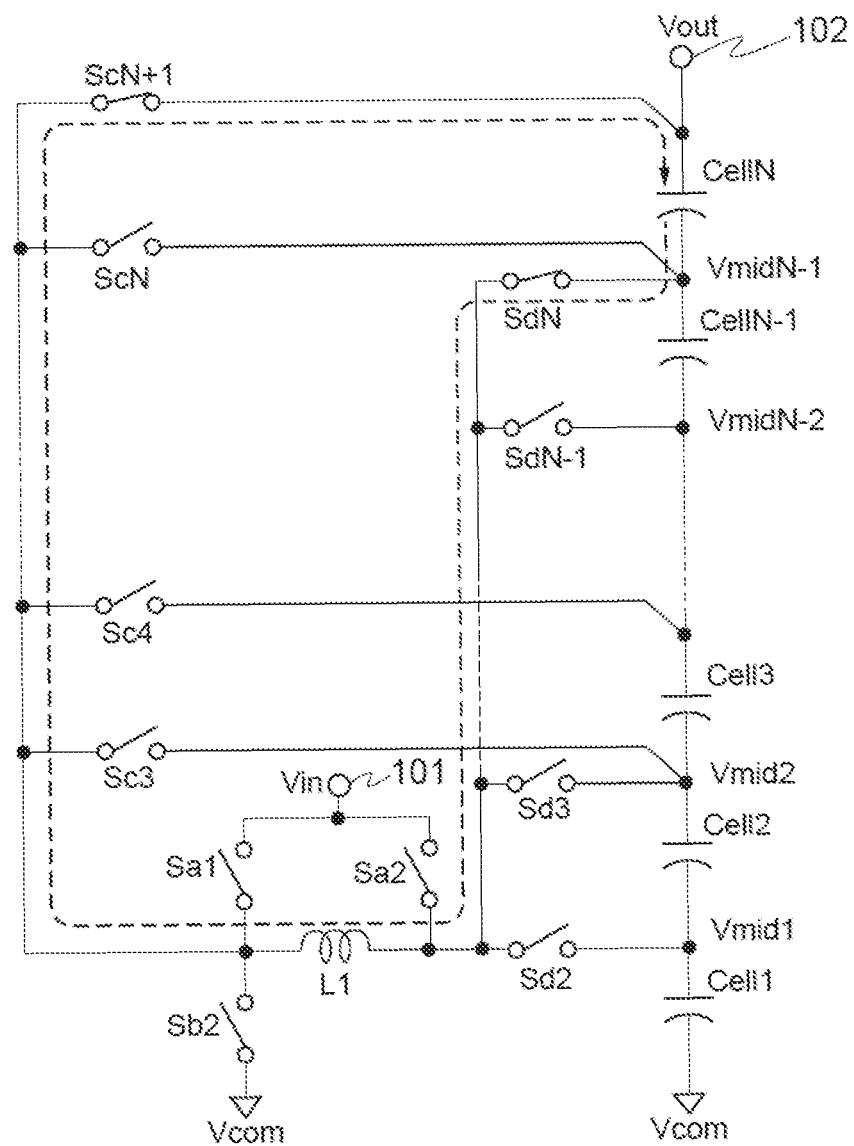
FIG. 68 is a view to explain an operation of the tenth embodiment of the present invention.

FIG. 63 is a circuit diagram illustrating an exemplary configuration of a balance charging circuit for charging, by use of a single coil L1, N pieces of storage cells Cell1 to CellN which are connected in series. In FIG. 63, the balance charging circuit includes a single coil L1, a switch group SW1 for electrically connecting the coil L1 between an input terminal 101 into which a charging voltage is input and a reference voltage terminal, and a switch group SW2 for electrically connecting both ends of each of the storage cells Cell1 to CellN to both ends of the coil L1.

The switch group SW1 includes a switch Sa1, a switch Sa2, and a switch Sb2. One ends of the switch Sa1 and the switch Sa2 are connected to the input terminal 101, and another ends thereof are respectively connected to one end and another end of the coil L1. One end of the switch Sb2 is connected to the reference voltage terminal, and another end thereof is connected to the other end of the coil L1.

The switch group SW2 includes switches Sc3 to ScN+1 and switches Sd2 to SdN. One ends of the switches Sc3 to ScN+1 are connected to contact points of N pieces of the storage cells Cell2 to CellN and an output terminal 102, and another ends thereof are connected to the one end of the coil L1. One ends of the switches Sd2 to SdN are connected to the contact points of N pieces of the storage cells Cell1 to CellN, and another ends thereof are connected to the another end of the coil L1.

As described, the balance charging circuit according to the present embodiment has such a configuration that the switch Sc2 is eliminated from the balance charging circuit according to the eighth embodiment explained with reference to FIG. 46.

(Operation of Balance Charging Circuit According to Tenth Embodiment)

Next, an operation of the balance charging circuit for series-connected cells according to the tenth embodiment of the present invention will be explained. FIGS. 64 to 69 are views to explain operations of the tenth embodiment of the present invention.

In the balance charging circuit for series-connected cells according to the tenth embodiment of the present invention, in order to charge storage cells connected in series and maintain voltage balance between the series-connected cells, first to Nth charging periods are set by a control circuit which is not illustrated in the figure.

In a first half of the first charging period, the control circuit, not illustrated, turns on the switches Sa1 and Sd2. Then, an input voltage Vin is input from the input terminal 101, so that the cell Cell1 is charged while a charging current is stored in the coil L1. A path of the charging current is indicated by a dotted arrow in FIG. 64.

Next, in a second half of the first charging period, the control circuit, not illustrated, turns off the switch Sa1 and turns on the switch Sb2 while the switch Sd2 is being turned on. Then, the cell Cell1 is charged with the charging current stored in the coil L1. A path of the charging current is indicated by a dotted arrow in FIG. 65.

Next, in a first half of the second charging period, the control circuit, not illustrated, turns off the switch Sd2 and turns on the switches Sa2 and Sb2. Then, an input voltage Vin is input from the input terminal 101, and a charging current to charge the cell Cell2 with electric charge is stored in the coil L1. A path of the charging current is indicated by a dotted arrow in FIG. 66.

Next, in a second half of the second charging period, the switches Sa2 and Sb2 are turned off and the switches Sc3 and Sd2 are turned on. Then, the cell Cell2 is charged with the charging current stored in the coil L1. A path of the charging current is indicated by a dotted arrow in FIG. 67.

Thereafter, a similar operation is repeated to turn on the switches Sa2 and Sb1 in a first half of each of the second charging period and its subsequent charging periods, so as to store, in the coil L1, a charging current to charge a storage cell with electric charge. Then, corresponding switches for both ends of each cell are turned on in a second half of the each charging period, so as to charge the cell with the charging current stored in the coil L1. Accordingly, in a case where the cell CellN is charged, the switches ScN+1 and SdN are turned on. A path of the charging current in this state is indicated by a dotted arrow in FIG. 68.

Here, controlled contents by the control circuit, not illustrated, are explained with reference to FIG. 69. FIG. 69 illustrates which switch, among the switches in FIG. 63, the control circuit, not illustrated, turns on in each of the first to Nth charging periods T1 to TN. That is, among the switches, a switch corresponding to a column indicative of "ON" in the figure is turned into an ON state by the control circuit, not illustrated, and the other switches are turned into an off state.

As illustrated in FIG. 69, in each of the charging periods T1 to TN, the switches Sa1 and Sd2 are turned on in the first half of the first charging period, and the switches Sa2 and Sb1 are turned on in a first half of each of the second charging period and its subsequent charging periods. Then, corresponding switches for both ends of each cell are turned on in a second half of each of the charging periods T1 to TN, as described above. As described, the control circuit, not illustrated, repeatedly controls each of the switches to turn on as shown in the first to Nth charging periods T1 to TN described above. Accordingly, it is possible to realize a balance charging circuit using a single coil L1.

Note that since a voltage drop operation is performed in the first charging period T1, the present embodiment is applicable to a case where the input voltage Vin is larger than a charging voltage of the cell Cell1, and a direction of a charging current to the cell Cell1 may be different from directions of charging currents to the cells Cell2 to N.

(Configuration of Balance Charging Circuit According to Eleventh Embodiment)

Figure 70:
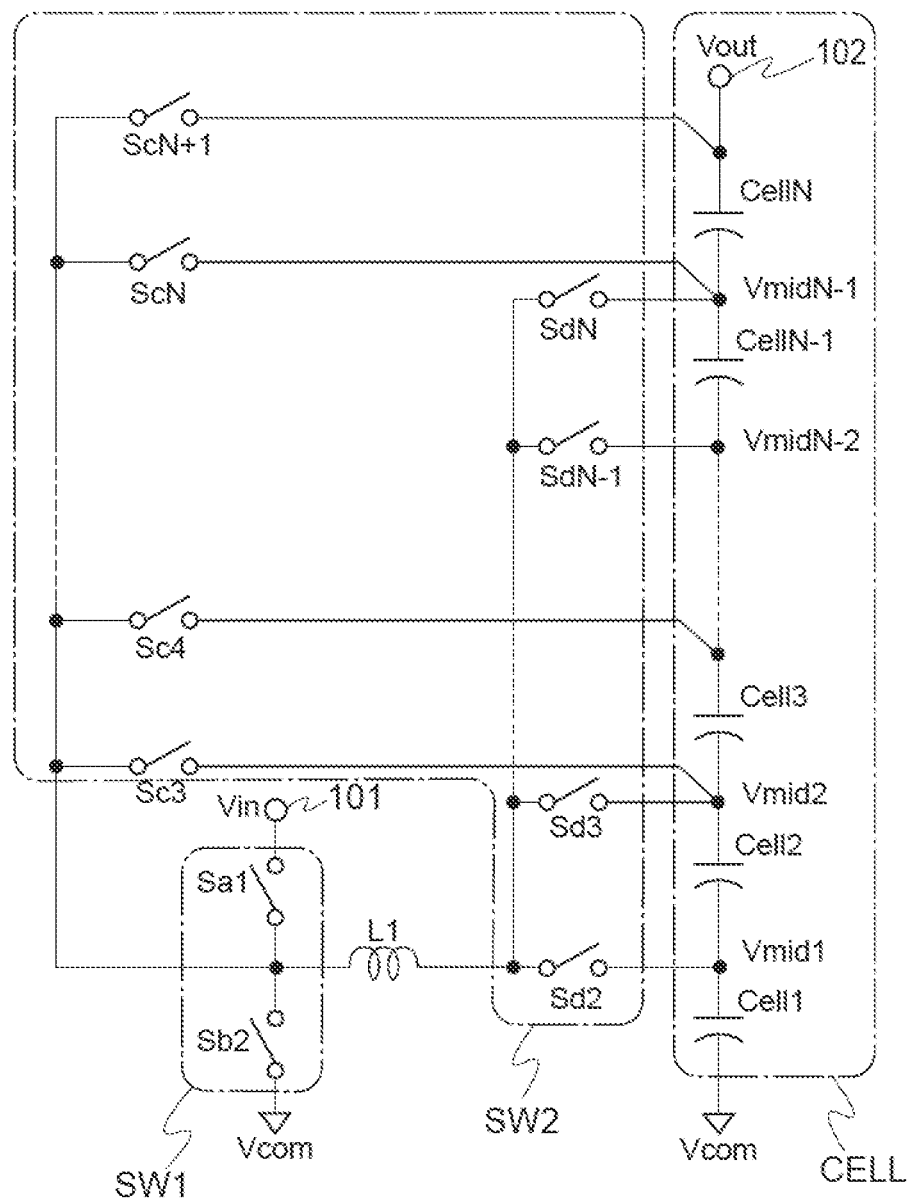
FIG. 70 is a circuit diagram illustrating an eleventh embodiment of the present invention.
Figure 71:
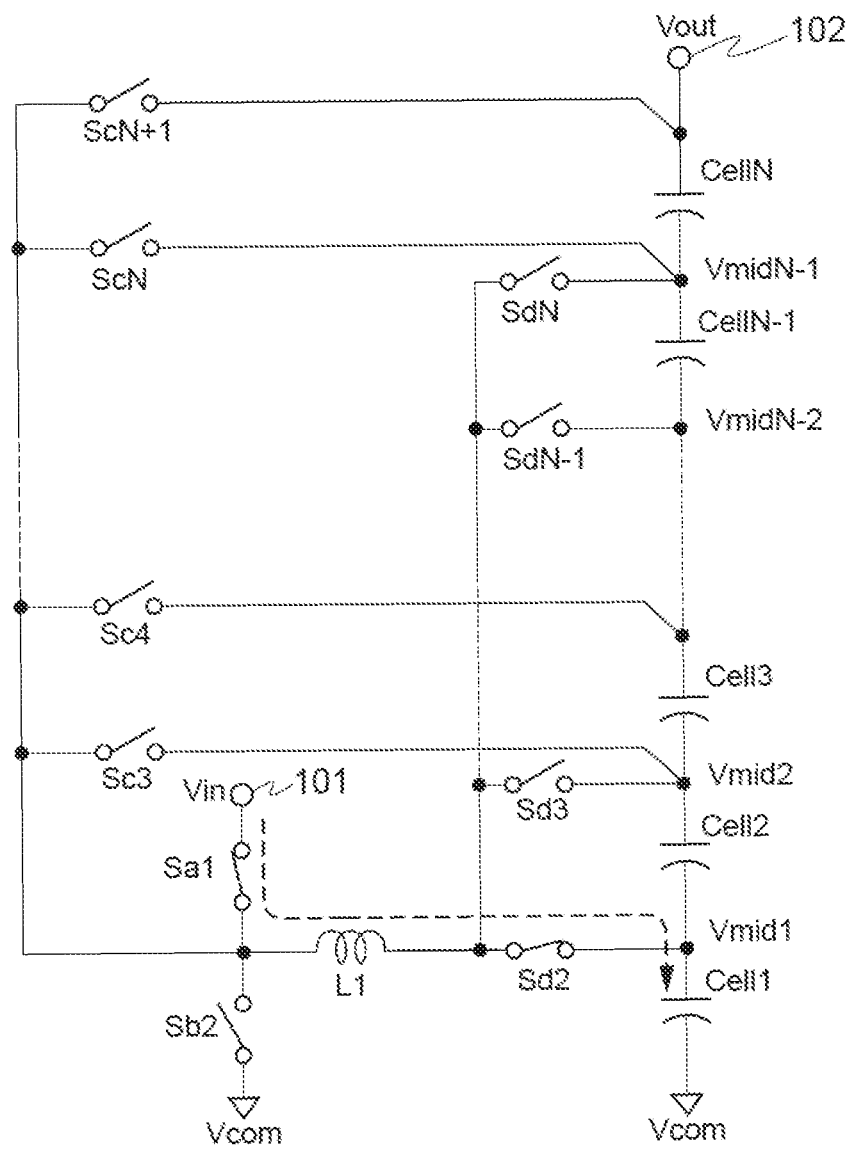
FIG. 71 is a view to explain an operation of the eleventh embodiment of the present invention.
Figure 72:
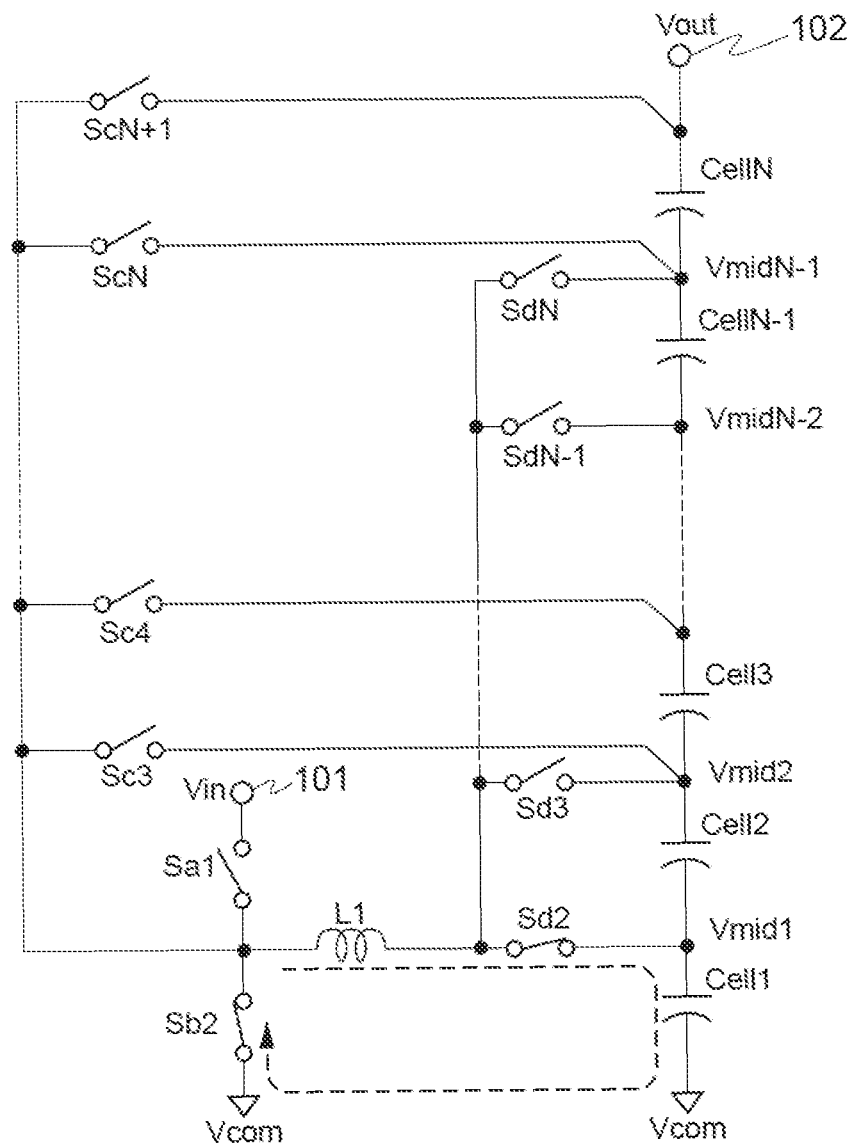
FIG. 72 is a view to explain an operation of the eleventh embodiment of the present invention.
Figure 73:
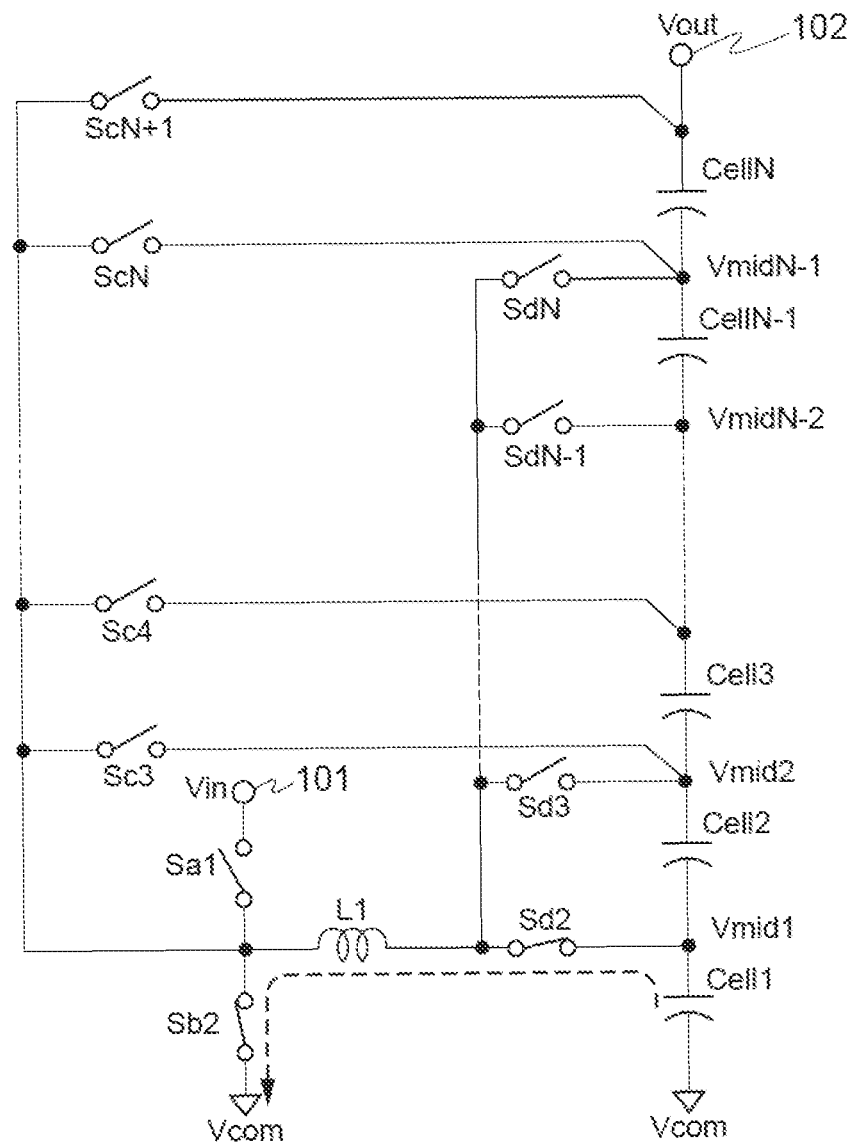
FIG. 73 is a view to explain an operation of the eleventh embodiment of the present invention.
Figure 74:
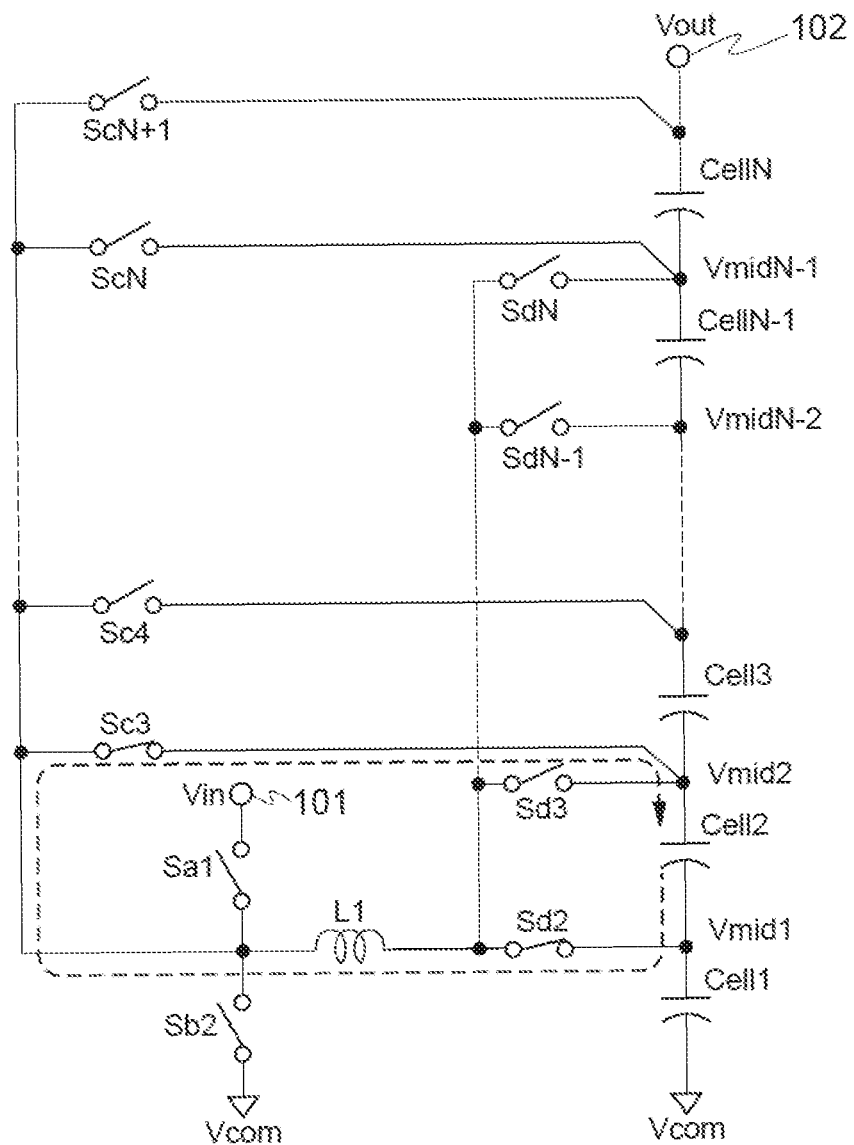
FIG. 74 is a view to explain an operation of the eleventh embodiment of the present invention.
Figure 75:
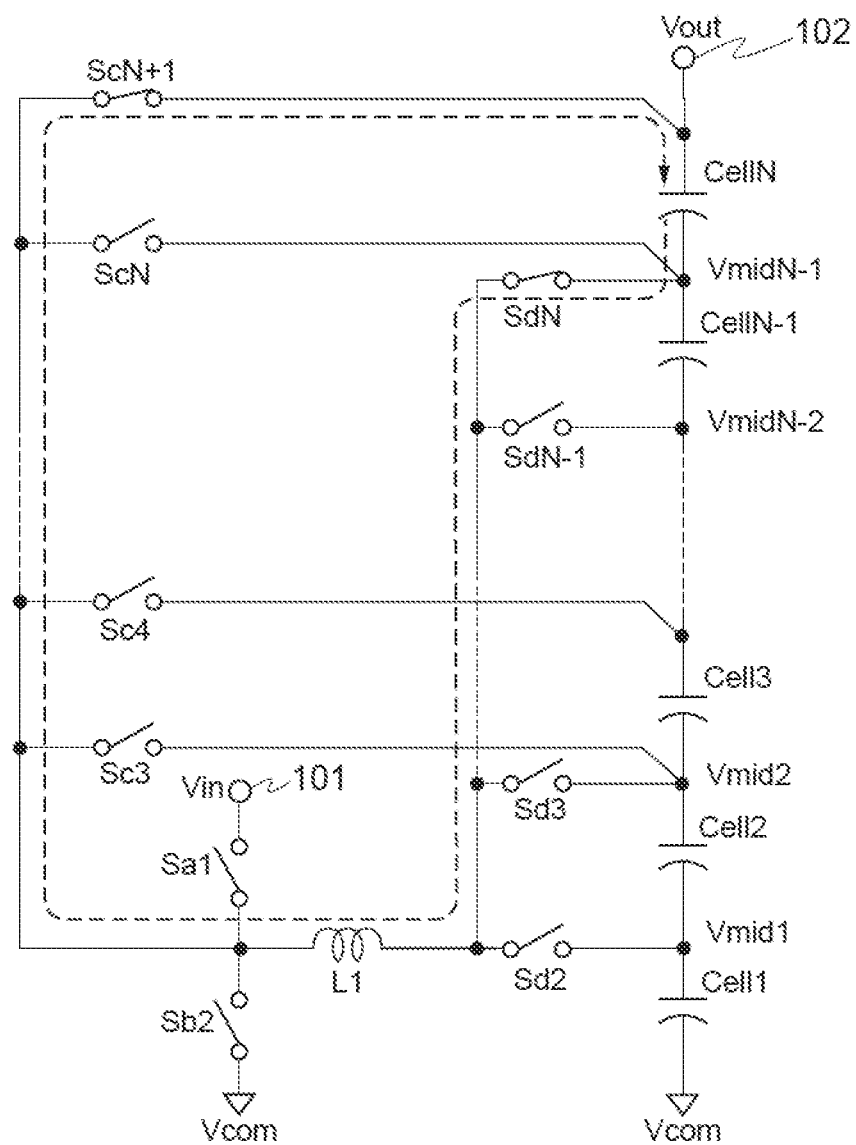
FIG. 75 is a view to explain an operation of the eleventh embodiment of the present invention.

FIG. 70 is a circuit diagram illustrating an exemplary configuration of a balance charging circuit for charging, by use of a single coil L1, N pieces of storage cells Cell1 to CellN which are connected in series. In FIG. 70, the balance charging circuit includes a single coil L1, a switch group SW1 for electrically connecting an input terminal 101 into which a charging voltage is input and the coil L1, and a switch group SW2 for electrically connecting both ends of each of the storage cells Cell1 to CellN to both ends of the coil L1.

The switch group SW1 includes a switch Sa1 and a switch Sb2. One end of the switch Sa1 is connected to the input terminal 101, and another end thereof is connected to one end of the coil L1. One end of the switch Sb2 is connected to the reference voltage terminal, and another end thereof is connected to the one end of the coil L1.

The switch group SW2 includes switches Sc3 to ScN+1 and switches Sd2 to SdN. One ends of the switches Sc3 to ScN+1 are connected to contact points of N pieces of the storage cells Cell2 to CellN and an output terminal 102, and another ends thereof are connected to the one end of the coil L1. One ends of the switches Sd2 to SdN are connected to the contact points of N pieces of the storage cells Cell1 to CellN, and another ends thereof are connected to another end of the coil L1.

As described, the balance charging circuit according to the present embodiment has such a configuration that the switch Sc2 is eliminated from the balance charging circuit according to the eighth embodiment explained with reference to FIG. 46.

(Operation of Balance Charging Circuit According to Eleventh Embodiment)

Next, an operation of the balance charging circuit for series-connected cells according to the eleventh embodiment of the present invention will be explained. FIGS. 71 to 76 are views to explain operations of the eleventh embodiment of the present invention.

In the balance charging circuit for series-connected cells according to the eleventh embodiment of the present invention, in order to charge series-connected storage cells and maintain voltage balance between the series-connected cells, first to Nth charging periods are set by a control circuit which is not illustrated in the figure.

In a first half of the first charging period, the control circuit, not illustrated, turns on the switches Sa1 and Sd2. Then, an input voltage Vin is input from the input terminal 101, so that the cell Cell1 is charged while a charging current is stored in the coil L1. A path of the charging current is indicated by a dotted arrow in FIG. 71.

Next, in a second half of the first charging period, the control circuit, not illustrated, turns off the switch Sa1 and turns on the switch Sb2 while the switch Sd2 is being turned on. Then, the cell Cell1 is charged with the charging current charged in the coil L1. A path of the charging current is indicated by a dotted arrow in FIG. 72.

After that, in a first half of the second charging period, the control circuit, not illustrated, maintains the switches Sd2 and Sb2 to be turned on. This causes discharge from the cell Cell1, thereby storing, in the coil L1, a charging current to charge the cell Cell2 with electric charge. A path of the charging current is indicated by a dotted arrow of FIG. 73.

Next, in a second half of the second charging period, the switch Sb2 is turned off and the switch Sc3 is turned on while the switch Sd2 is being turned on. Then, the cell Cell2 is charged with the charging current charged in the coil L1. A path of the charging current is indicated by a dotted arrow of FIG. 74.

Thereafter, a similar operation is repeated to turn on the switches Sb2 and Sd2 in a first half of each of the second charging period and its subsequent charging periods, so as to store, in the coil L1, a charging current to charge the other cells Cell2 to CellN with electric charge by discharge from the cell Cell1. Accordingly, in a case where the cell CellN is charged, the switches ScN+1 and SdN are turned on. A path of the charging current in this state is indicated by a dotted arrow in FIG. 75.

Here, controlled contents by the control circuit, not illustrated, are explained with reference to FIG. 76. FIG. 76 illustrates which switch, among the switches in FIG. 70, the control circuit, not illustrated, turns on in each of the first to Nth charging periods T1 to TN. That is, among the switches, a switch corresponding to a column indicative of "ON" in the figure is turned into an ON state by the control circuit, not illustrated, and the other switches are turned into an off state.

As illustrated in FIG. 76, in each of the charging periods T1 to TN, the switches Sa1 and Sd2 are turned on in the first half of the first charging period so as to charge the cell Cell1, and the switches Sb2 and Sd2 are turned on in a first half of each of the second charging period and its subsequent charging periods so as to store, in the coil L1, a charging current to charge the other storage cells Cell2 to CellN with electric charge by discharge from the cell Cell1. Then, corresponding switches for both ends of each cell are turned on in a second half of each of the charging periods T1 to TN so as to charge the other cells Cell2 to CellN, as described above. As described, the control circuit, not illustrated, repeatedly controls each of the switches to turn on as shown in the first to Nth charging periods T1 to TN described above. Accordingly, it is possible to realize a balance charging circuit using a single coil L1.

Note that since a voltage drop operation is performed in the first charging period T1, the present embodiment is applicable to a case where the input voltage Vin is larger than a charging voltage of the cell Cell1, and discharge of the cell Cell1 is allowable.

(Configuration of Balance Charging Circuit According to Twelfth Embodiment)

Figure 77:
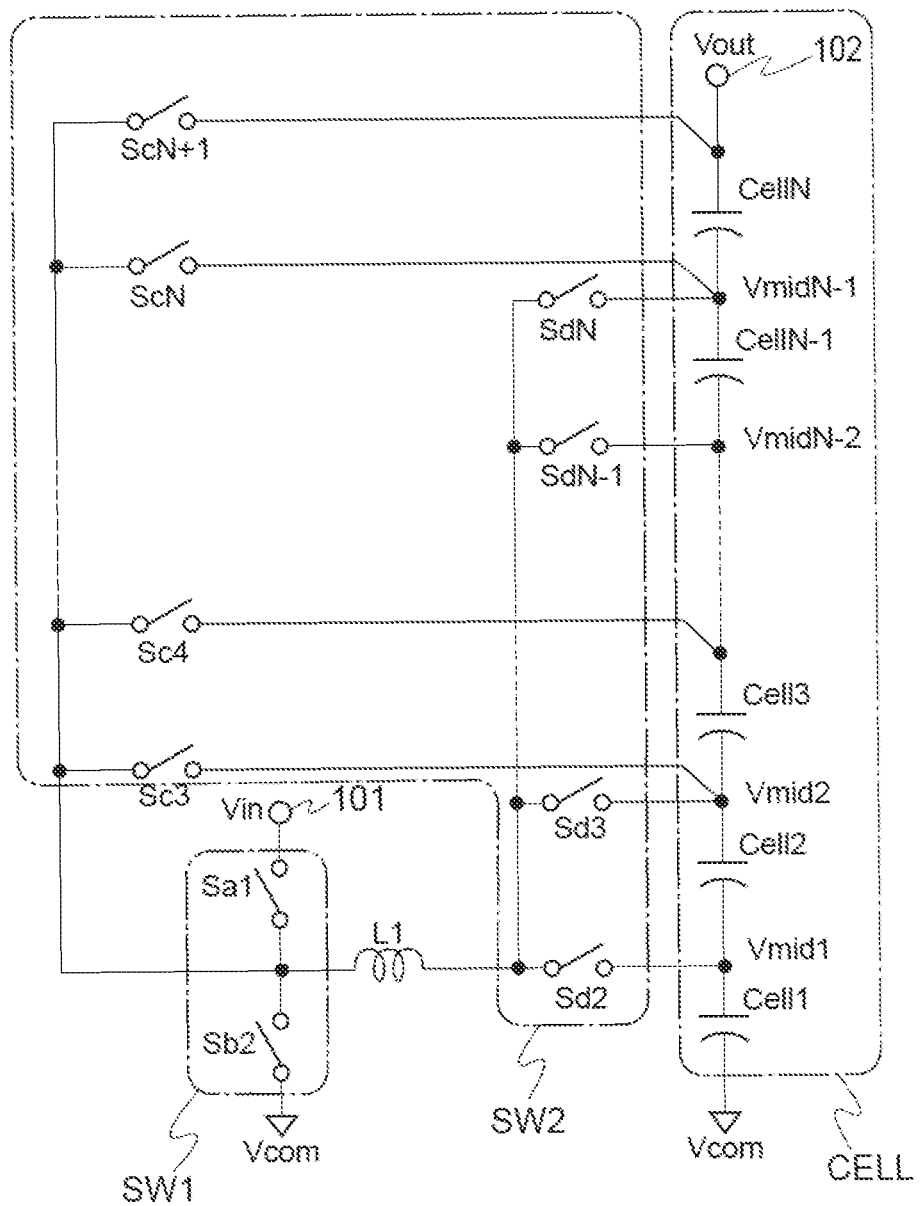
FIG. 77 is a circuit diagram illustrating a twelfth embodiment of the present invention.
Figure 78:
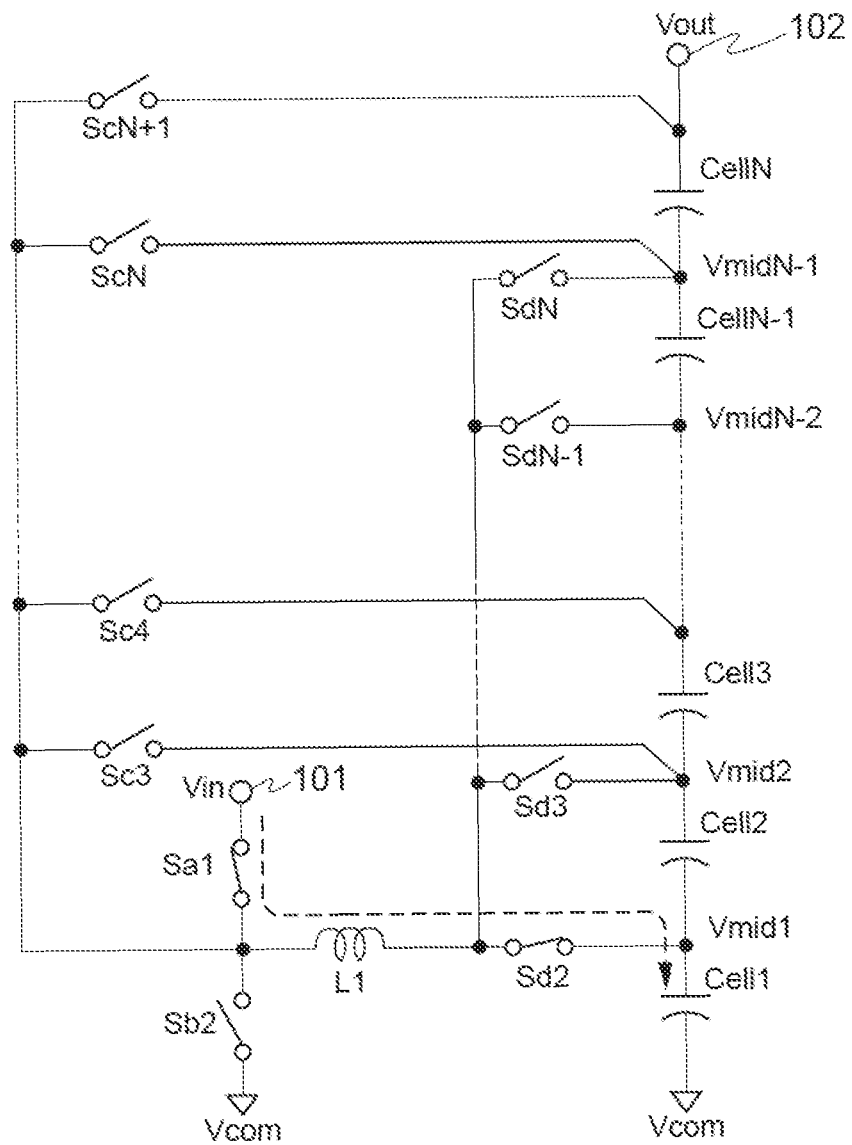
FIG. 78 is a view to explain an operation of the twelfth embodiment of the present invention.
Figure 79:
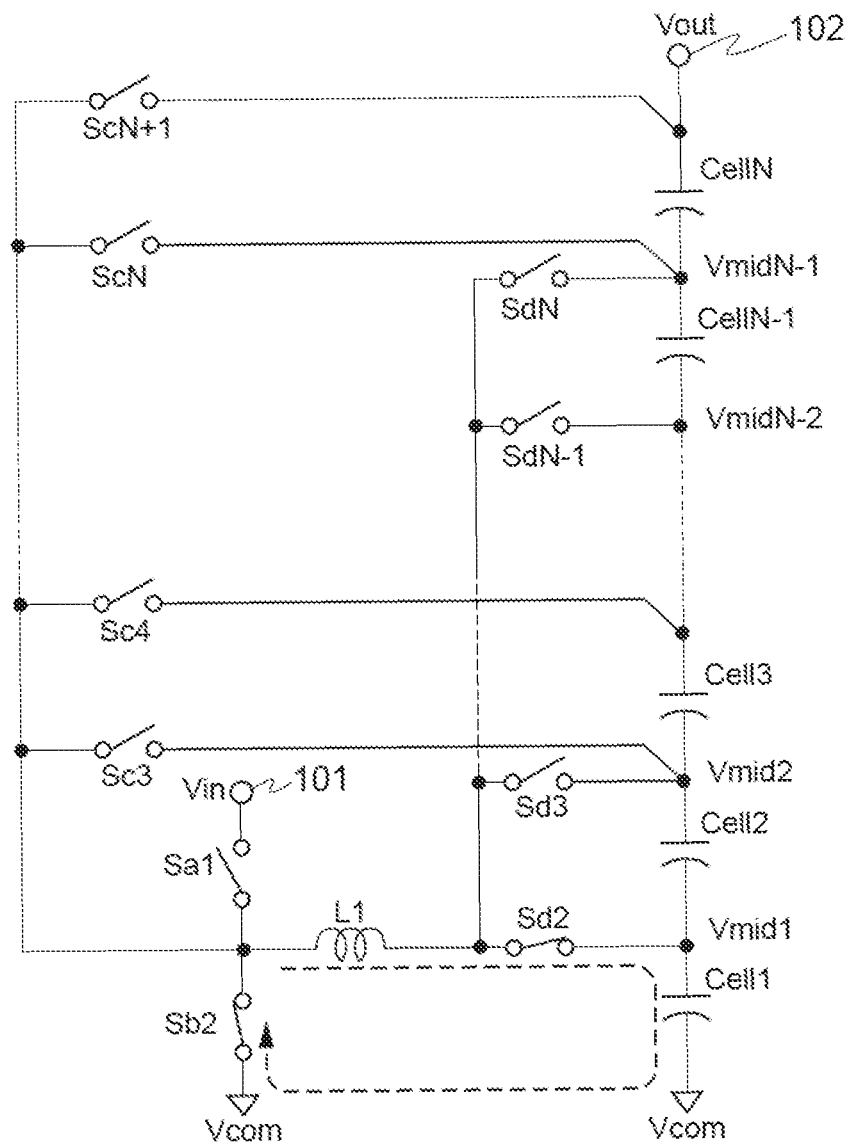
FIG. 79 is a view to explain an operation of the twelfth embodiment of the present invention.
Figure 80:
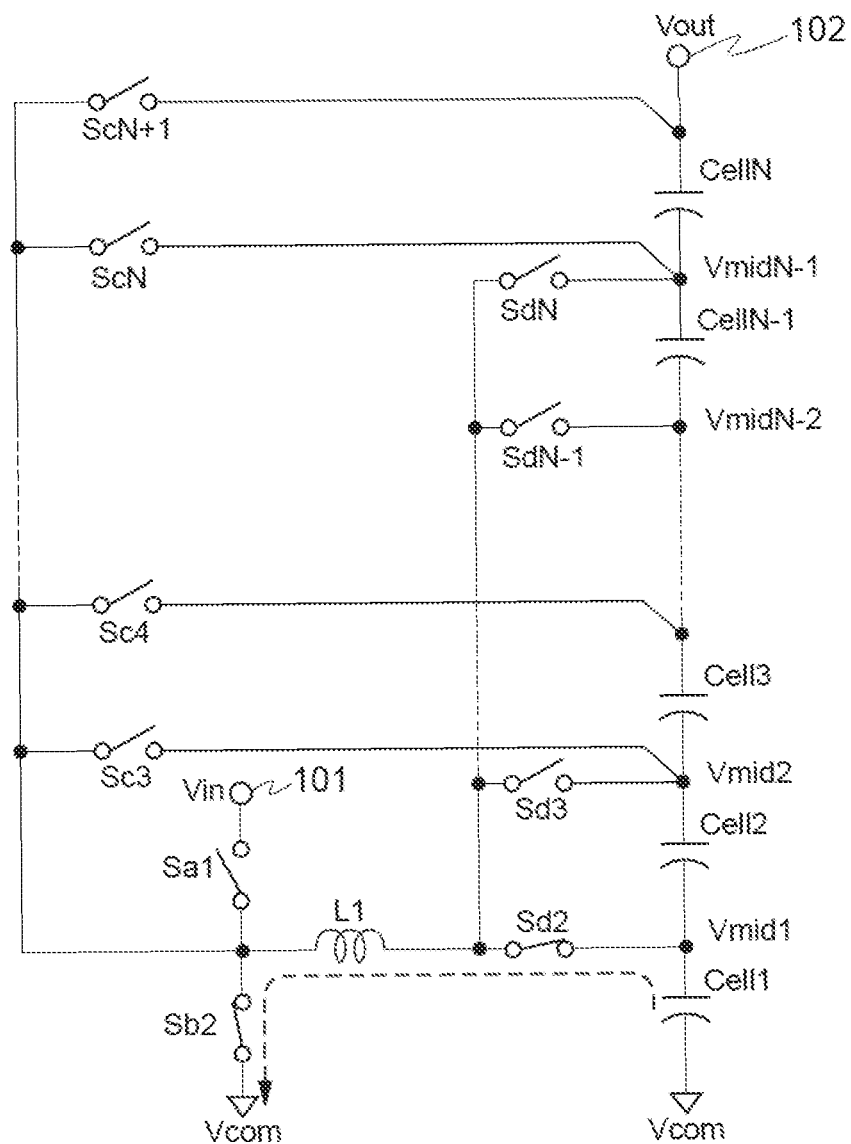
FIG. 80 is a view to explain an operation of the twelfth embodiment of the present invention.
Figure 81:
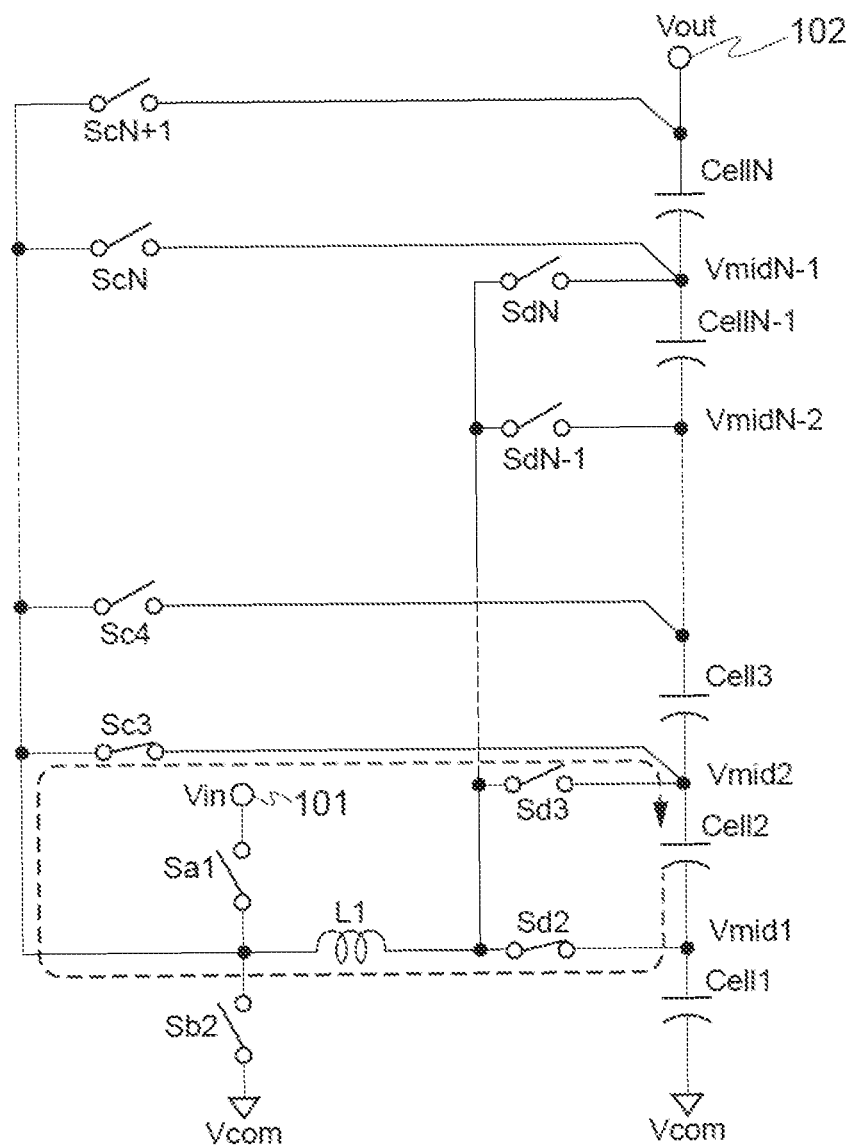
FIG. 81 is a view to explain an operation of the twelfth embodiment of the present invention.
Figure 82:
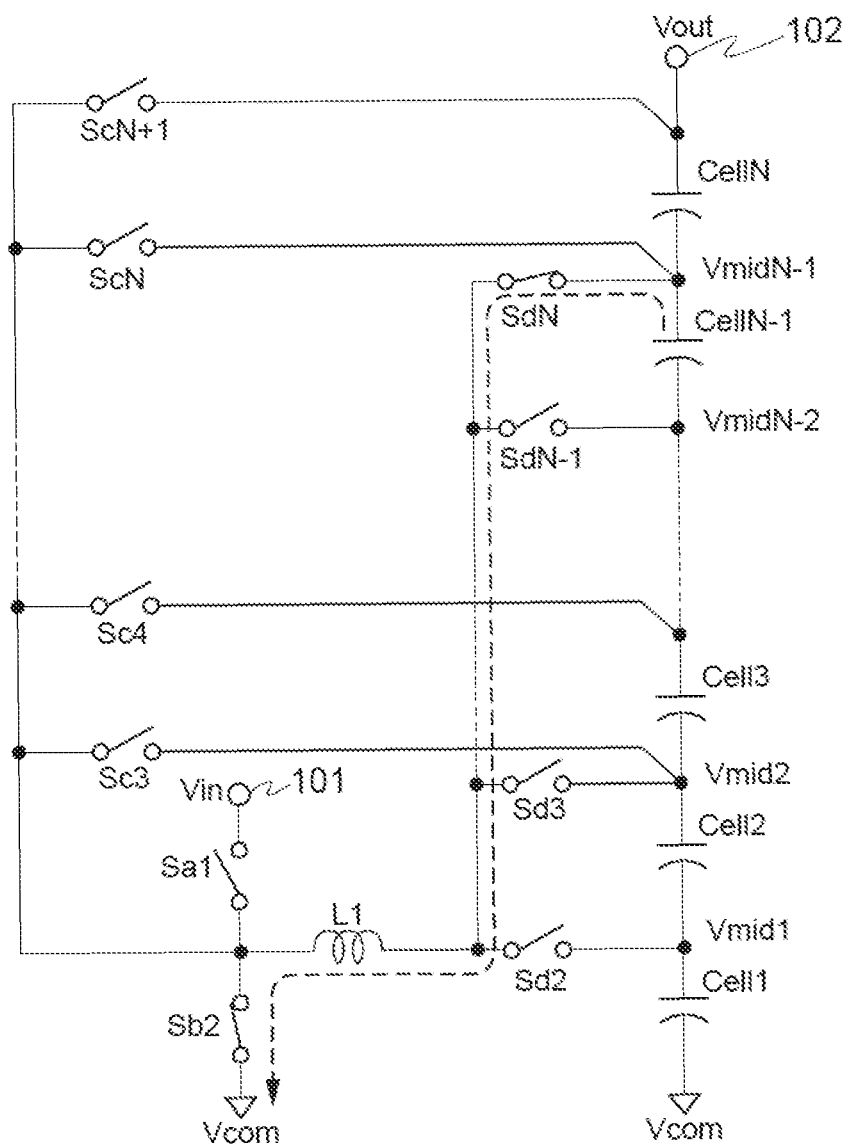
FIG. 82 is a view to explain an operation of the twelfth embodiment of the present invention.
Figure 83:
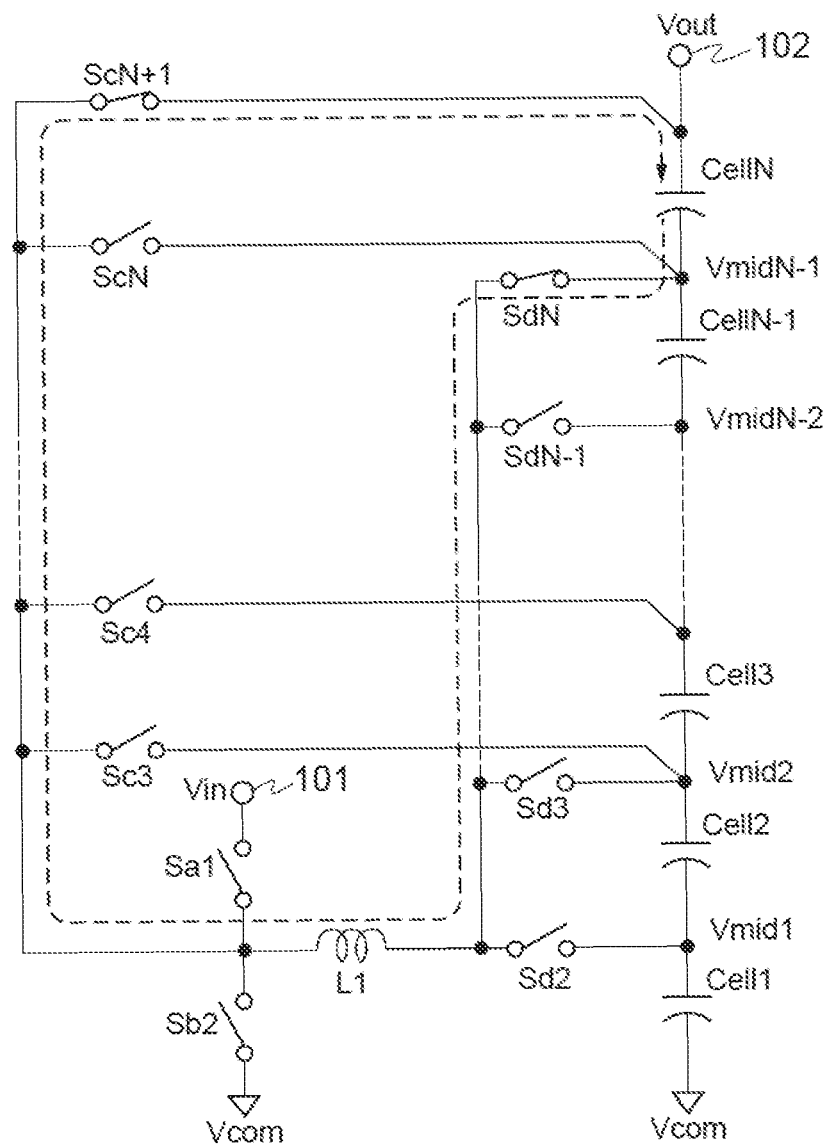
FIG. 83 is a view to explain an operation of the twelfth embodiment of the present invention.

FIG. 77 is a circuit diagram illustrating an exemplary configuration of a balance charging circuit for charging, by use of a single coil L1, N pieces of storage cells Cell1 to CellN which are connected in series. In FIG. 77, the balance charging circuit includes a single coil L1, a switch group SW1 for electrically connecting an input terminal 101 into which a charging voltage is input and the coil L1, and a switch group SW2 for electrically connecting both ends of each of the storage cells Cell1 to CellN to both ends of the coil L1.

The switch group SW1 includes a switch Sa1 and a switch Sb2. One end of the switch Sa1 is connected to the input terminal 101, and another end thereof is connected to one end of the coil L1. One end of the switch Sb2 is connected to the reference voltage terminal, and another end thereof is connected to the one end of the coil L1.

The switch group SW2 includes switches Sc3 to ScN+1 and switches Sd2 to SdN. One ends of the switches Sc3 to ScN+1 are connected to contact points of N pieces of the storage cells Cell2 to CellN and an output terminal 102, and another ends thereof are connected to the one end of the coil L1. One ends of the switches Sd2 to SdN are connected to the contact points of N pieces of the storage cells Cell1 to CellN, and another ends thereof are connected to another end of the coil L1.

As described, the balance charging circuit according to the present embodiment has such a configuration that the switch Sc2 is eliminated from the balance charging circuit according to the eighth embodiment explained with reference to FIG. 46.

The configuration of the balance charging circuit in FIG. 77 itself is similar to the configuration of the balance charging circuit explained with reference to FIG. 70, but some controlled contents of switches controlled by a control circuit, not illustrated, are different.

(Operation of Balance Charging Circuit According to Twelfth Embodiment)

Next, an operation of the balance charging circuit for series-connected cells according to the twelfth embodiment of the present invention will be explained. FIGS. 77 to 84 are views to explain operations of the twelfth embodiment of the present invention.

In the balance charging circuit for series-connected cells according to the twelfth embodiment of the present invention, in order to charge series-connected storage cells and maintain voltage balance between the series-connected cells, first to Nth charging periods are set by a control circuit which is not illustrated in the figure.

In a first half of the first charging period, the control circuit, not illustrated, turns on the switches Sa1 and Sd2. Then, an input voltage Vin is input from the input terminal 101, so that the cell Cell1 is charged while a charging current is stored in the coil L1. A path of the charging current is indicated by a dotted arrow of FIG. 78.

Next, in a second half of the first charging period, the control circuit, not illustrated, turns off the switch Sa1 and turns on the switch Sb2 while the switch Sd2 is being turned on. Then, the cell Cell1 is charged with the charging current stored in the coil L1. A path of the charging current is indicated by a dotted arrow of FIG. 79.

After that, in a first half of the second charging period, the control circuit, not illustrated, maintains the switches Sd2 and Sb2 to be turned on. This causes discharge from the cell Cell1, thereby storing, in the coil L1, a charging current to charge the cell Cell2 with electric charge. A path of the charging current is indicated by a dotted arrow in FIG. 80.

Next, in a second half of the second charging period, the switch Sb2 is turned off and the switch Sc3 is turned on while the switch Sd2 is being turned on. Then, the cell Cell2 is charged with the charging current stored in the coil L1. A path of the charging current is indicated by a dotted arrow of FIG. 81.

Then, in the third charging period and its subsequent periods, the control circuit, not illustrated, turns on the switch Sb2 and the switches Sd3 to SdN in a first half of each of the charging period to cause discharge from the cells Cell2 to CellN−1, thereby storing, in the coil L1, a charging current to charge the cells Cell2 to CellN with electric charge. Accordingly, in the charging period TN, the control circuit, not illustrated, turns on the switches Sb2 and SdN in the first half of the charging period TN to cause discharge from the cell Cell1N−1, thereby storing, in the coil L1, a charging current to charge the cell CellN with electric charge. A path of the charging current is indicated by a dotted arrow of FIG. 82.

Next, in a second half of the charging period TN, the control circuit, not illustrated, turns on the switches SdN and ScN+1 to charge the cell CellN with the charging current stored in the coil L1. A path of the charging current is indicated by a dotted arrow of FIG. 83.

Here, controlled contents by the control circuit, not illustrated, are explained with reference to FIG. 84. FIG. 84 illustrates which switch, among the switches in FIG. 77, the control circuit, not illustrated, turns on in each of the first to Nth charging periods T1 to TN. That is, among the switches, a switch corresponding to a column indicative of "ON" in the figure is turned into an ON state by the control circuit, not illustrated, and the other switches are turned into an off state.

As illustrated in FIG. 84, in each of the charging periods T1 to TN, the switches Sa1 and Sd2 are turned on in the first half of the first charging period so as to charge the cell Cell1, and the switch Sb2 and a switch for sequentially causing the cells Cell1 to Cell1N−1 to discharge are turned on in a first half of each of the second charging period and its subsequent charging periods so as to store a charging current in the coil L1. Then, corresponding switches for both ends of each cell are turned on in a second half of each of the charging periods T1 to TN so as to charge the cells Cell2 to CellN, as described above. As described, the control circuit, not illustrated, repeatedly controls each of the switches to turn on as shown in the first to Nth charging periods T1 to TN described above. Accordingly, it is possible to realize a balance charging circuit using a single coil L1.

In the eleventh embodiment described above, the cell Cell1 is fixed as a cell to be discharged, whereas the cell to be discharged is not fixed particularly in the present exemplary embodiment, thereby making it possible to reduce a burden to the cell Cell1.

Note that the present embodiment is applicable to a case where discharge of the cell Cell1 to CellN−1 is allowable.

(Configuration of Balance Charging Circuit According to Thirteenth Embodiment)

Figure 85:
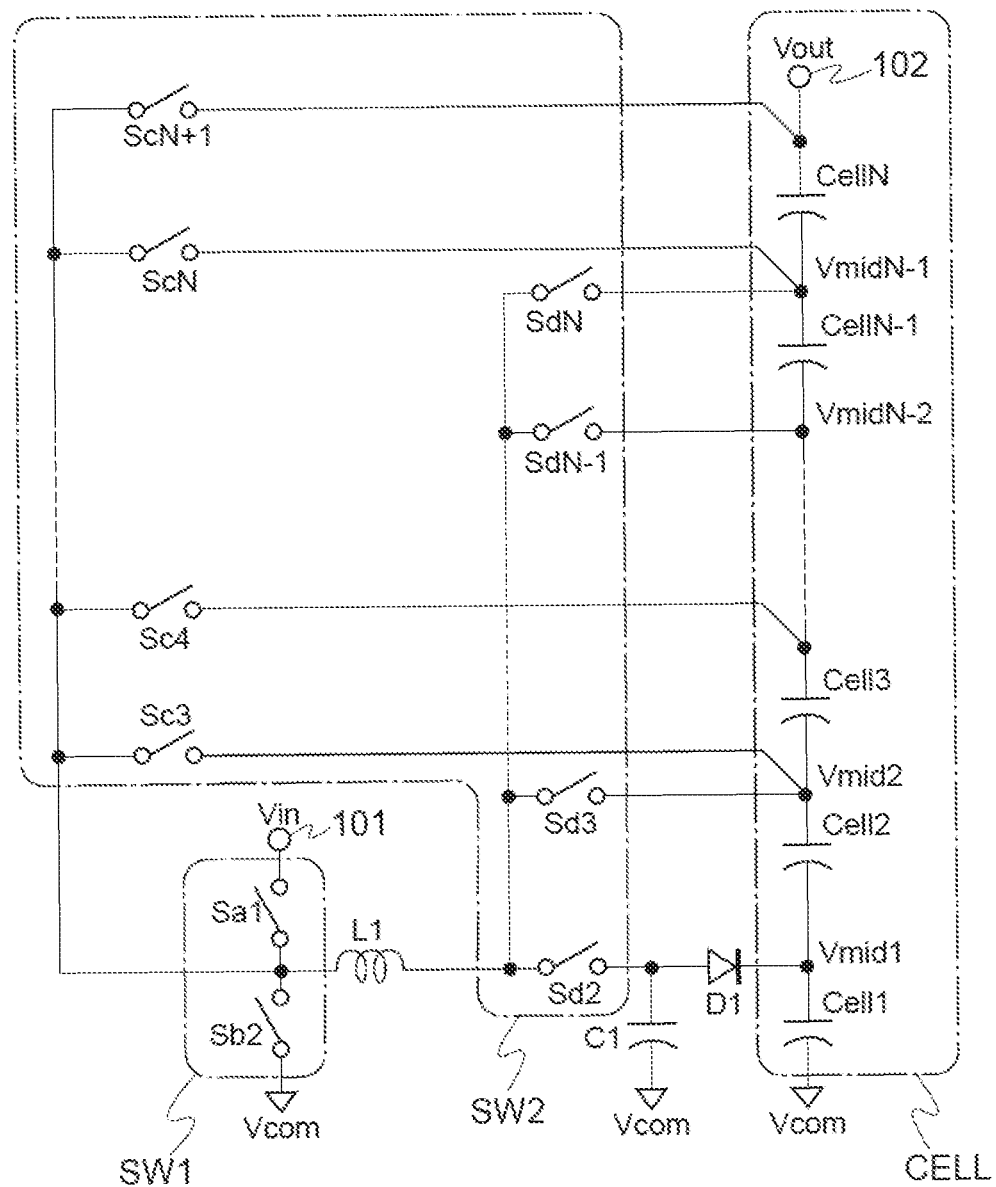
FIG. 85 is a circuit diagram illustrating a thirteenth embodiment of the present invention.
Figure 86:
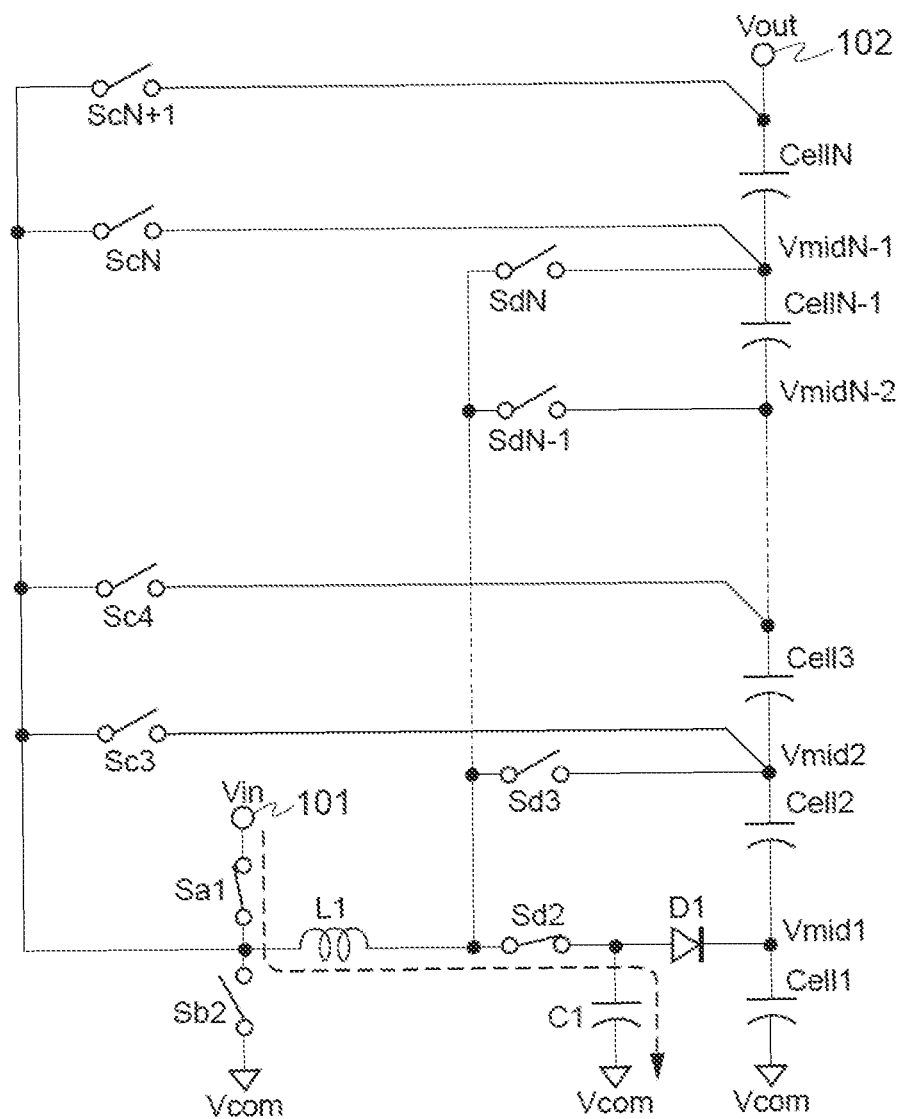
FIG. 86 is a view to explain an operation of the thirteenth embodiment of the present invention.
Figure 87:
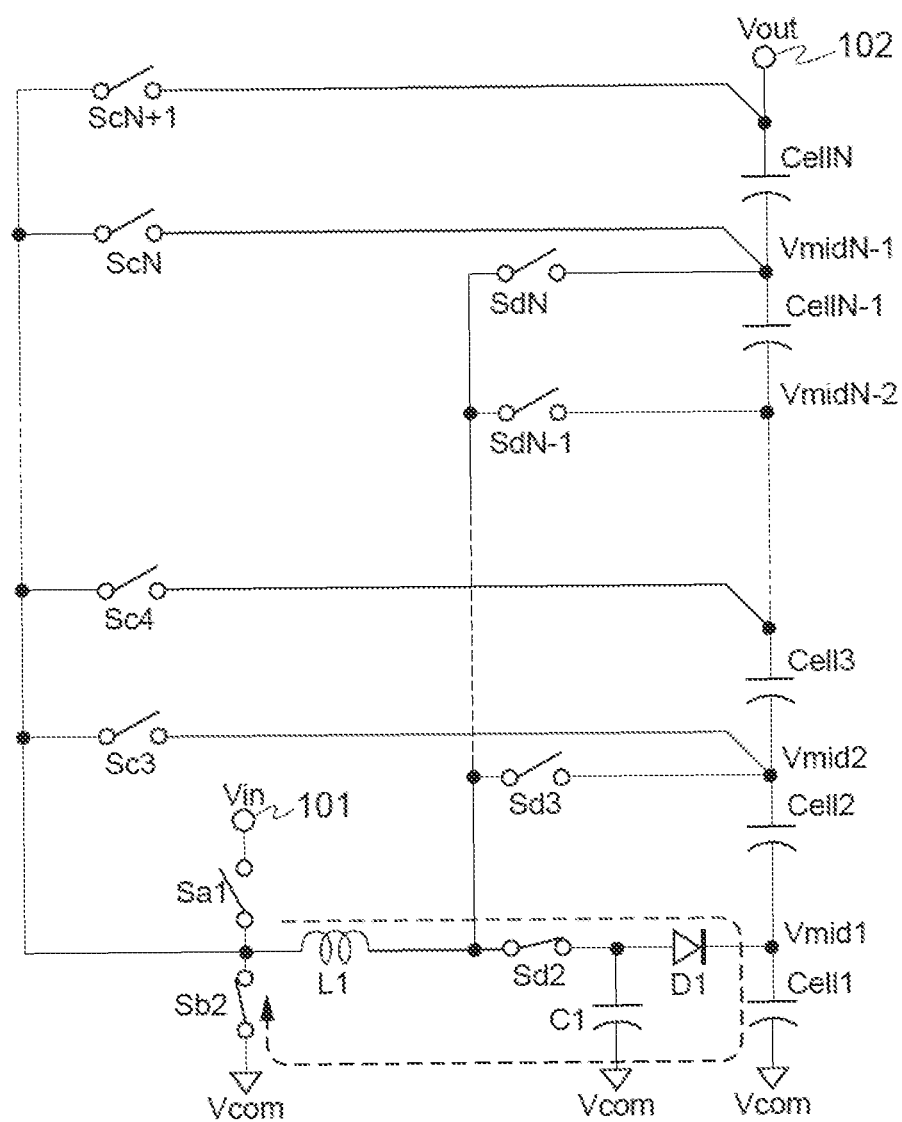
FIG. 87 is a view to explain an operation of the thirteenth embodiment of the present invention.
Figure 88:
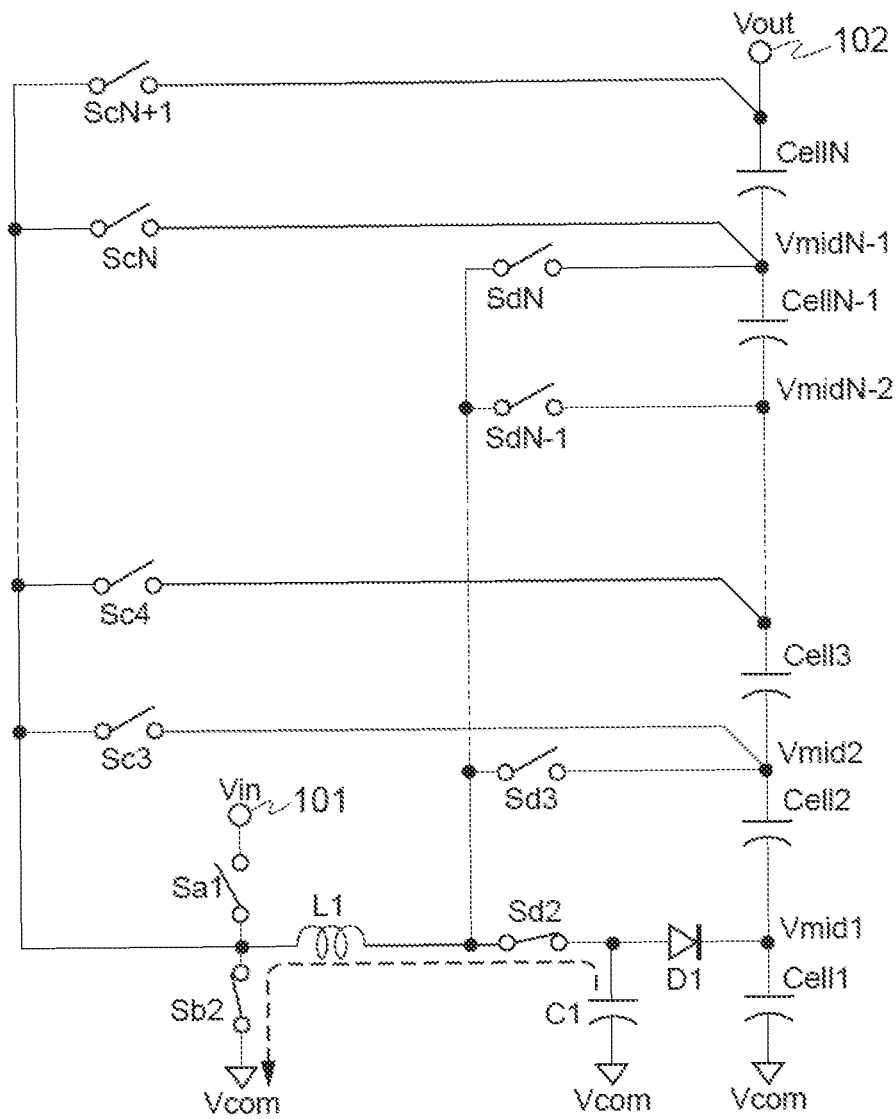
FIG. 88 is a view to explain an operation of the thirteenth embodiment of the present invention.
Figure 89:
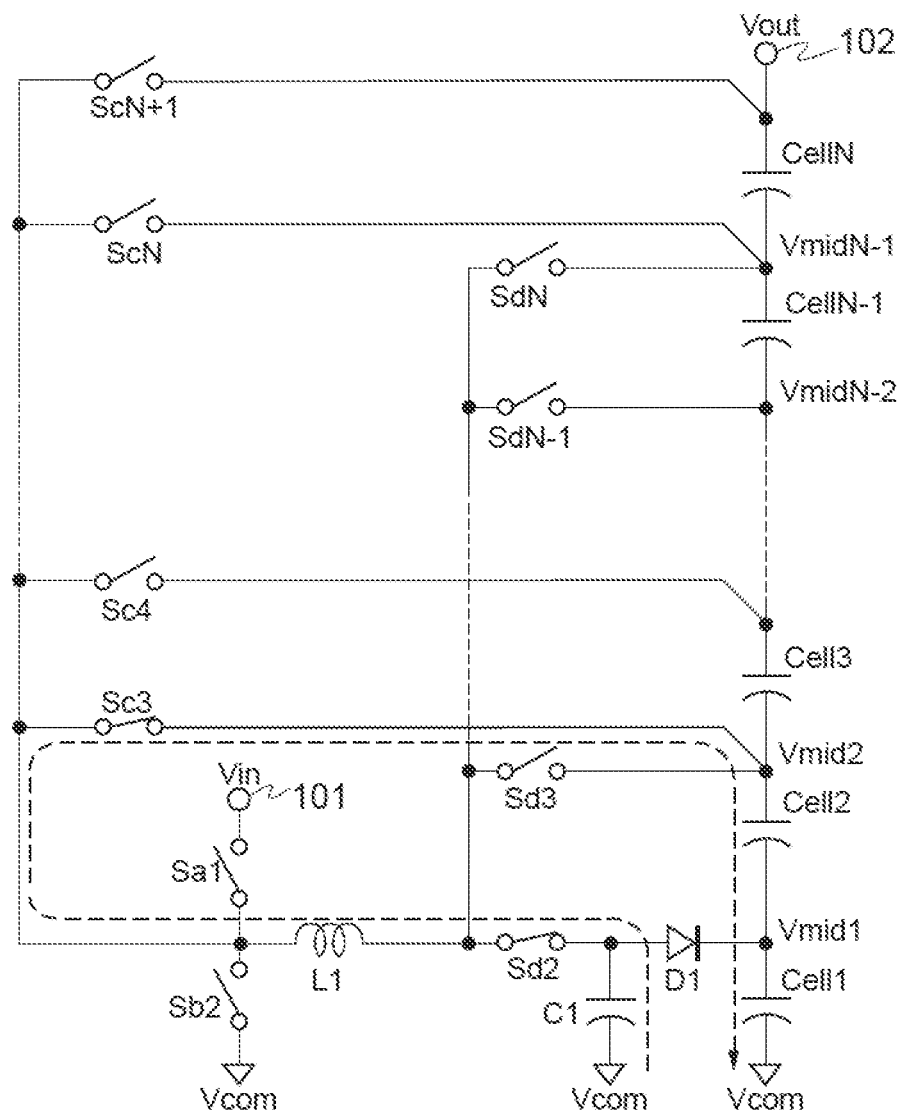
FIG. 89 is a view to explain an operation of the thirteenth embodiment of the present invention.
Figure 90:
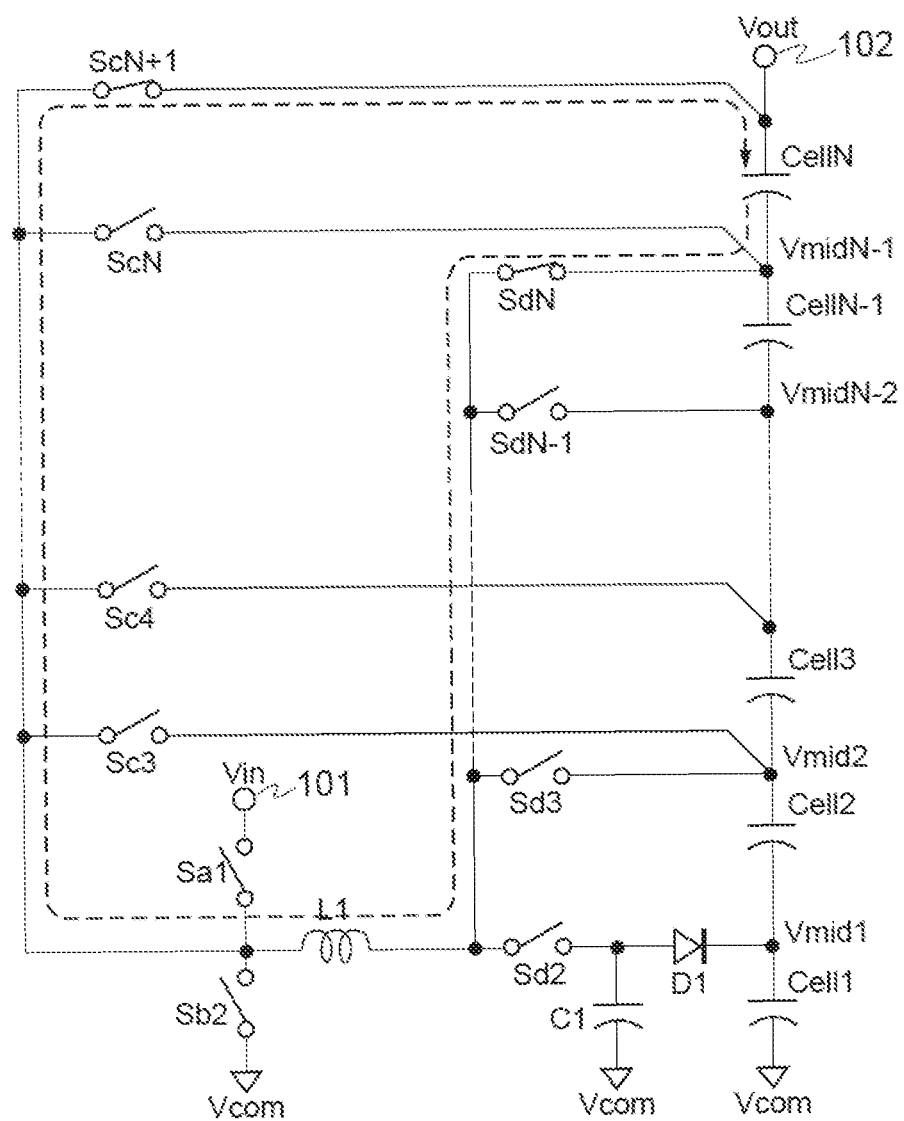
FIG. 90 is a view to explain an operation of the thirteenth embodiment of the present invention.

FIG. 85 is a circuit diagram illustrating an exemplary configuration of a balance charging circuit for charging, by use of a single coil L1, N pieces of storage cells Cell1 to CellN which are connected in series. In FIG. 85, the balance charging circuit includes a single coil L1, a switch group SW1 for electrically connecting an input terminal 101 into which a charging voltage is input and the coil L1, a switch group SW2 for electrically connecting both ends of each of the storage cells Cell1 to CellN to both ends of the coil L1, a diode D1, and a capacitor C1.

The switch group SW1 includes a switch Sa1 and a switch Sb2. One end of the switch Sa1 is connected to the input terminal 101, and another end thereof is connected to one end of the coil L1. One end of the switch Sb2 is connected to a reference voltage terminal, and another end thereof is connected to the one end of the coil L1.

The switch group SW2 includes switches Sc3 to ScN+1 and switches Sd2 to SdN. One ends of the switches Sc3 to ScN+1 are connected to contact points of N pieces of the storage cells Cell2 to CellN and an output terminal 102, and another ends thereof are connected to the one end of the coil L1. One ends of the switches Sd2 to SdN are connected to the contact points of N pieces of the storage cells Cell1 to CellN, and the other ends thereof are connected to another end of the coil L1.

An anode of the diode D1 is connected to one end of the switch Sd2, and a cathode thereof is connected to a contact point between the storage cell Cell1 and the storage cell Cell2. This diode D1 is provided so as to suppress discharge from the storage cell Cell1.

The capacitor C1 is connected between the anode of the diode D1 and the reference voltage terminal. This capacitor C1 is provided to store electric charge once so as to store, in the coil L1, a current to charge the storage cells Cell2 to CellN by discharge of the electric charge thus charged.

(Operation of Balance Charging Circuit According to Thirteenth Embodiment)

Next, an operation of the balance charging circuit for series-connected cells according to the thirteenth embodiment of the present invention will be explained. FIGS. 86 to 91 are views to explain operations of the thirteenth embodiment of the present invention.

In the balance charging circuit for series-connected cells according to the thirteenth embodiment of the present invention, in order to charge series-connected storage cells and maintain voltage balance between the series-connected cells, first to Nth charging periods are set by a control circuit which is not illustrated in the figure.

In a first half of the first charging period, the control circuit, not illustrated, turns on the switches Sa1 and Sd2. Then, an input voltage Vin is input from the input terminal 101, so that the cell Cell1 is charged while a charging current is stored in the coil L1. A path of the charging current is indicated by a dotted arrow of FIG. 86. While this cell Cell1 is charged, electric charge is stored in the capacitor C1.

Next, in a second half of the first charging period, the control circuit, not illustrated, turns off the switch Sa1 and turns on the switch Sb2 while the switch Sd2 is being turned on. Then, the cell Cell1 is charged with the charging current charged in the coil L1. A path of the charging current is indicated by a dotted arrow of FIG. 87.

After that, in a first half of the second charging period, the control circuit, not illustrated, maintains the switches Sd2 and Sb2 to be turned on. This causes discharge from the capacitor C1, thereby storing, in the coil L1, a charging current to charge the cell Cell2 with electric charge. At this time, discharge from the cell Cell1 is suppressed by the diode D1. A path of the charging current is indicated by a dotted arrow of FIG. 88.

Next, in a second half of the second charging period, the switch Sb2 is turned off and the switch Sc3 is turned on while the switch Sd2 is being turned on. Then, the cell Cell2 is charged with the charging current charged in the coil L1. A path of the charging current is indicated by a dotted arrow of FIG. 89.

Then, in the third charging period and its subsequent periods, the control circuit, not illustrated, turns on the switch Sb2 and the switch Sd2 in a first half of each charging period to cause discharge from the capacitor C1, thereby storing, in the coil L1, a charging current to charge the cells Cell3 to CellN with electric charge. Accordingly, in the charging period TN, the control circuit, not illustrated, turns on the switches Sb2 and Sd2 in a first half of the charging period TN to cause discharge from the capacitor C1, thereby storing, in the coil L1, a charging current to charge the cell CellN with electric charge. This state is the same as the state in FIG. 88, and a path of the charging current is indicated by the dotted arrow of FIG. 88.

Next, in a second half of the charging period TN, the control circuit, not illustrated, turns on the switches SdN and ScN+1 to charge the cell CellN with the charging current stored in the coil L1. A path of the charging current is indicated by a dotted arrow in FIG. 90.

Here, controlled contents by the control circuit, not illustrated, are explained with reference to FIG. 91. FIG. 91 illustrates which switch, among the switches in FIG. 85, the control circuit, not illustrated, turns on in each of the first to Nth charging periods T1 to TN. That is, among the switches, a switch corresponding to a column indicative of "ON" in the figure is turned into an ON state by the control circuit, not illustrated, and the other switches are turned into an off state.

As illustrated in FIG. 91, in each of the charging periods T1 to TN, the switches Sa1 and Sd2 are turned on in the first half of the first charging period so as to charge the cell Cell1 and store electric charge in the capacitor C1, and the switches Sb2 and Sd2 are turned on in a first half of each of the second charging period and its subsequent charging periods so as to store, in the coil L1, a charging current. Then, corresponding switches for both ends of each cell are turned on in a second half of each of the charging periods T1 to TN so as to charge the cells Cell2 to CellN, as described above. As described, the control circuit, not illustrated, repeatedly controls each of the switches to turn on as shown in the first to Nth charging periods T1 to TN described above. Accordingly, it is possible to realize a balance charging circuit using a single coil L1.

Note that the present embodiment is applicable to a case where it is necessary that discharge of the cell Cell1 be suppressed.

(Configuration of Balance Charging Circuit According to Fourteenth Embodiment)

Figure 92:
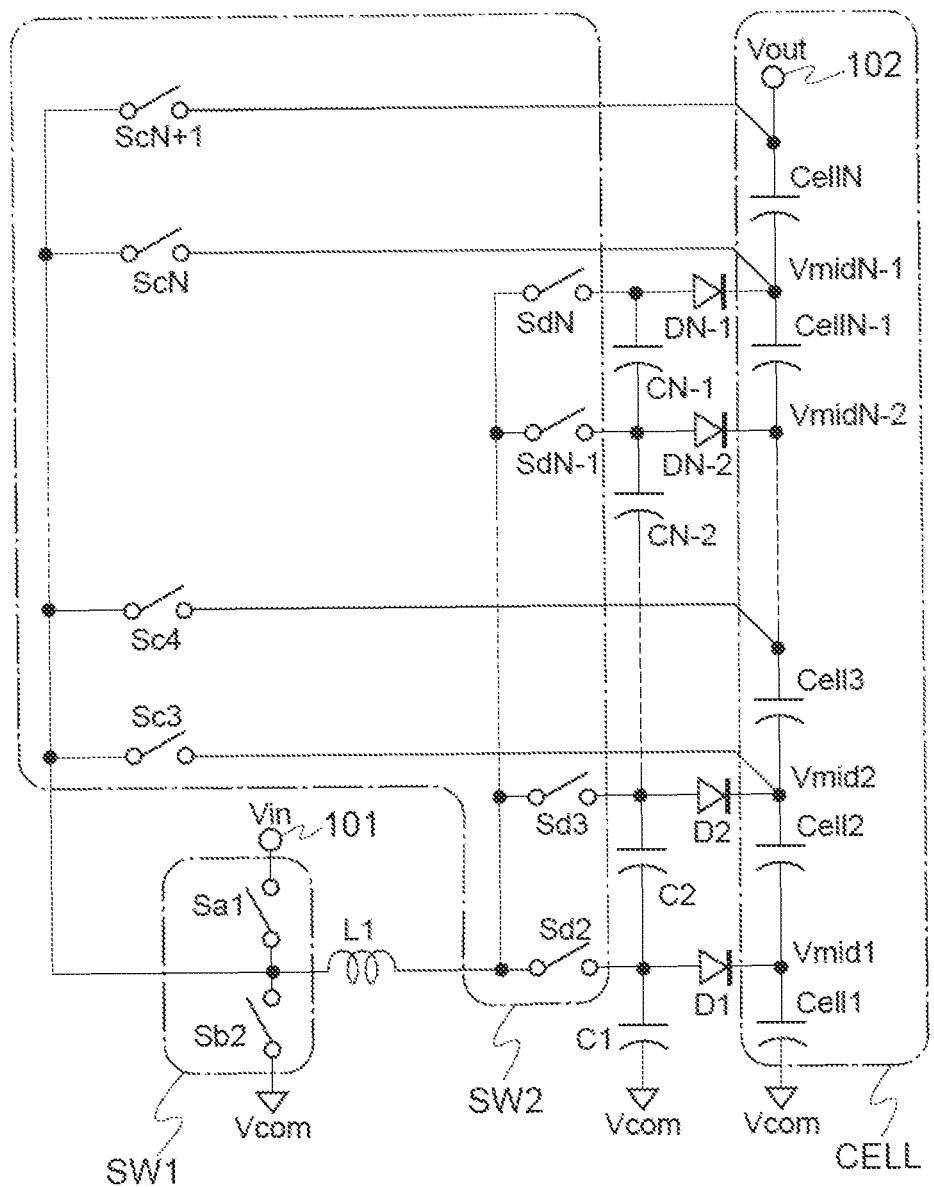
FIG. 92 is a circuit diagram illustrating a fourteenth embodiment of the present invention.
Figure 93:
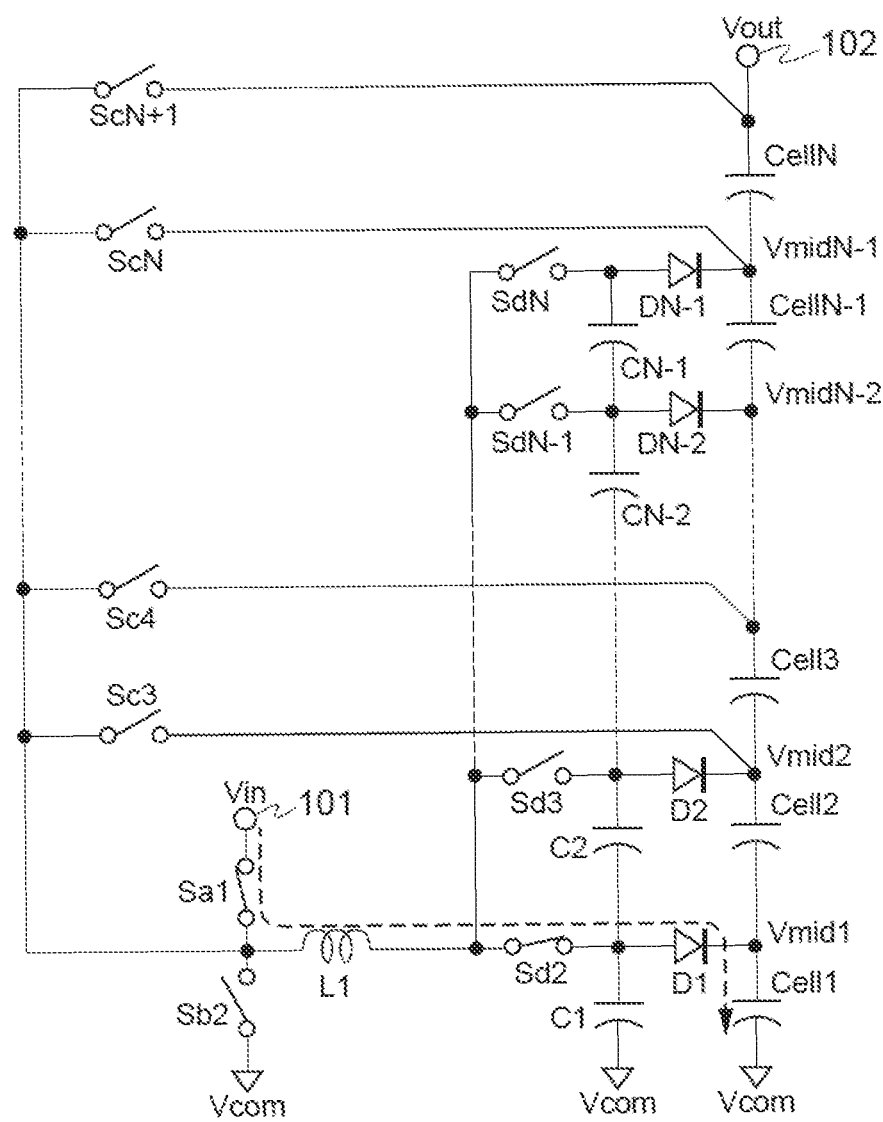
FIG. 93 is a view to explain an operation of the fourteenth embodiment of the present invention.
Figure 94:
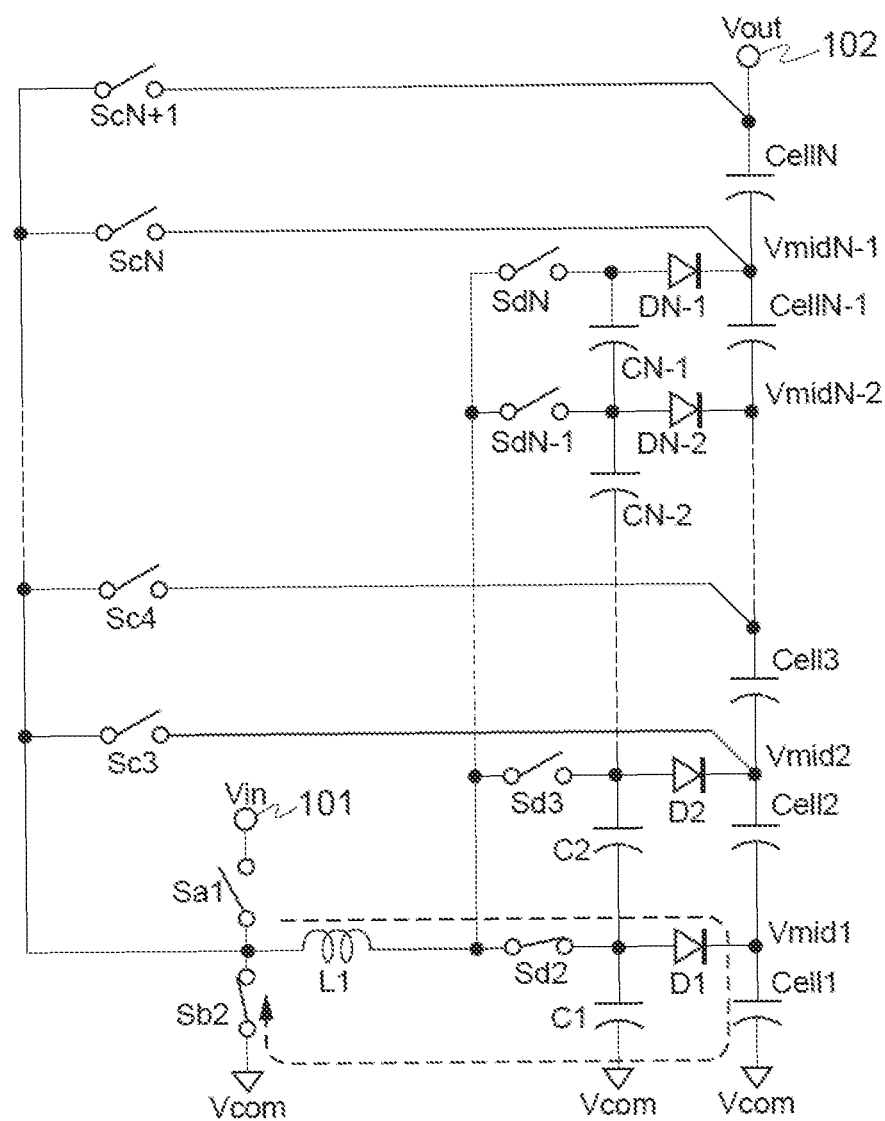
FIG. 94 is a view to explain an operation of the fourteenth embodiment of the present invention.
Figure 95:
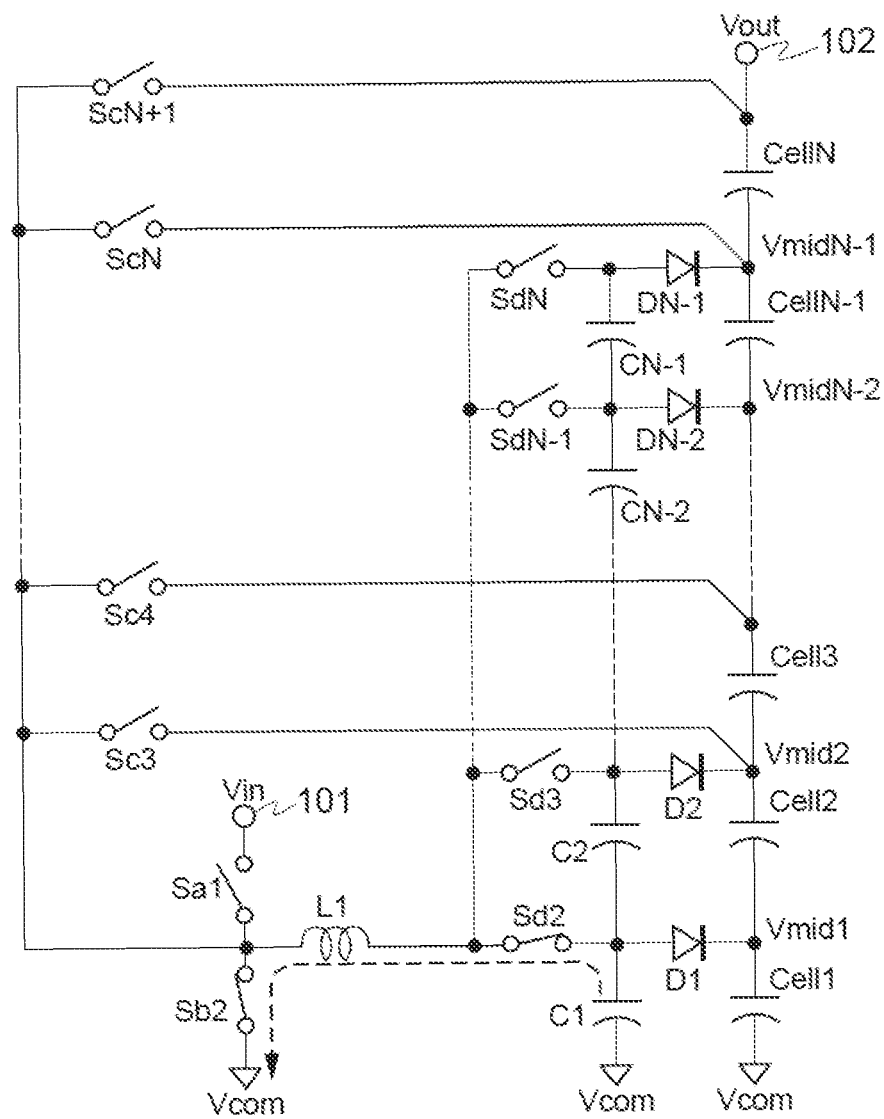
FIG. 95 is a view to explain an operation of the fourteenth embodiment of the present invention.
Figure 96:
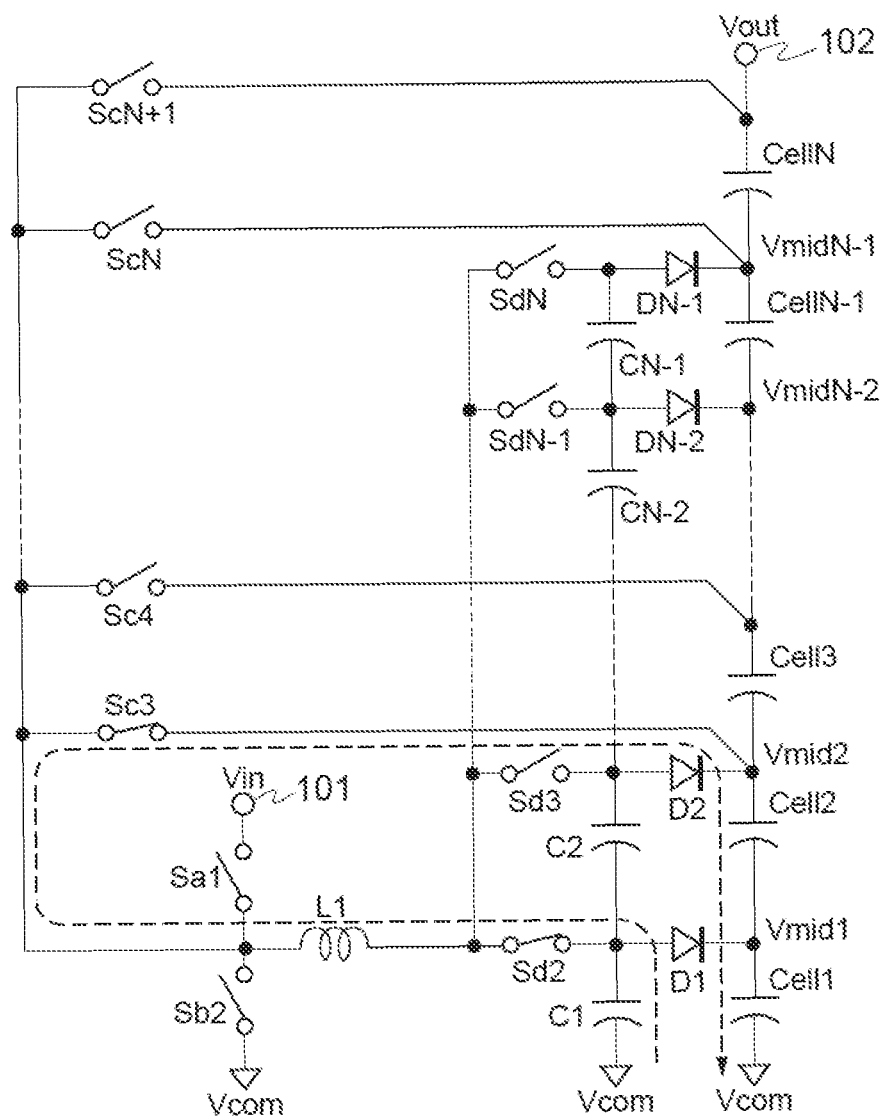
FIG. 96 is a view to explain an operation of the fourteenth embodiment of the present invention.
Figure 97:
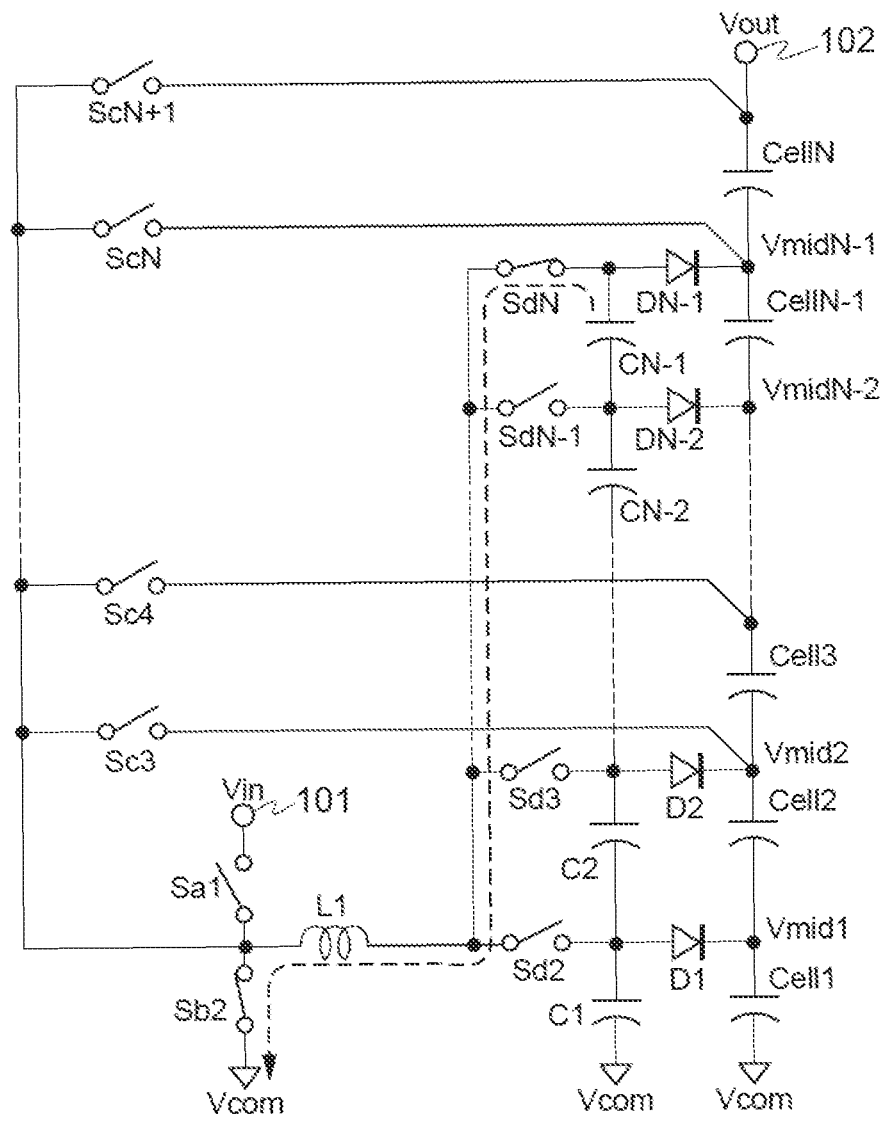
FIG. 97 is a view to explain an operation of the fourteenth embodiment of the present invention.
Figure 98:
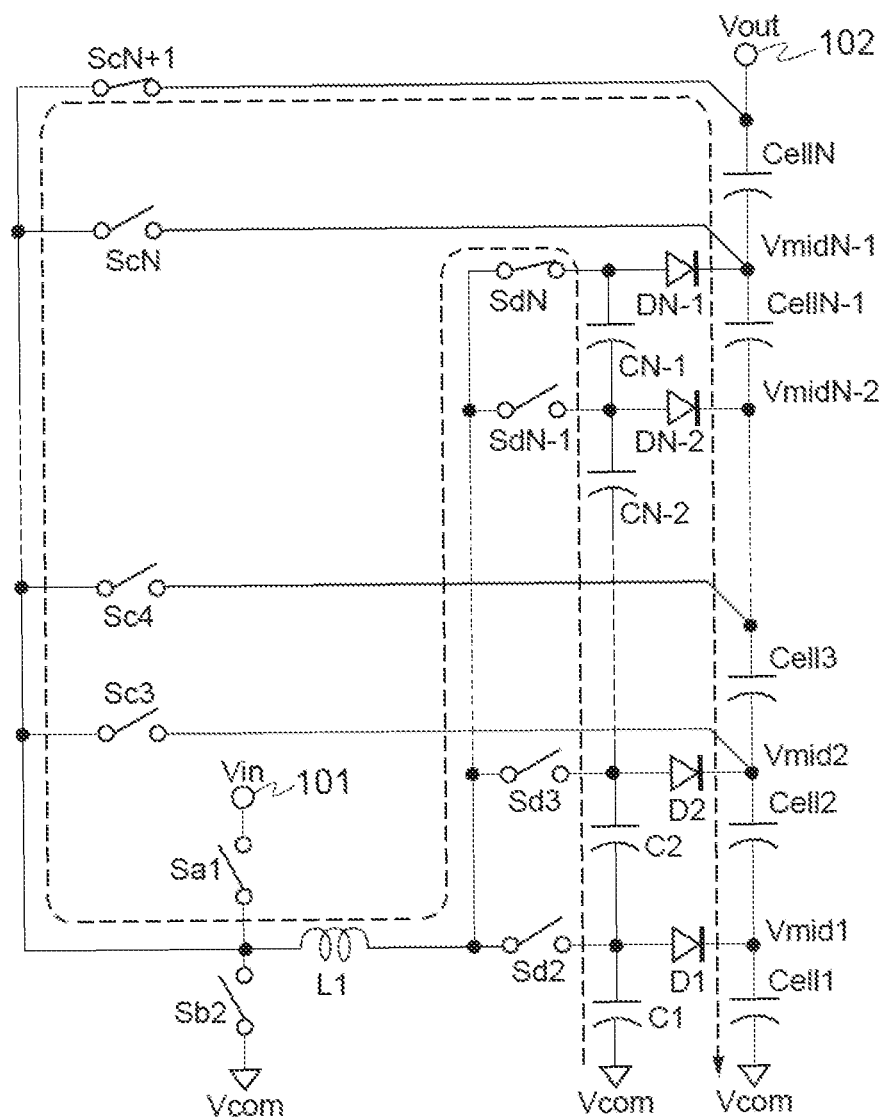
FIG. 98 is a view to explain an operation of the fourteenth embodiment of the present invention.

FIG. 92 is a circuit diagram illustrating an exemplary configuration of a balance charging circuit for charging, by use of a single coil L1, N pieces of storage cells Cell1 to CellN which are connected in series. In FIG. 92, the balance charging circuit includes a single coil L1, a switch group SW1 for electrically connecting an input terminal 101 into which a charging voltage is input and the coil L1, a switch group SW2 for electrically connecting both ends of each of the storage cells Cell1 to CellN to both ends of the coil L1, (N−1) pieces of diodes D1 to DN−1, and (N−1) pieces of capacitors C1 to CN−1.

The switch group SW1 includes a switch Sa1 and a switch Sb2. One end of the switch Sa1 is connected to the input terminal 101, and another end thereof is connected to one end of the coil L1. One end of the switch Sb2 is connected to a reference voltage terminal, and another end thereof is connected to the one end of the coil L1.

The switch group SW2 includes switches Sc3 to ScN+1 and switches Sd2 to SdN. One ends of the switches Sc3 to ScN+1 are connected to contact points of N pieces of the storage cells Cell2 to CellN and an output terminal 102, and another ends thereof are connected to the one end of the coil L1. One ends of the switches Sd2 to SdN are connected to the contact points of N pieces of the storage cells Cell1 to CellN, and another ends thereof are connected to another end of the coil L1.

The diodes D1 to DN−1 are provided so as to correspond to respective switches Sd2 to SdN and respective storage cells Cell1 to CellN−1. An anode of each of the diodes D1 to DN−1 is connected to one end of a corresponding one of the switches Sd2 to SdN, and a cathode thereof is connected to a contact point between a corresponding storage cell and another storage cell. These diodes D1 to DN−1 are each provided so as to suppress discharge from a corresponding storage cell.

The capacitors C1 to CN−1 are each provided to store electric charge once so as to store, in the coil L1, a current to charge a corresponding one of the storage cells Cell2 to CellN by discharge of the electric charge thus stored.

(Operation of Balance Charging Circuit According to Fourteenth Embodiment)

Next, an operation of the balance charging circuit for series-connected cells according to the fourteenth embodiment of the present invention will be explained. FIGS. 93 to 99 are views to explain operations of the fourteenth embodiment of the present invention.

In the balance charging circuit for series-connected cells according to the fourteenth embodiment of the present invention, in order to charge series-connected storage cells and maintain voltage balance between the series-connected cells, first to Nth charging periods are set by a control circuit which is not illustrated in the figure.

In a first half of the first charging period, the control circuit, not illustrated, turns on the switches Sa1 and Sd2. Then, an input voltage Vin is input from the input terminal 101, so that the cell Cell1 is charged while a charging current is stored in the coil L1. A path of the charging current is indicated by a dotted arrow in FIG. 93. While this cell Cell1 is charged, electric charge is stored in the capacitor C1.

Next, in a second half of the first charging period, the control circuit, not illustrated, turns off the switch Sa1 and turns on the switch Sb2 while the switch Sd2 is being turned on. Then, the cell Cell1 is charged with the charging current stored in the coil L1. A path of the charging current is indicated by a dotted arrow in FIG. 94.

After that, in a first half of the second charging period, the control circuit, not illustrated, maintains the switches Sd2 and Sb2 to be turned on. This causes discharge from the capacitor C1, thereby storing, in the coil L1, a charging current to charge the cell Cell2 with electric charge. At this time, discharge from the cell Cell1 is suppressed by the diode D1. A path of the charging current is indicated by a dotted arrow in FIG. 95.

Next, in a second half of the second charging period, the switch Sb2 is turned off and the switch Sc3 is turned on while the switch Sd2 is being turned on. Then, the cell Cell2 is charged with the charging current charged in the coil L1. A path of the charging current is indicated by a dotted arrow in FIG. 96.

Then, in the third charging period and its subsequent periods, the control circuit, not illustrated, turns on the switch Sb2 and switches corresponding to the capacitors C2 to CN−1 in a first half of each of the charging periods to cause discharge from the capacitor, thereby storing, in the coil L1, a charging current to charge the cells Cell3 to CellN with electric charge. Accordingly, in the charging period TN, the control circuit, not illustrated, turns on the switches Sb2 and SdN in a first half of the charging period TN to cause discharge from the capacitor CN−1, thereby storing, in the coil L1, a charging current to charge the cell CellN with electric charge. A path of the charging current is indicated by a dotted arrow in FIG. 97.

Next, in a second half of the charging period TN, the control circuit, not illustrated, turns on the switches SdN and ScN+1 to charge the cell CellN with the charging current charged in the coil L1. A path of the charging current is indicated by a dotted arrow in FIG. 98.

Here, controlled contents by the control circuit, not illustrated, are explained with reference to FIG. 99. FIG. 99 illustrates which switch, among the switches in FIG. 92, the control circuit, not illustrated, turns on in each of the first to Nth charging periods T1 to TN. That is, among the switches, a switch corresponding to a column indicative of "ON" in the figure is turned into an ON state by the control circuit, not illustrated, and the other switches are turned into an off state.

As illustrated in FIG. 99, in each of the charging periods T1 to TN, the switches Sa1 and Sd2 are turned on in the first half of the first charging period so as to charge the cell Cell1 and store electric charge in the capacitor C1, and the switch Sb2 and switches corresponding to each capacitor are turned on in a first half of each of the second charging period and its subsequent charging periods so as to store, in the coil L1, a charging current. Then, corresponding switches for both ends of each cell are turned on in a second half of each of the charging periods T1 to TN so as to charge the cells Cell2 to CellN, as described above. As described, the control circuit, not illustrated, repeatedly controls each of the switches to turn on as shown in the first to Nth charging periods T1 to TN described above. Accordingly, it is possible to realize a balance charging circuit using a single coil L1.

Note that the present embodiment is applicable to a case where it is necessary that discharge of the cells Cell1 to CellN be suppressed.

(Cell Balance Control 1 at the Time of Discharge)

As regard to the series-connected cells charged by the balance charging circuit for series-connected cells, at the time of discharge, that is, load driving, if a specific storage cell constituting the series-connected cells is discharged in an unbalanced manner, the life of the cell may be shorten. Therefore, at the time of discharge of the series-connected cells, it is preferable that the discharge is performed while charging voltages of respective storage cells constituting the series-connected cells are kept in balance with each other.

In order to cause discharge while the charging voltages of the storage cells are kept in balance with each other, a storage cell having a high charging voltage and a storage cell having a low charging voltage are searched by current monitoring circuits, and the following operations may be performed.

For example, in the balance charging circuits explained with reference to FIGS. 33, 39, and 46, a high-voltage storage cell CellP (P=1 to N) and a low-voltage storage cell CellQ (Q=1 to N, except for P) are searched, and voltages of the respective storage cells are kept in balance with each other by performing the following operations (1) and (2):

(1) The switch ScP+1 and the switch SdP are turned on in the charging period Txa, so as to store a current in the coil L1 from the storage cell CellP; and (2) The switch ScQ and the switch SdQ+1 are turned on in the charging period Txb, so as to charge the storage cell CellQ with the current stored in the coil L1 in the charging period Txa.

That is, as illustrated in FIG. 100, the switch SdP and the switch ScP+1 are turned on by the control circuit, not illustrated, in the first half period Txa of the charging period Tx. Further, the switch SdQ+1 and the switch ScQ are turned on by the control circuit, not illustrated, in the second half period Txb of the charging period Tx.

(Cell Balance Control 2 at the Time of Discharge)

As regard to the balance charging circuits explained with reference to FIGS. 33, 39, and 46, a high-voltage storage cell CellP (P=1 to N) and a low-voltage storage cell CellQ (Q=1 to N, except for P) are searched, and the switches may be controlled as follows. For example, the switch ScP and the switch SdP+1 are turned on by the control circuit, not illustrated, in the first half period Txa of the charging period Tx so as to store a current in the coil L1 from the storage cell CellP. Next, the switch ScQ+1 and the switch SdQ are turned on by the control circuit, not illustrated, in the second half period Txb of the charging period Tx so as to charge the storage cell CellQ with the current thus stored in the coil L1.

That is, if Q>1 is satisfied, the switch ScP and the switch SdP+1 are turned on by the control circuit, not illustrated, in the first half period Txa of the charging period Tx, as illustrated in FIG. 101. Further, the switch SdQ and the switch ScQ+1 are turned on by the control circuit, not illustrated, in the second half period Txb of the charging period Tx. However, if Q=1 is satisfied, the switch Sb1 and the switch Sc2 are turned on by the control circuit, not illustrated, in the second half period Txb of the charging period Tx, as illustrated in FIG. 102.

(Cell Balance Control 3 at the Time of Discharge)

In regard to the balance charging circuit explained with reference to FIG. 52, the cell balance at the time of discharge is limited to charge-transfer from an odd-numbered storage cell to an even-numbered storage cell and vice versa. A high-voltage storage cell CellP (P=1 to N) and a low-voltage storage cell CellQ (Q=1 to N, and P+Q is an odd number) are searched, and voltages of the respective storage cells are kept in balance with each other by performing the following operations (1) and (2):

(1) The switch SfP−1 and the switch SfP are turned on in the first half period Txa of the charging period Tx, so as to store a current in the coil L1 from the storage cell CellP; and (2) The switch SfQ−1 and the switch SfQ are turned on in the second half period Txb of the charging period Tx, so as to charge the storage cell CellQ with the current stored in the coil L1 in the period Txa.

That is, as illustrated in FIG. 103, the switch SfP−1 and the switch SfP are turned on by the control circuit, not illustrated, in the first half period Txa of the charging period Tx. Further, the switch SfQ−1 and the switch SfQ are turned on by the control circuit, not illustrated, in the second half period Txb of the charging period Tx.

(Cell Balance Control 4 at the Time of Discharge)

As regard to the balance charging circuit explained with reference to FIG. 63, a high-voltage storage cell CellP (P=1 to N) and a low-voltage storage cell CellQ (Q=1 to N, except for P) are searched at the time of discharge, and the switches may be controlled as illustrated in FIGS. 104 to 106.

That is, if P>1 is satisfied, the switch SdP and the switch ScP+1 are turned on by the control circuit, not illustrated, in the first half period Txa of the charging period Tx, as illustrated in FIG. 104. Further, the switch ScQ and the switch SdQ+1 are turned on by the control circuit, not illustrated, in the second half period Txb of the charging period Tx.

However, if P=1 is satisfied, the switch Sb2 and the switch Sd2 are turned on by the control circuit, not illustrated, in the first half period Txa of the charging period Tx, as illustrated in FIG. 105. Further, the switch ScQ and the switch SdQ+1 are turned on by the control circuit, not illustrated, in the second half period Txb of the charging period Tx.

Furthermore, if Q=1 is satisfied, the switch SdP and the switch ScP+1 are turned on by the control circuit, not illustrated, in the first half period Txa of the charging period Tx, as illustrated in FIG. 106. Further, the switch Sd2 and the switch Sb2 are turned on by the control circuit, not illustrated, in the second half period Txb of the charging period Tx.

(Cell Balance Control 5 at the Time of Discharge)

Figures 108, 109:
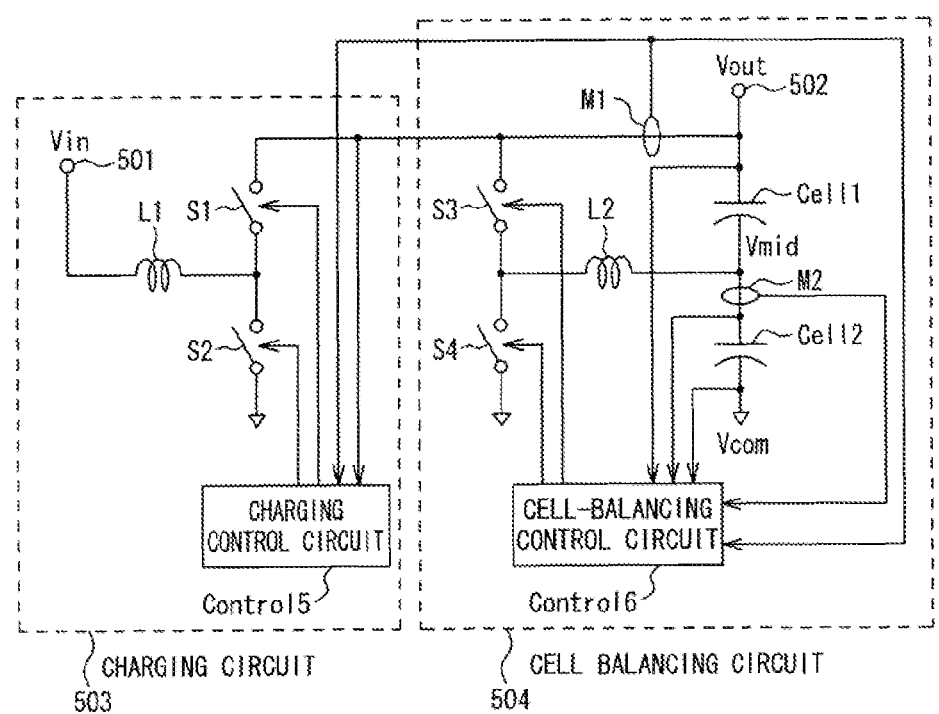
FIG. 108 is a view illustrating an example of a cell balancing control at the time of discharge.
FIG. 109 is a circuit diagram illustrating a conventional balance charging circuit for series-connected cells.
Figure 110:
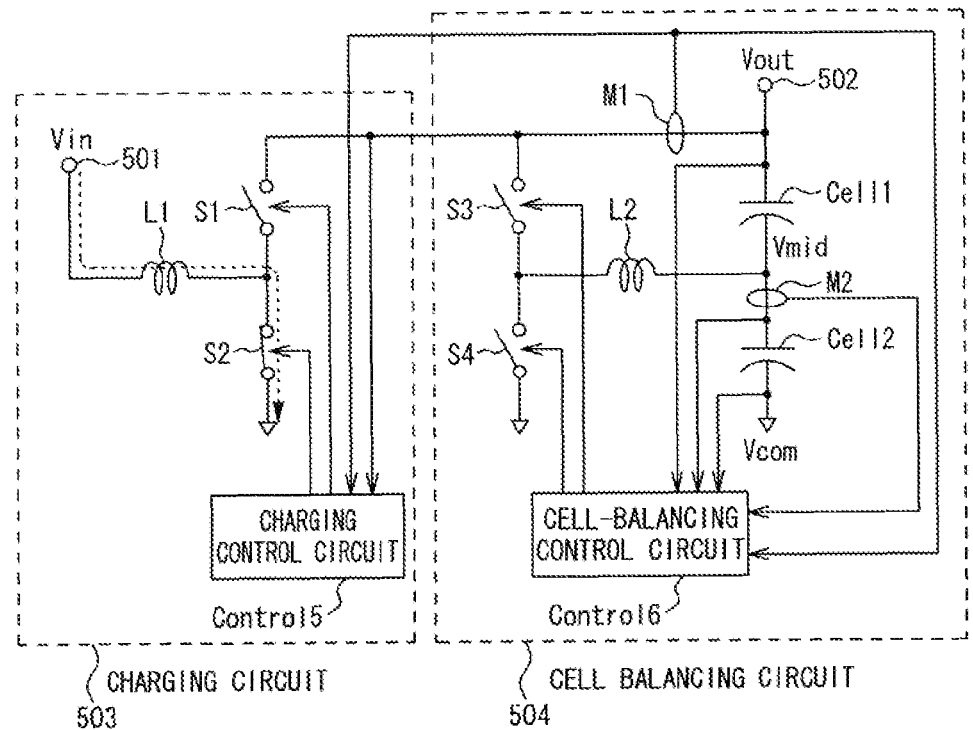
FIG. 110 is a view to explain an operation of the conventional balance charging circuit for series-connected cells.
Figure 111:
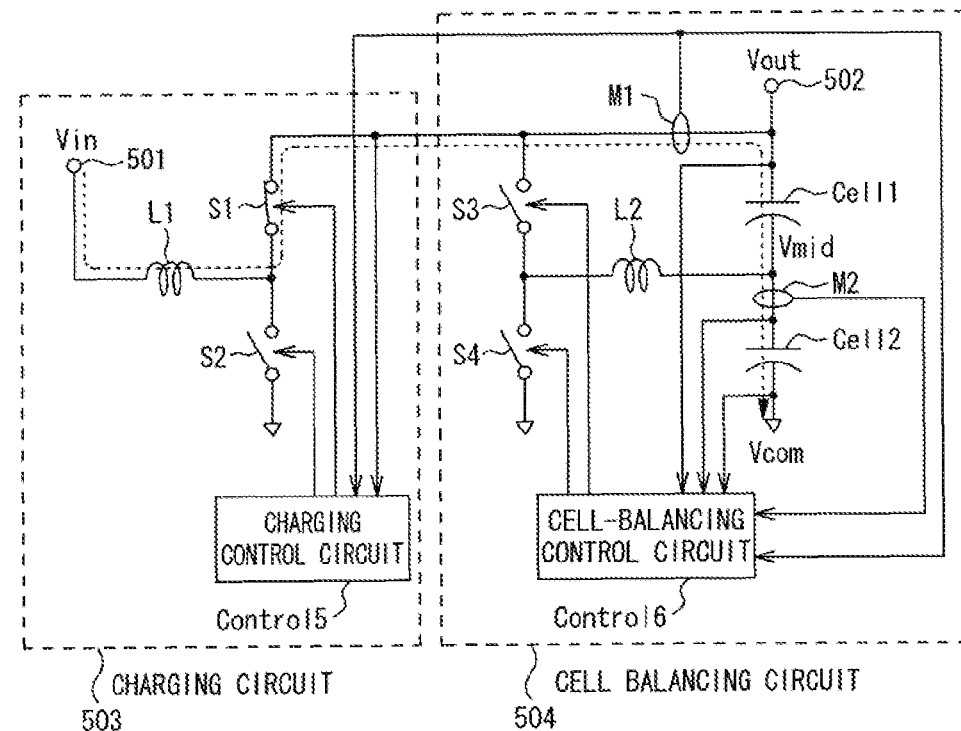
FIG. 111 is a view to explain an operation of the conventional balance charging circuit for series-connected cells.
Figure 112:
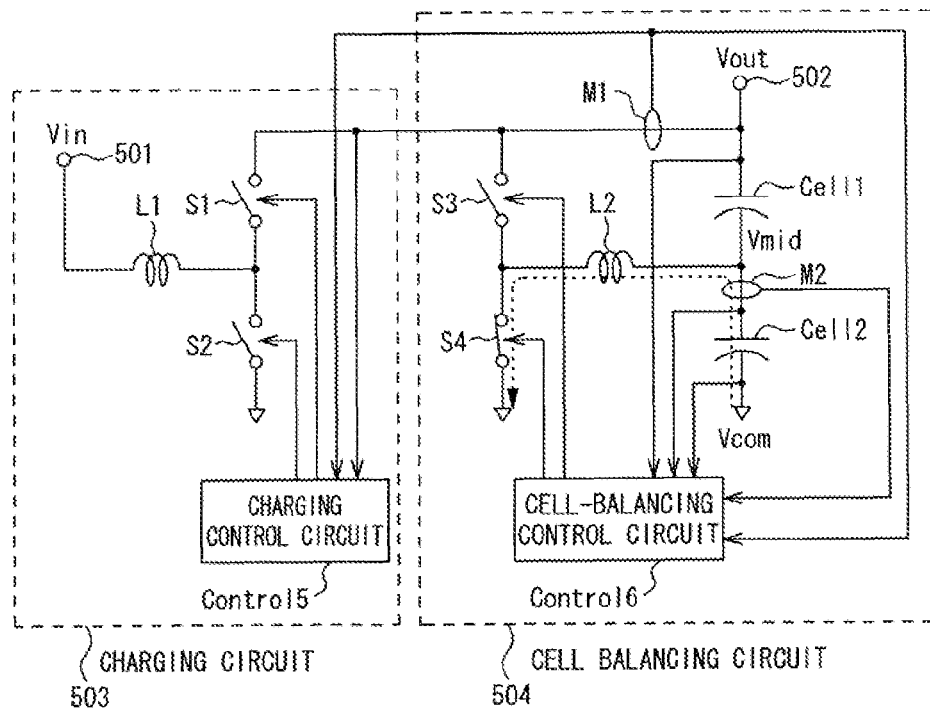
FIG. 112 is a view to explain an operation of the conventional balance charging circuit for series-connected cells.
Figure 113:
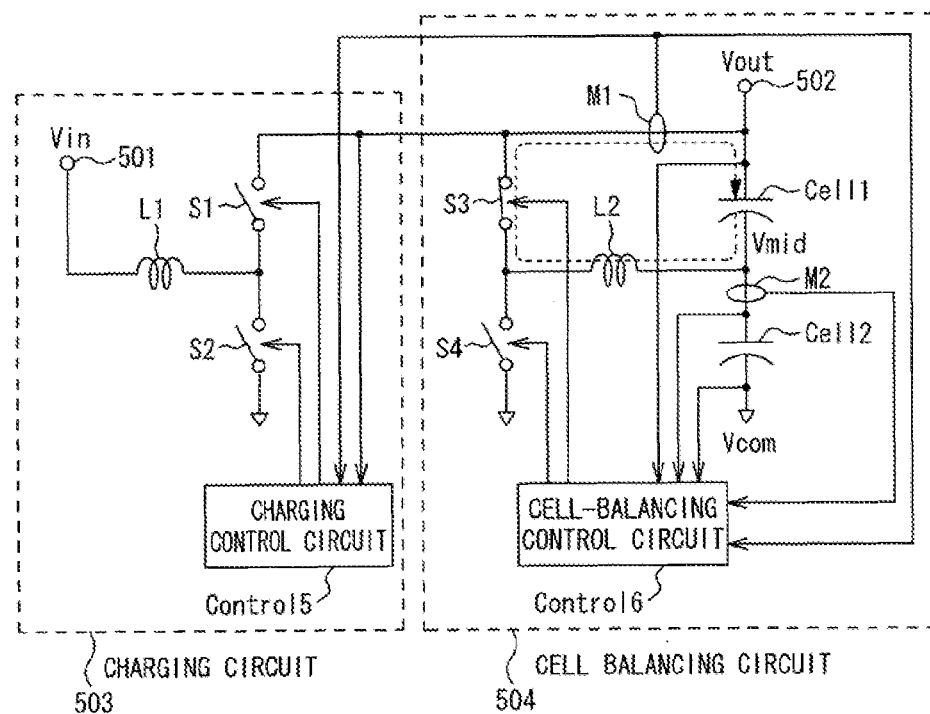
FIG. 113 is a view to explain an operation of the conventional balance charging circuit for series-connected cells.

As regard to the balance charging circuit explained with reference to FIG. 85, a high-voltage storage cell CellP (P=2 to N) and a low-voltage storage cell CellQ (Q=1 to N, except for P) are searched at the time of discharge, and the switches may be controlled as illustrated in FIGS. 107 and 108.

That is, if P>1 is satisfied, the switch SdP and the switch ScP+1 are turned on by the control circuit, not illustrated, in the first half period Txa of the charging period Tx, as illustrated in FIG. 107. Further, the switch ScQ and the switch SdQ+1 are turned on by the control circuit, not illustrated, in the second half period Txb of the charging period Tx.

Furthermore, if Q=1 is satisfied, the switch SdP and the switch ScP+1 are turned on by the control circuit, not illustrated, in the first half period Txa of the charging period Tx, as illustrated in FIG. 108. Further, the switch Sd2 and the switch Sb2 are turned on by the control circuit, not illustrated, in the second half period Txb of the charging period Tx.

In the balance charging circuit explained above with reference to FIG. 85, the diode D1 is provided. Therefore, in a case of P=1, it is impossible to perform cell balance at the time of discharge.

Note that as regard to the balance charging circuit explained with reference to FIG. 92, since the diodes D1 to DN−1 are provided, it is impossible to perform cell balance at the time of discharge.

(Balance Charging Method for Series-Connected Storage Cells)

In the balance charging circuit for series-connected storage cells according to each of the embodiments described above, the following balance charging method for series-connected storage cells is implemented. That is, such a balance charging method for series-connected storage cells is implemented in which a power is supplied from a power supply connected to an input terminal, and first to Nth (N is an integer of 2 or more, the same applies hereinafter) storage cells connected in series sequentially from a reference voltage terminal between an output terminal and the reference voltage terminal are charged in a balanced manner, and which method includes: a first step of electrically connecting a coil between the input terminal and the reference voltage terminal and charging the coil with a charging current to charge the kth ($1 \leq k \leq N$) storage cell; a second step of electrically connecting the coil to both ends of the kth storage cell and charging the kth storage cell with the charging current charged in the coil in the first step; and a third step of repeatedly performing the first and second steps to charge the first to Nth storage cells one by one. By employing this method, it is not necessary to provide a plurality of coils and it is possible to charge series-connected storage cells in a balanced manner by a single coil.

INDUSTRIAL APPLICABILITY

The balance charging circuit for series-connected cells according to the present invention is preferably applicable to a field such as an electricity storage system.

REFERENCE SIGNS LIST 101, 201, 301, 401, 501: Input Terminal
102, 202, 302, 402, 502: Output Terminal
503: Charging Control Circuit
504: Cell Balancing Circuit
C1 to CN−1: Capacitor
Cell1 to CellN: Storage Cell
Control 1 to Control 6: Control Circuit
D1 to DN−1: Diode
L1, L2: Coil
M1, M2: Current Monitoring Circuit
S1 to S6: Switch

The invention claimed is:

1. A balance charging circuit for series-connected storage cells for charging, in a balanced manner, a first storage cell and a second storage cell connected in series and having one series-connected end connected to an output terminal and another series-connected end connected to a reference voltage terminal, the balancing charging circuit comprising:

a coil provided in common for the first storage cell and the second storage cell and temporarily storing a power supplied from a power supply to charge the first storage cell and the second storage cell; and a switch section for electrically connecting the coil to one of the first storage cell and the second storage cell to charge the one of the first storage cell and the second storage cell, and then for electrically connecting the coil to the other one of the first storage cell and the second storage cell to charge the other one of the first storage cell and the second storage cell;

wherein the switch section includes a plurality of switches for switching a path of a charging current flowing in the coil, the balance charging circuit further comprising:

a control circuit for controlling the plurality of switches to be turned on and off and for setting repeatedly in turn a first charging period in which the coil is charged with a charging current to charge the second storage cell, a second charging period in which the second storage cell is charged with the charging current thus charged in the coil, a third charging period in which the coil is charged with a charging current to charge the first storage cell, and a fourth charging period in which the first storage cell is charged with the charging current thus charged in the coil, wherein:

in the first charging period, the control circuit controls the plurality of switches to be turned on and off to form a path of a charging current flowing into the reference voltage terminal through the coil;

in the second charging period, the control circuit controls the plurality of switches to be turned on and off to form a path of a charging current flowing into the second storage cell from the coil; and in the third charging period, the control circuit controls the plurality of switches to be turned on and off to form a path of a charging current flowing into the reference voltage terminal through the coil; and in the fourth charging period, the control circuit controls the plurality of switches to be turned on and off to electrically conduct one end of the coil to one end of the first storage cell, electrically conduct another end of the coil to another end of the first storage cell, and form a path of a charging current flowing into the first storage cell from the coil;

wherein the plurality of switches includes:

a first switch having one end connected to a contact point where the first storage cell and the second storage cell are connected to each other, a second switch having one end connected to an input terminal, a third switch having one end connected to the reference voltage terminal, a fourth switch having one end connected to the output terminal, a fifth switch having one end connected to the reference voltage terminal, and a sixth switch having one end connected to the contact point where the first storage cell and the second storage cell are connected to each other, wherein one end of the coil is connected to another end of the first switch, another end of the second switch, and another end of the third switch, and another end of the coil is connected to another end of the fourth switch, another end of the fifth switch, and another end of the sixth switch, and wherein in the first charging period, the control circuit turns on the second and sixth switches and turns off the first, third, fourth, and fifth switches, in the second charging period, the control circuit turns on the third and sixth switches and turns off the first, second, fourth, and fifth switches, in the third charging period, the control circuit turns on the second and fifth switches and turns off the first, third, fourth, and sixth switches, and in the fourth charging period, the control circuit turns on the first and fourth switches and turns off the second, third, fifth, and sixth switches.

2. A balance charging circuit for series-connected storage cells for charging, in a balanced manner, a first storage cell and a second storage cell connected in series and having one series-connected end connected to an output terminal and another series-connected end connected to a reference voltage terminal, the balancing charging circuit comprising:

a coil provided in common for the first storage cell and the second storage cell and temporarily storing a power supplied from a power supply to charge the first storage cell and the second storage cell; and a switch section for electrically connecting the coil to one of the first storage cell and the second storage cell to charge the one of the first storage cell and the second storage cell, and then for electrically connecting the coil to the other one of the first storage cell and the second storage cell to charge the other one of the first storage cell and the second storage cell;

wherein the switch section includes a plurality of switches for switching a path of a charging current flowing in the coil, the balance charging circuit further comprising:

a control circuit for controlling the plurality of switches to be turned on and off and for setting repeatedly in turn a first charging period in which the coil is charged with a charging current to charge the second storage cell, a second charging period in which the second storage cell is charged with the charging current thus charged in the coil, a third charging period in which the coil is charged with a charging current to charge the first storage cell, and a fourth charging period in which the first storage cell is charged with the charging current thus charged in the coil, wherein:

in the first charging period, the control circuit controls the plurality of switches to be turned on and off to form a path of a charging current flowing into the reference voltage terminal through the coil;

in the second charging period, the control circuit controls the plurality of switches to be turned on and off to form a path of a charging current flowing into the second storage cell from the coil;

in the third charging period, the control circuit controls the plurality of switches to be turned on and off to form a path of a charging current flowing into the reference voltage terminal through the coil; and in the fourth charging period, the control circuit controls the plurality of switches to be turned on and off to electrically conduct one end of the coil to one end of the first storage cell, electrically conduct another end of the coil to another end of the first storage cell, and form a path of a charging current flowing into the first storage cell from the coil;

wherein the plurality of switches includes:

a first switch having one end connected to a contact point where the first storage cell and the second storage cell are connected to each other, a second switch having one end connected to an input terminal, a third switch having one end connected to the reference voltage terminal, a fourth switch having one end connected to the output terminal, a fifth switch having one end connected to the reference voltage terminal, and a sixth switch having one end connected to the contact point where the first storage cell and the second storage cell are connected to each other, wherein one end of the coil is connected to another end of the first switch, another end of the second switch, and another end of the third switch, and another end of the coil is connected to another end of the fourth switch, another end of the fifth switch, and another end of the sixth switch, and wherein in the first charging period, the control circuit turns on the second and fifth switches and turns off the first, third, fourth, and sixth switches, in the second charging period, the control circuit turns on the third and sixth switches and turns off the first, second, fourth, and fifth switches, in the third charging period, the control circuit turns on the second and fifth switches and turns off the first, third, fourth, and sixth switches, and in the fourth charging period, the control circuit turns on the first and fourth switches and turns off the second, third, fifth, and sixth switches.

3. A balance charging circuit for series-connected storage cells for charging, in a balanced manner, a first storage cell and a second storage cell connected in series and having one series-connected end connected to an output terminal and another series-connected end connected to a reference voltage terminal, the balancing charging circuit comprising:

a coil provided in common for the first storage cell and the second storage cell and temporarily storing a power supplied from a power supply to charge the first storage cell and the second storage cell; and a switch section for electrically connecting the coil to one of the first storage cell and the second storage cell to charge the one of the first storage cell and the second storage cell, and then for electrically connecting the coil to the other one of the first storage cell and the second storage cell to charge the other one of the first storage cell and the second storage cell;

wherein the switch section includes a plurality of switches for switching a path of a charging current flowing in the coil, the balance charging circuit further comprising:

a control circuit for controlling the plurality of switches to be turned on and off and for setting repeatedly in turn a first charging period in which the coil is charged with a charging current to charge the second storage cell, a second charging period in which the second storage cell is charged with the charging current thus charged in the coil, a third charging period in which the coil is charged with a charging current to charge the first storage cell, and a fourth charging period in which the first storage cell is charged with the charging current thus charged in the coil, wherein:

in the first charging period, the control circuit controls the plurality of switches to be turned on and off to form a path of a charging current flowing into the reference voltage terminal through the coil;

in the second charging period, the control circuit controls the plurality of switches to be turned on and off to form a path of a charging current flowing into the second storage cell from the coil;

in the third charging period, the control circuit controls the plurality of switches to be turned on and off to form a path of a charging current flowing into the reference voltage terminal through the coil; and
in the fourth charging period, the control circuit controls the plurality of switches to be turned on and off to electrically conduct one end of the coil to one end of the first storage cell, electrically conduct another end of the coil to another end of the first storage cell, and form a path of a charging current flowing into the first storage cell from the coil;
wherein the plurality of switches includes:
a first switch having one end connected to the output terminal,
a second switch having one end connected to an input terminal,
a third switch having one end connected to the reference voltage terminal,
a fourth switch having one end connected to the input terminal, and
a fifth switch having one end connected to a contact point where the first storage cell and the second storage cell are connected to each other,
wherein one end of the coil is connected to another end of the first switch, another end of the second switch, and another end of the third switch, and another end of the coil is connected to another end of the fourth switch and another end of the fifth switch, and
wherein in the first charging period, the control circuit turns on the second and fifth switches and turns off the first, third, and fourth switches,
in the second charging period, the control circuit turns on the third and fifth switches and turns off the first, second, and fourth switches,
in the third charging period, the control circuit turns on the third and fourth switches and turns off the first, second, and fifth switches, and
in the fourth charging period, the control circuit turns on the first and fifth switches and turns off the second, third, and fourth switches.

4. A balance charging circuit for series-connected storage cells for charging, in a balanced manner, a first storage cell and a second storage cell connected in series and having one series-connected end connected to an output terminal and another series-connected end connected to a reference voltage terminal, the balancing charging circuit comprising:
a coil provided in common for the first storage cell and the second storage cell and temporarily storing a power supplied from a power supply to charge the first storage cell and the second storage cell; and
a switch section for electrically connecting the coil to one of the first storage cell and the second storage cell to charge the one of the first storage cell and the second storage cell, and then for electrically connecting the coil to the other one of the first storage cell and the second storage cell to charge the other one of the first storage cell and the second storage cell;
wherein the switch section includes a plurality of switches for switching a path of a charging current flowing in the coil,
the balance charging circuit further comprising:
a control circuit for controlling the plurality of switches to be turned on and off and for setting repeatedly in turn a first charging period in which the coil is charged with a charging current to charge the second storage cell, a second charging period in which the second storage cell is charged with the charging current thus charged in the coil, a third charging period in which the coil is charged with a charging current to charge the first storage cell, and a fourth charging period in which the first storage cell is charged with the charging current thus charged in the coil, wherein:
in the first charging period, the control circuit controls the plurality of switches to be turned on and off to form a path of a charging current flowing into the reference voltage terminal through the coil;
in the second charging period, the control circuit controls the plurality of switches to be turned on and off to form a path of a charging current flowing into the second storage cell from the coil;
in the third charging period, the control circuit controls the plurality of switches to be turned on and off to form a path of a charging current flowing into the reference voltage terminal through the coil; and
in the fourth charging period, the control circuit controls the plurality of switches to be turned on and off to electrically conduct one end of the coil to one end of the first storage cell, electrically conduct another end of the coil to another end of the first storage cell, and form a path of a charging current flowing into the first storage cell from the coil;
wherein the plurality of switches includes:
a first switch having one end connected to the output terminal,
a second switch having one end connected to an input terminal, and
a third switch having one end connected to the reference voltage terminal,
wherein one end of the coil is connected to another end of the first switch, another end of the second switch, and another end of the third switch, and another end of the coil is connected to a contact point where the first storage cell and the second storage cell are connected to each other, and
wherein in the first charging period, the control circuit turns on the second switch and turns off the first and third switches,
in the second charging period, the control circuit turns on the third switch and turns off the first and second switches,
in the third charging period, the control circuit turns on the third switch and turns off the first and second switches, and
in the fourth charging period, the control circuit turns on the first switch and turns off the second and third switches.

5. A balance charging circuit for series-connected storage cells for charging, in a balanced manner, a first storage cell and a second storage cell connected in series and having one series-connected end connected to an output terminal and another series-connected end connected to a reference voltage terminal, the balancing charging circuit comprising:
a coil provided in common for the first storage cell and the second storage cell and temporarily storing a power supplied from a power supply to charge the first storage cell and the second storage cell; and
a switch section for electrically connecting the coil to one of the first storage cell and the second storage cell to charge the one of the first storage cell and the second storage cell, and then for electrically connecting the coil to the other one of the first storage cell and the second storage cell to charge the other one of the first storage cell and the second storage cell;

wherein the switch section includes a plurality of switches for switching a path of a charging current flowing in the coil, the balance charging circuit further comprising:

a control circuit for controlling the plurality of switches to be turned on and off and for setting repeatedly in turn a first charging period in which the coil is charged with a charging current to charge the second storage cell, a second charging period in which the second storage cell is charged with the charging current thus charged in the coil, a third charging period in which the coil is charged with a charging current to charge the first storage cell, and a fourth charging period in which the first storage cell is charged with the charging current thus charged in the coil, wherein:

in the first charging period, the control circuit controls the plurality of switches to be turned on and off to form a path of a charging current flowing into the reference voltage terminal through the coil;

in the second charging period, the control circuit controls the plurality of switches to be turned on and off to form a path of a charging current flowing into the second storage cell from the coil;

in the third charging period, the control circuit controls the plurality of switches to be turned on and off to form a path of a charging current flowing into the reference voltage terminal through the coil; and in the fourth charging period, the control circuit controls the plurality of switches to be turned on and off to electrically conduct one end of the coil to one end of the first storage cell, electrically conduct another end of the coil to another end of the first storage cell, and form a path of a charging current flowing into the first storage cell from the coil;

wherein the plurality of switches includes:

a first switch having one end connected to the output terminal, a second switch having one end connected to an input terminal, and a third switch having one end connected to the reference voltage terminal, the balance charging circuit further comprising:

a capacitor having one end connected to the reference voltage terminal, and a diode having a cathode connected to a contact point where the first storage cell and the second storage cell are connected to each other, wherein one end of the coil is connected to another end of the first switch, another end of the second switch, and another end of the third switch, and another end of the coil is connected to another end of the capacitor and an anode of the diode, and wherein in the first charging period, the control circuit turns on the second switch and turns off the first and third switches, in the second charging period, the control circuit turns on the third switch and turns off the first and second switches, in the third charging period, the control circuit turns on the third switch and turns off the first and second switches, and in the fourth charging period, the control circuit turns on the first switch and turns off the second and third switches.

6. The balance charging circuit for series-connected storage cells according to claim 3, wherein the control circuit sets times for turning on the switches in the second and fourth charging periods so that the charging current of the coil becomes zero at the end of the second and fourth charging periods.

7. A balance charging circuit for series-connected storage cells in which a power is supplied from a power supply connected to an input terminal, and first to Nth (N is an integer of 2 or more, the same applies hereinafter) storage cells connected in series sequentially from a reference voltage terminal between an output terminal and the reference voltage terminal are charged in a balanced manner, the balance charging circuit comprising:

a coil for storing a power supplied from the power supply and charging the first to Nth storage cells;

a first switch group for electrically connecting the coil between the input terminal and the reference voltage terminal;

a second switch group for electrically connecting the coil to both ends of each of the first to Nth storage cells to charge the each of the first to Nth storage cells, and a control circuit for repeatedly setting each of first to Nth charging periods wherein a kth (1≤k≤N) coil charging period in which the first switch group is controlled to be turned on and off to charge the coil with a charging current to charge the kth storage cell, and a kth storage cell charging period in which the second switch group is controlled to be turned on and off to charge the kth storage cell with the charging current charged in the coil in the kth coil charging period are taken as a kth charging period for charging the kth storage cell, wherein the first to Nth storage cells are charged one by one, and wherein:

in the kth coil charging period, the control circuit controls the first switch group to be turned on and off to form a path of a charging current flowing into the reference voltage terminal through the coil, and in the kth storage cell charging period, the control circuit controls the second switch group to be turned on and off to form a path of a charging current flowing into the kth storage cell from the coil.

8. The balance charging circuit for series-connected storage cells according to claim 7, wherein the first switch group includes:

a first coil connection switch having one end connected to the input terminal and another end connected to one end of the coil, and a second coil connection switch having one end connected to another end of the coil and another end connected to the reference voltage terminal; and wherein the second switch group includes:

first to Nth storage cell lower side connection switches each having one end connected to a lower side of each of the first to Nth storage cells, and another end connected to the one end of the coil, and first to (N−1)th storage cell upper side connection switches each having one end connected to an upper side of each of the first to (N−1)th storage cells, and another end connected to the another end of the coil.

9. The balance charging circuit for series-connected storage cells according to claim 8, wherein in the kth coil charging period, the control circuit turns on the first and second coil connection switches, and turns off the first to Nth storage cell lower side connection switches and the first to (N−1)th storage cell upper side connection switches; and in the kth storage cell charging period, the control circuit turns off the first and second coil connection switches, turns on the kth storage cell lower side connection switch and the kth storage cell upper side connection switch, and turns off the switches other than the kth storage cell lower side connection switch among the second to Nth storage cell lower side connection switches, and the switches other than the kth storage cell upper side connection switch among the first to (N−1)th storage cell upper side connection switches.

10. The balance charging circuit for series-connected storage cells according to claim 8, wherein in the first coil charging period, the control circuit turns on the first coil connection switch and the first storage cell upper side connection switch, and turns off the second coil connection switch, the first to Nth storage cell lower side connection switches, and the second to (N−1)th storage cell upper side connection switches;
  in the Mth (2≤M≤N) coil charging period, the control circuit turns on the first and second coil connection switches, and turns off the first to Nth storage cell lower side connection switches and the first to (N−1)th storage cell upper side connection switches,
  in the first storage cell charging period, the control circuit turns off the first and second coil connection switches, turns on the first storage cell lower side connection switch and the first storage cell upper side connection switch, and turns off the switches other than the first storage cell lower side connection switch among the first to Nth storage cell lower side connection switches, and the switches other than the first storage cell upper side connection switch among the first to (N−1)th storage cell upper side connection switches, and
  in the Mth storage cell charging period, the control circuit turns off the first and second coil connection switches, turns on the Mth storage cell lower side connection switch and the Mth storage cell upper side connection switch, and turns off the switches other than the Mth storage cell lower side connection switch among the first to Nth storage cell lower side connection switches, and the switches other than the Mth storage cell upper side connection switch among the first to (N−1)th storage cell upper side connection switches.

11. The balance charging circuit for series-connected storage cells according to claim 8, wherein in the first storage cell charging period, the control circuit turns on the first and second coil connection switches, and turns off the first to Nth storage cell lower side connection switches and the first to (N−1)th storage cell upper side connection switches,
  in the Mth coil charging period, the control circuit turns on the first and second coil connection switches, and turns off the first to Nth storage cell lower side connection switches and the first to (N−1)th storage cell upper side connection switches, in the first storage cell charging period, the control circuit turns on the first coil connection switch and the first storage cell upper side connection switch, and turns off the second coil connection switch, the first to Nth storage cell lower side connection switches, and the switches other than the first storage cell upper side connection switch among the first to (N−1)th storage cell upper side connection switches, and
  in the Mth storage cell charging period, the control circuit turns off the first and second coil connection switches, turns on the Mth storage cell lower side connection switch and the Mth storage cell upper side connection switch, and turns off the switches other than the Mth storage cell lower side connection switch among the first to Nth storage cell lower side connection switches, and the switches other than the Mth storage cell upper side connection switch among the first to (N−1)th storage cell upper side connection switches.

12. The balance charging circuit for series-connected storage cells according to claim 7, wherein the first switch group includes:
  a first coil connection switch having one end connected to the input terminal and another end connected to one end of the coil,
  a second coil connection switch having one end connected to another end of the coil and another end connected to the reference voltage terminal,
  a third coil connection switch having one end connected to the input terminal and another end connected to the another end of the coil, and
  a fourth coil connection switch having one end connected to the one end of the coil and another end connected to the reference voltage terminal, and
  wherein the second switch group includes:
  a kth (k is an even number) storage cell connection switch having one end connected to a lower side of each of the first to Nth storage cells and the output terminal, and another end connected to the one end of the coil, and
  a kth (k is an odd number) storage cell connection switch having one end connected to an upper side of each of the first to (N−1)th storage cells, and another end connected to the another end of the coil.

13. The balance charging circuit for series-connected storage cells according to claim 12, wherein in the kth (k is an odd number) coil charging period, the control circuit turns on the first and second coil connection switches, and turns off the third and fourth coil connection switches and the first to Nth storage cell connection switches,
  in the kth (k is an even number) coil charging period, the control circuit turns on the third and fourth coil connection switches, and turns off the first and second coil connection switches and the first to Nth storage cell connection switches,
  in the first storage cell charging period, the control circuit turns on the fourth coil connection switch and the first storage cell connection switch, and turns off the first to third coil connection switches and the second to Nth storage cell connection switches, and
  in the kth (k≥2) storage cell charging period, the control circuit turns on the kth storage cell connection switch and the (k−1)th storage cell connection switch, and turns off the first to fourth coil connection switches and the switches other than the kth and (k−1)th storage cell connection switches among the first to Nth storage cell connection switches.

14. The balance charging circuit for series-connected storage cells according to claim 13, wherein in the first coil charging period, the control circuit turns on the first storage cell connection switch instead of turning on the second coil connection switch.

15. The balance charging circuit for series-connected storage cells according to claim 13, wherein in the first storage cell charging period, the control circuit turns on the first coil connection switch instead of turning on the fourth coil connection switch.

16. The balance charging circuit for series-connected storage cells according to claim 7, wherein the first switch group includes:
  a first coil connection switch having one end connected to the input terminal and another end connected to one end of the coil, a second coil connection switch having one end connected to the input terminal and another end connected to another end of the coil, and a third coil connection switch having one end connected to the one end of the coil and another end connected to the reference voltage terminal, and wherein the second switch group includes:

first to (N−1)th storage cell lower side connection switches each having one end connected to a lower side of each of the third to Nth storage cells and the output terminal, and another end connected to the one end of the coil, and first to (N−1)th storage cell upper side connection switches each having one end connected to an upper side of each of the first to (N−1)th storage cells, and another end connected to the another end of the coil.

17. The balance charging circuit for series-connected storage cells according to claim 16, wherein in the first coil charging period, the control circuit turns on the first coil connection switch and the first storage cell upper side connection switch, in the second to Nth coil charging periods, the control circuit turns on the second and third coil connection switches, and turns off the first to (N−1)th storage cell lower side connection switches and the first to (N−1)th storage cell upper side connection switches, in the first storage cell charging period, the control circuit turns on the third coil connection switch and the first storage cell upper side connection switch, and turns off the first to (N−1)th storage cell lower side connection switches, and the switches other than the first storage cell upper side connection switch among the first to (N−1)th storage cell upper side connection switches, and in the kth (k≥2) storage cell charging period, the control circuit turns off the first to third coil connection switches, turns on the (k+1)th storage cell lower side connection switch and the kth storage cell upper side connection switch, and turns off the switches other than the (k+1)th storage cell lower side connection switch among the first to (N−1)th storage cell lower side connection switches, and the switches other than the kth storage cell upper side connection switch among the first to (N−1)th storage cell upper side connection switches.

18. The balance charging circuit for series-connected storage cells according to claim 7, wherein the first switch group includes:

a first coil connection switch having one end connected to the input terminal and another end connected to one end of the coil, and a second coil connection switch having one end connected to the one end of the coil and another end connected to the reference voltage terminal, and wherein the second switch group includes:

first to (N−1)th storage cell lower side connection switches each having one end connected to a lower side of each of the third to Nth storage cells and the output terminal, and another end connected to the one end of the coil, and first to (N−1)th storage cell upper side connection switches each having one end connected to an upper side of each of the first to (N−1)th storage cells, and another end connected to another end of the coil.

19. The balance charging circuit for series-connected storage cells according to claim 18, wherein in the first coil charging period, the control circuit turns on the first coil connection switch and the first storage cell upper side connection switch, in the second to Nth coil charging periods, the control circuit turns on the second coil connection switch and the first storage cell upper side connection switch, and turns off the first to (N−1)th storage cell lower side connection switches and the second to (N−1)th storage cell upper side connection switches, in the first storage cell charging period, the control circuit turns on the second coil connection switch and the first storage cell upper side connection switch, and turns off the first to (N−1)th storage cell lower side connection switches and the second to (N−1)th storage cell upper side connection switches, and in the kth (k≥2) storage cell charging period, the control circuit turns off the first and second coil connection switches, turns on the (k+1)th storage cell lower side connection switch and the kth storage cell upper side connection switch, and turns off the switches other than the (k+1)th storage cell lower side connection switch among the first to (N−1)th storage cell lower side connection switches, and the switches other than the kth storage cell upper side connection switch among the first to (N−1) storage cell upper side connection switches.

20. The balance charging circuit for series-connected storage cells according to claim 19, wherein in the kth (2≤k≤N) coil charging period, the control circuit turns on the second coil connection switch and the (k−1)th storage cell upper side connection switch, and turns off the first to (N−1)th storage cell lower side connection switches, and the switches other than the (k−1)th storage cell upper side connection switch among the first to (N−1)th storage cell upper side connection switches.

21. The balance charging circuit for series-connected storage cells according to claim 7, wherein the first switch group includes:

a first coil connection switch having one end connected to the input terminal and another end connected to one end of the coil, and a second coil connection switch having one end connected to the one end of the coil and another end connected to the reference voltage terminal, and wherein the second switch group includes:

first to (N−1)th storage cell lower side connection switches each having one end connected to a lower side of each of the third to Nth storage cells and the output terminal, and another end connected to the one end of the coil, and first to (N−1)th storage cell upper side connection switches each having one end connected to an upper side of each of the first to (N−1) th storage cells, and another end connected to another end of the coil, and wherein the balance charging circuit further comprising:

a diode having a cathode connected to the upper side of the first storage cell and an anode connected to the first storage cell upper side connection switch; and a capacitor connected between the anode of the diode and the reference voltage terminal.

22. The balance charging circuit for series-connected storage cells according to claim 7, wherein the first switch group includes:

a first coil connection switch having one end connected to the input terminal and another end connected to one end of the coil, a second coil connection switch having one end connected to the one end of the coil and another end connected to the reference voltage terminal, and the second switch group comprising:

first to (N−1)th storage cell lower side connection switches each having one end connected to a lower side of each of the third to Nth storage cells and the output terminal, and another end connected to the one end of the coil, and first to (N−1)th storage cell upper side connection switches each having one end connected to an upper side of each of the first to (N−1)th storage cells, and another end connected to another end of the coil, the balance charging circuit further comprising:

first to (N−1)th diodes each provided for each of the first to (N−1)th storage cells and having a cathode connected to an upper side of a corresponding storage cell and an anode connected to each of the first to (N−1)th storage cell upper side connection switches;

a first capacitor connected between an anode of the first diode and the reference voltage terminal; and second to (N−1)th capacitors each provided for each of the second to (N−1)th diodes and connected between an anode of a corresponding diode and an anode of a diode provided at a lower side of the corresponding diode.

23. The balance charging circuit for series-connected storage cells according to claim 21, wherein in the first coil charging period, the control circuit turns on the first coil connection switch and the first storage cell upper side connection switch;

in the second to Nth coil charging periods, the control circuit turns on the second coil connection switch and the first storage cell upper side connection switch, and turns off the first to (N−1)th storage cell lower side connection switches and the second to (N−1)th storage cell upper side connection switches;

in the first storage cell charging period, the control circuit turns on the second coil connection switch and the first storage cell upper side connection switch, and turns off the first to (N−1)th storage cell lower side connection switches and the second to (N−1)th storage cell upper side connection switches; and in the kth (k≥2) storage cell charging period, the control circuit turns off the first and second coil connection switches, turns on the (k−1)th storage cell lower side connection switch and the (k−1)th storage cell upper side connection switch, and turns off the switches other than the (k−1)th storage cell lower side connection switch among the first to Nth storage cell lower side connection switches, and the switches other than the (k−1)th storage cell upper side connection switch among the first to (N−1) storage cell upper side connection switches.

24. The balance charging circuit for series-connected storage cells according to claim 7, wherein the first switch group includes:

a first coil connection switch having one end connected to the input terminal and another end connected to one end of the coil, and a second coil connection switch having one end connected to another end of the coil and another end connected to the reference voltage terminal; and wherein the second switch group includes:

first to Nth storage cell lower side connection switches each having one end connected to a lower side of each of the first to Nth storage cells, and another end connected to the one end of the coil, and first to Nth storage cell upper side connection switches each having one end connected to an upper side of each of the first to Nth storage cells, and another end connected to the another end of the coil.

25. The balance charging circuit for series-connected storage cells according to claim 24, wherein in the first to Nth coil charging periods, the control circuit turns on the first coil connection switch and the second coil connection switch, and turns off the first to Nth storage cell lower side connection switches and the first to Nth storage cell upper side connection switches; and in the kth (1 ≤k≤N) storage cell charging period, the control circuit turns on the kth storage cell lower side connection switch and the kth storage cell upper side connection switch, and turns off the switches other than the kth storage cell lower side connection switch among the first to Nth storage cell lower side connection switches, and the switches other than the kth storage cell upper side connection switch among the first to Nth storage cell upper side connection switches.

26. The balance charging circuit for series-connected storage cells according to claim 13, wherein after all operations corresponding to the kth (k is an odd number) coil charging period and the kth (k is an odd number) storage cell charging period are completed, the control circuit controls the first and second switch groups to be turned on and off so that operations corresponding to the kth (k is an even number) coil charging period and the kth (k is an even number) storage cell charging period are performed.

27. The balance charging circuit for series-connected storage cells according to claim 13, wherein after all operations corresponding to the kth (k is an even number) coil charging period and the kth (k is an even number) storage cell charging period are completed, the control circuit controls the first and second switch groups to be turned on and off so that operations corresponding to the kth (k is an odd number) coil charging period and the kth (k is an odd number) storage cell charging period are performed.

* * * * *